United States Patent [19]
Kanoshima et al.

[11] Patent Number: 5,311,364
[45] Date of Patent: May 10, 1994

[54] READING LENS FOR SCANNER

[75] Inventors: Yuichiro Kanoshima, Tokyo; Taira Kouchiwa, Kamakura; Kiichiro Nishina, Tokyo; Kohji Ichimiya, Yokohama; Yoshitsugu Kohno, Miyamori; Naomi Harada, Yokohama, all of Japan

[73] Assignee: Ricoh Company, Ltd., Tokyo, Japan

[21] Appl. No.: 903,484

[22] Filed: Jun. 22, 1992

Related U.S. Application Data

[63] Continuation of Ser. No. 574,100, Aug. 29, 1990, abandoned.

[30] Foreign Application Priority Data

| Aug. 30, 1989 | [JP] | Japan | 1-223664 |
| Aug. 31, 1989 | [JP] | Japan | 1-225086 |
| Nov. 14, 1989 | [JP] | Japan | 1-295797 |
| Dec. 20, 1989 | [JP] | Japan | 1-330097 |
| Dec. 27, 1989 | [JP] | Japan | 1-341976 |

[51] Int. Cl.$^5$ .......................... G02B 9/62; G02B 9/52; G02B 9/54
[52] U.S. Cl. ..................... 359/756; 359/708; 359/740
[58] Field of Search ............ 350/432, 464, 450; 359/708, 740, 756, 776, 771–772

[56] References Cited

U.S. PATENT DOCUMENTS

| 3,459,468 | 8/1969 | Marx et al. | 350/432 |
| 3,817,599 | 6/1974 | McCrobic | 350/464 |
| 4,711,536 | 12/1987 | Kouchiwa | 359/788 |
| 4,753,522 | 6/1988 | Nishima | 359/756 |
| 4,902,114 | 2/1990 | Arai | 350/432 |
| 5,040,884 | 8/1991 | Kanoshima | 359/740 |

Primary Examiner—Bruce Y. Arnold
Assistant Examiner—James Phan
Attorney, Agent, or Firm—Oblon, Spivak, McClelland, Maier & Neustadt

[57] ABSTRACT

A reading lens for a scanner to read an original in a reduced magnification, the lens comprising six lenses, i.e., from a first lens to a sixth lens in order on an optical axis. The first lens is a positive lens having a first lens-surface and a second lens-surface. The second lens is a negative lens disposed in contact with the first lens and has the second lens-surface in common with the first lens and a third lens-surface. The third lens is a meniscus lens and has a fourth lens-surface and a fifth lens-surface. The fourth lens is a meniscus lens and has a sixth lens-surface and a seventh lens-surface. The fifth lens is a negative lens and has a eighth lens-surface and a ninth lens-surface. The sixth lens is a positive lens disposed in contact with the fifth lens and has the ninth lens-surface in common with the fifth lens and a tenth lens-surface. At least one of the ten lens-surfaces is formed as an aspherical surface.

9 Claims, 91 Drawing Sheets

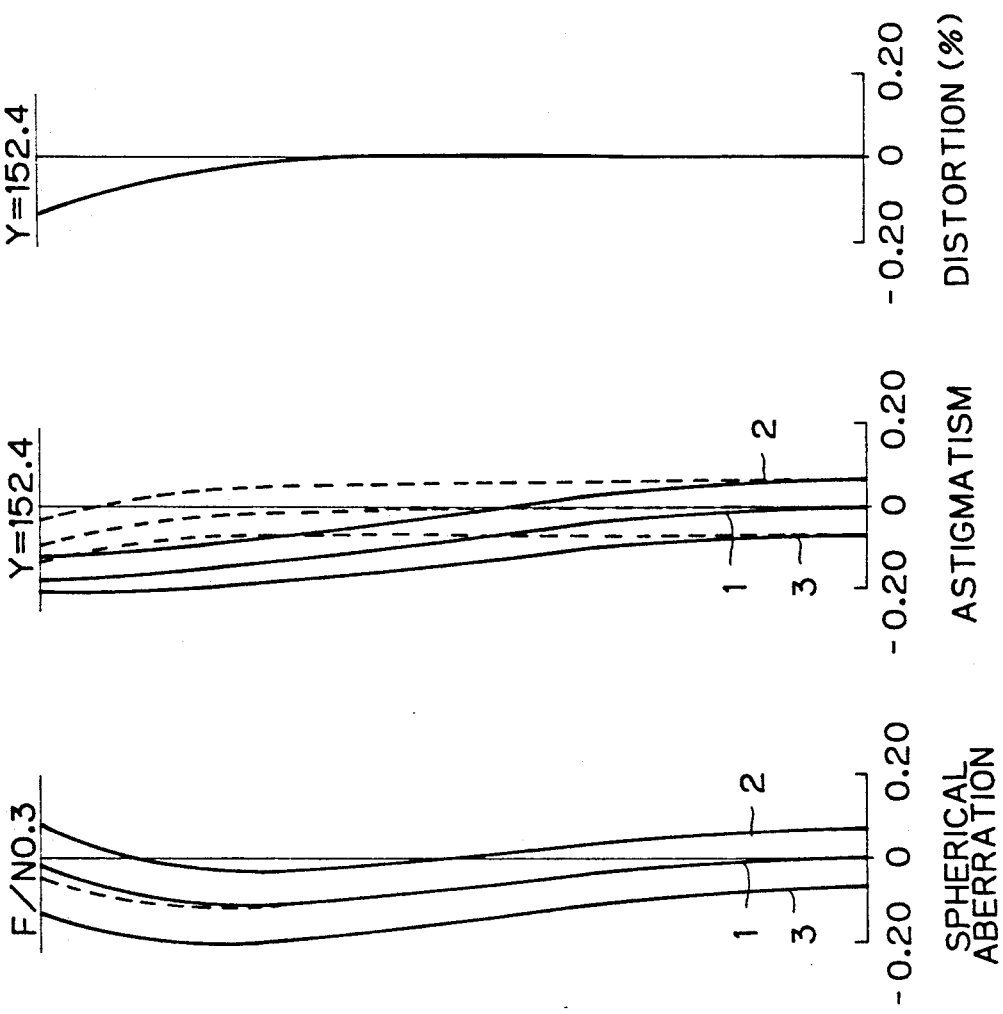

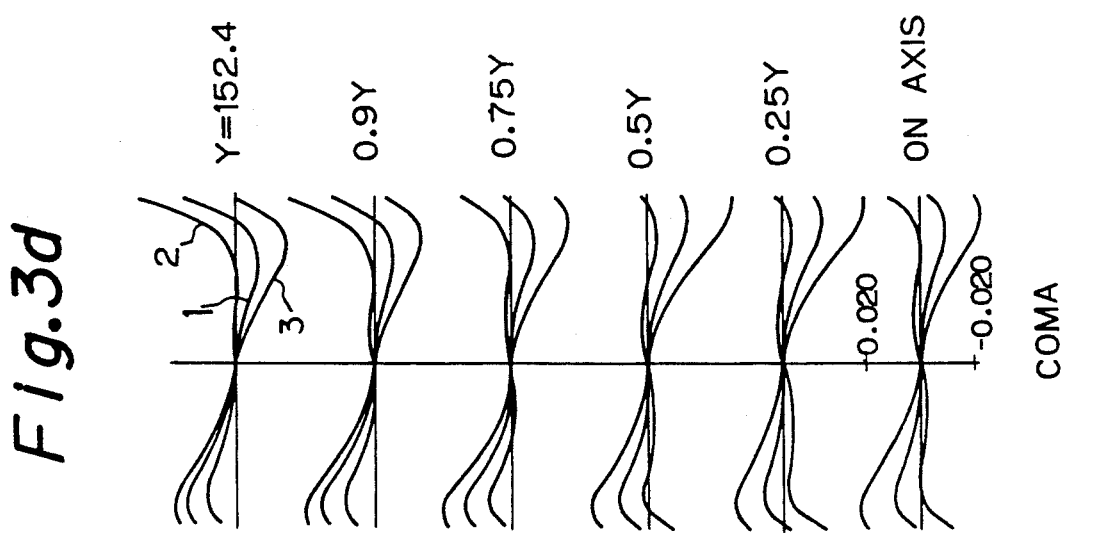

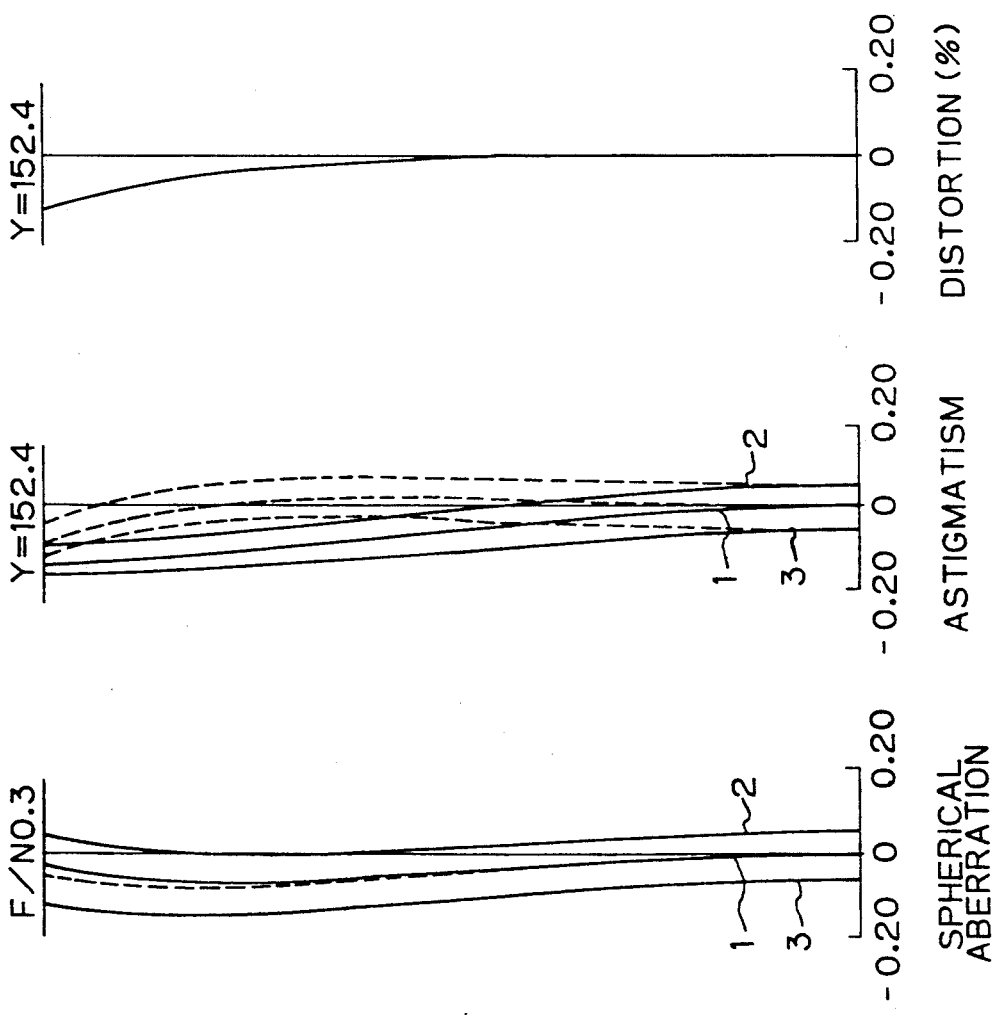

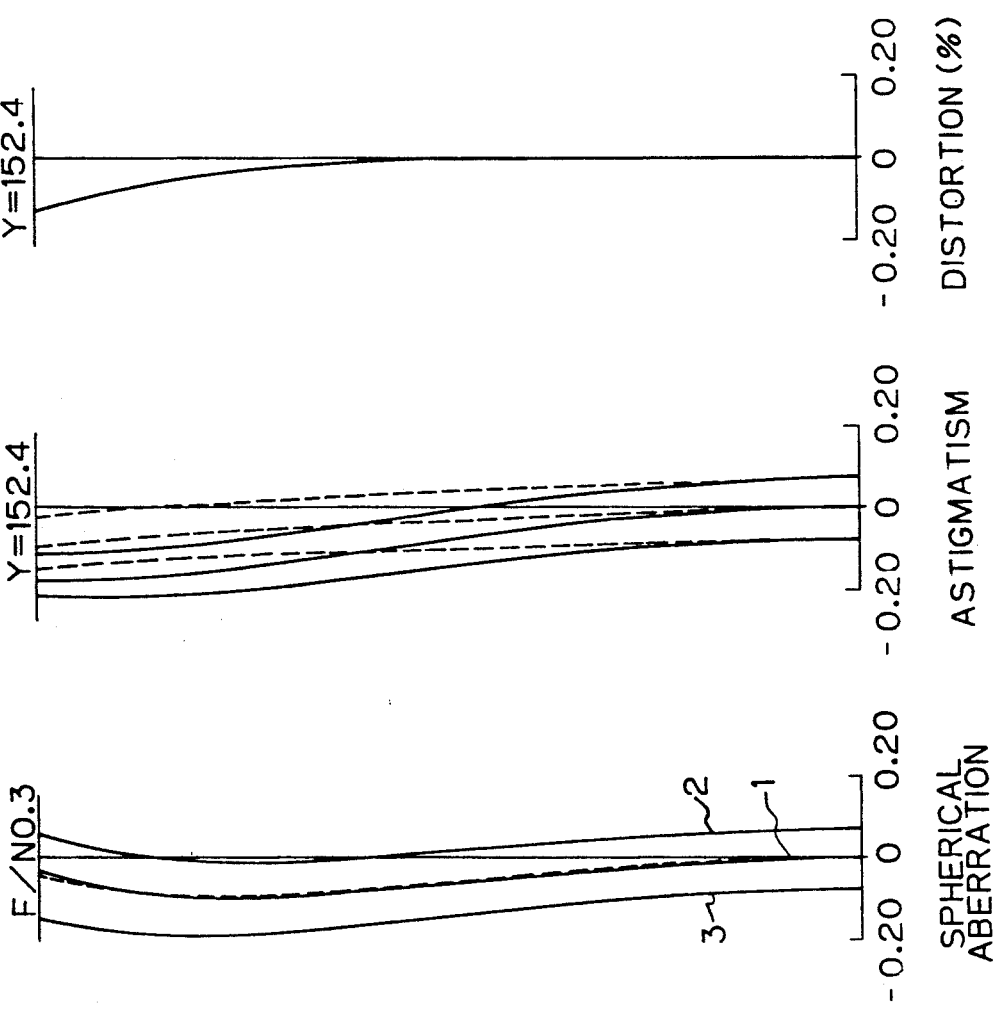

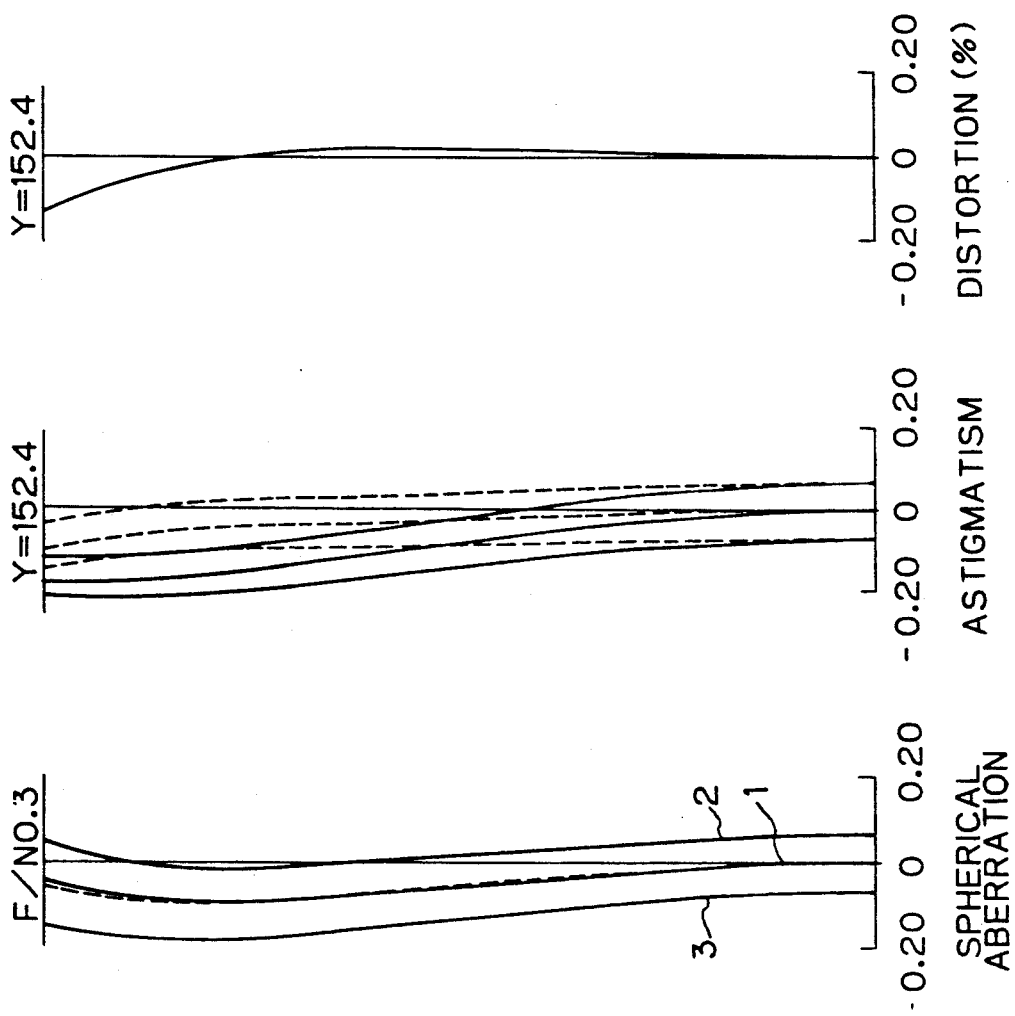

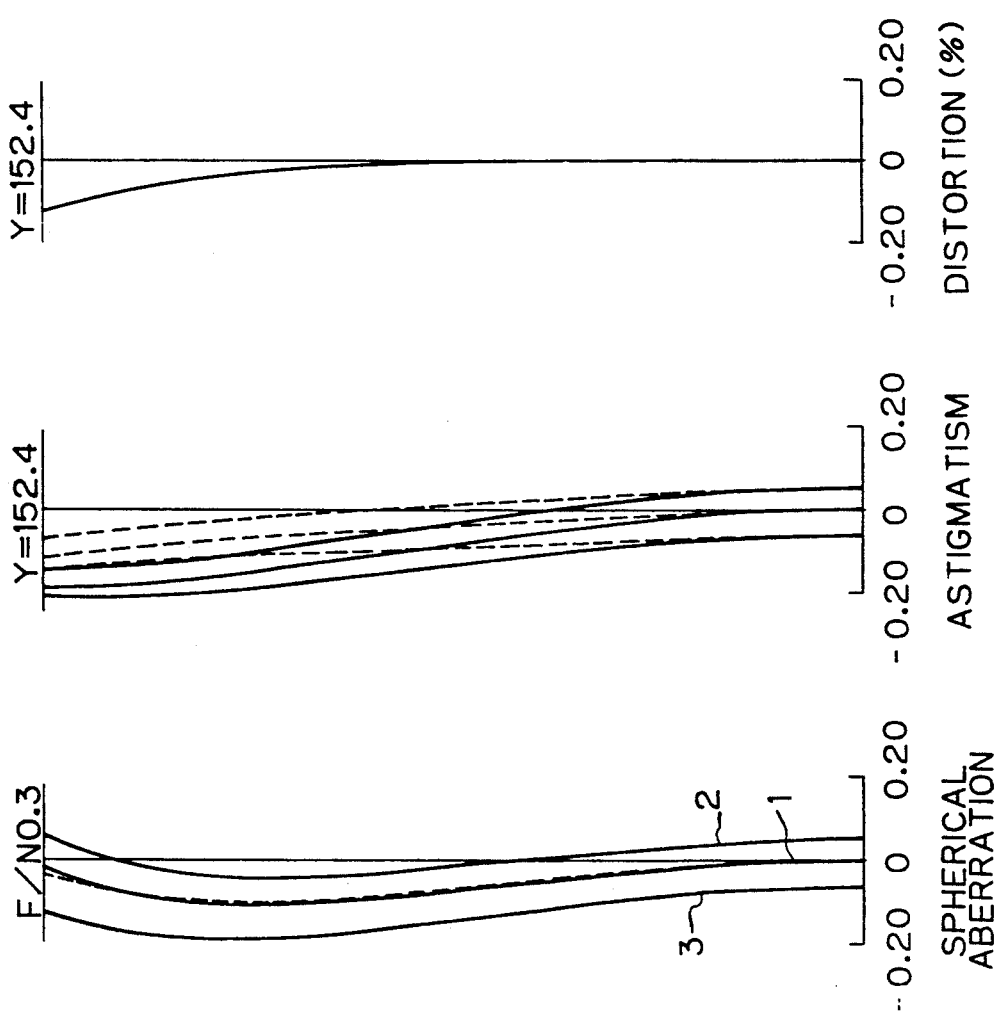

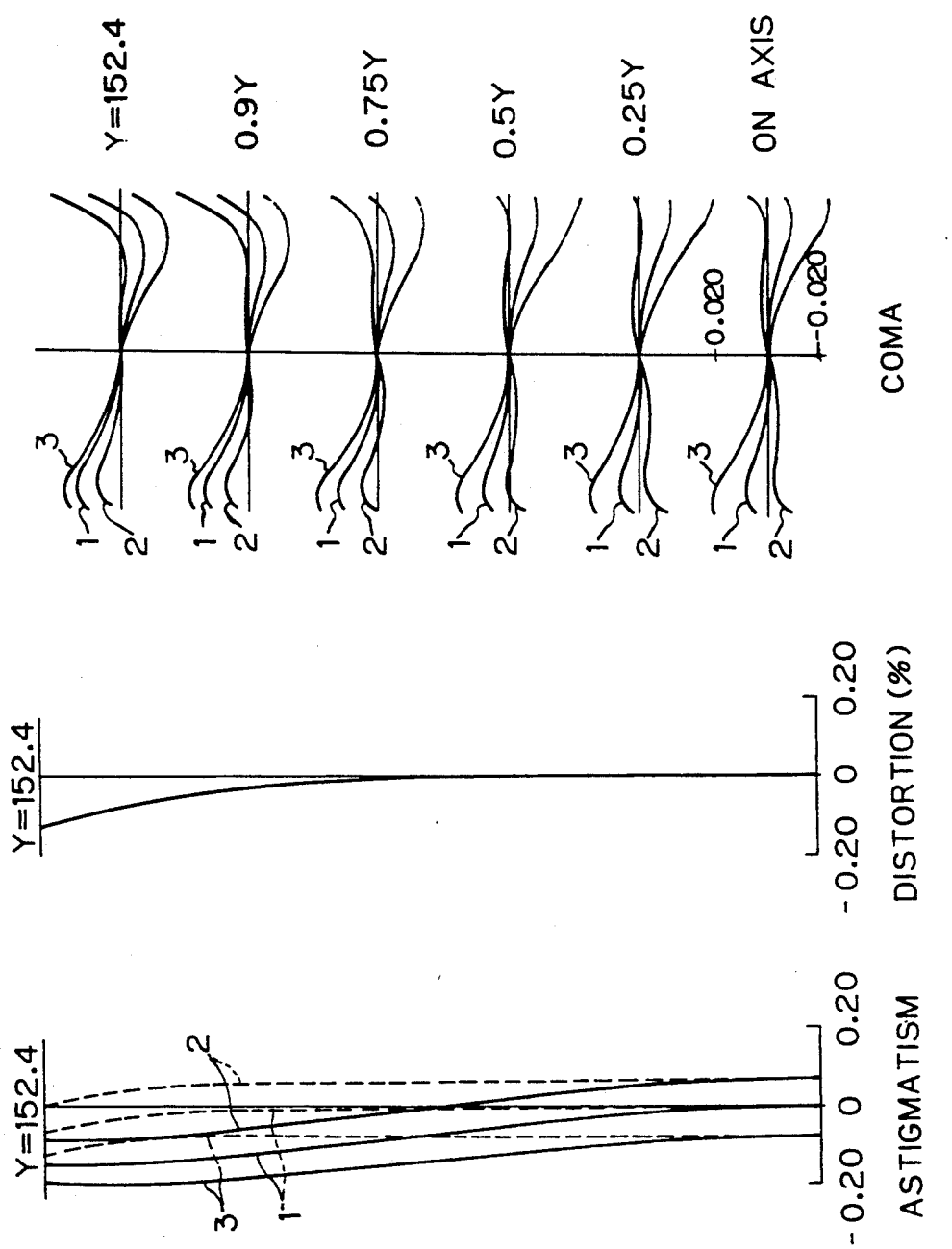

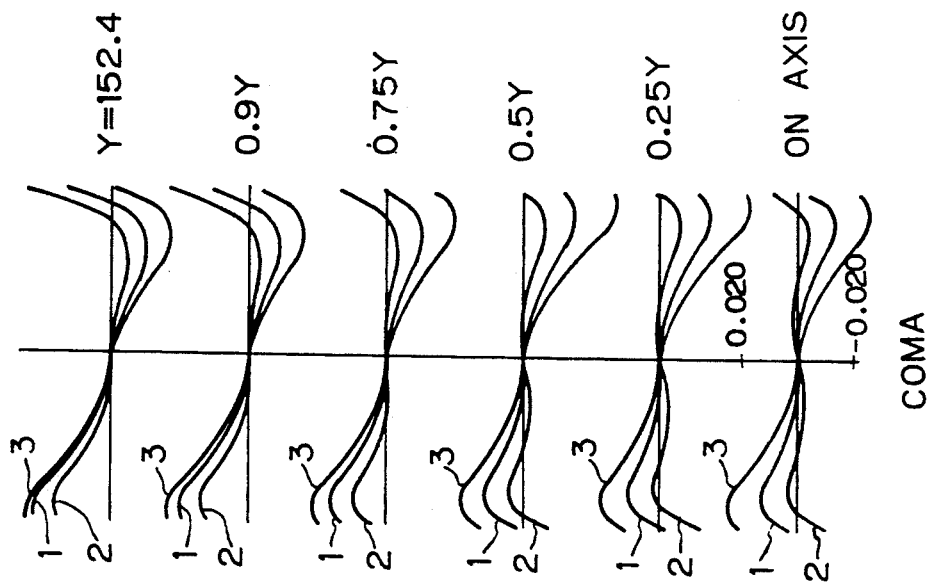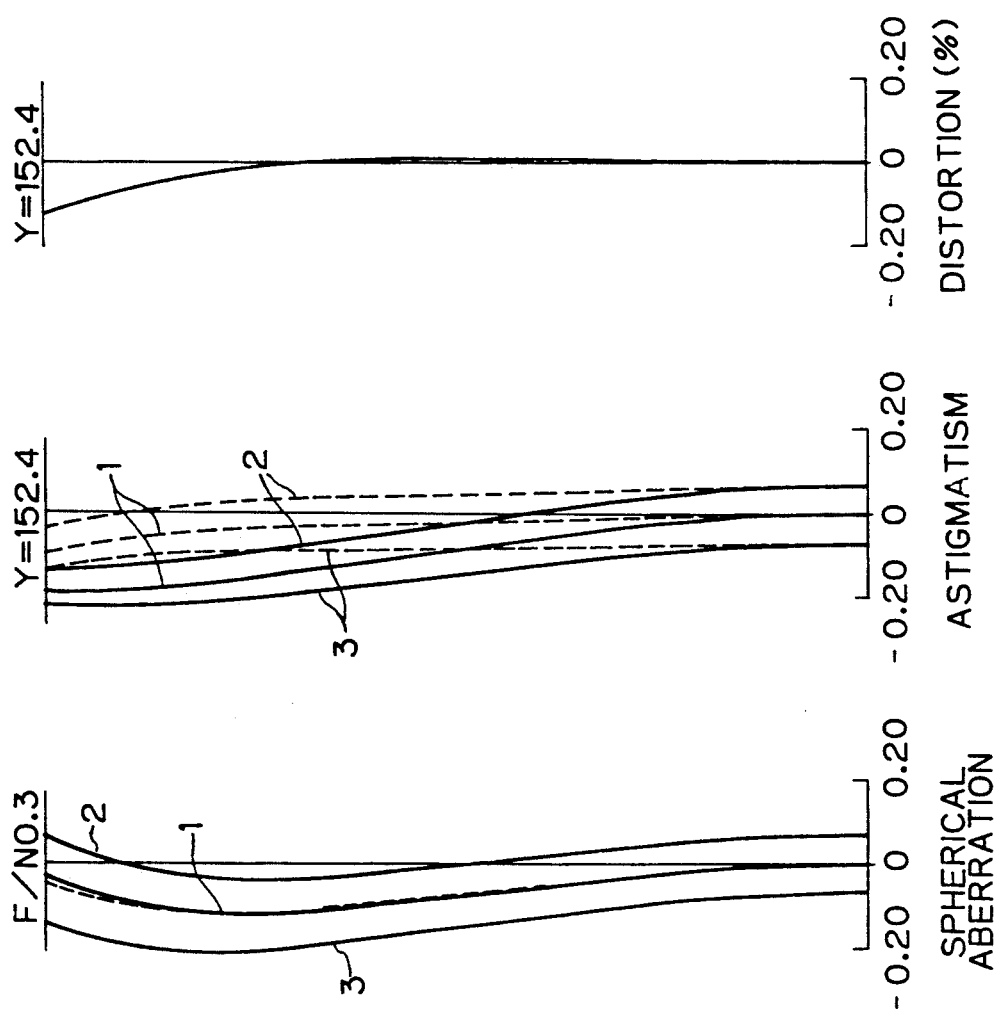

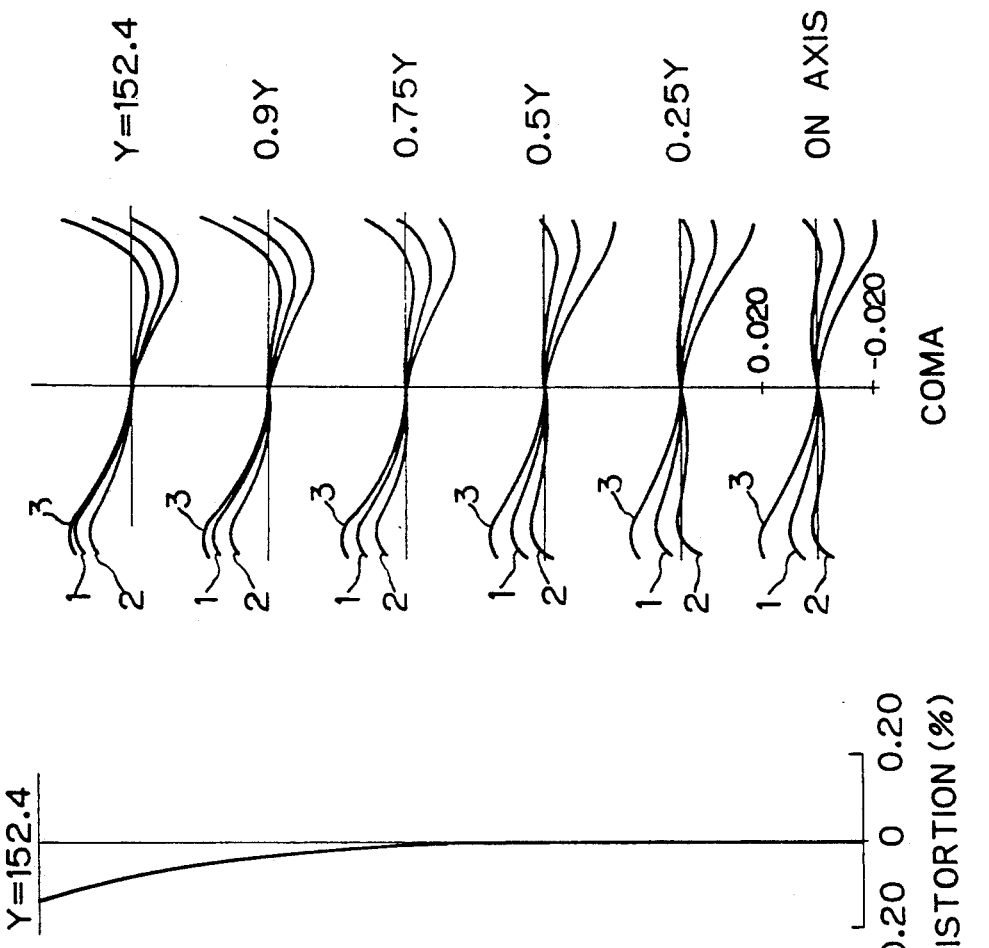

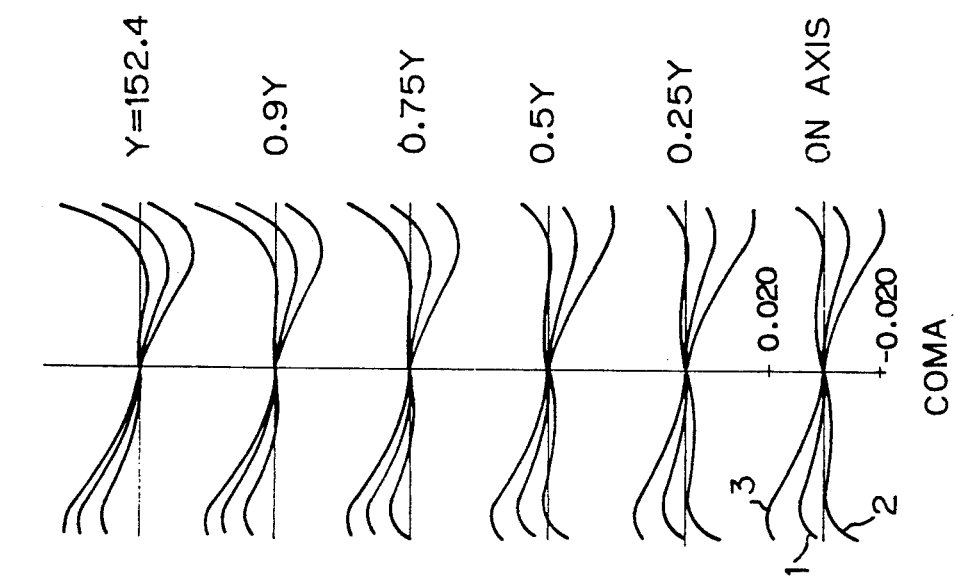
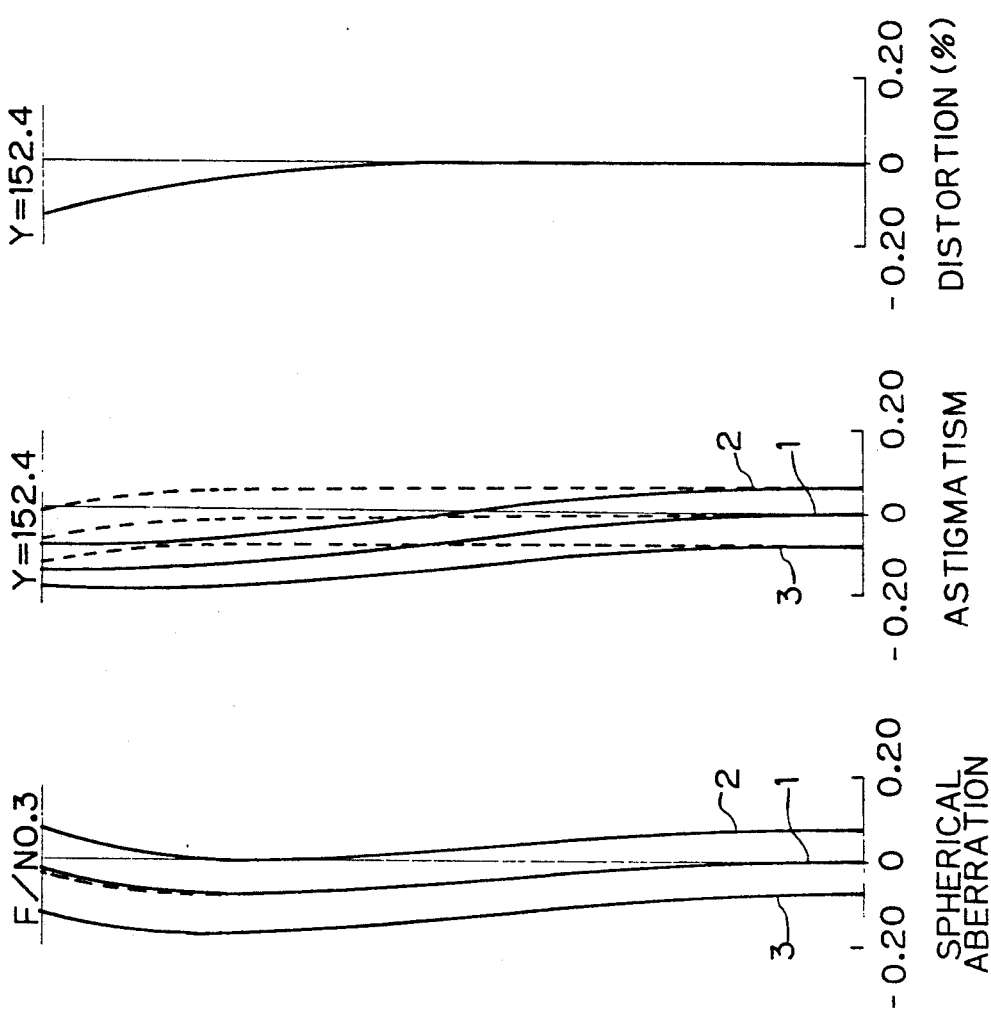

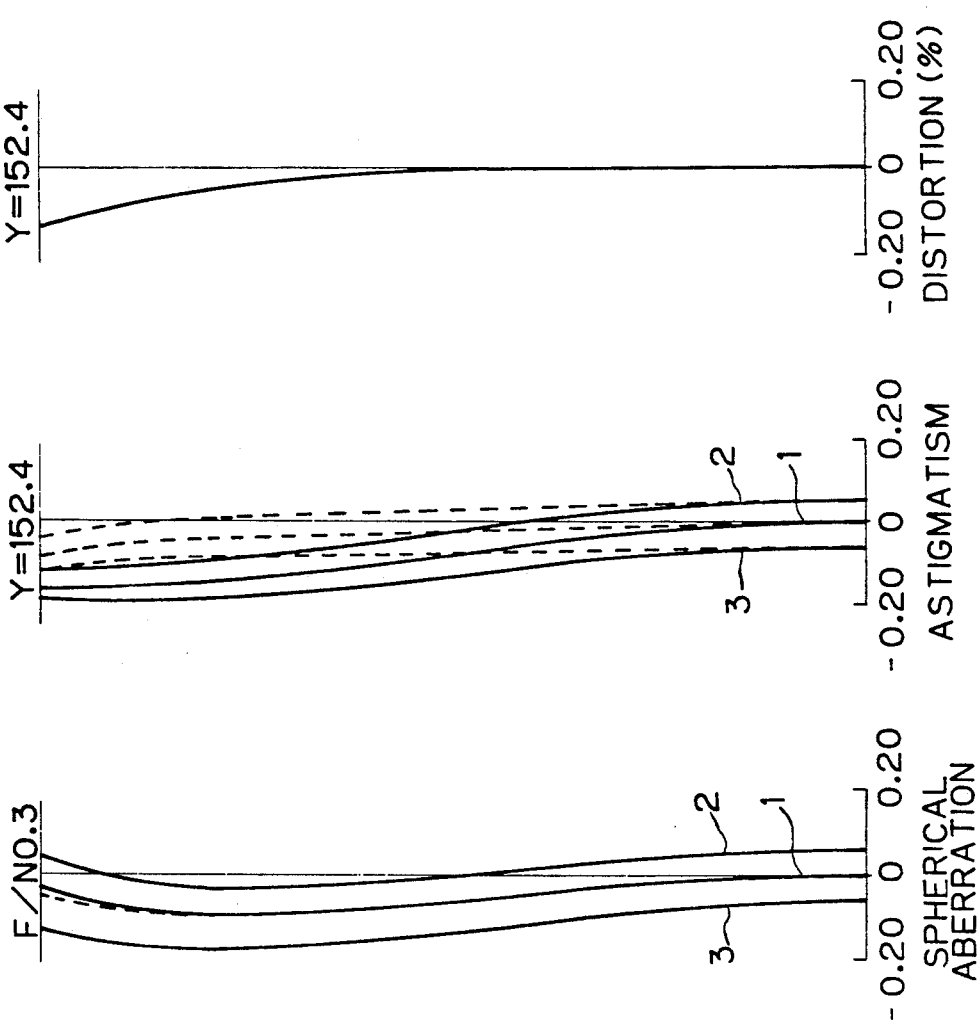

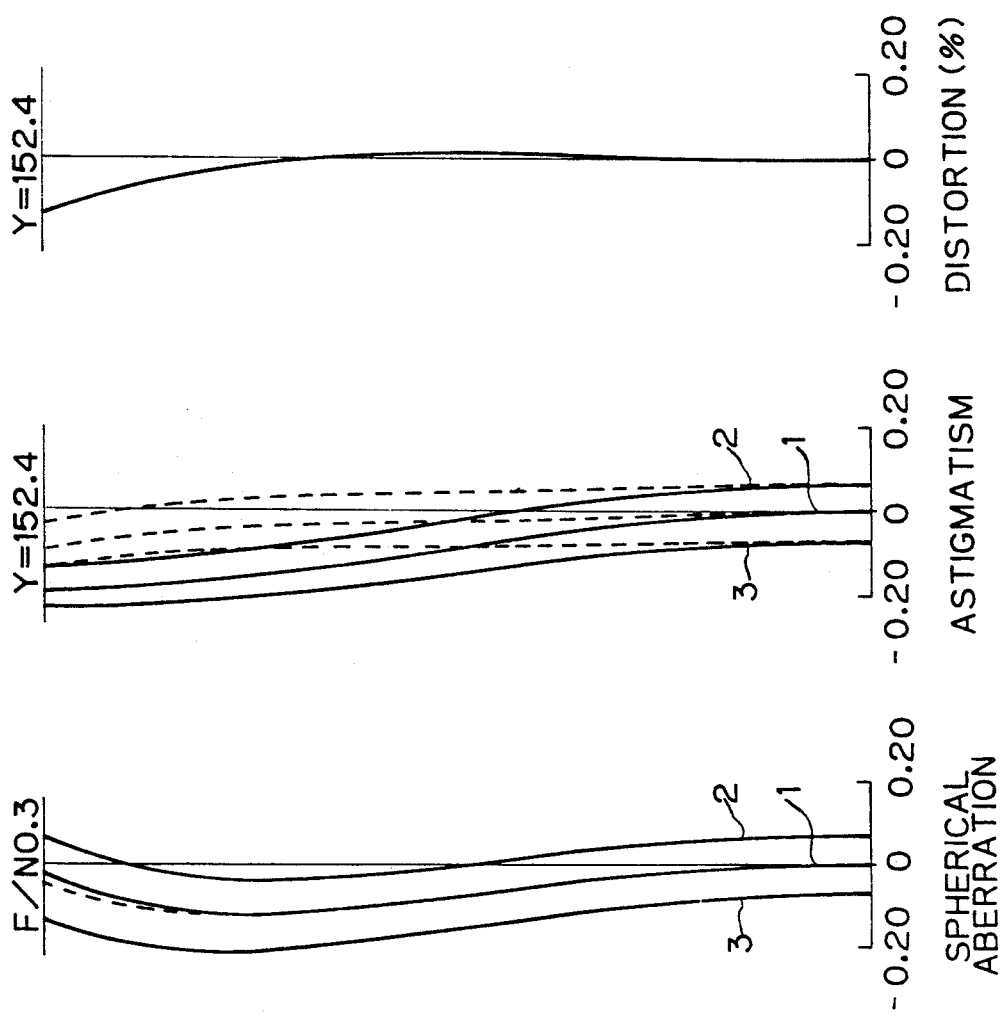

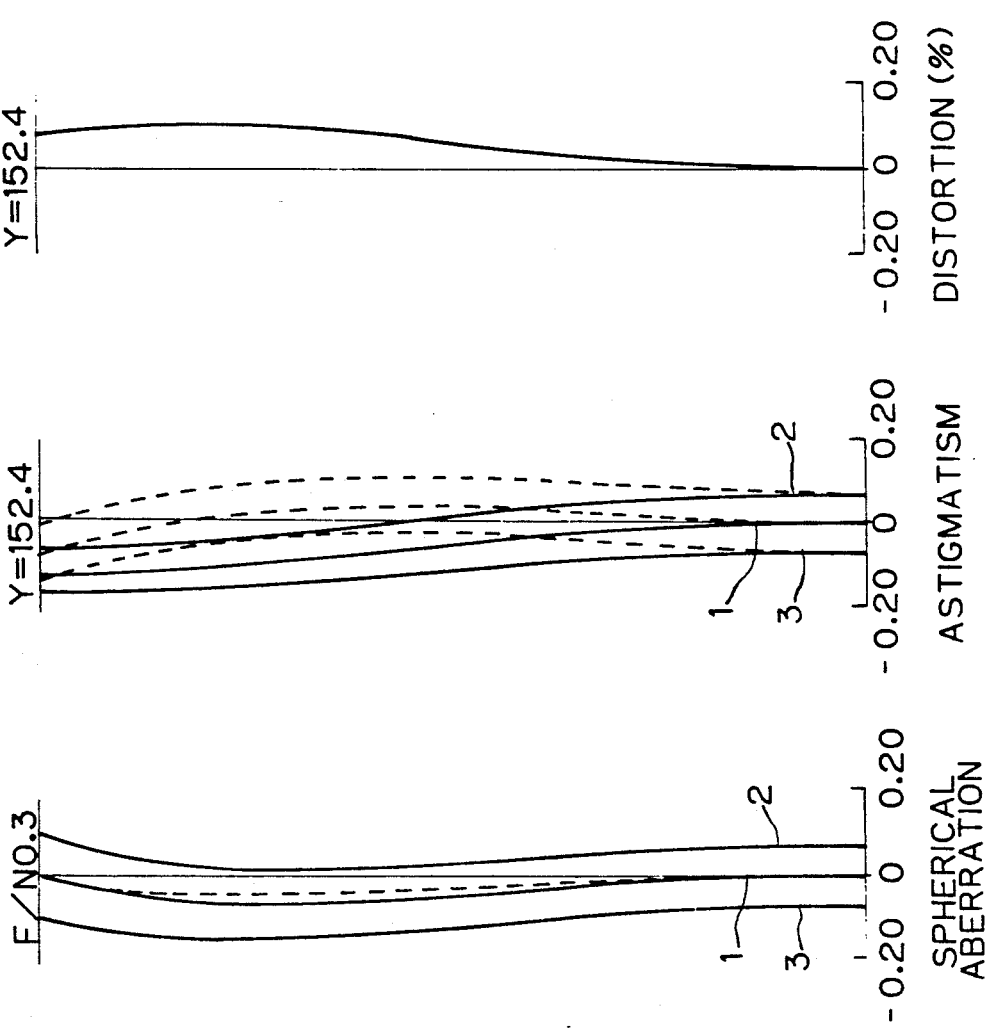

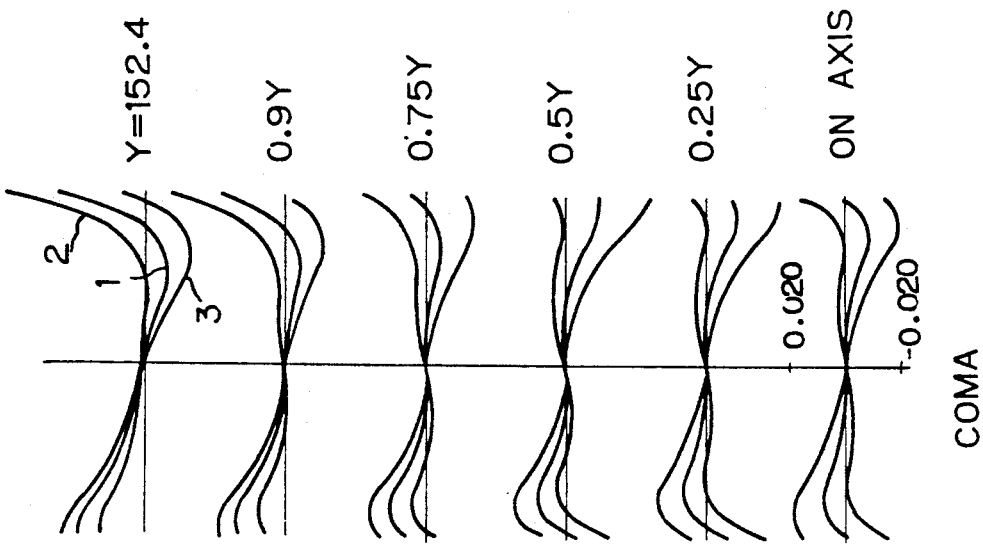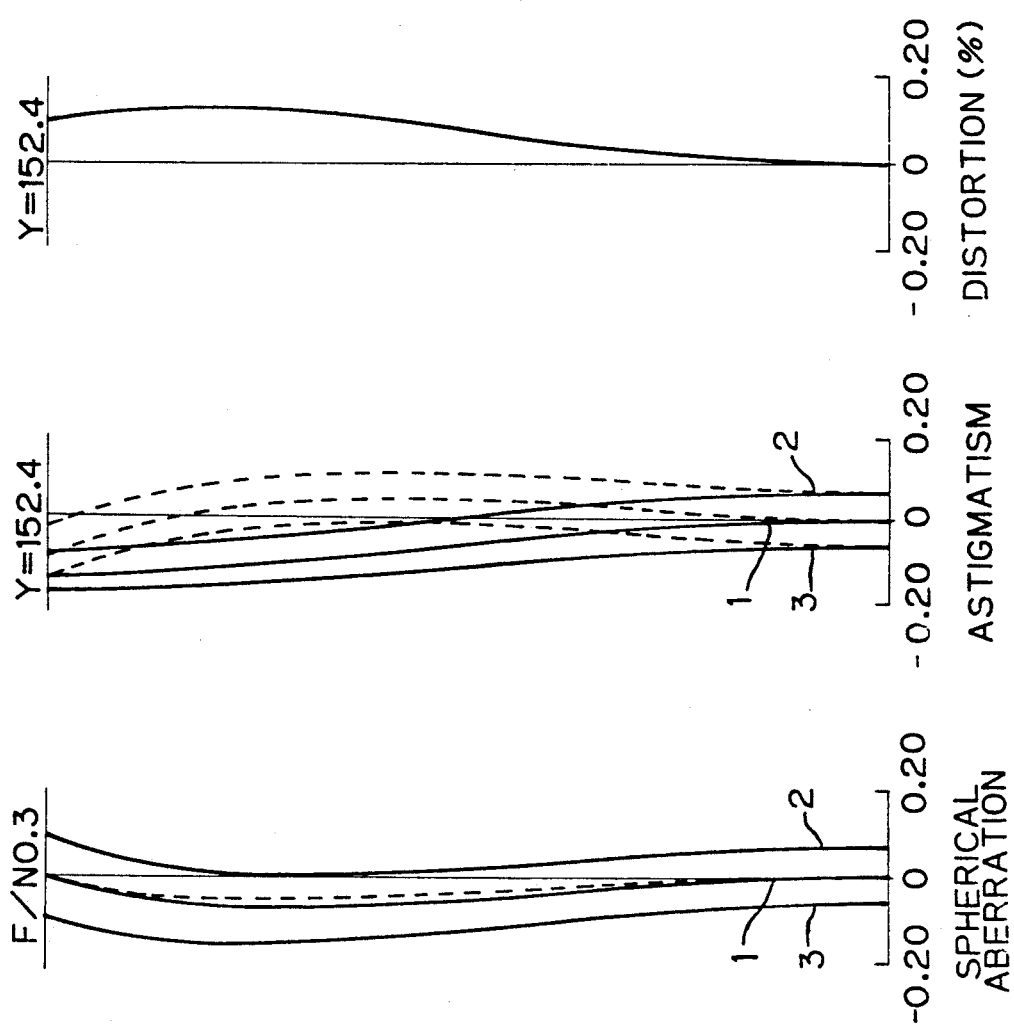

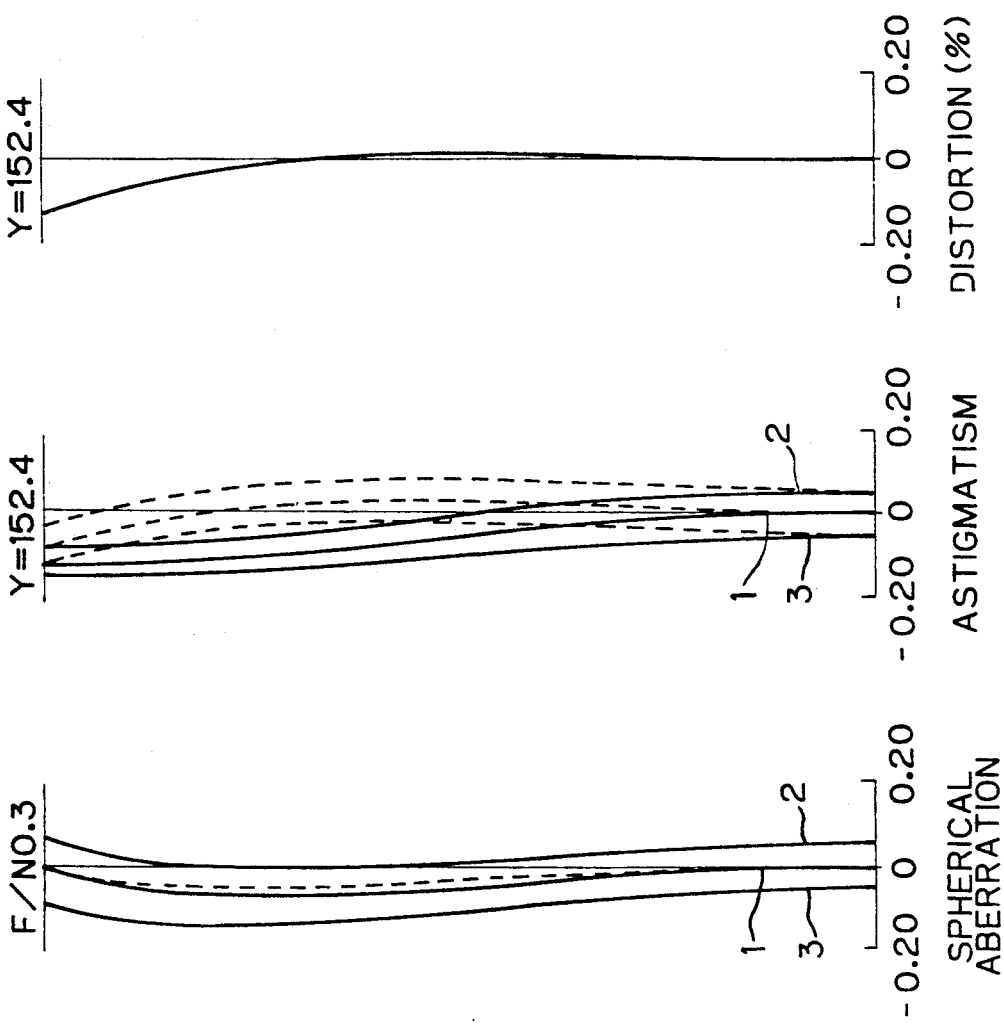
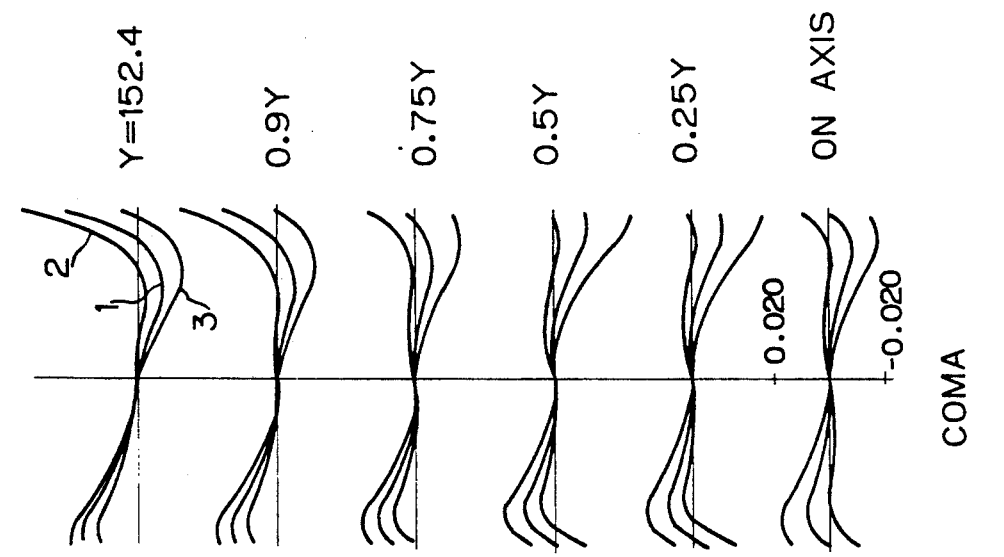

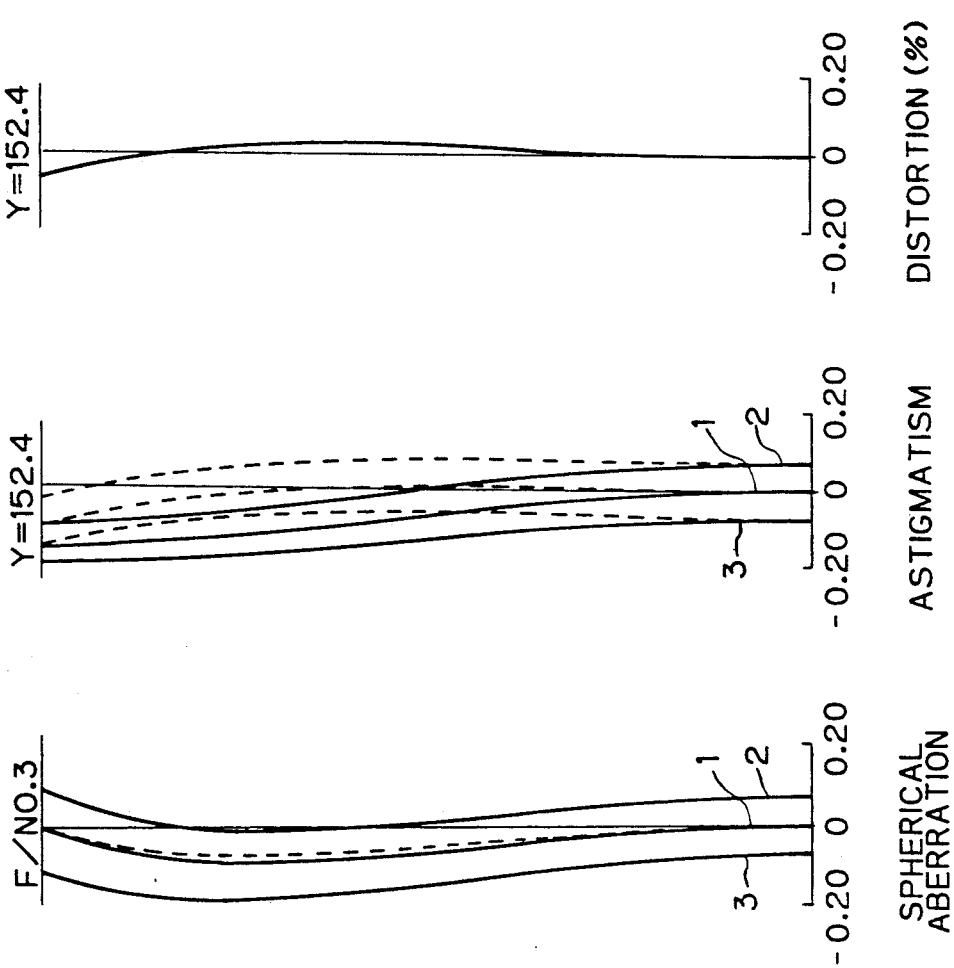

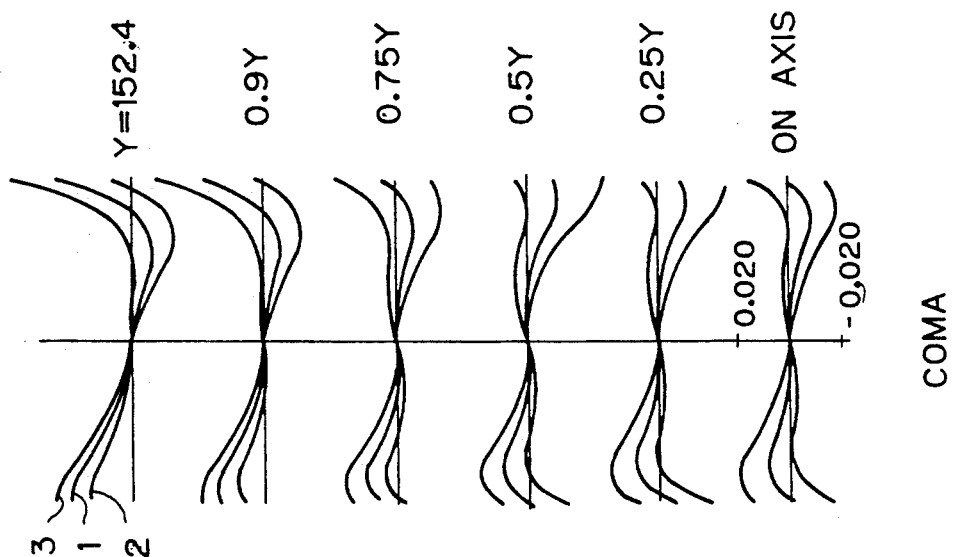
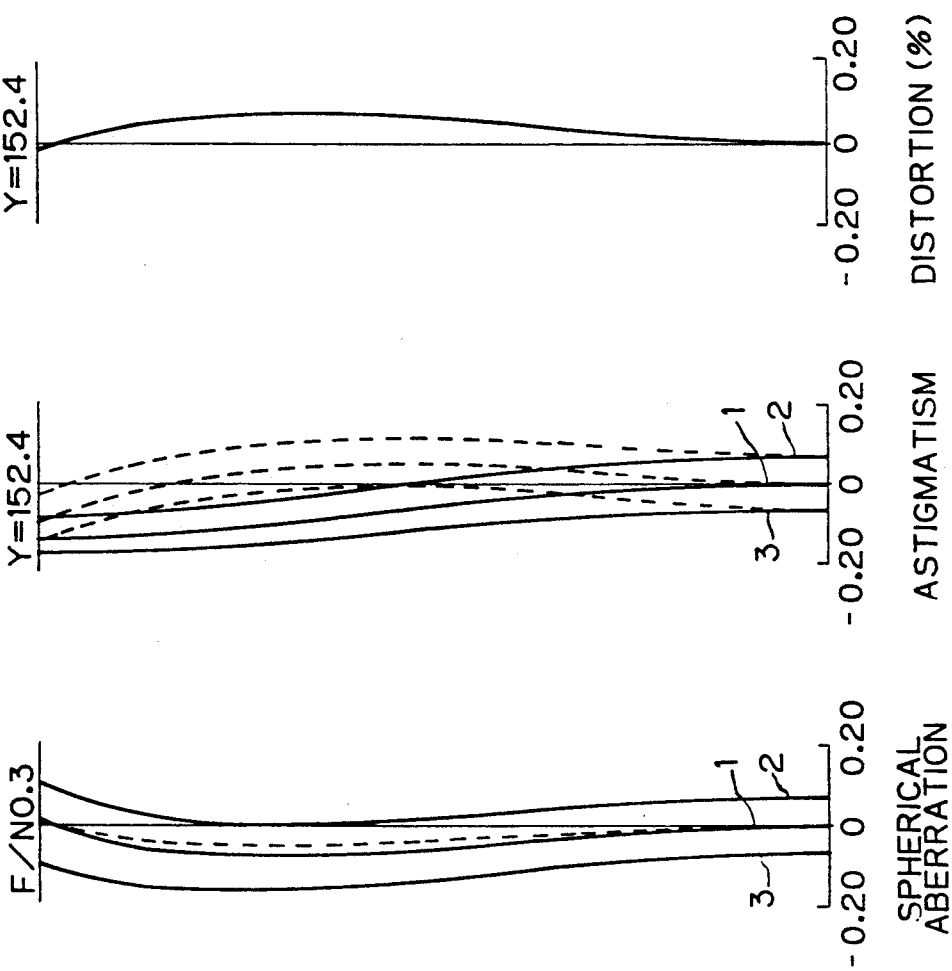

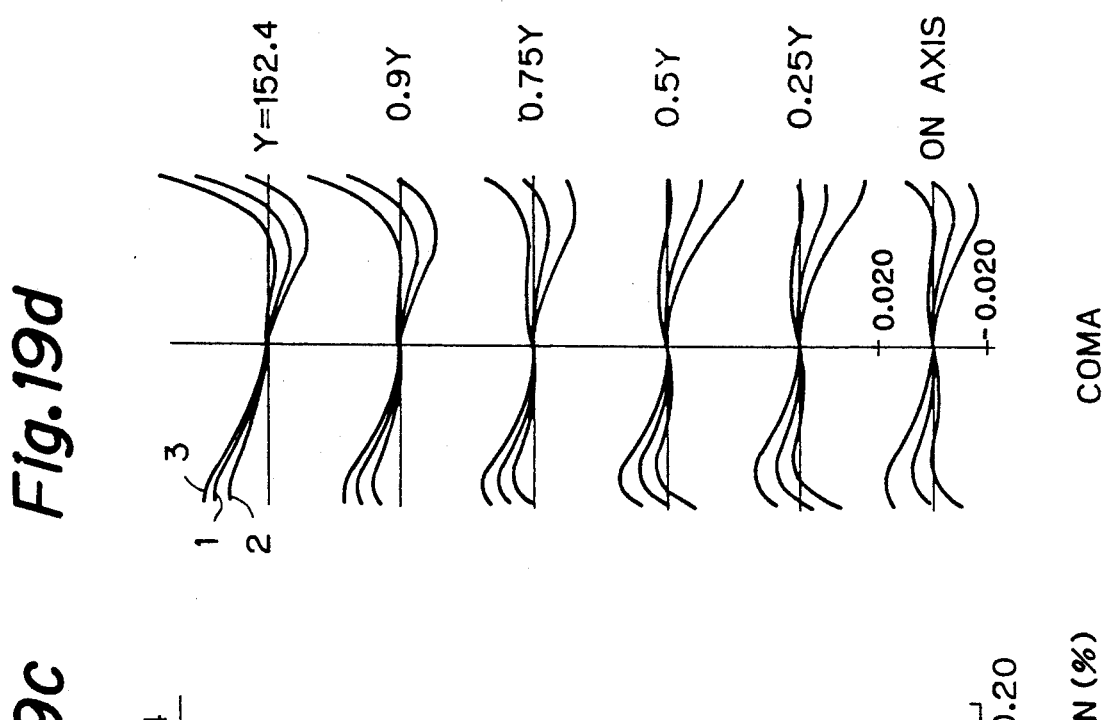

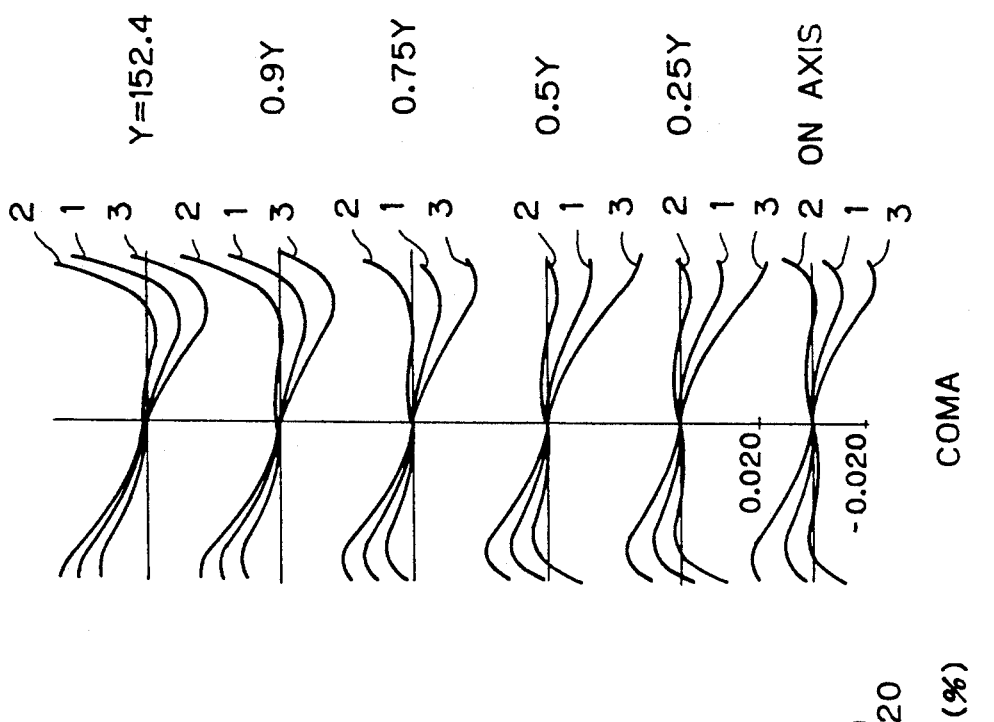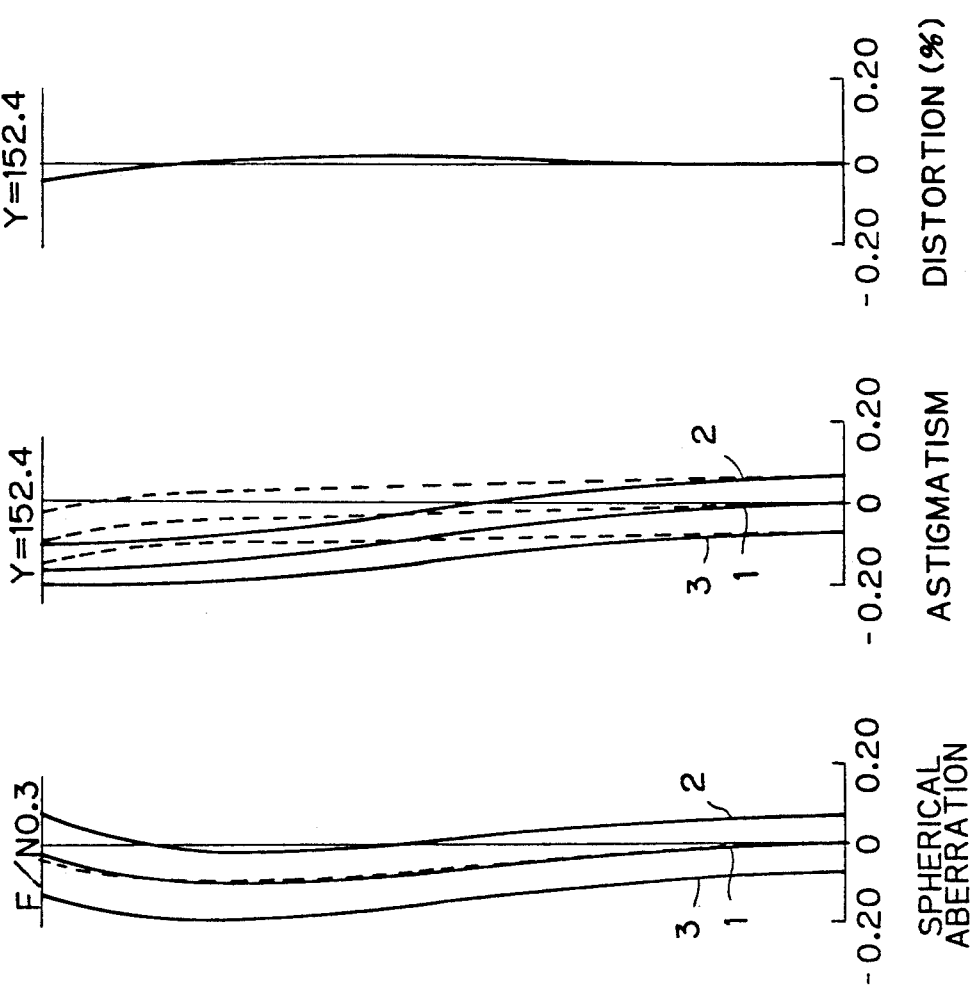

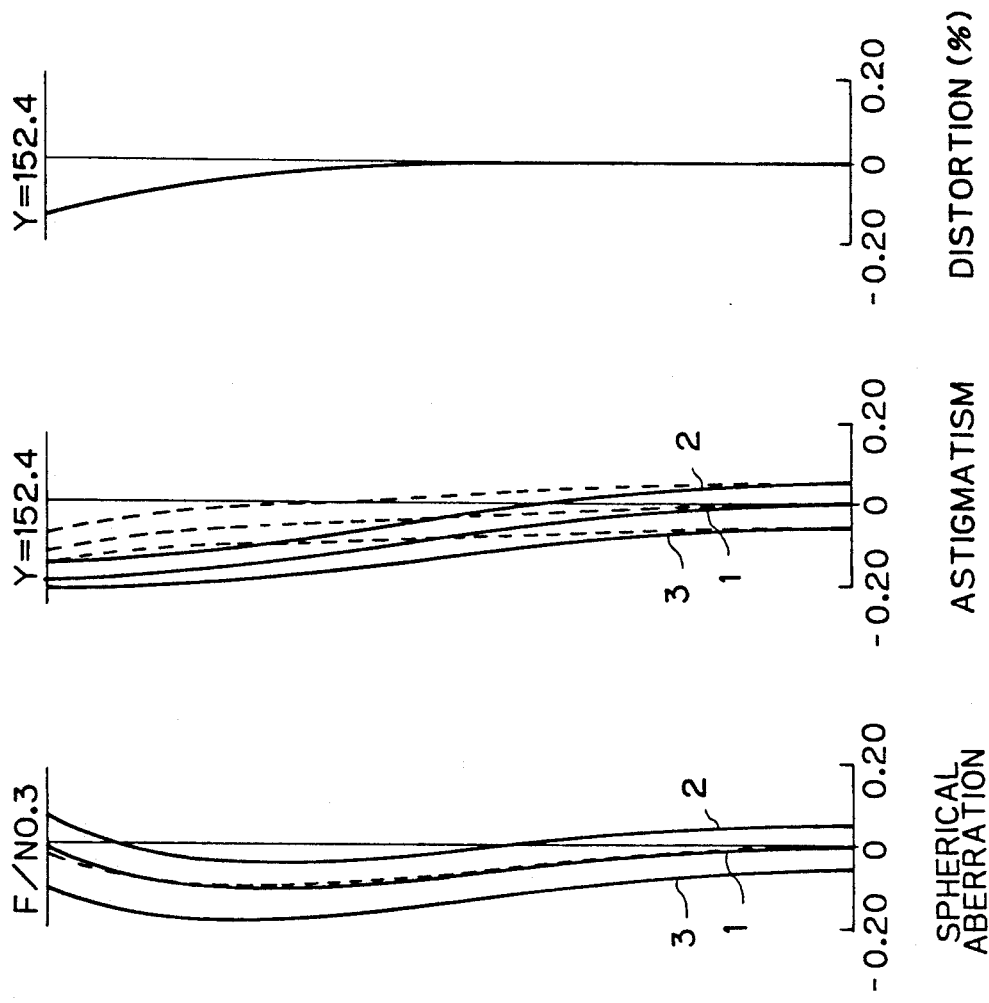

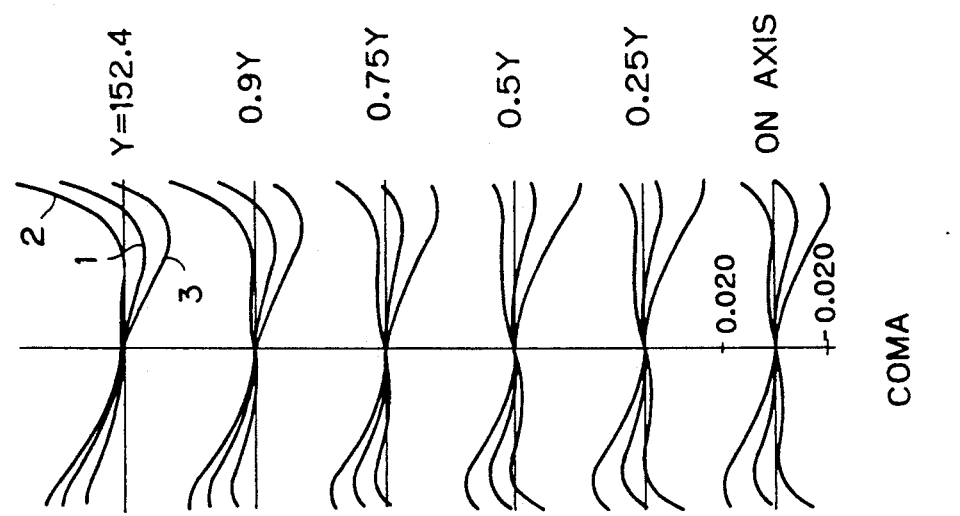
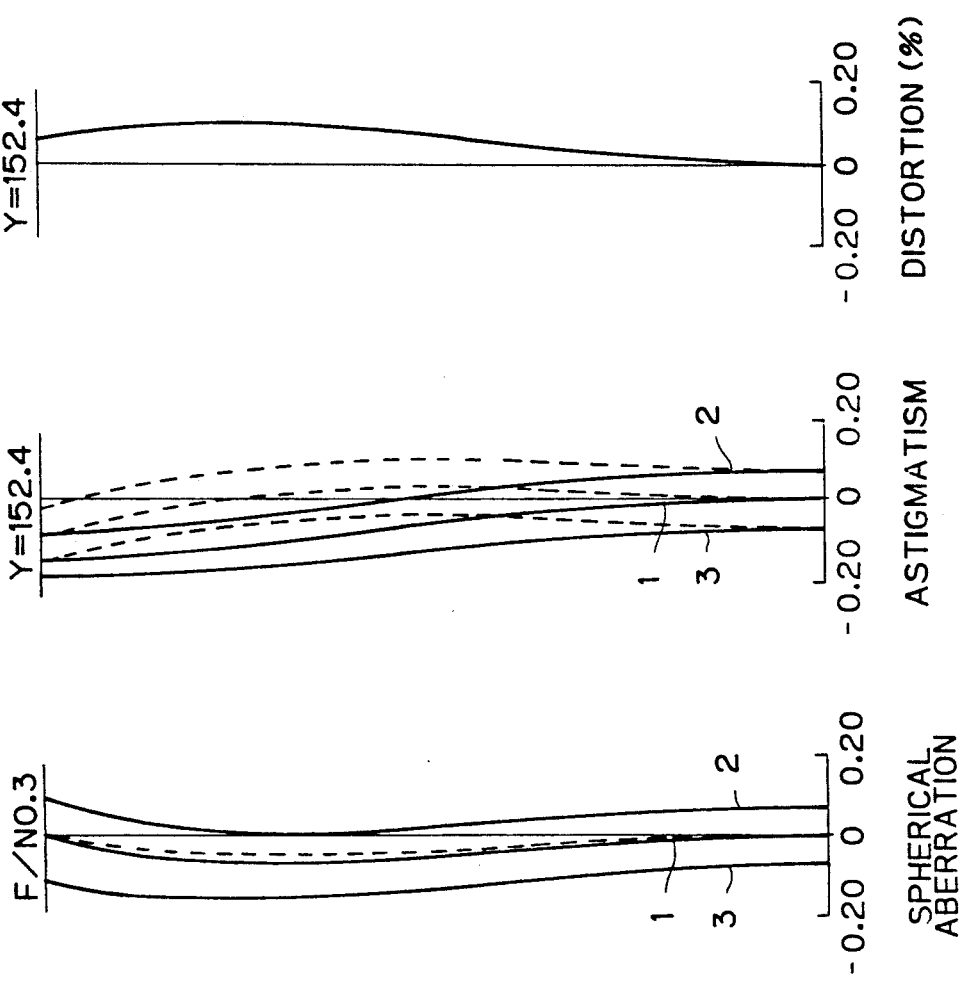

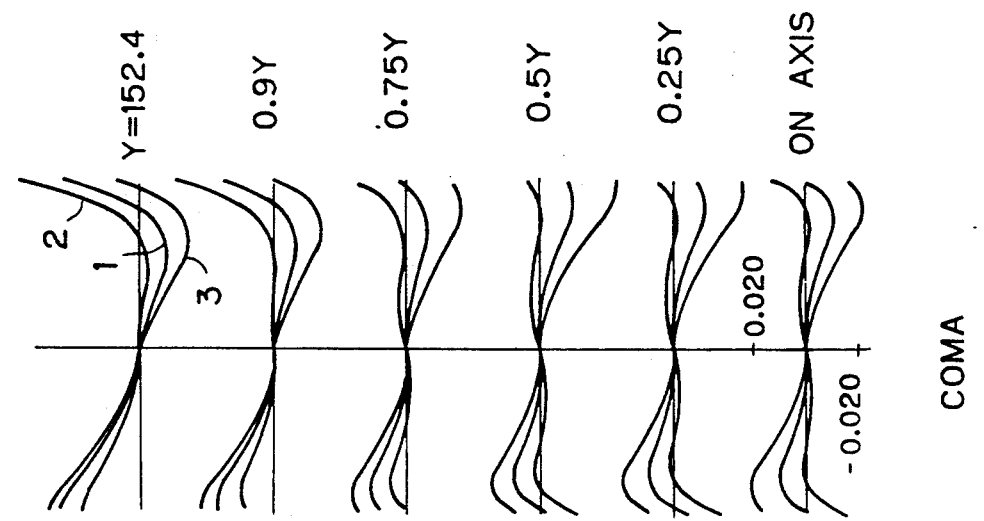
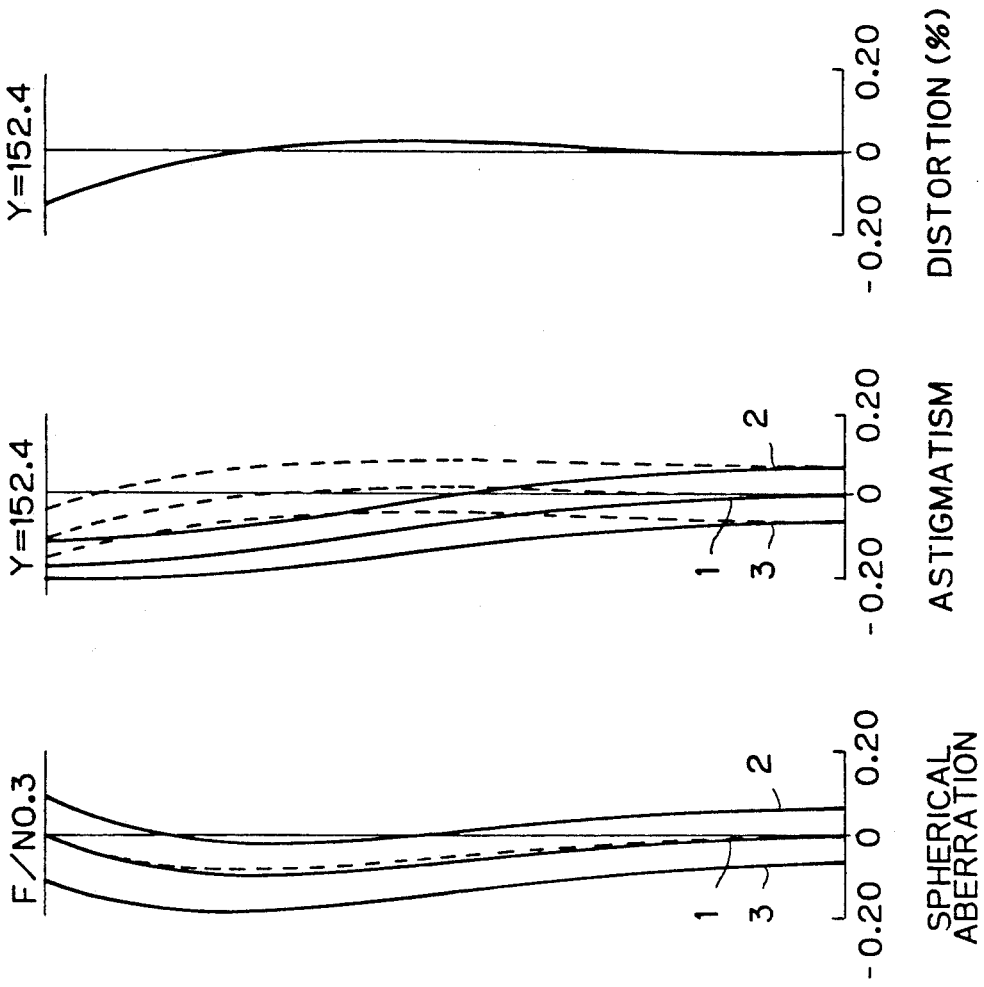

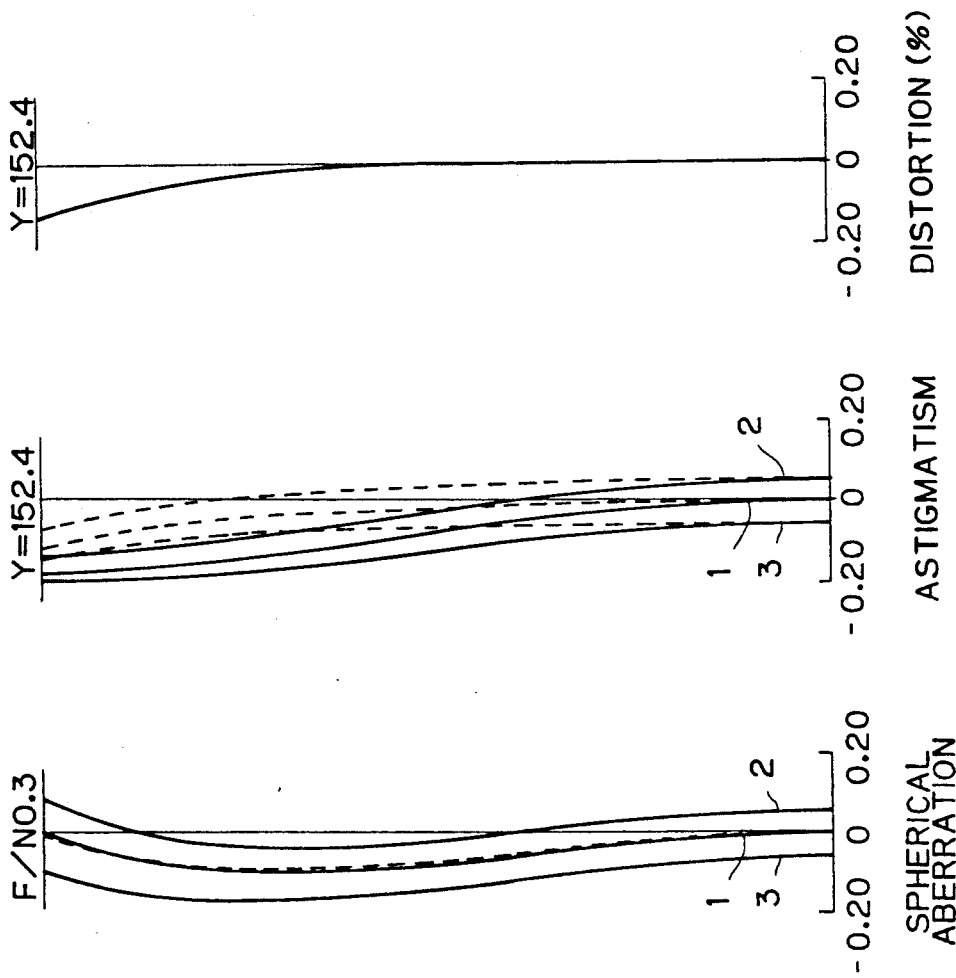

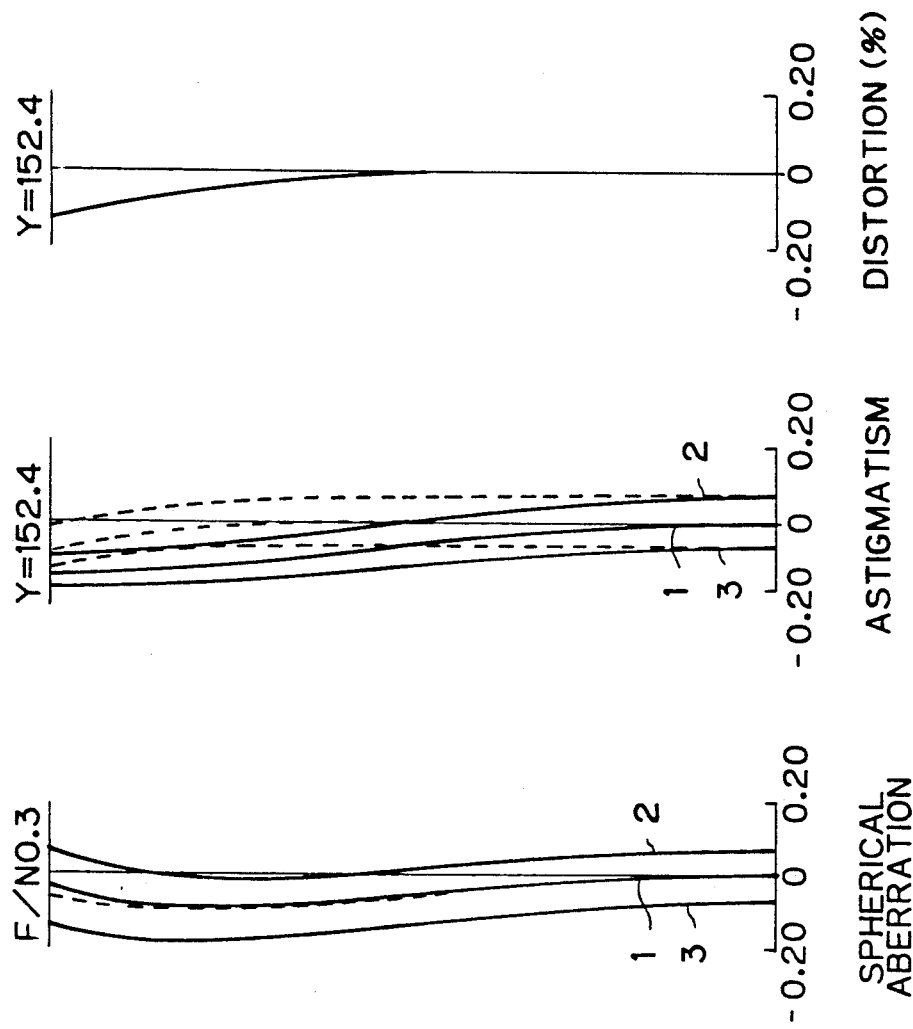

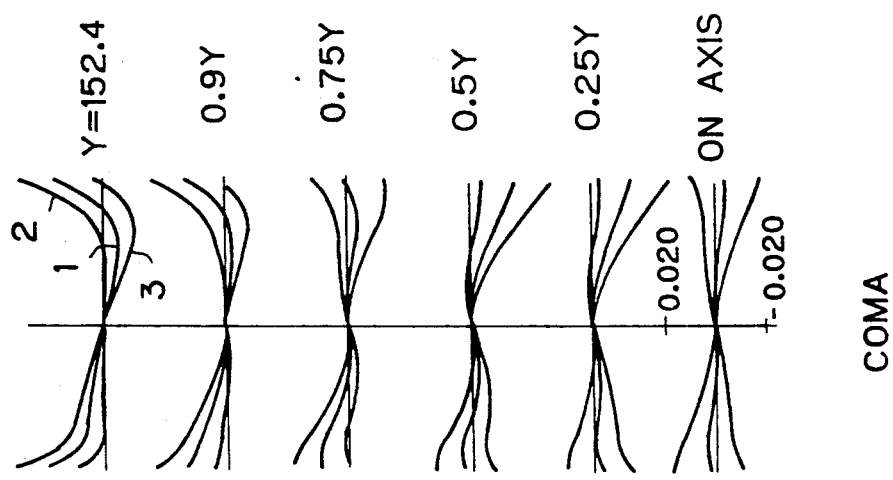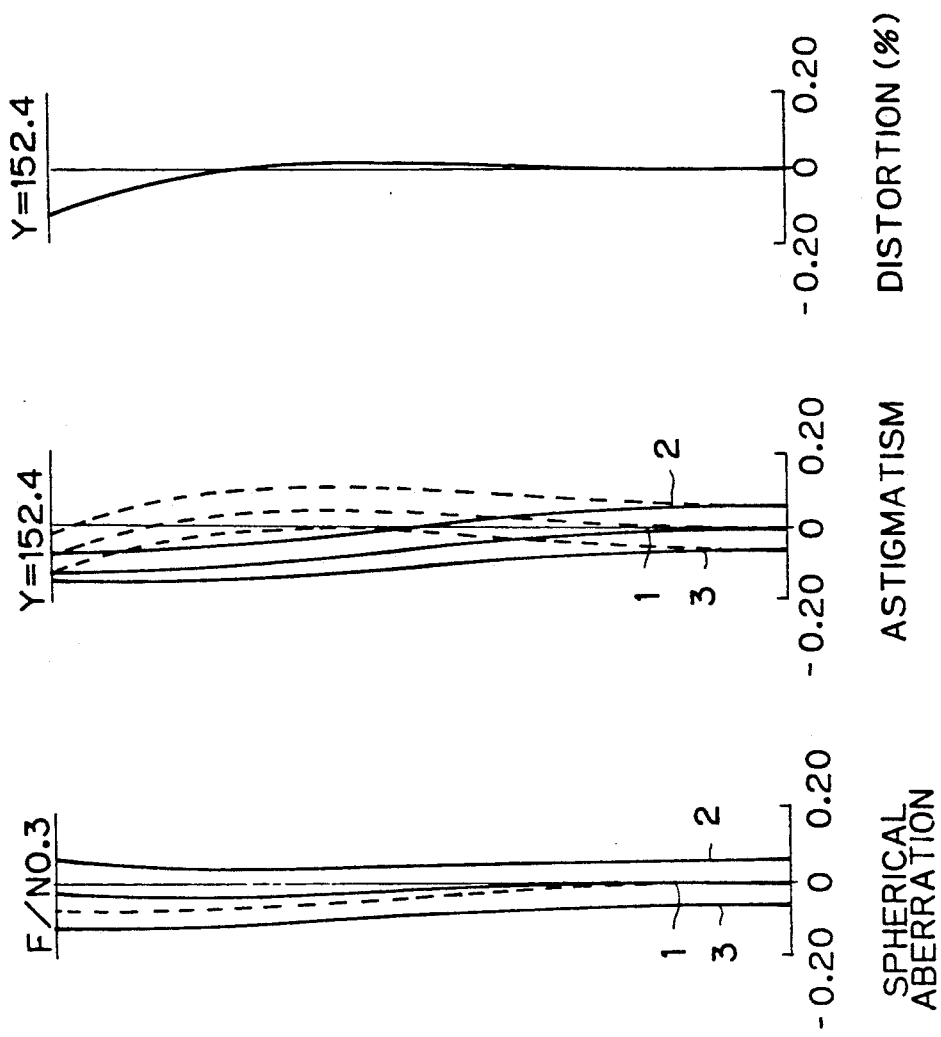

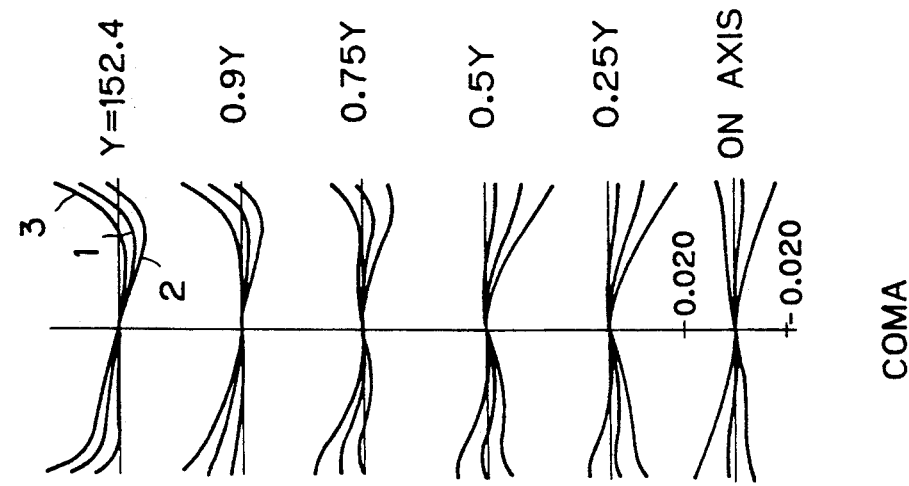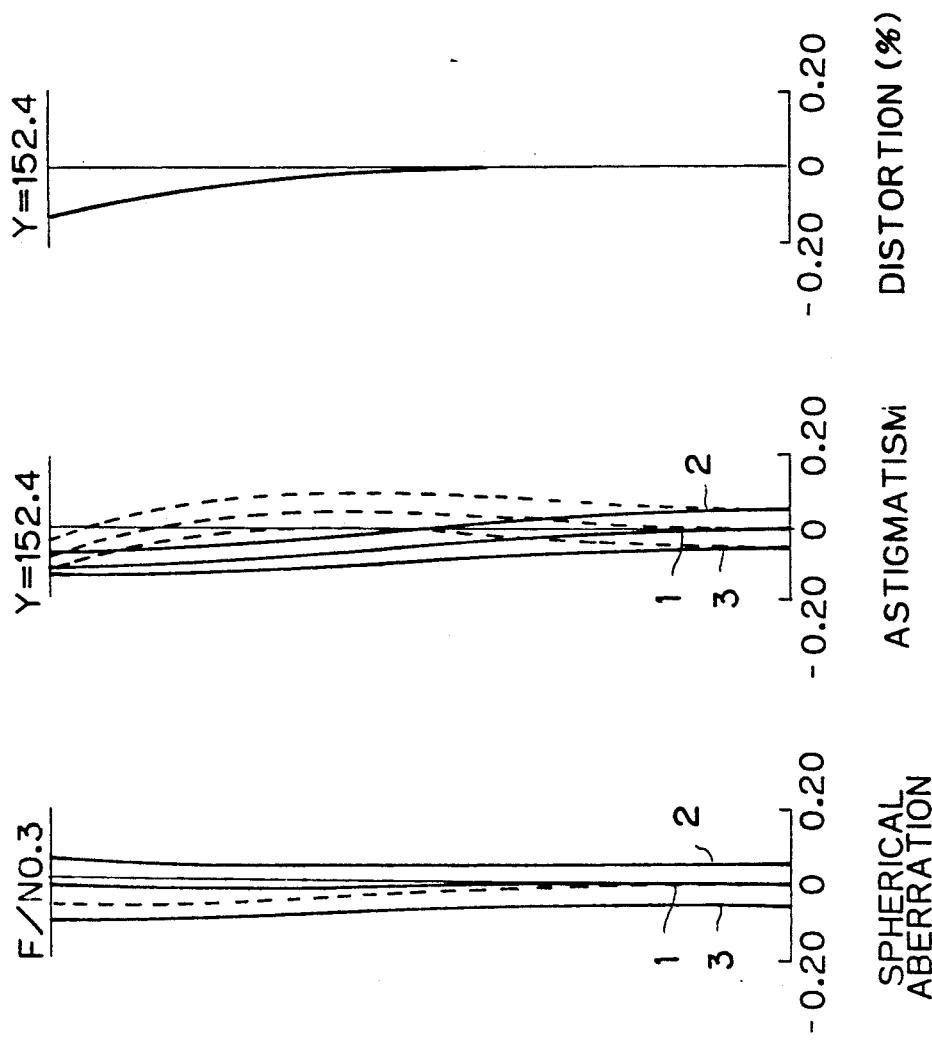

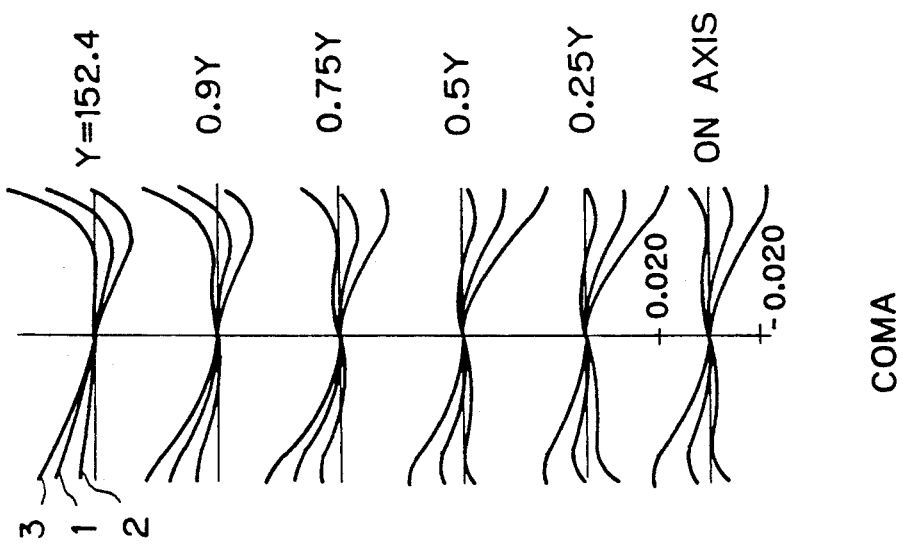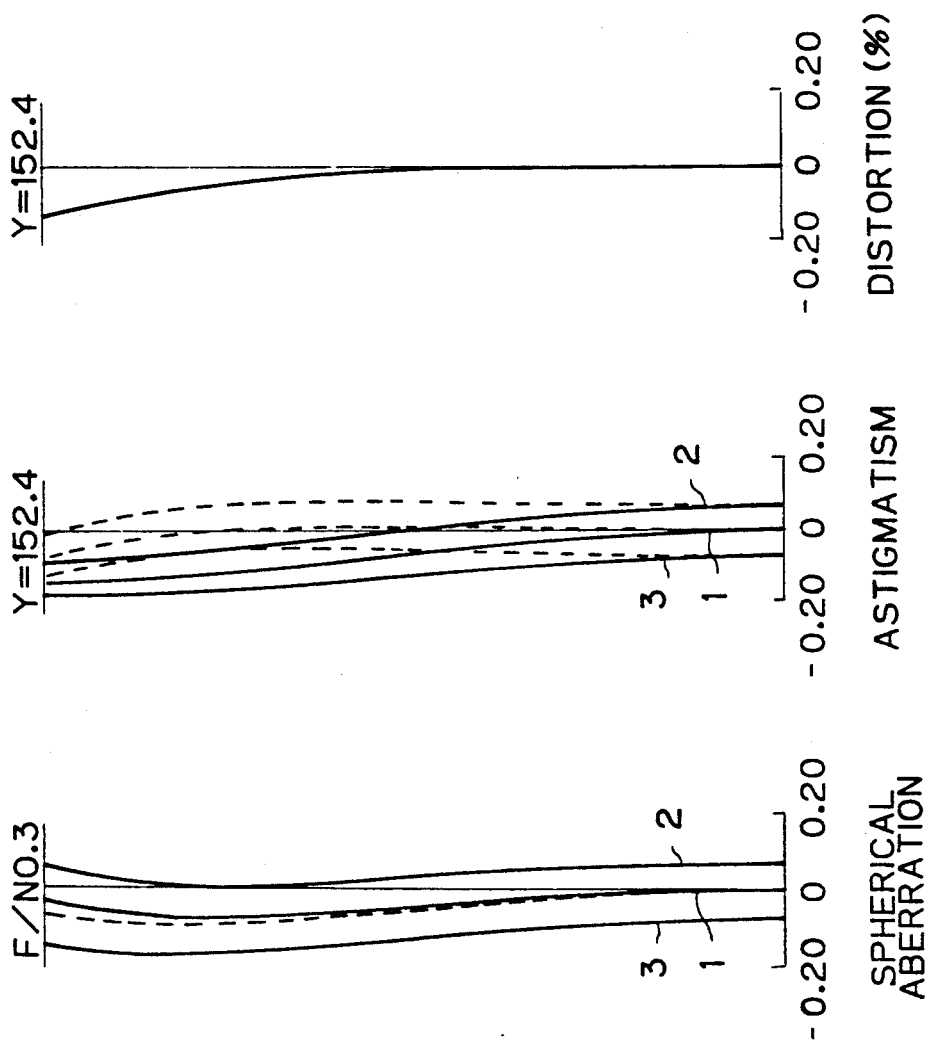

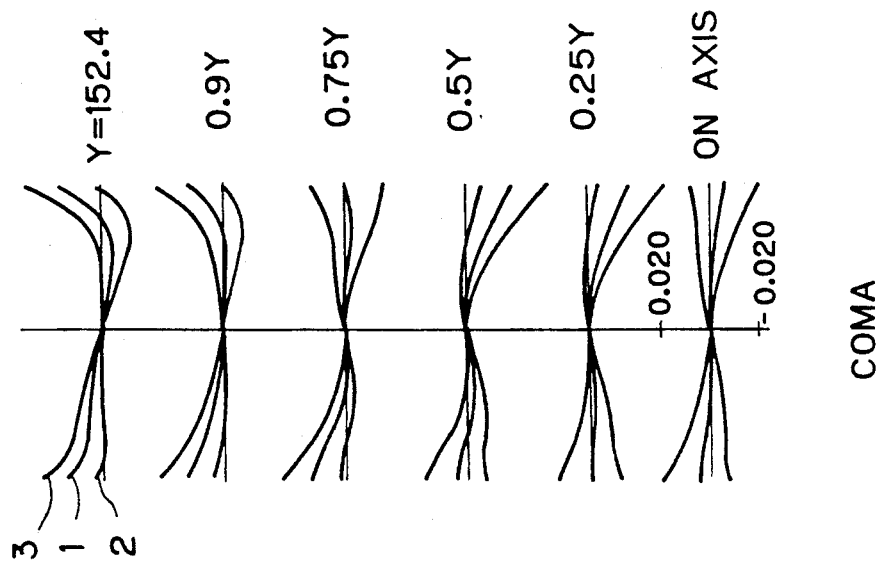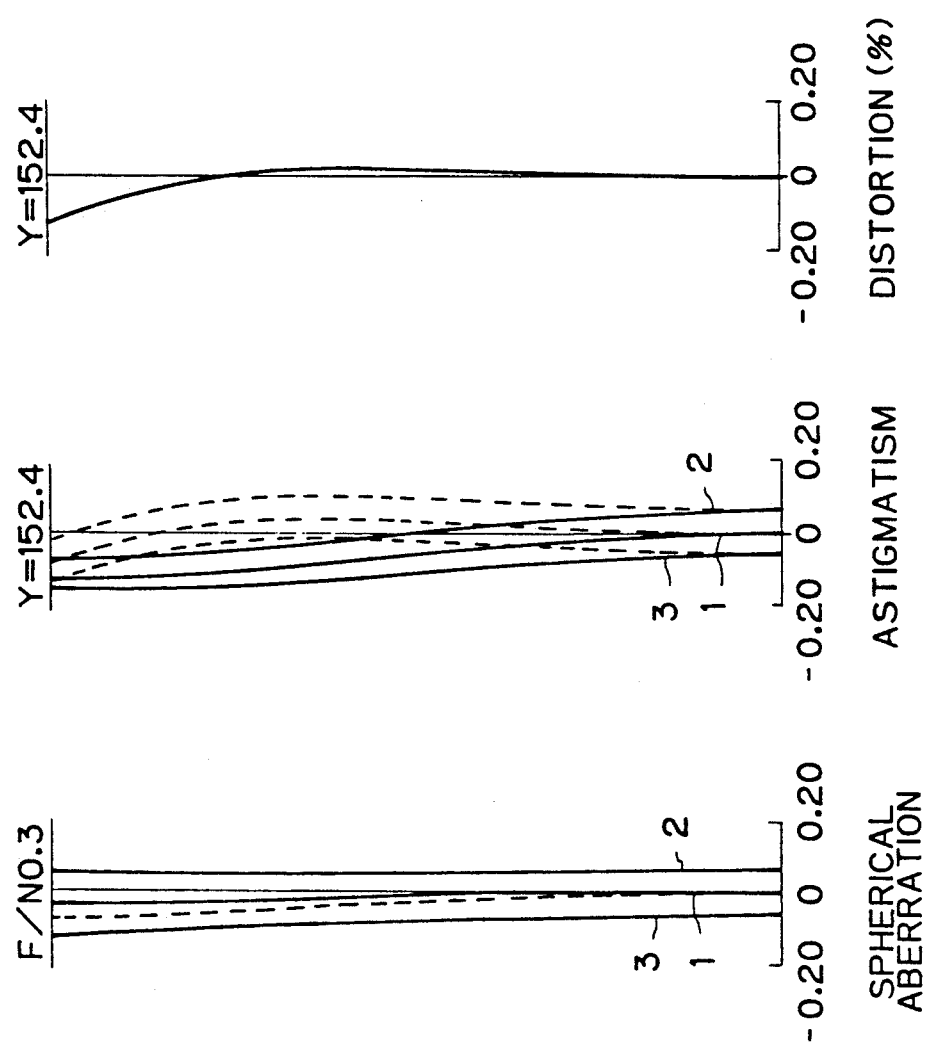

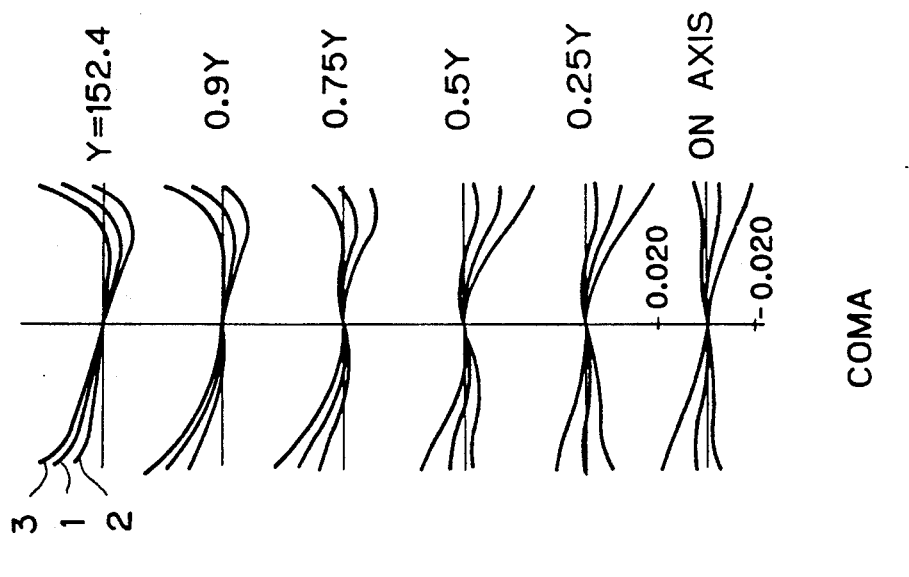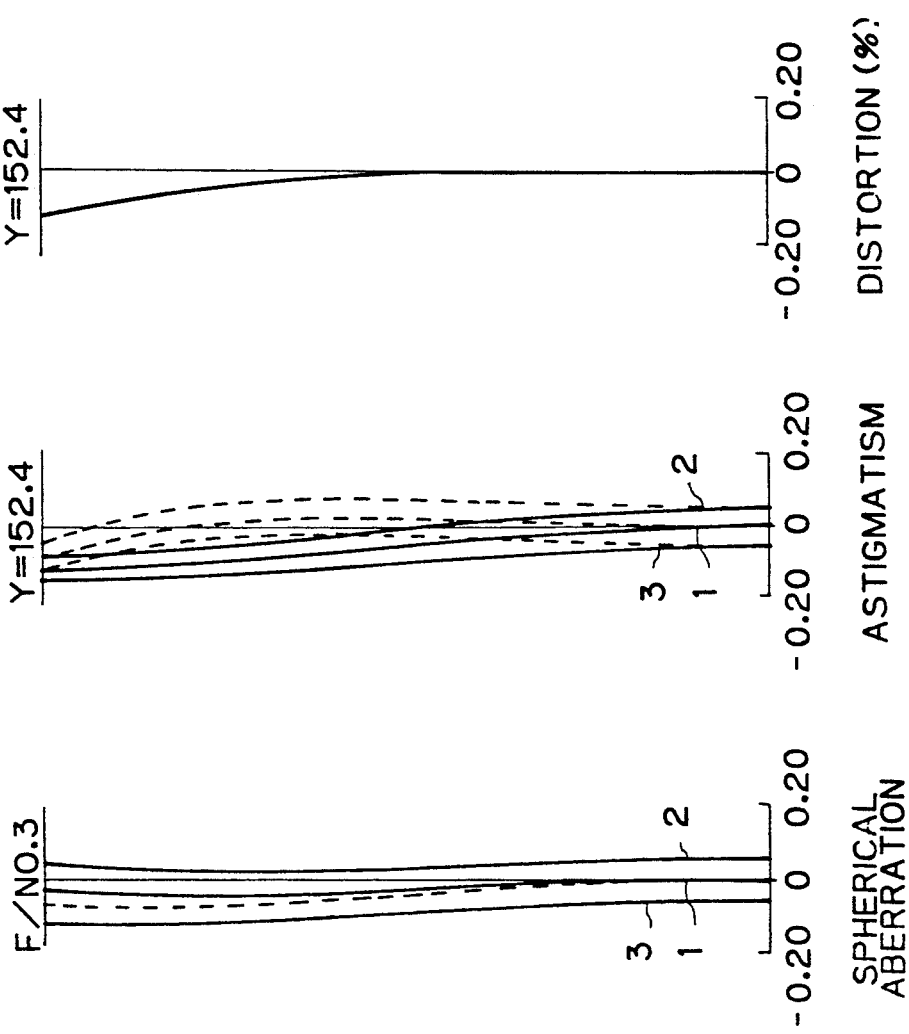

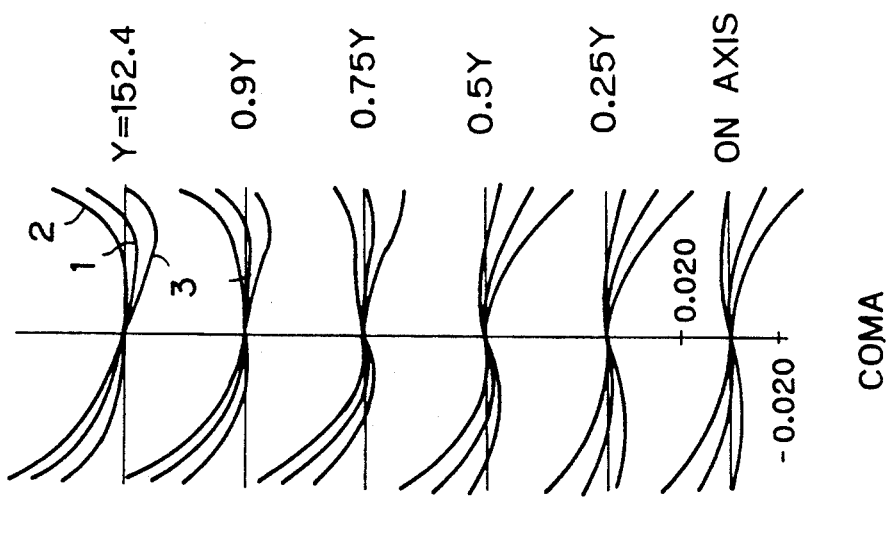
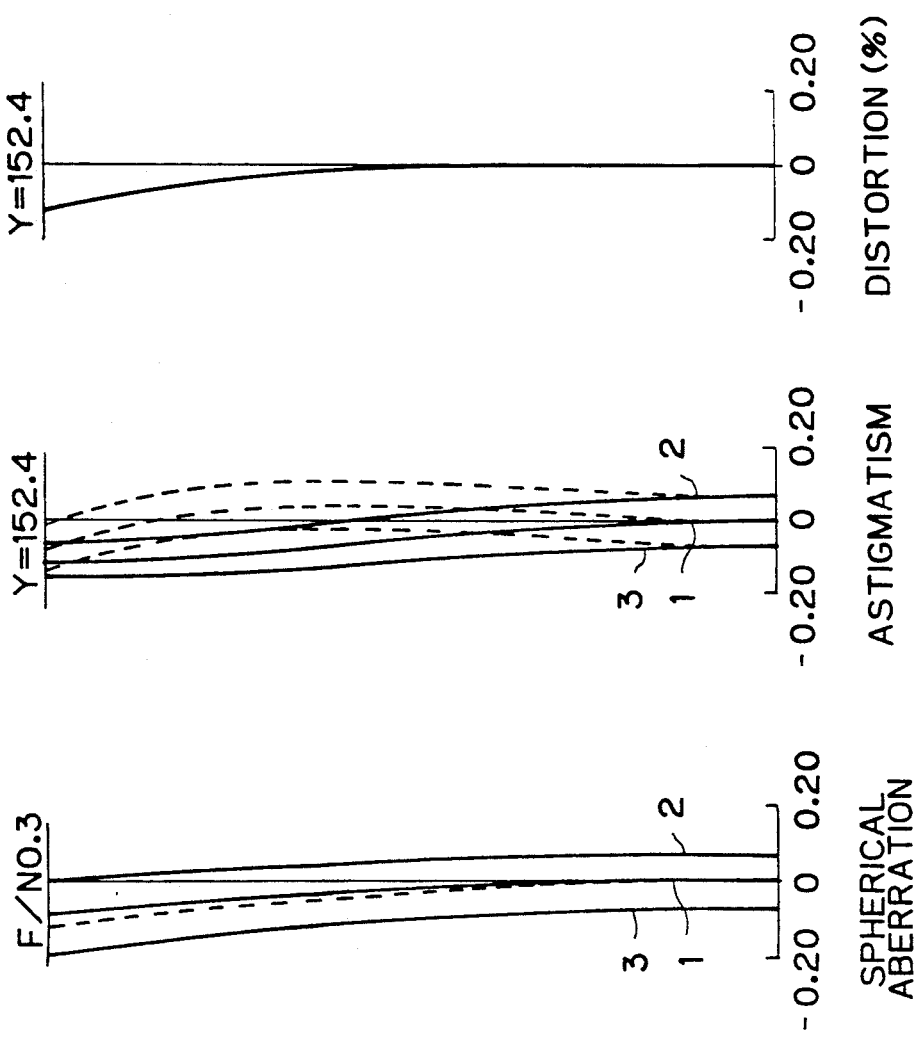

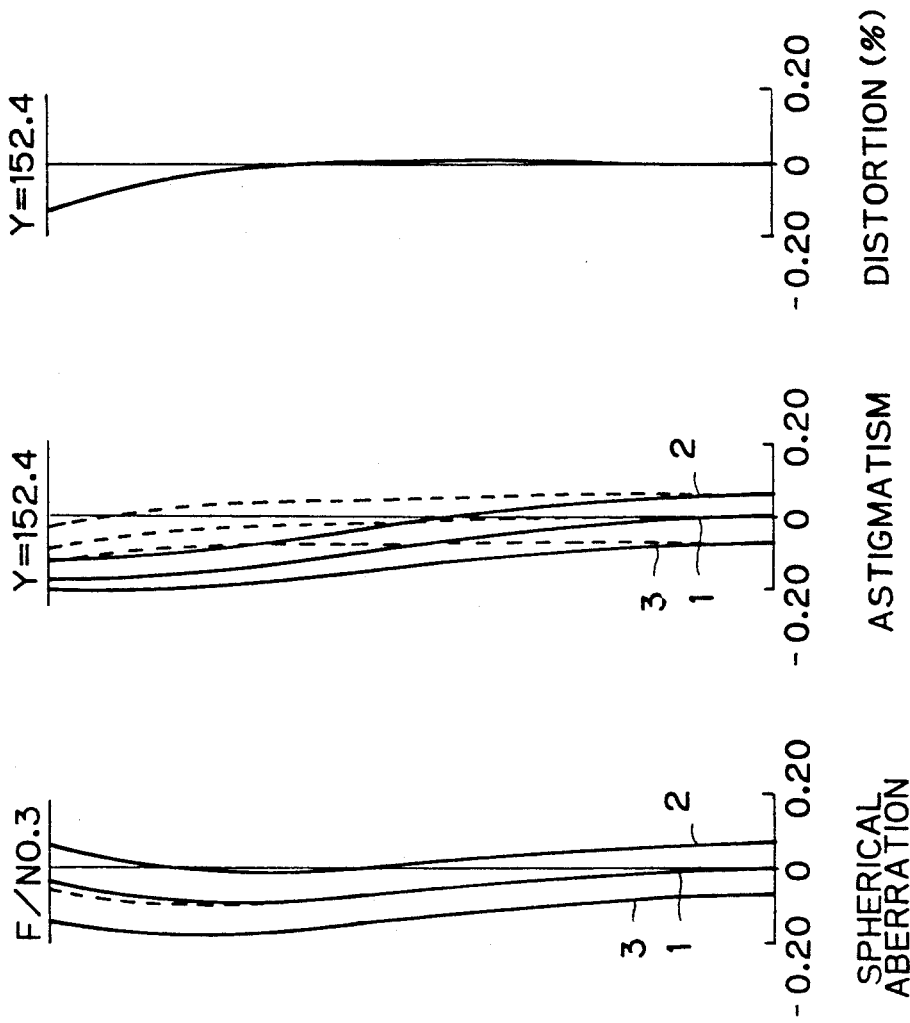

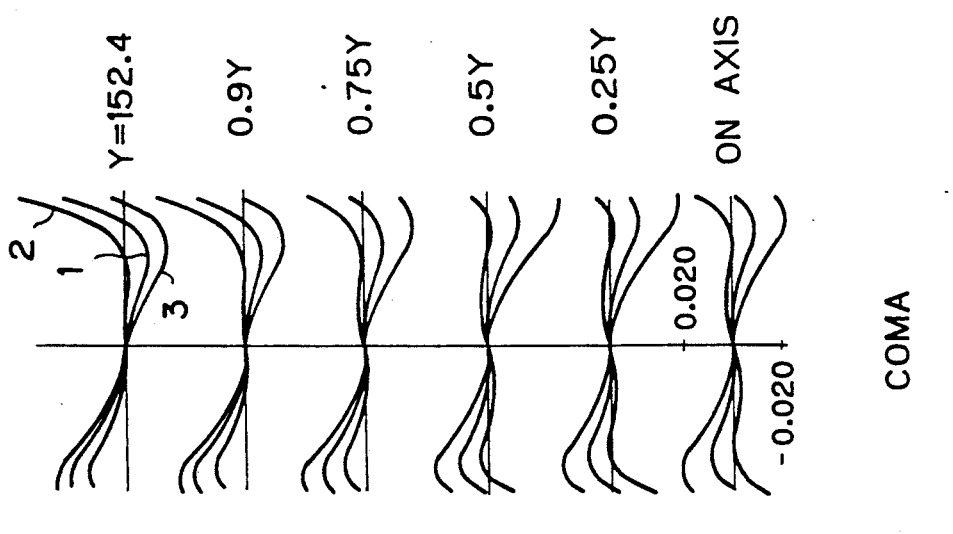
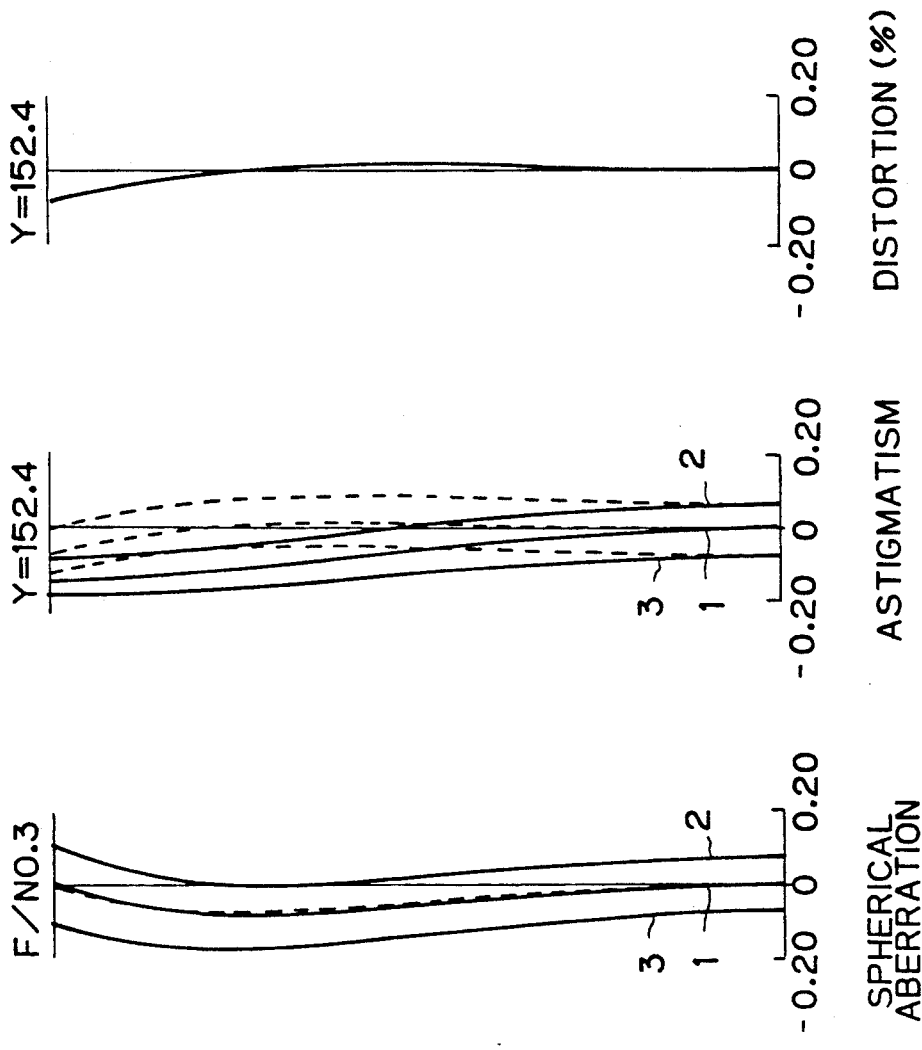

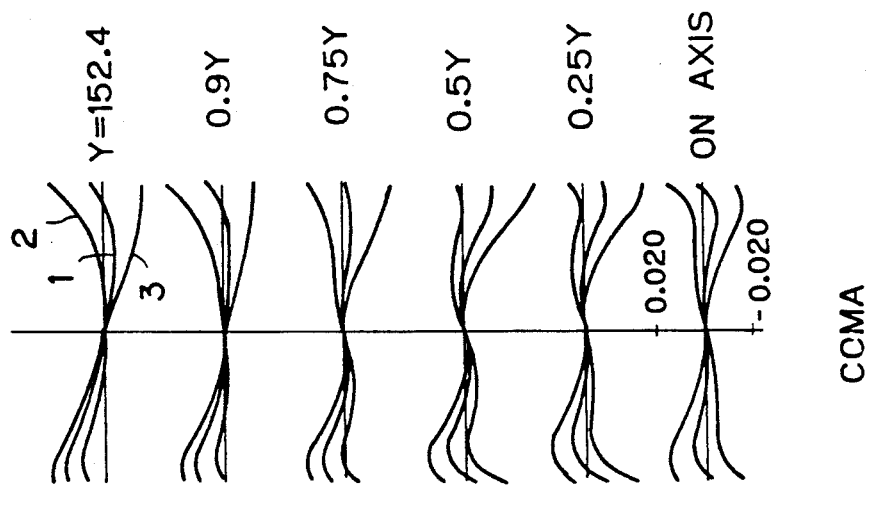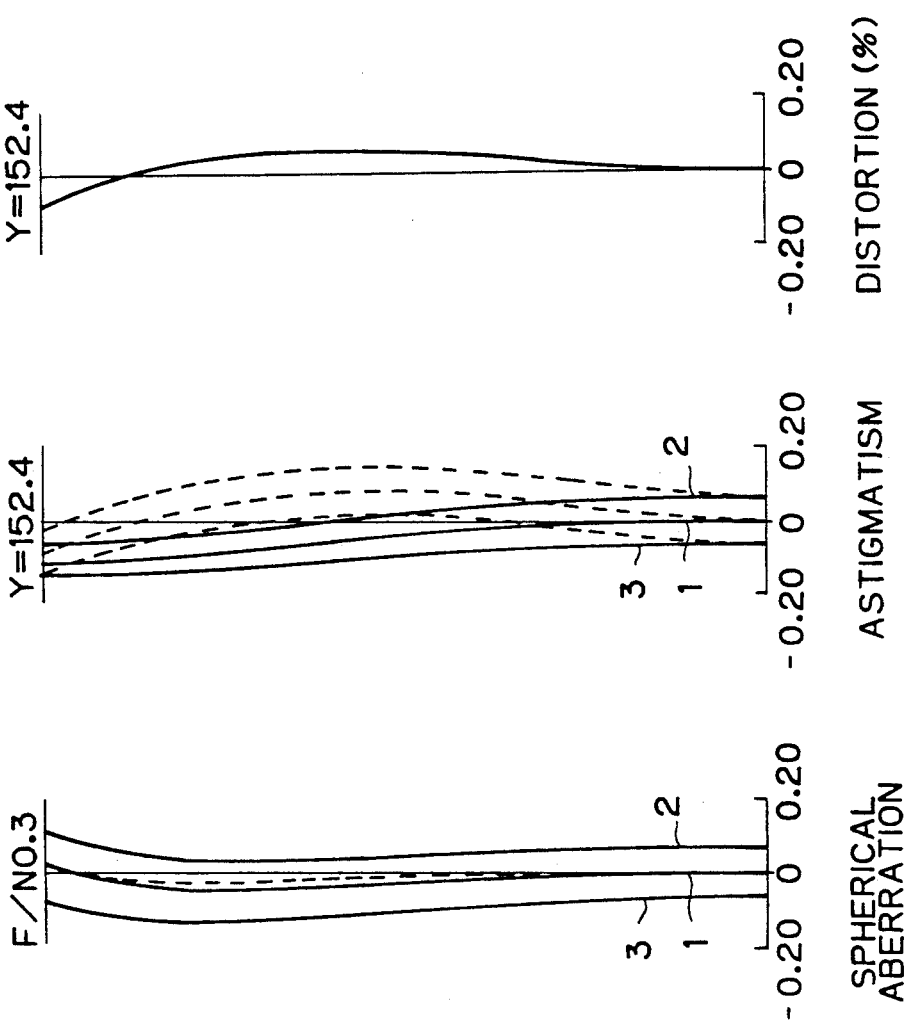
Fig.36a  Fig.36b  Fig.36c  Fig.36d

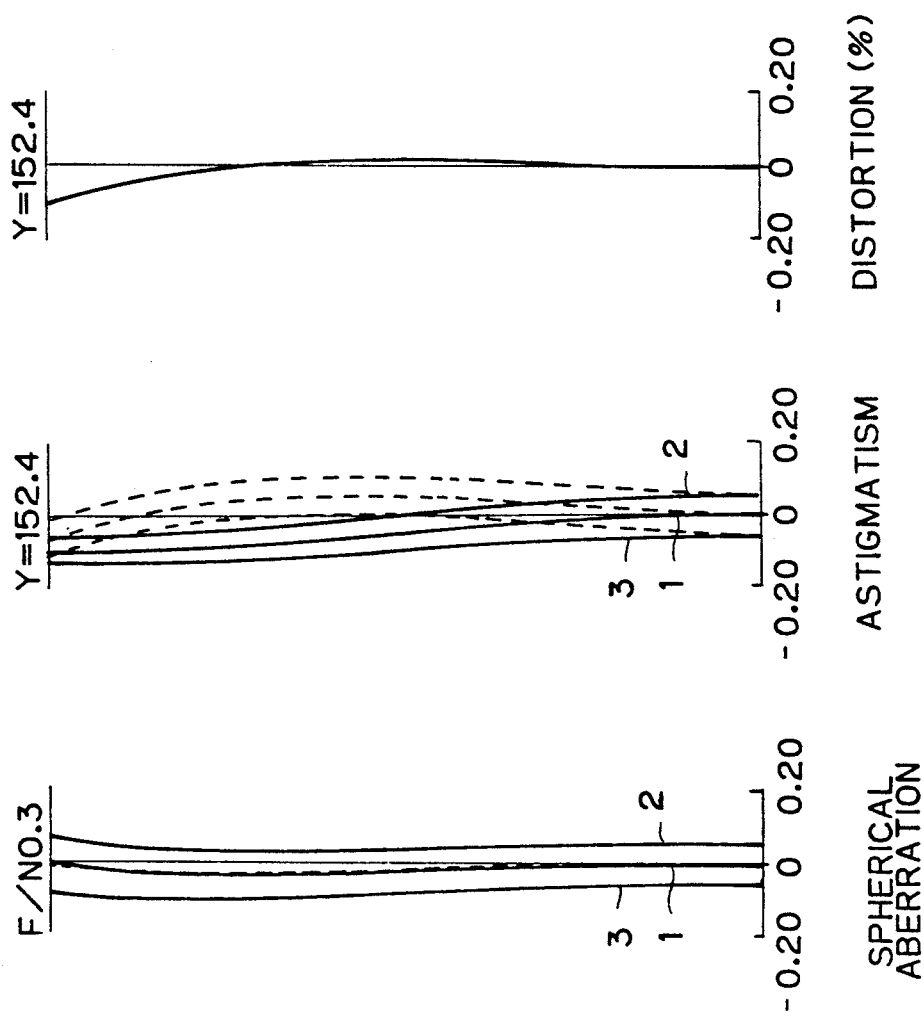

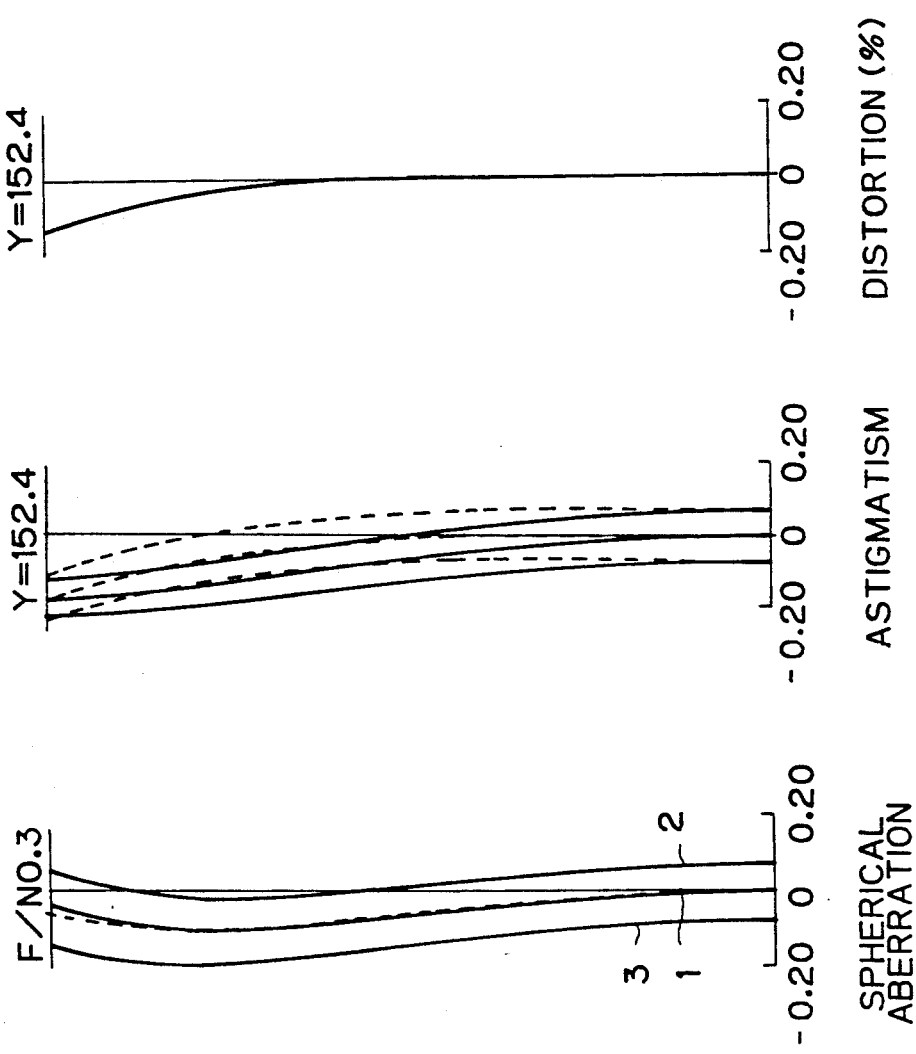

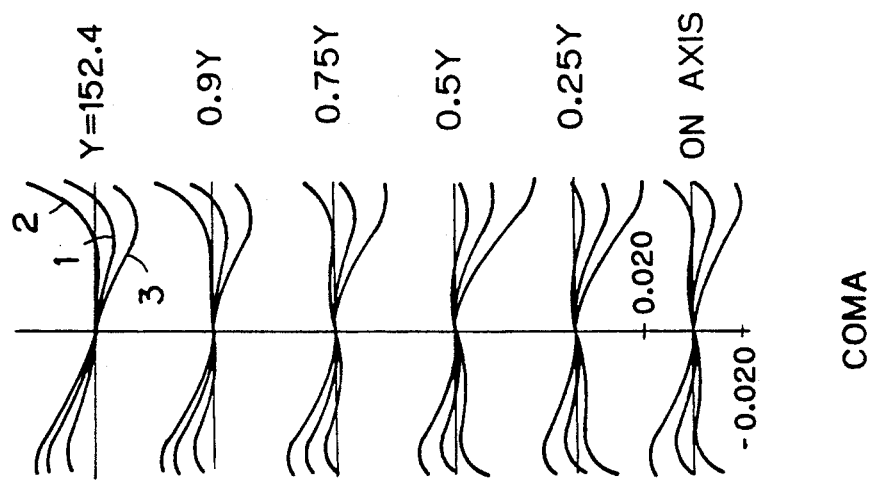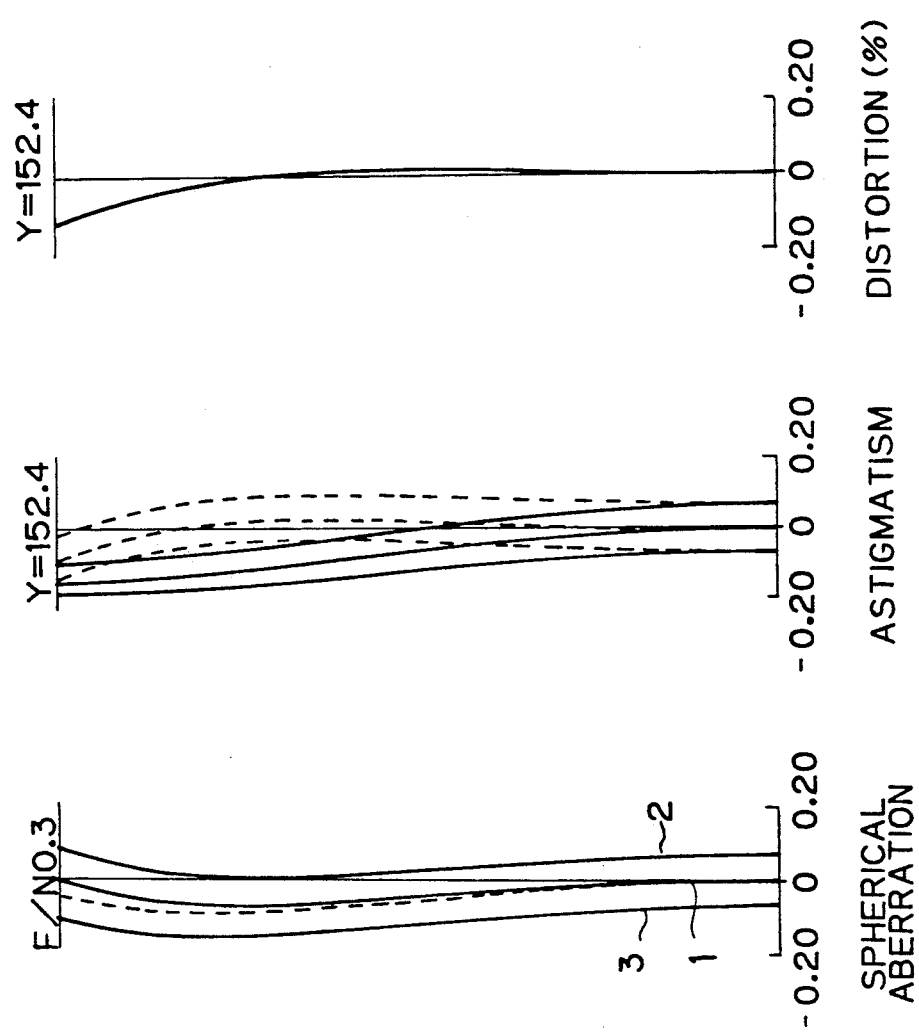

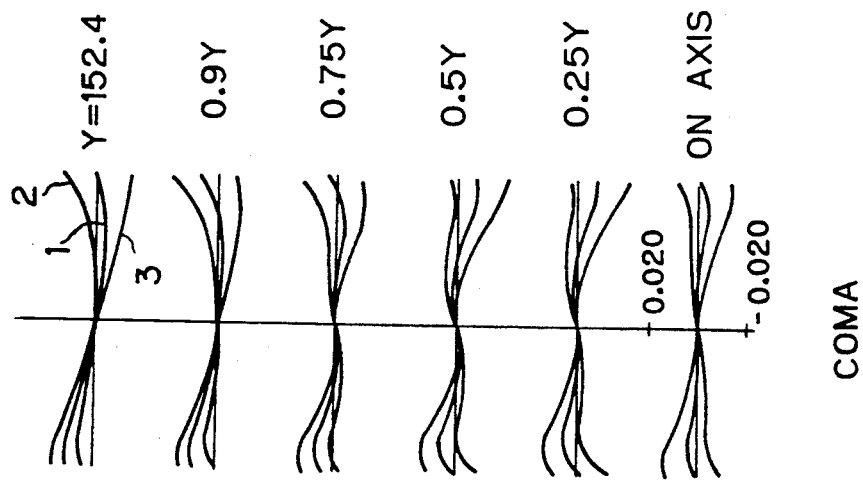
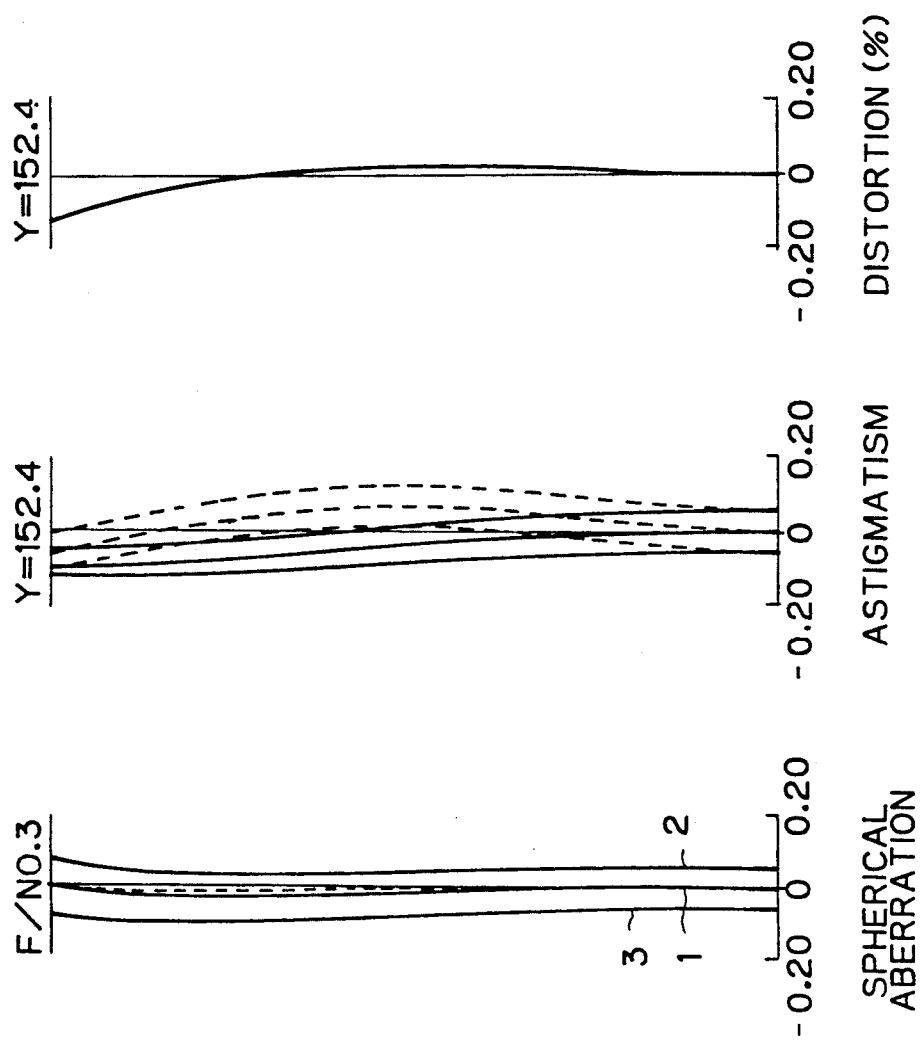

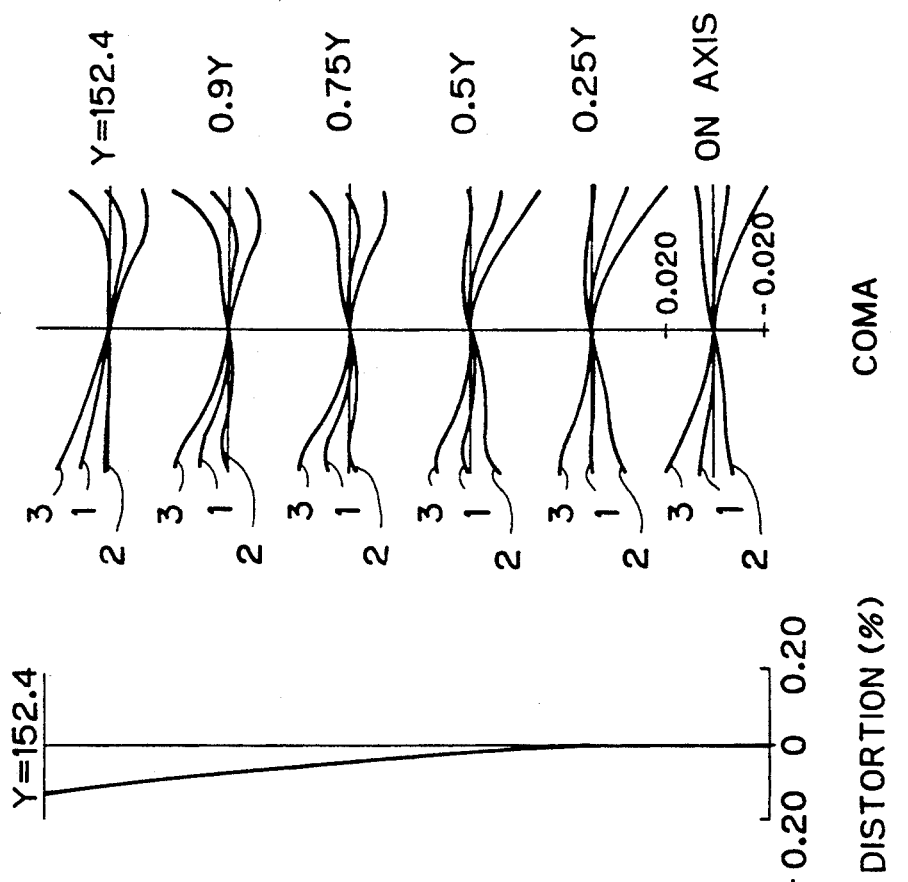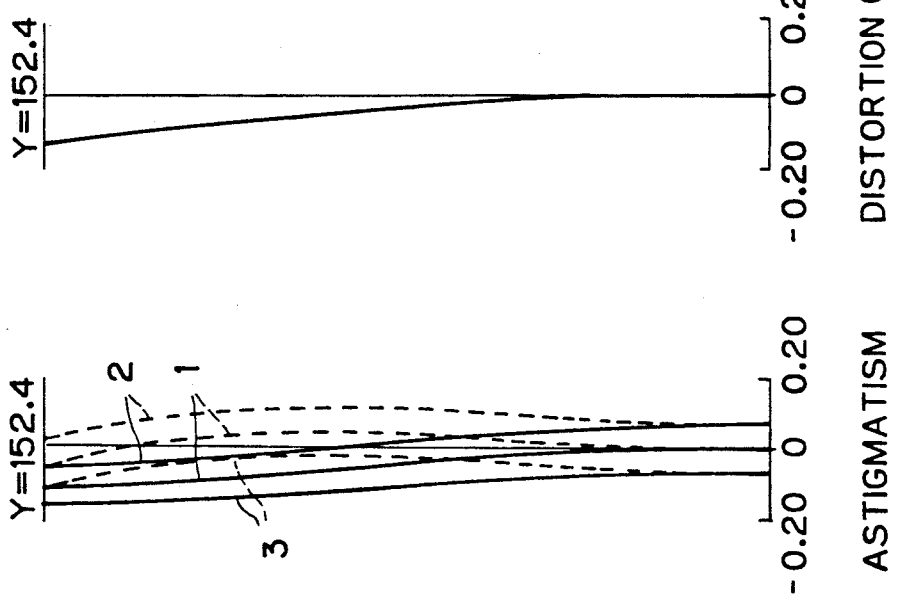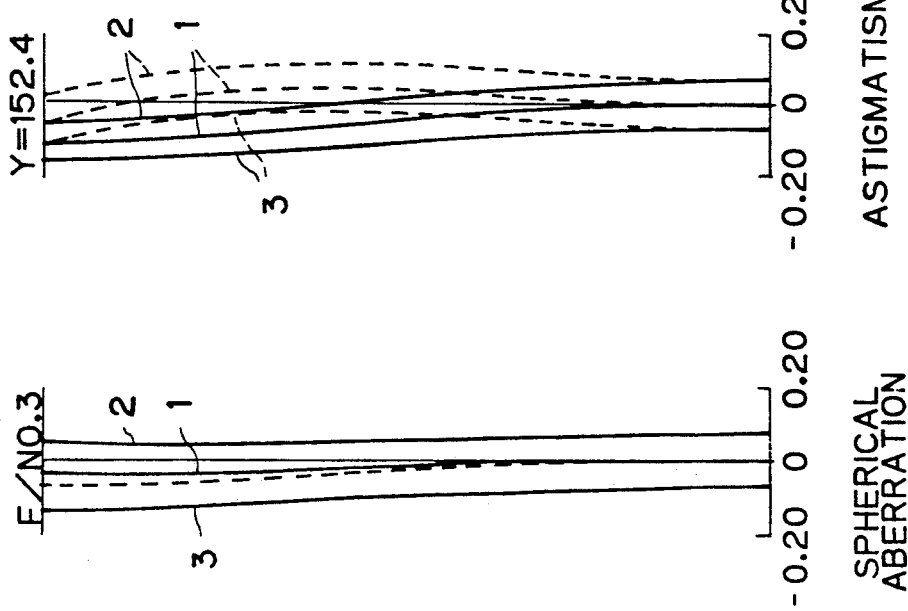

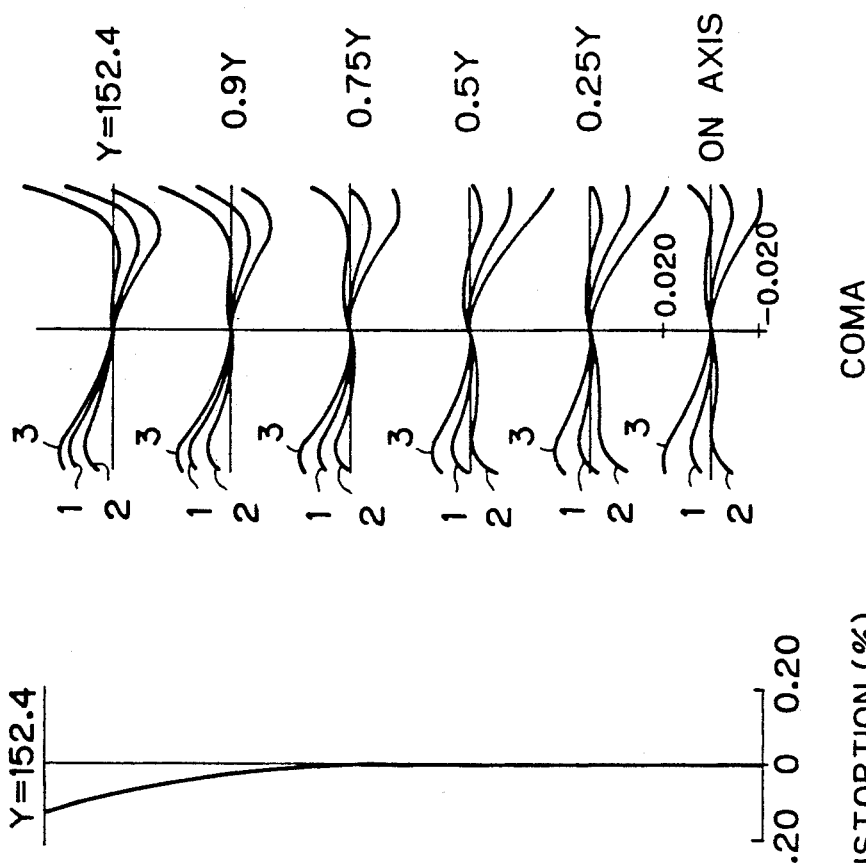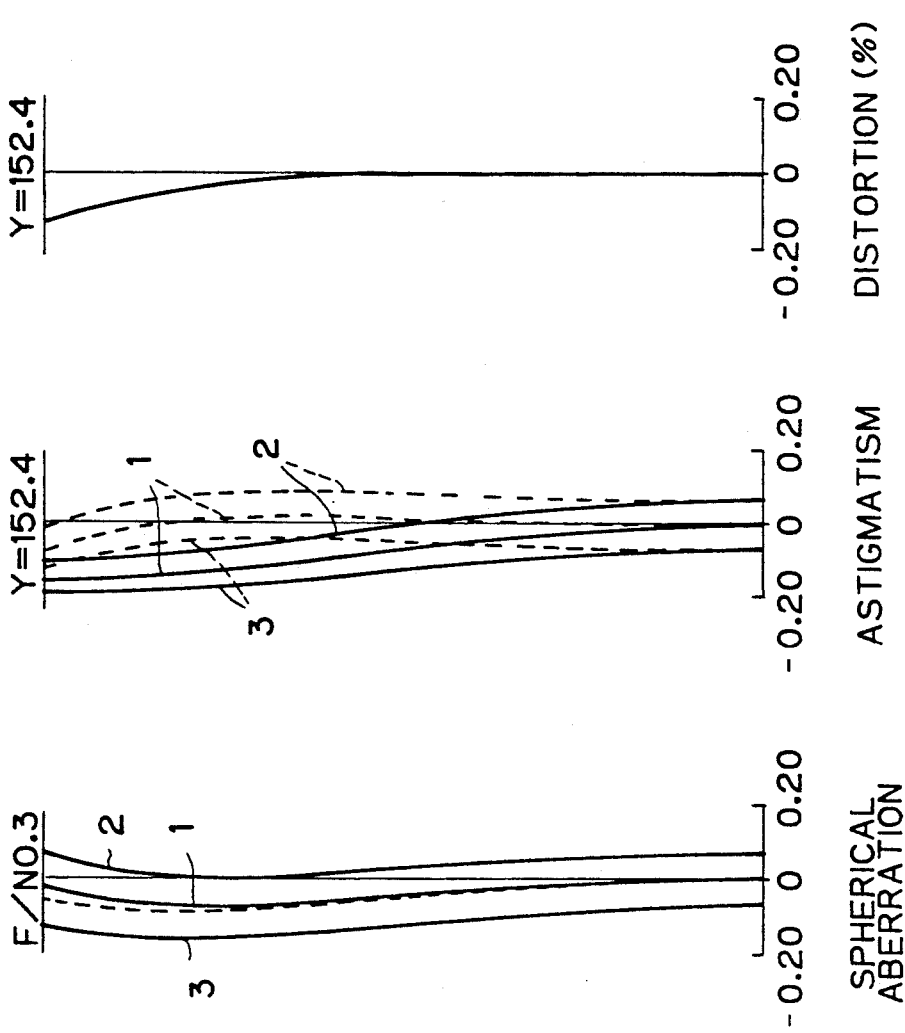

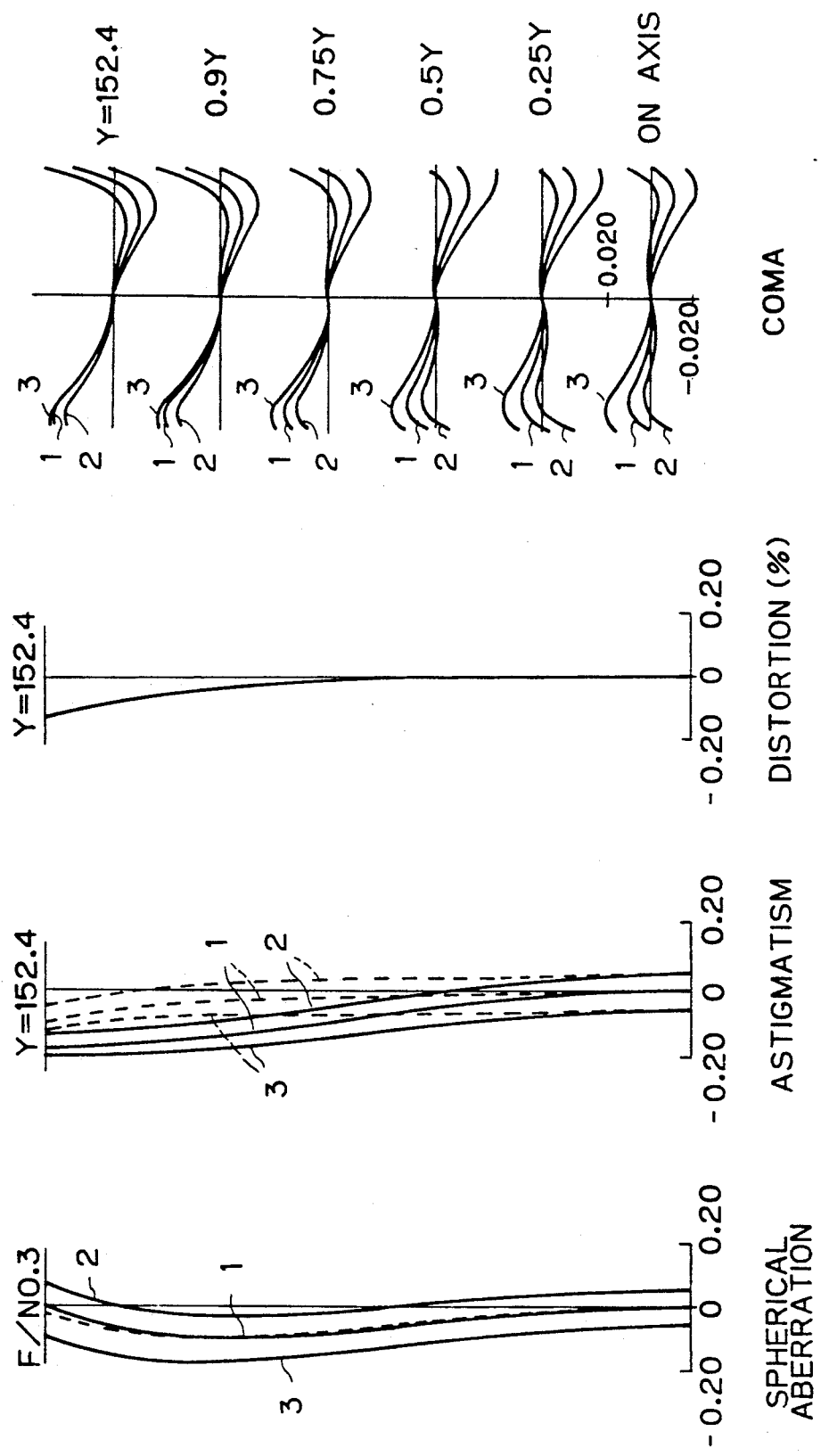

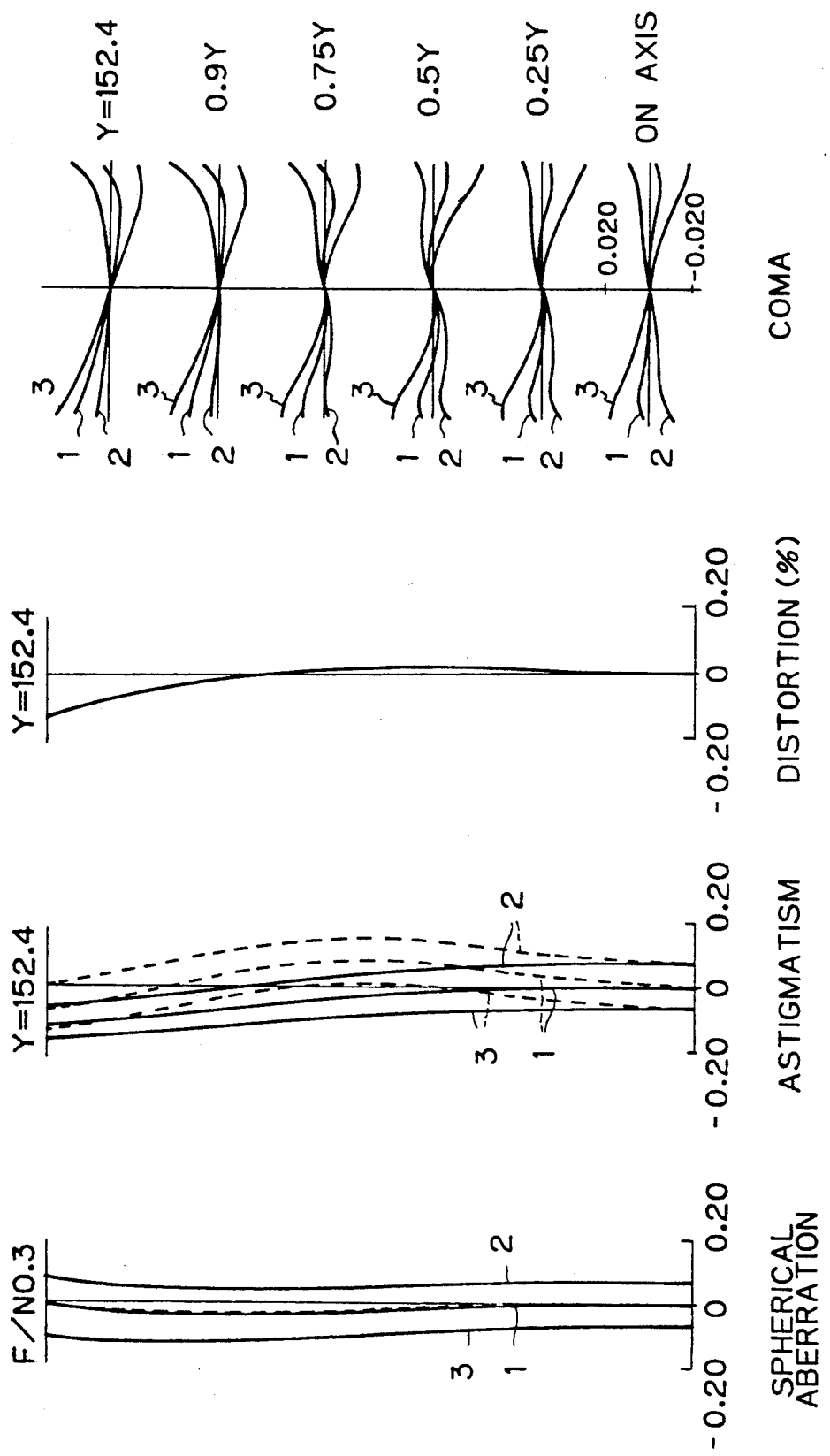

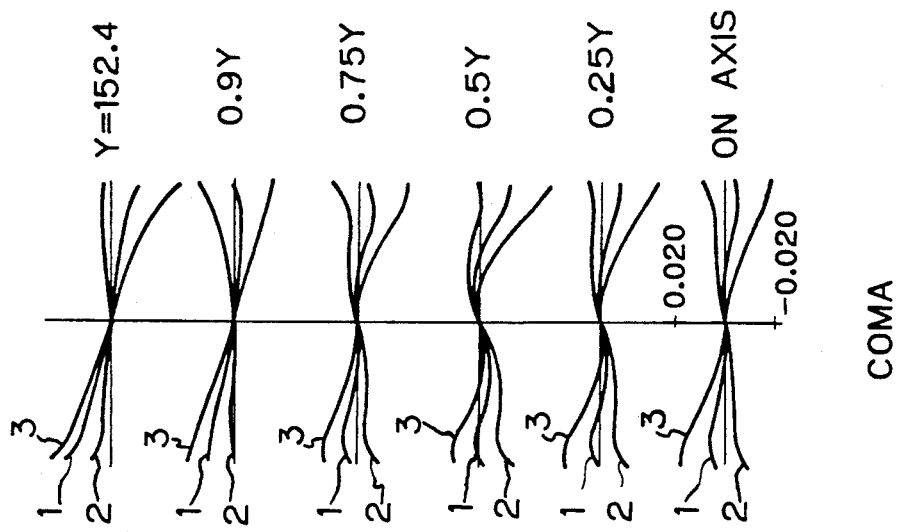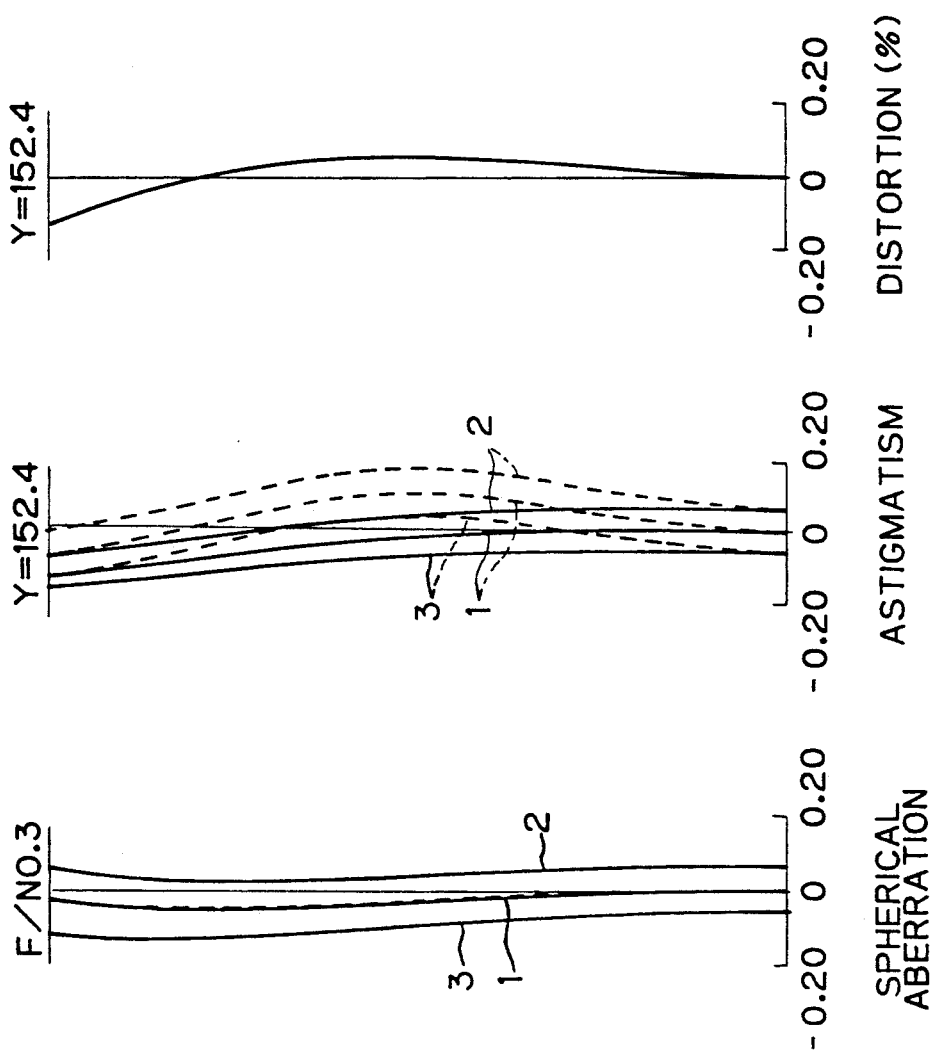

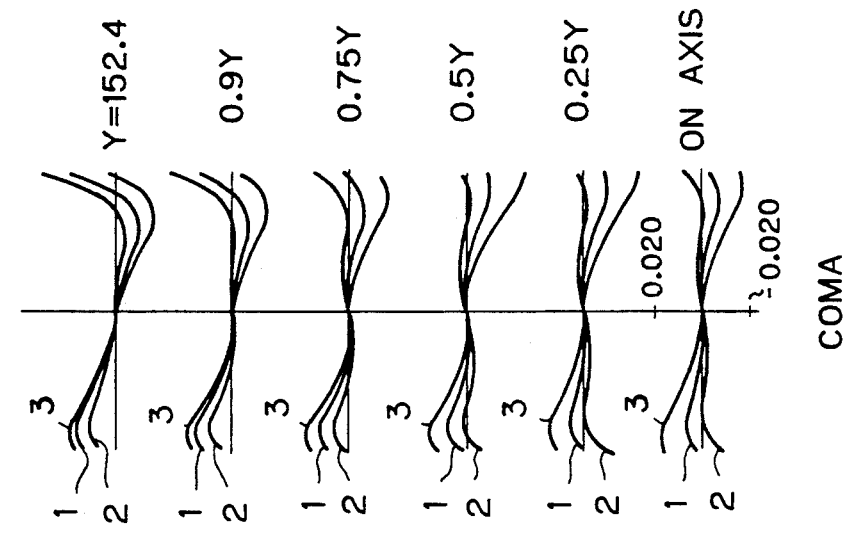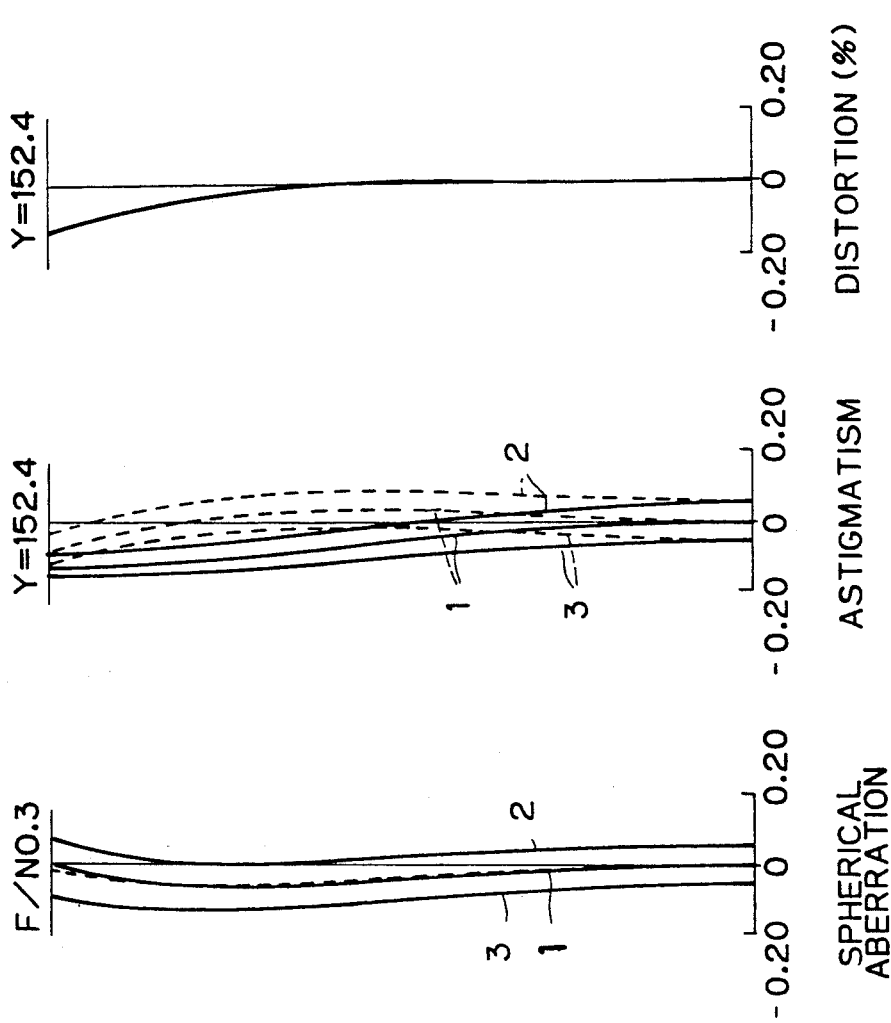

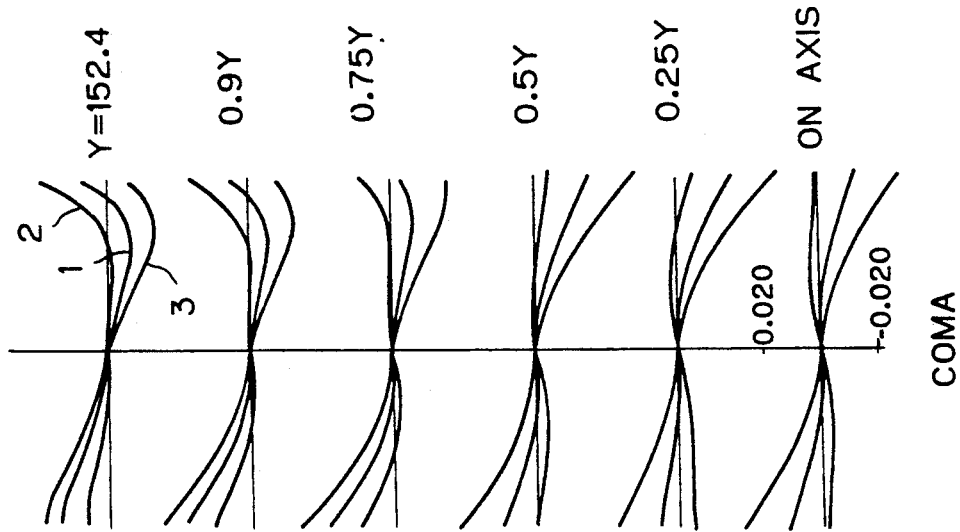
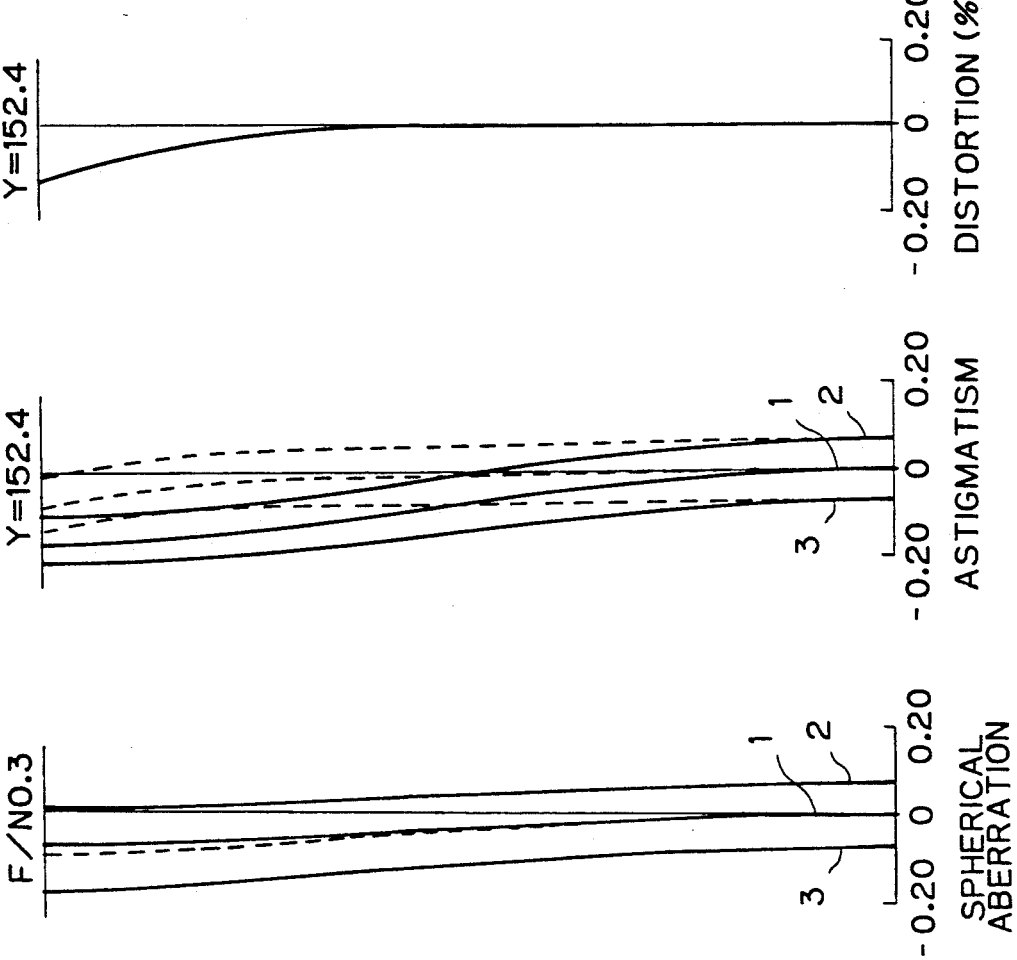

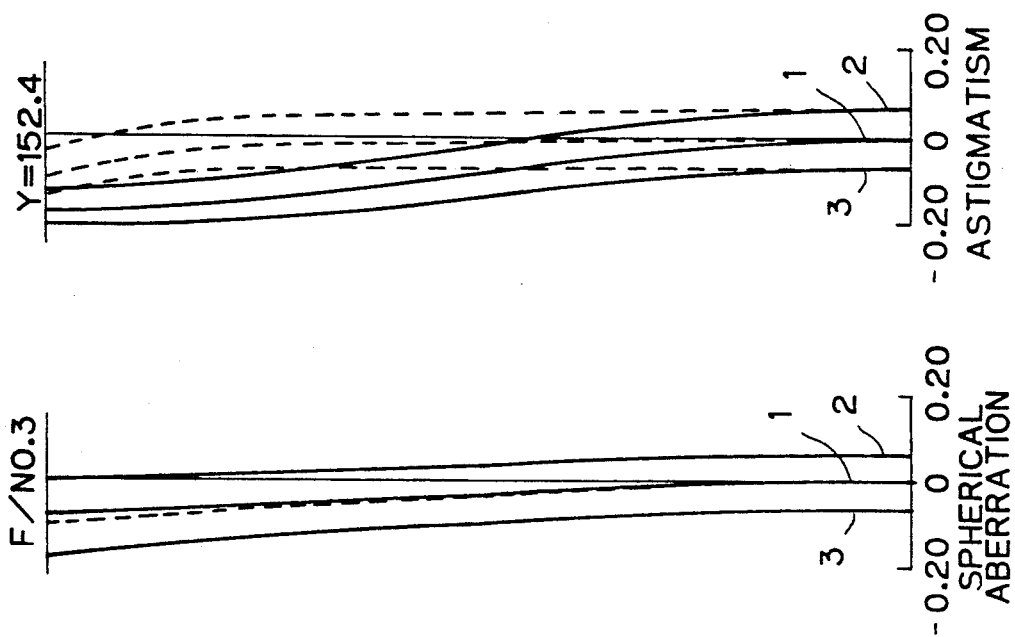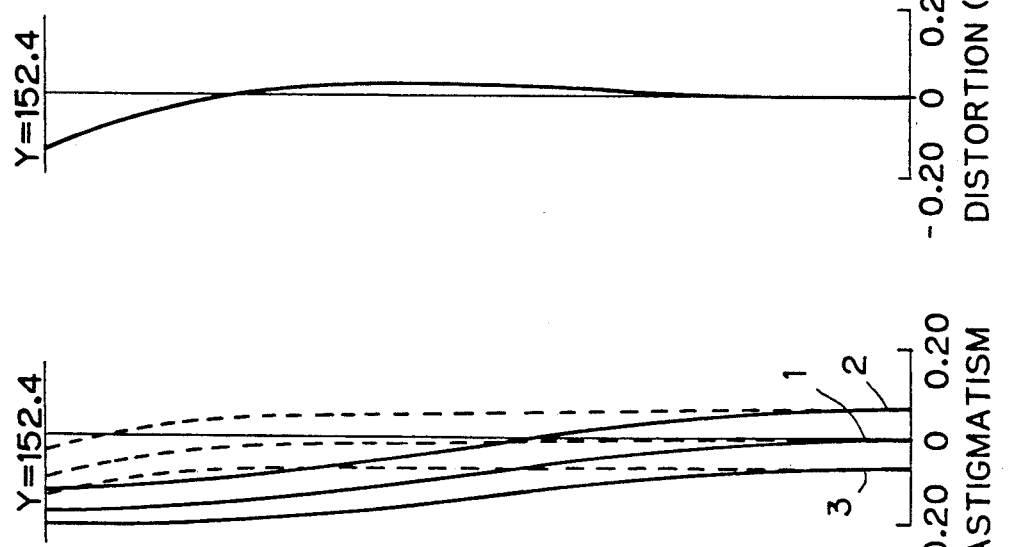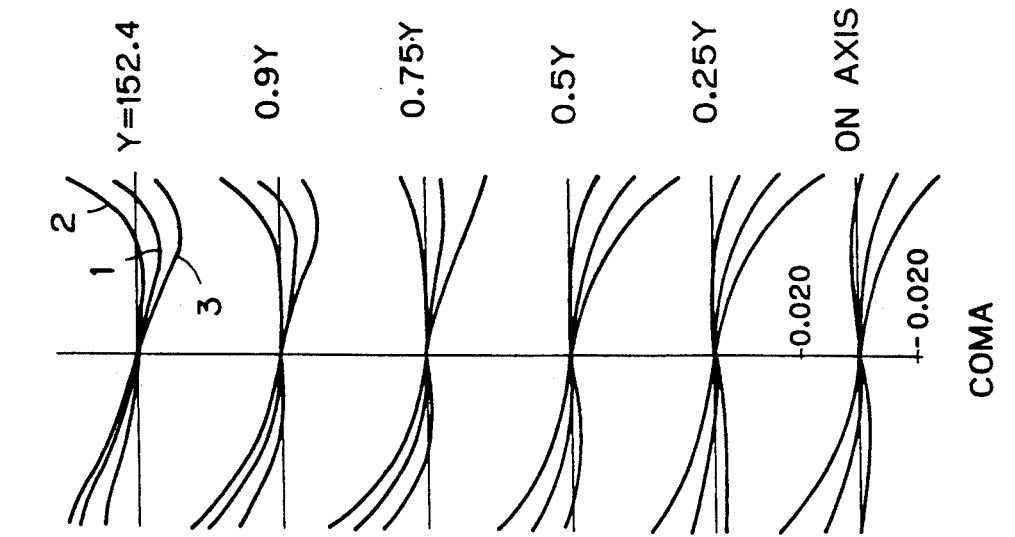

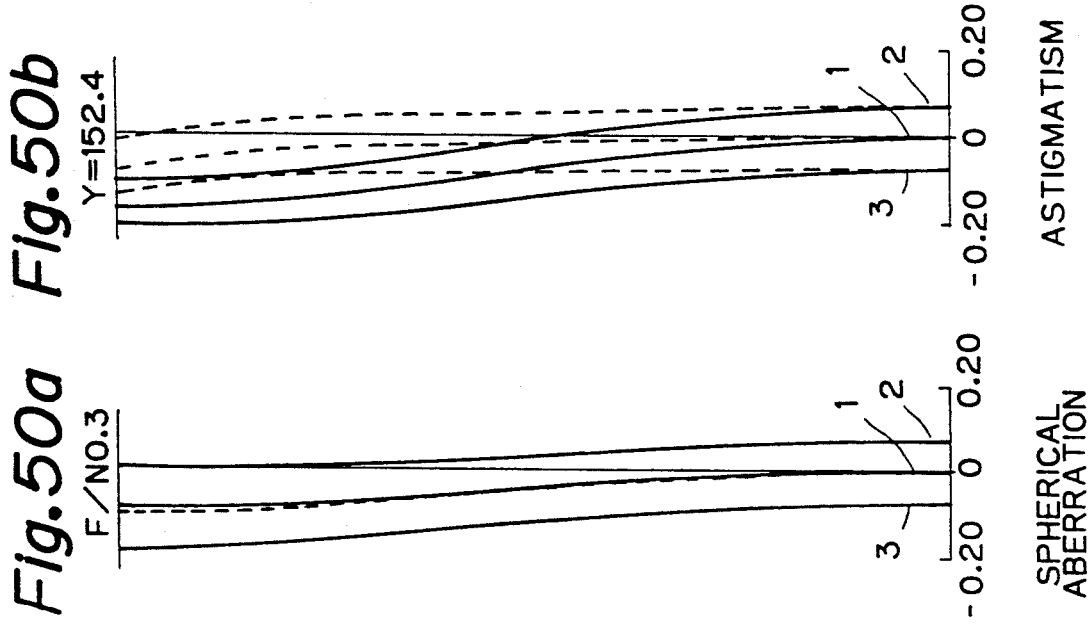

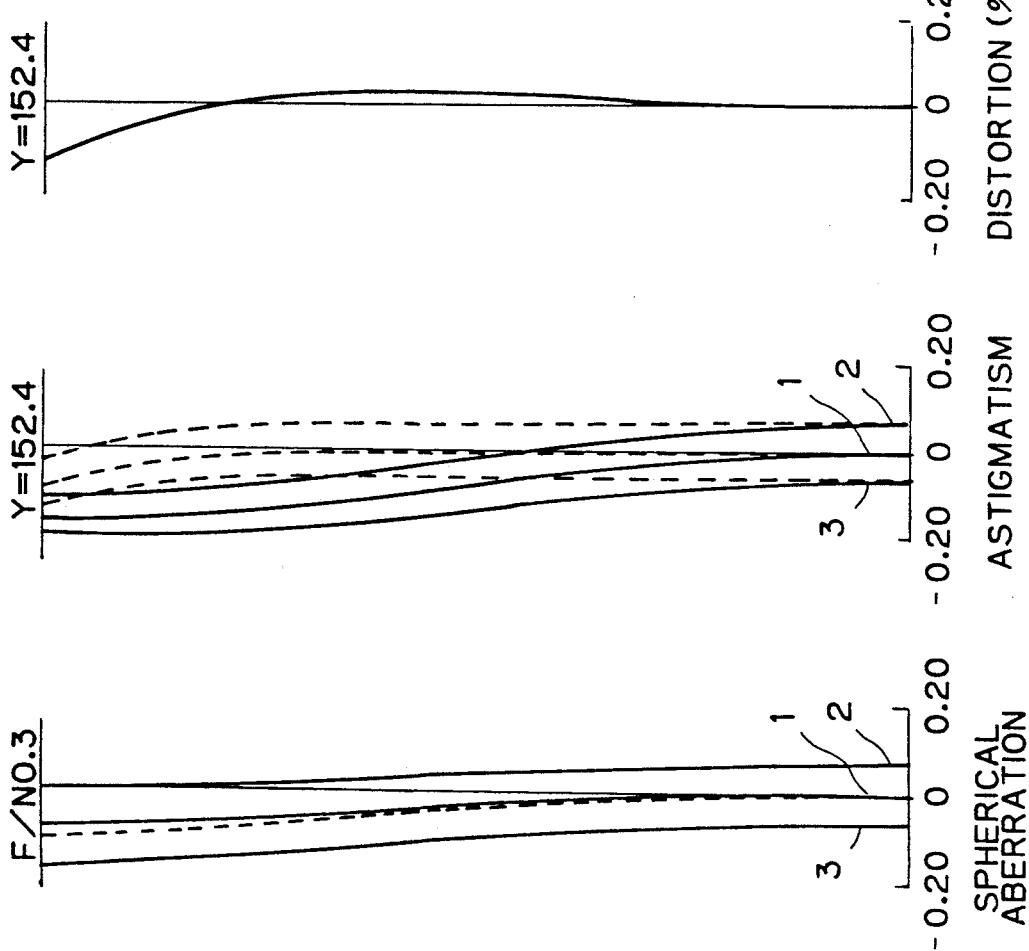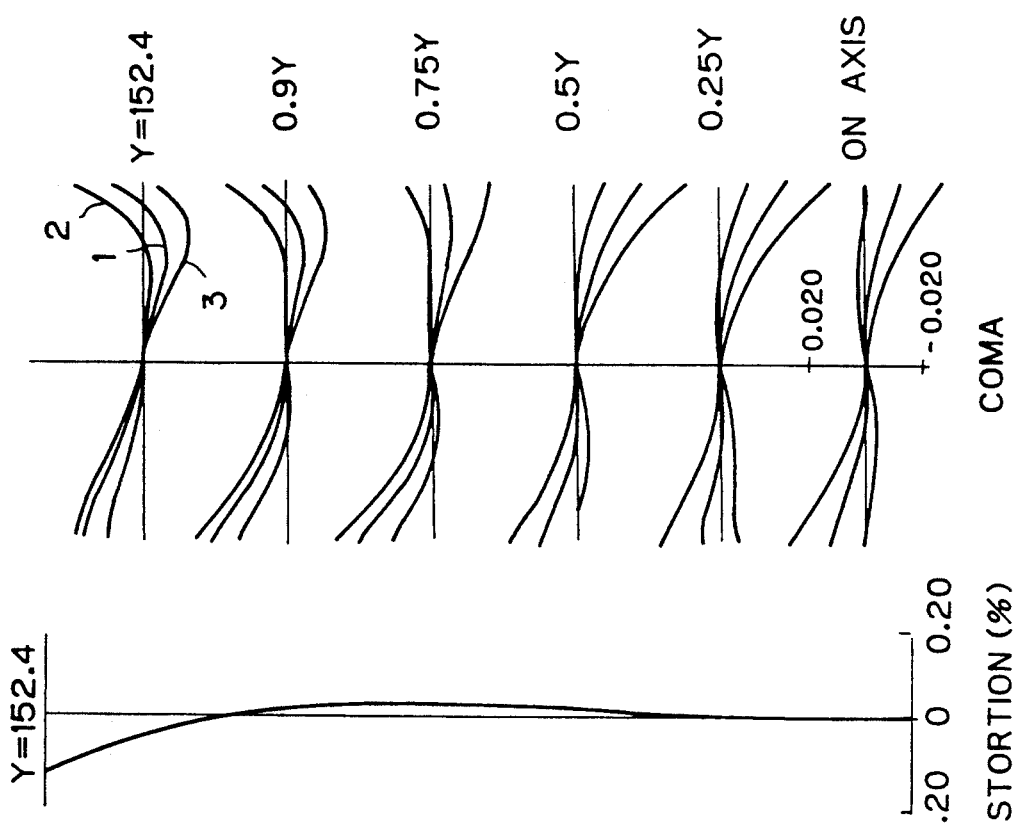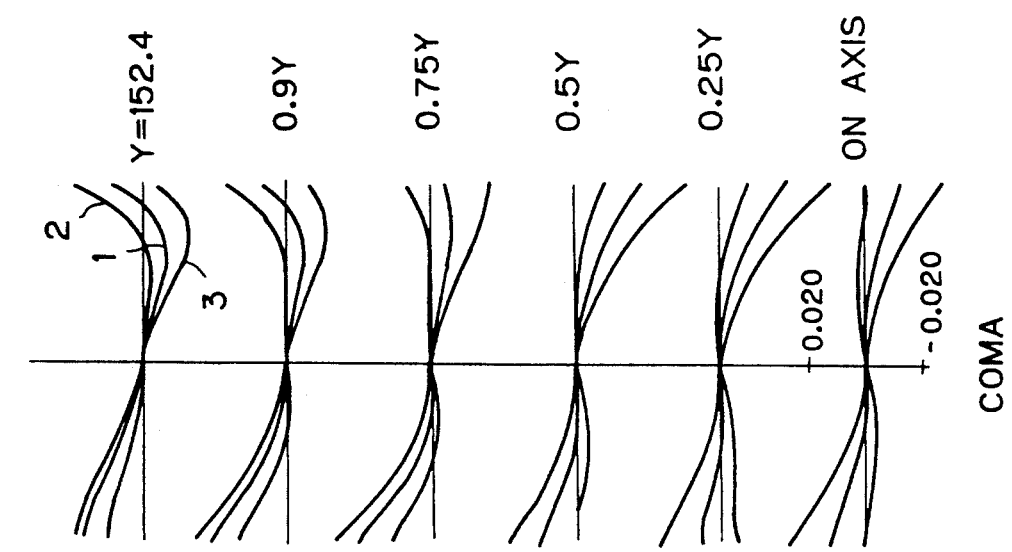

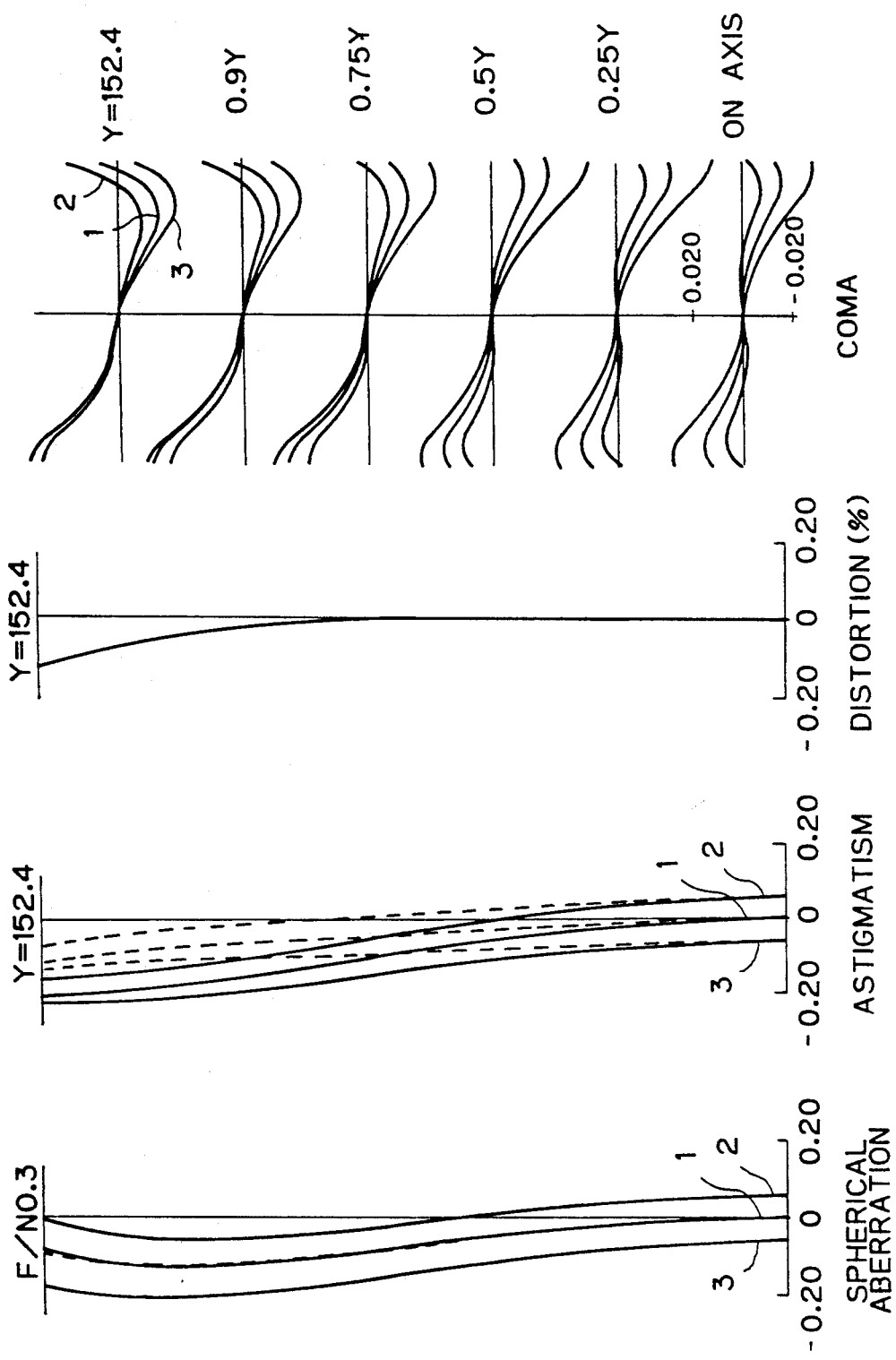

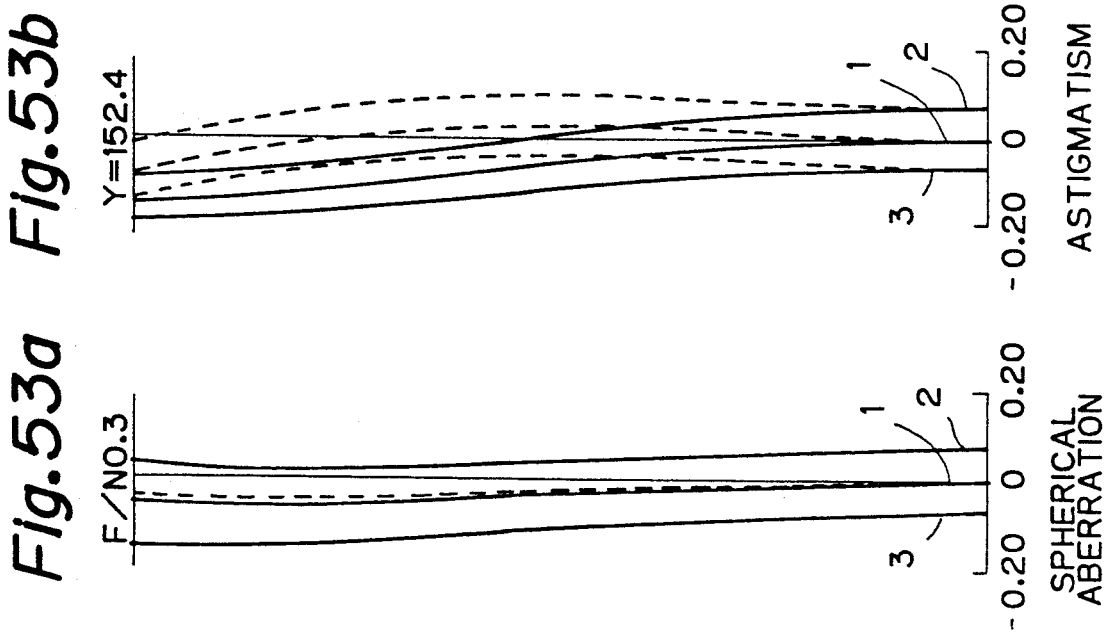

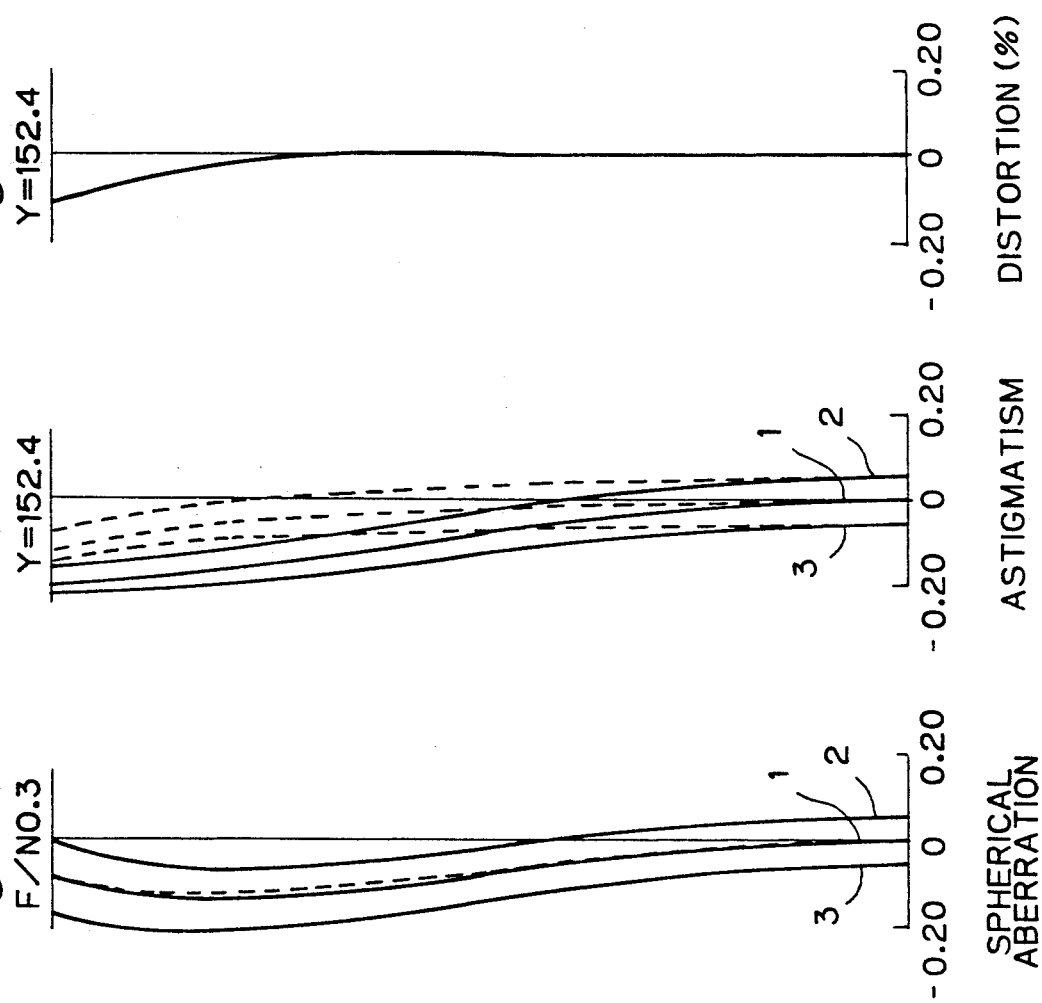

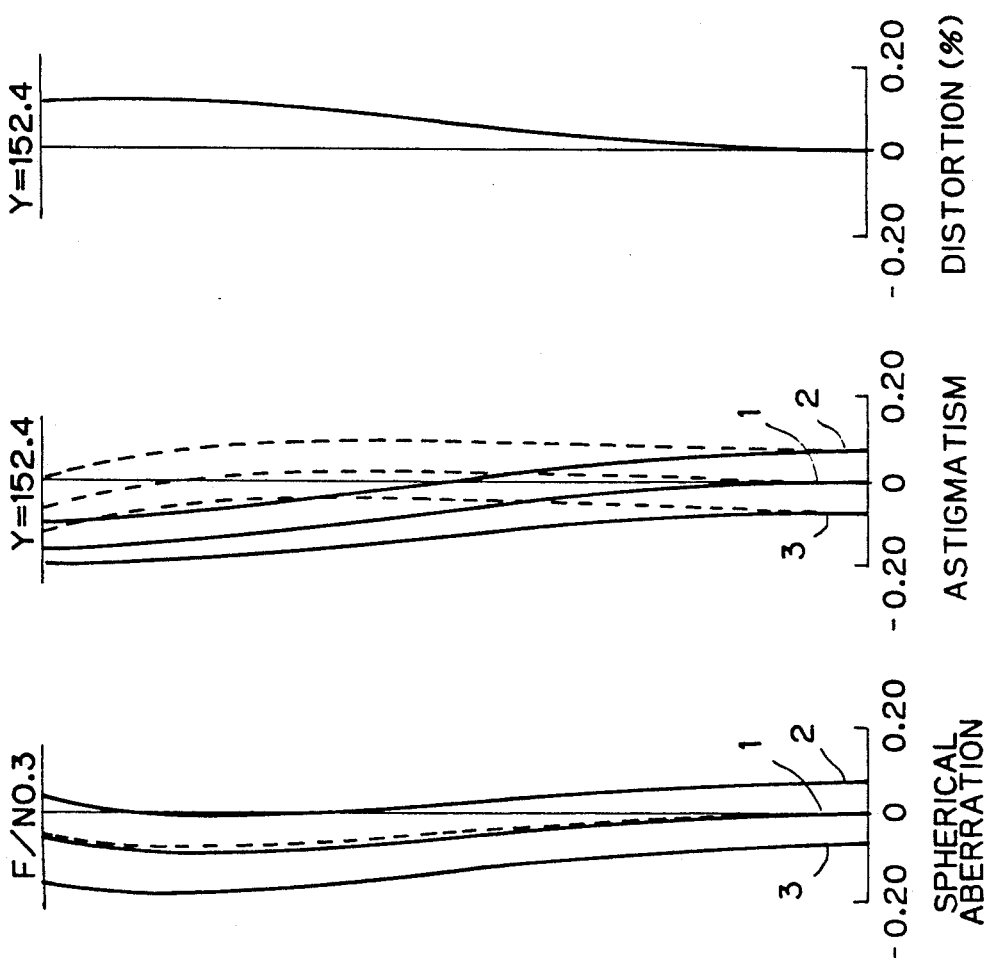

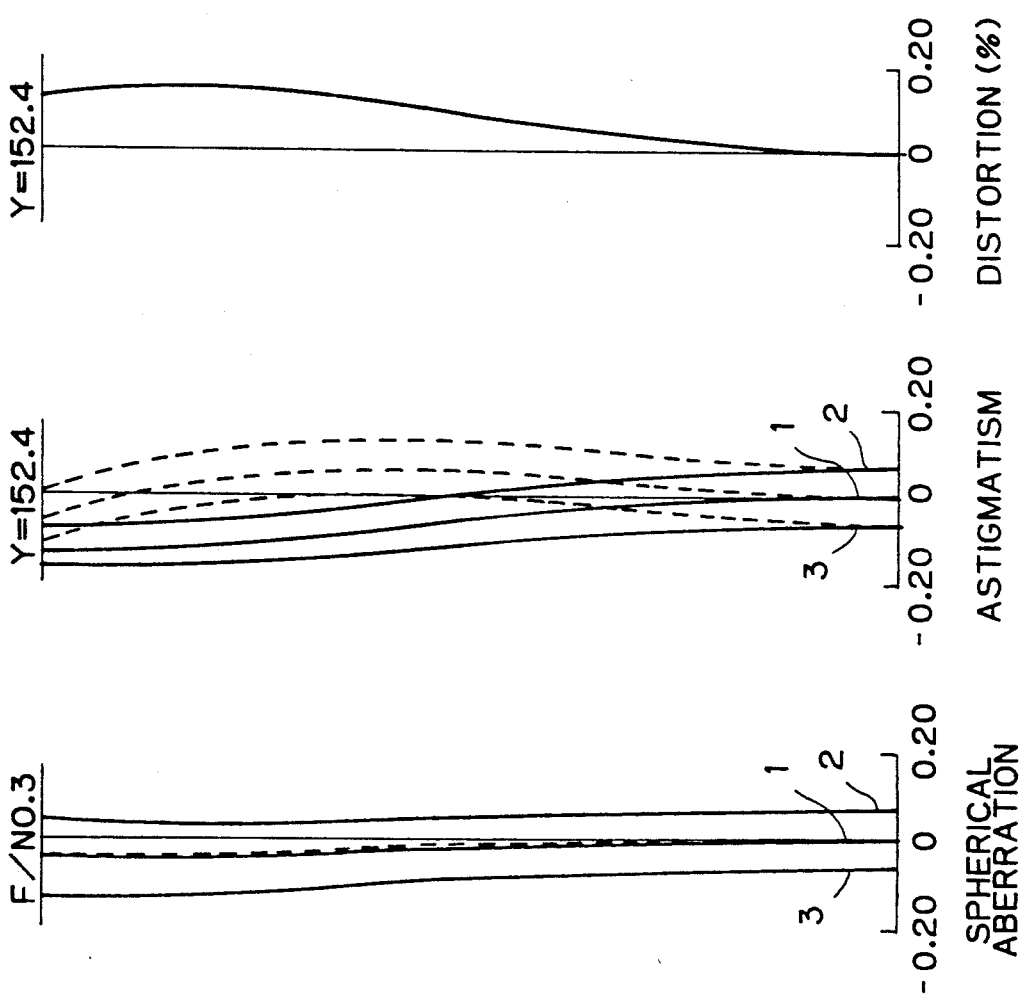

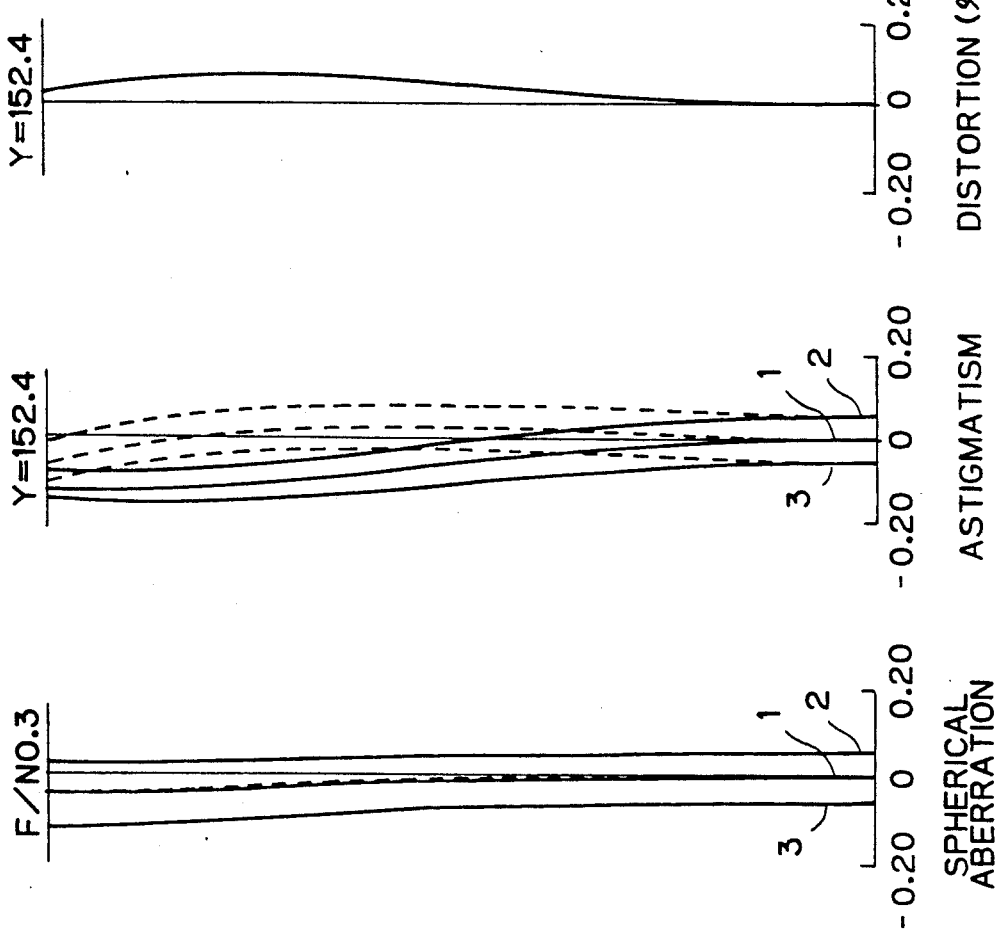

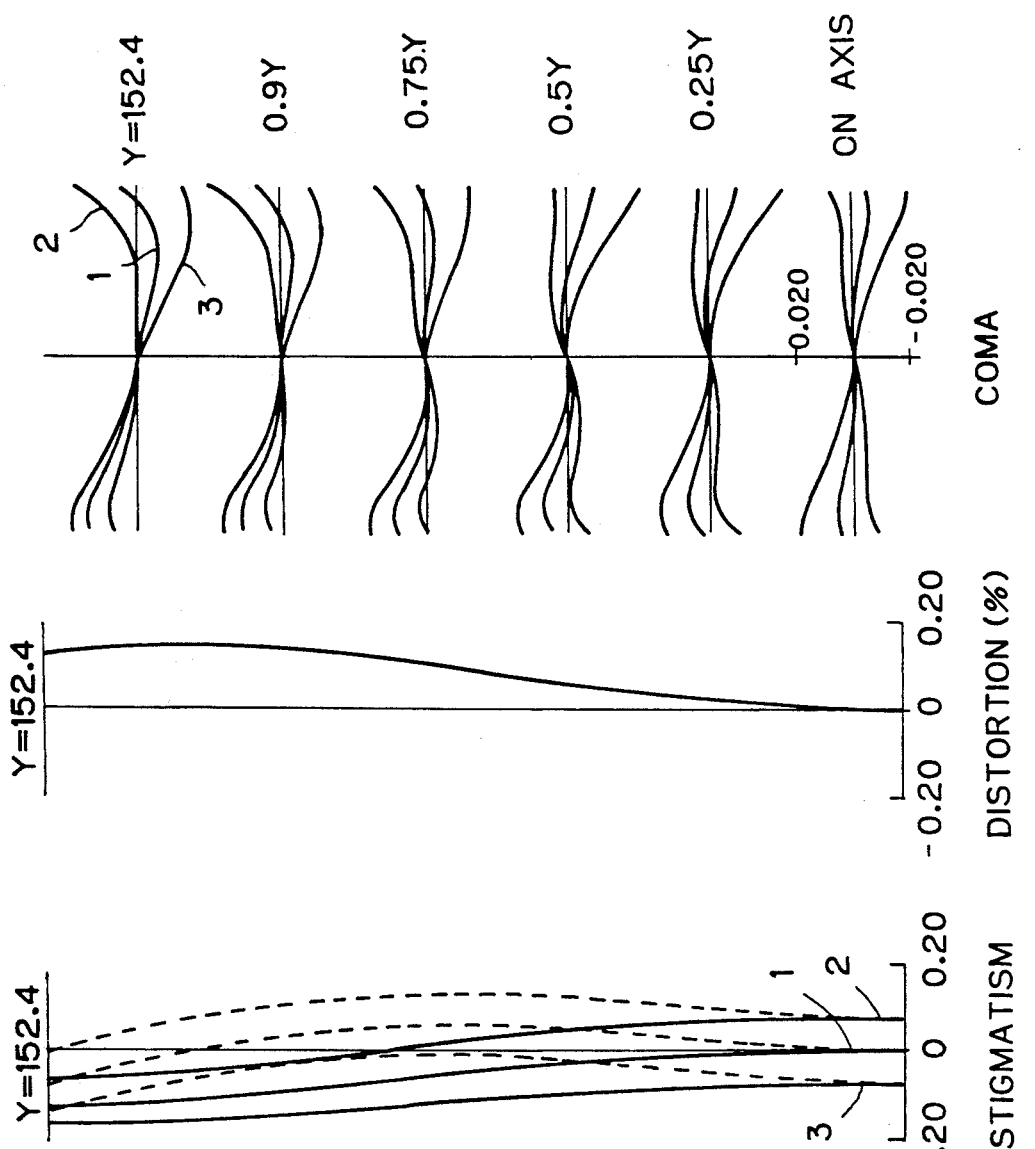

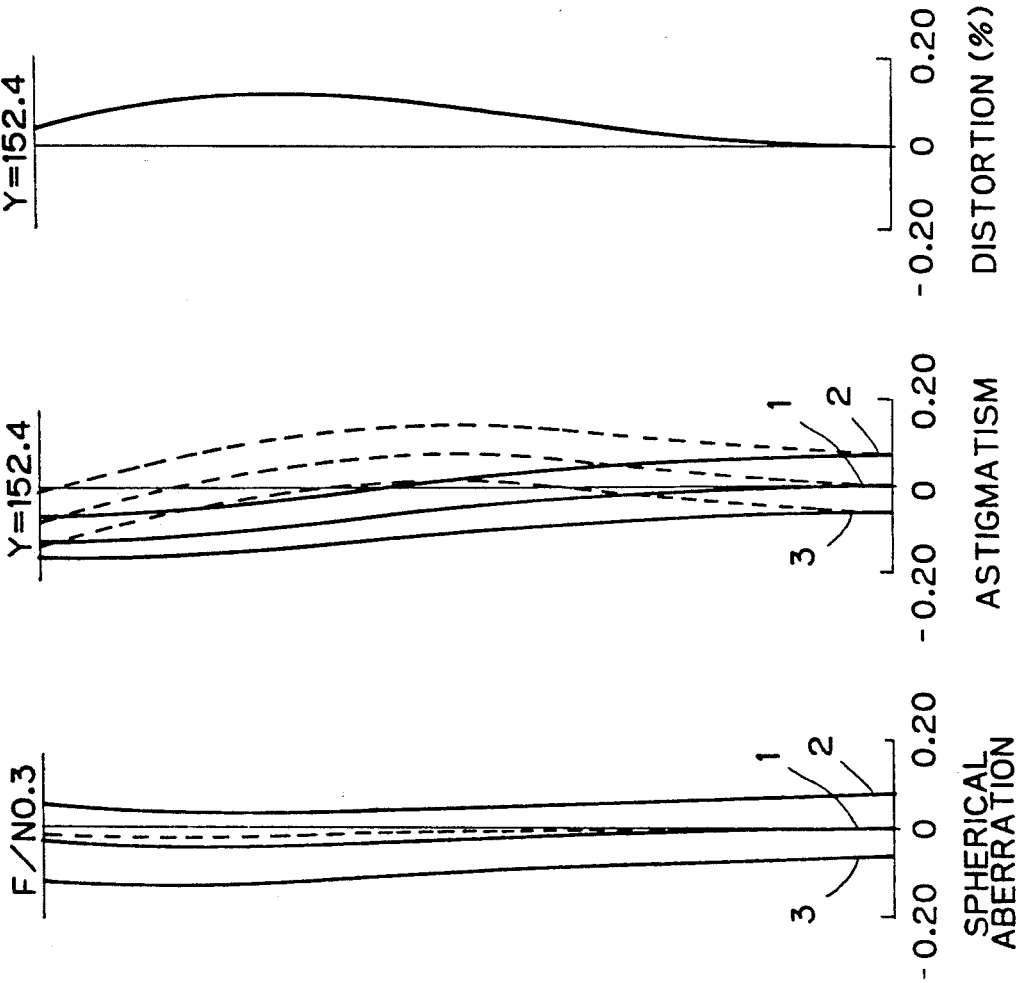

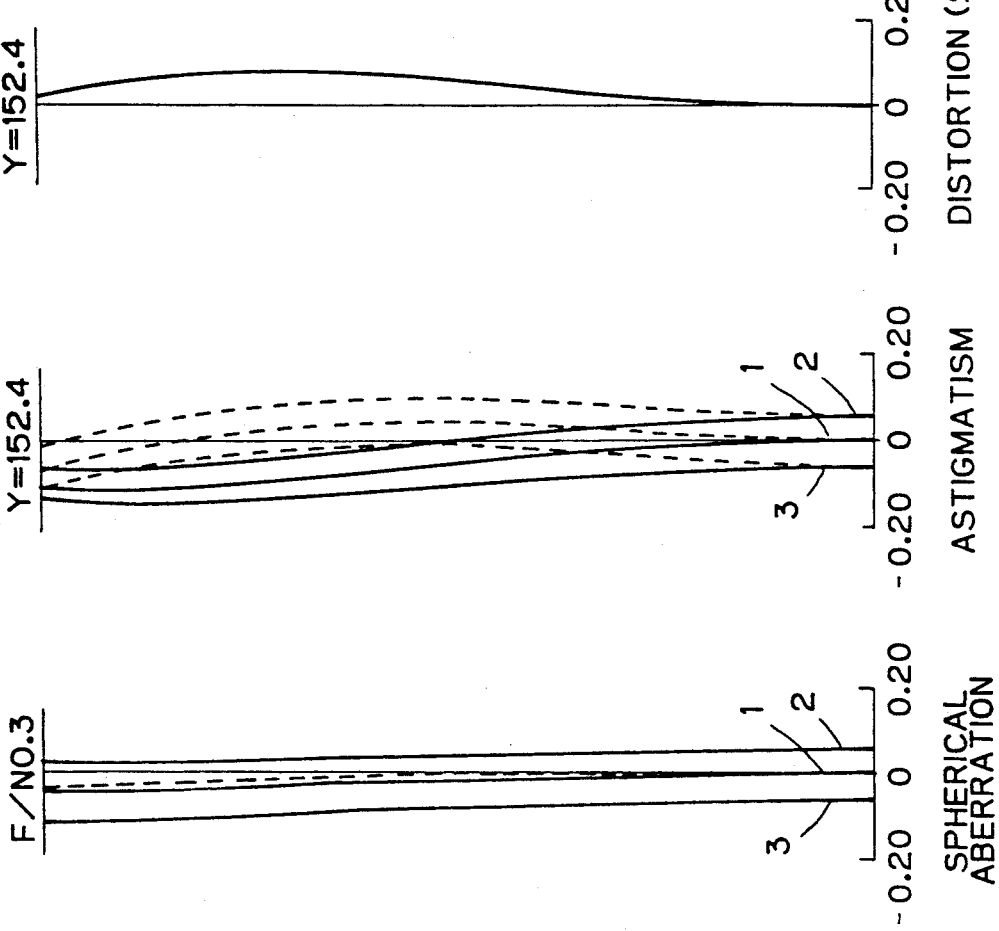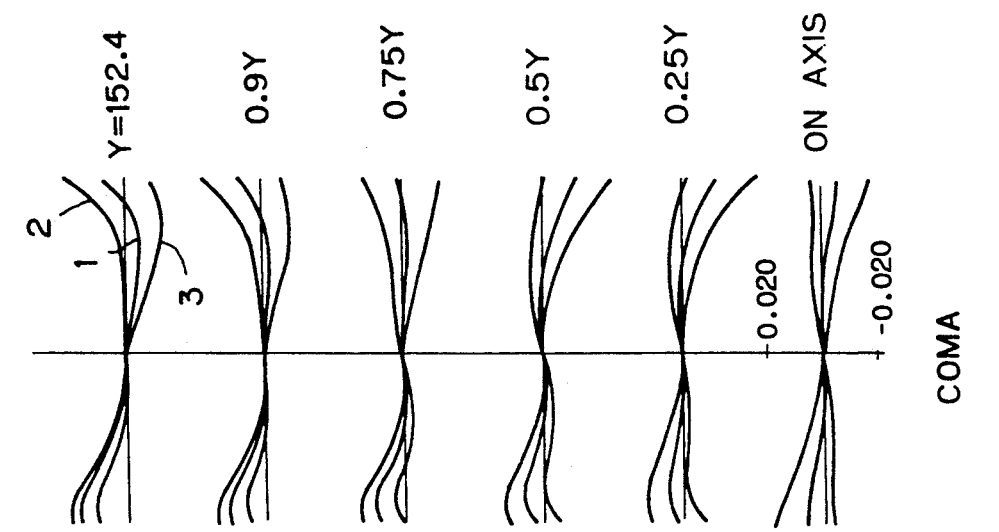

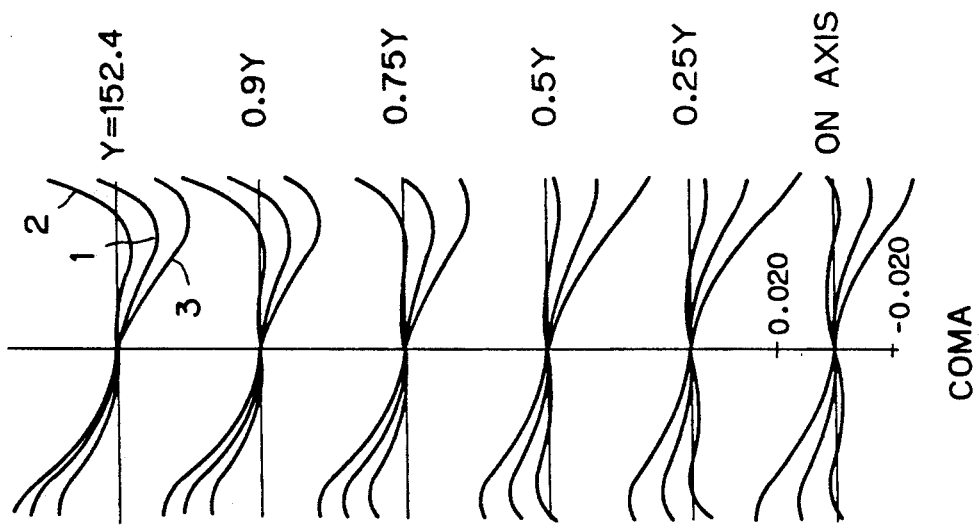
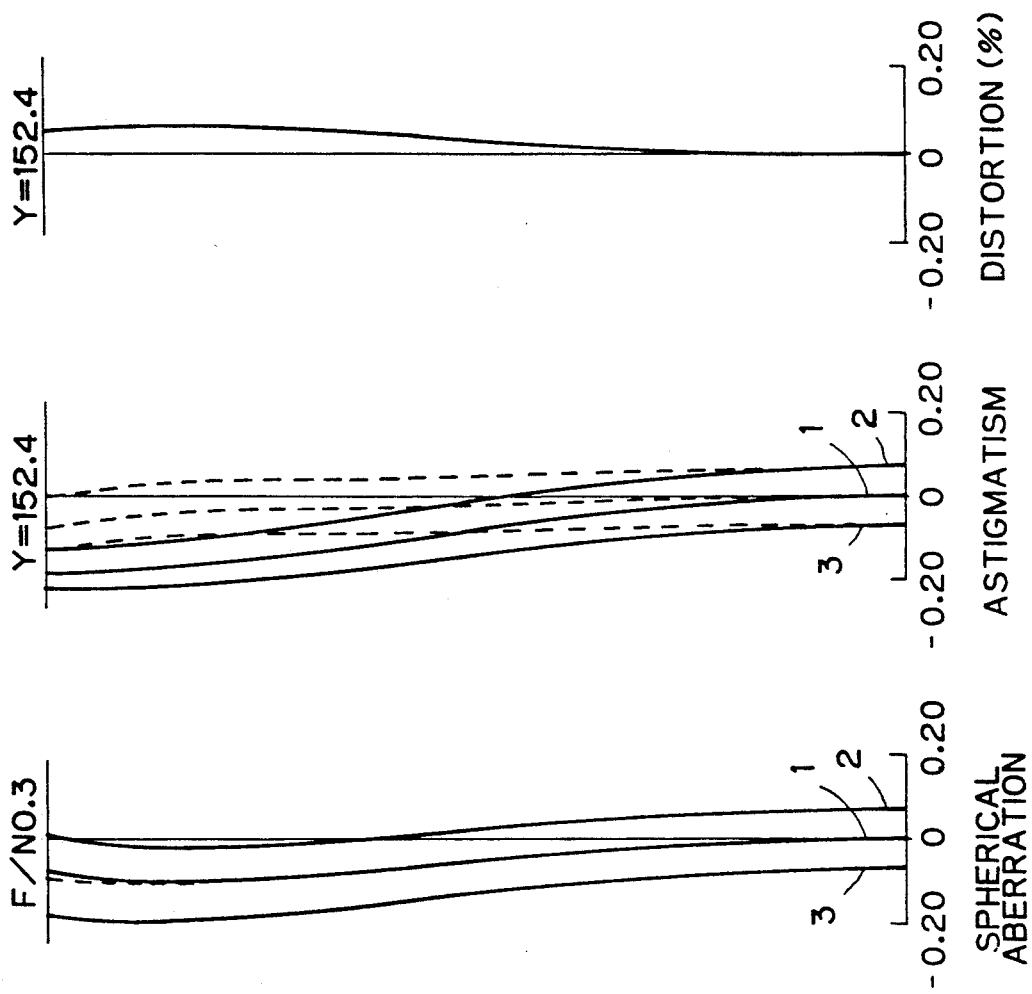

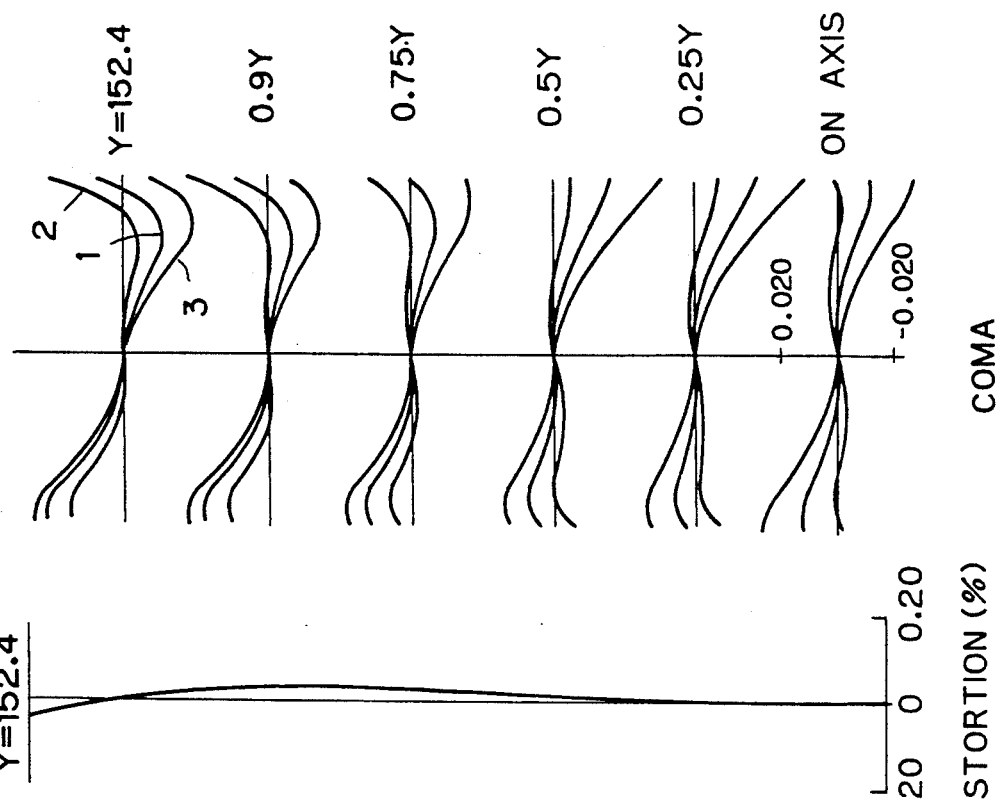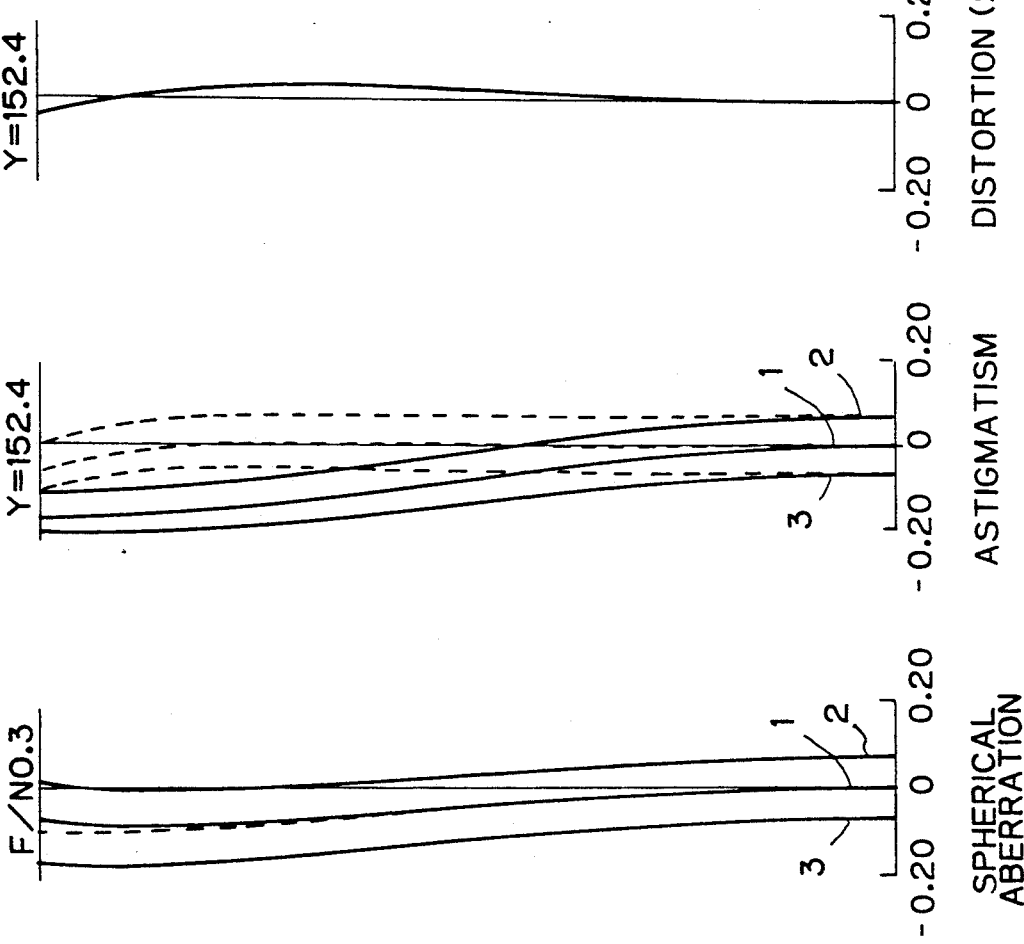

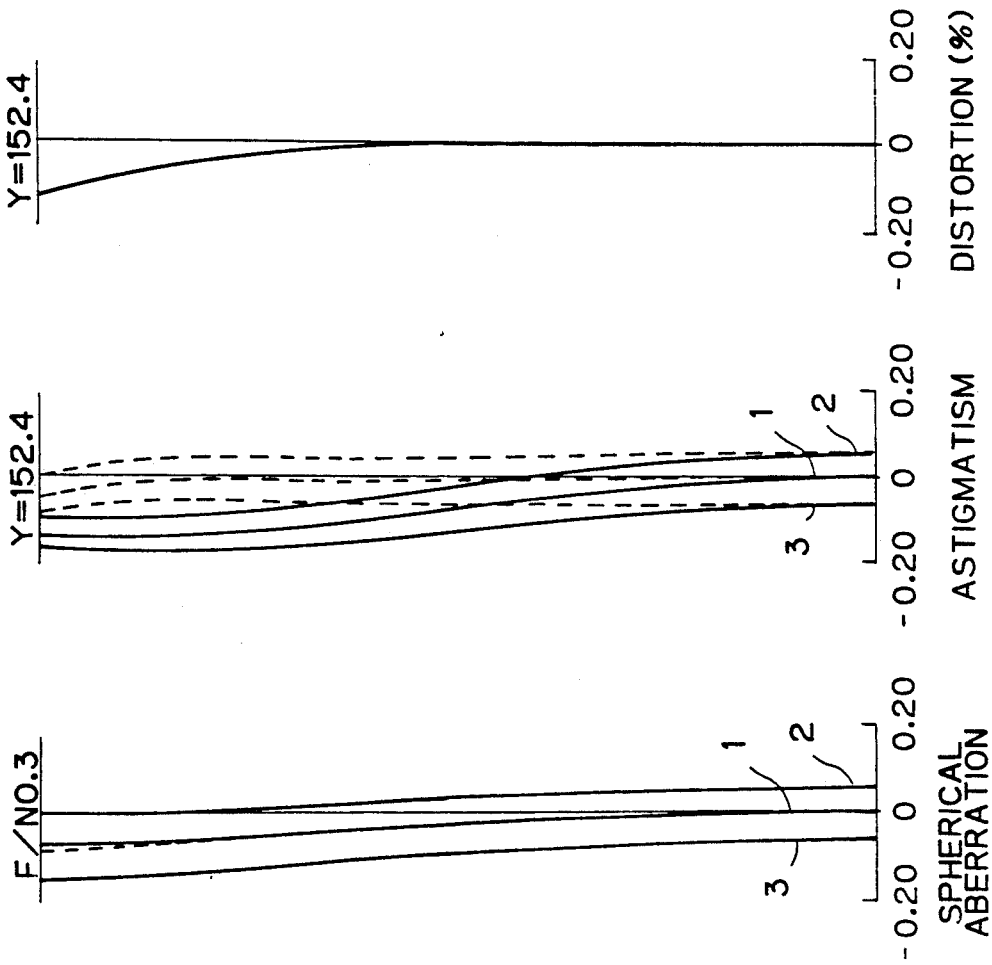

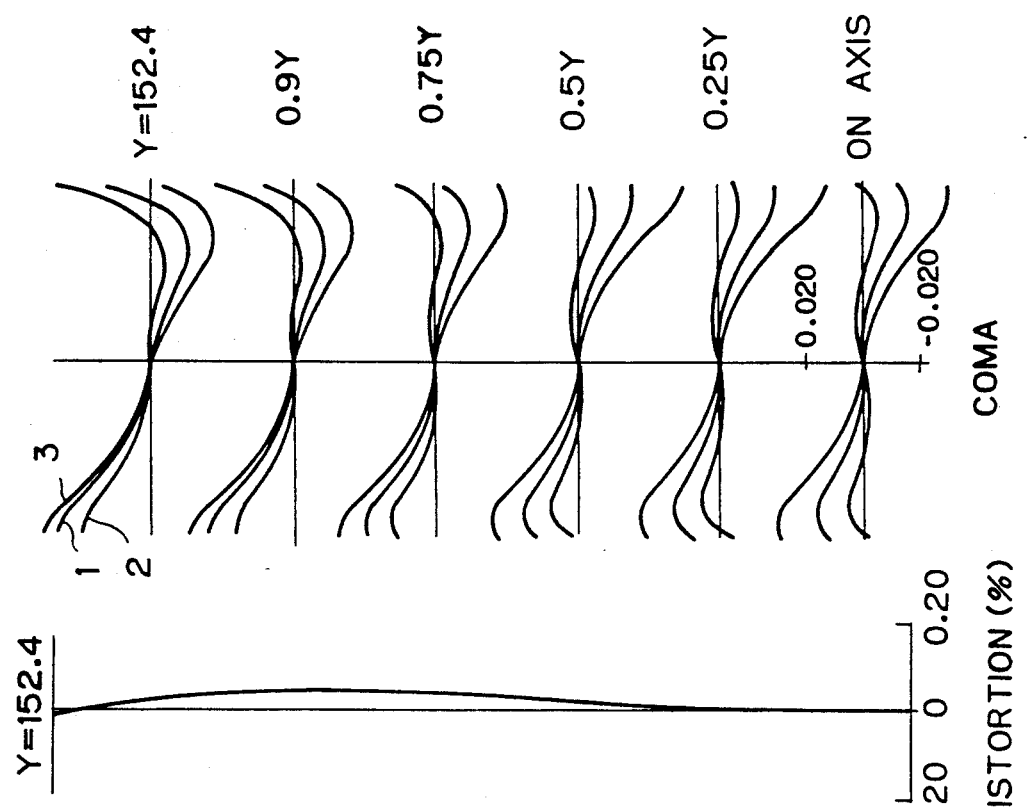

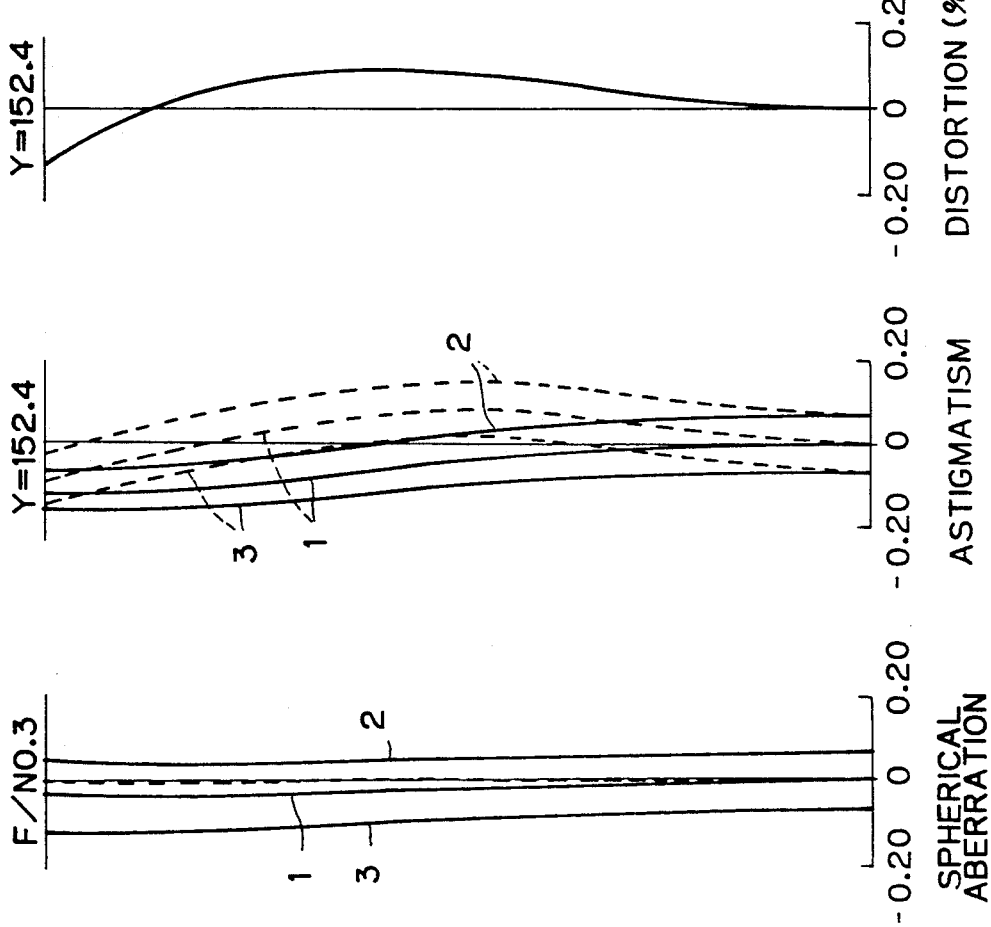

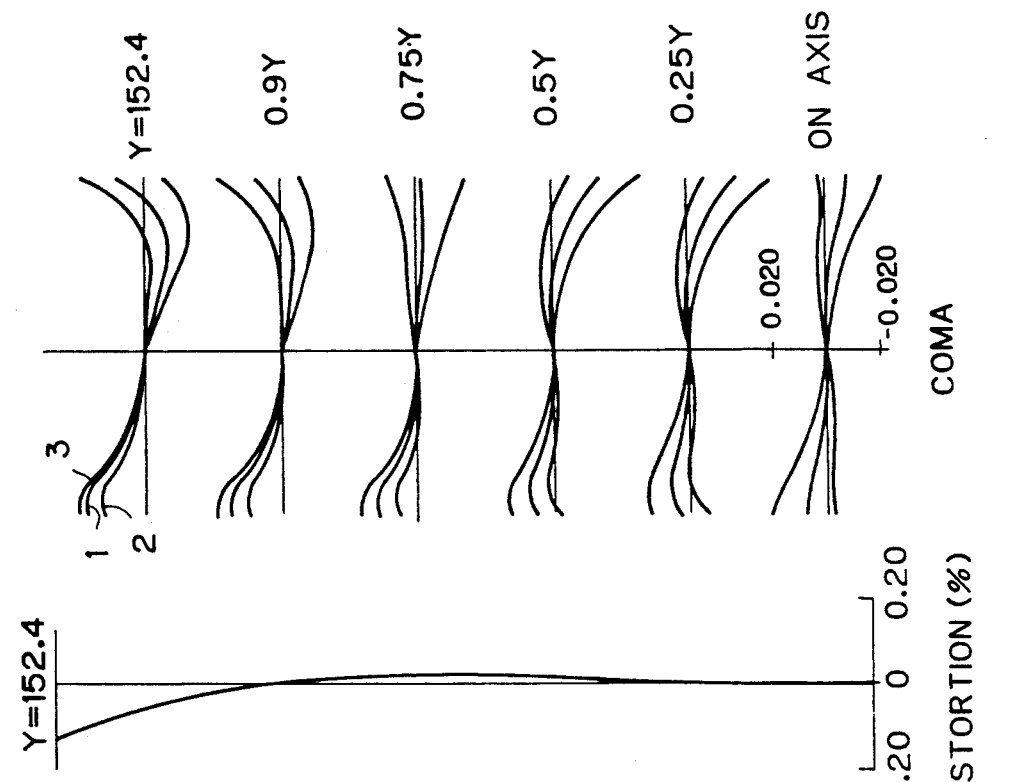

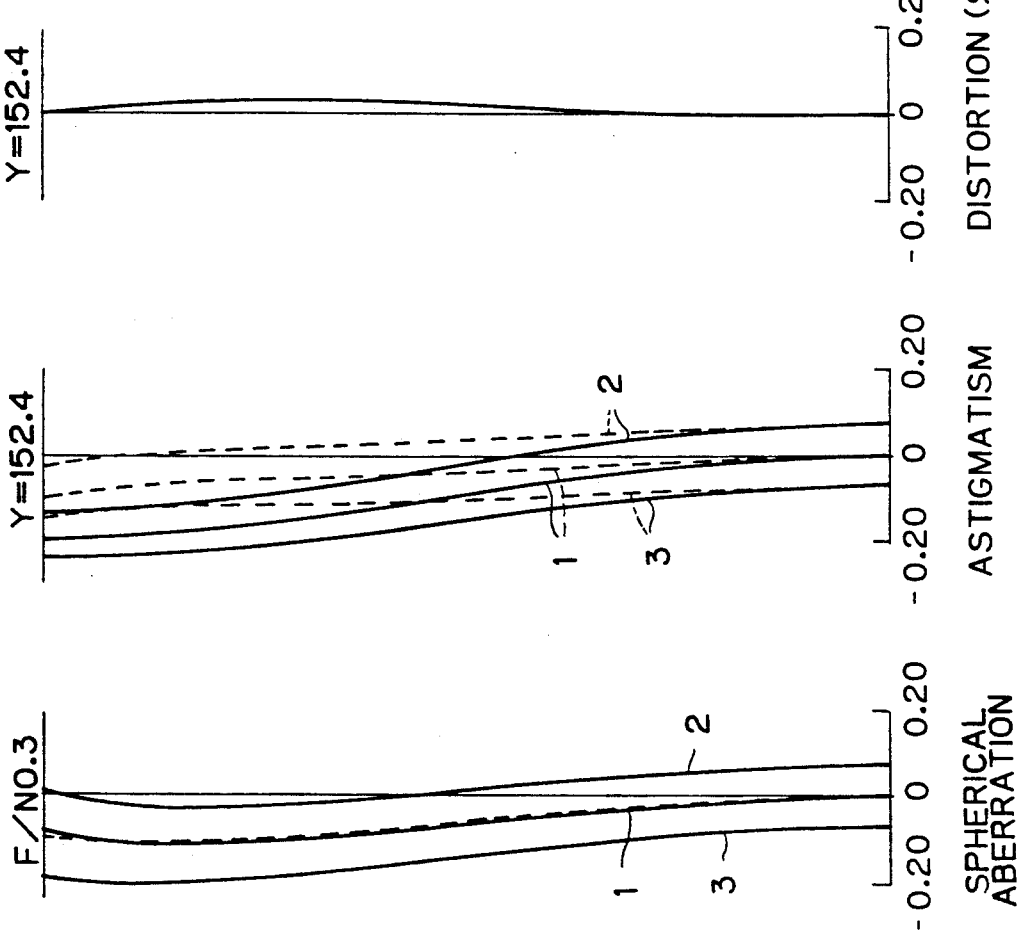

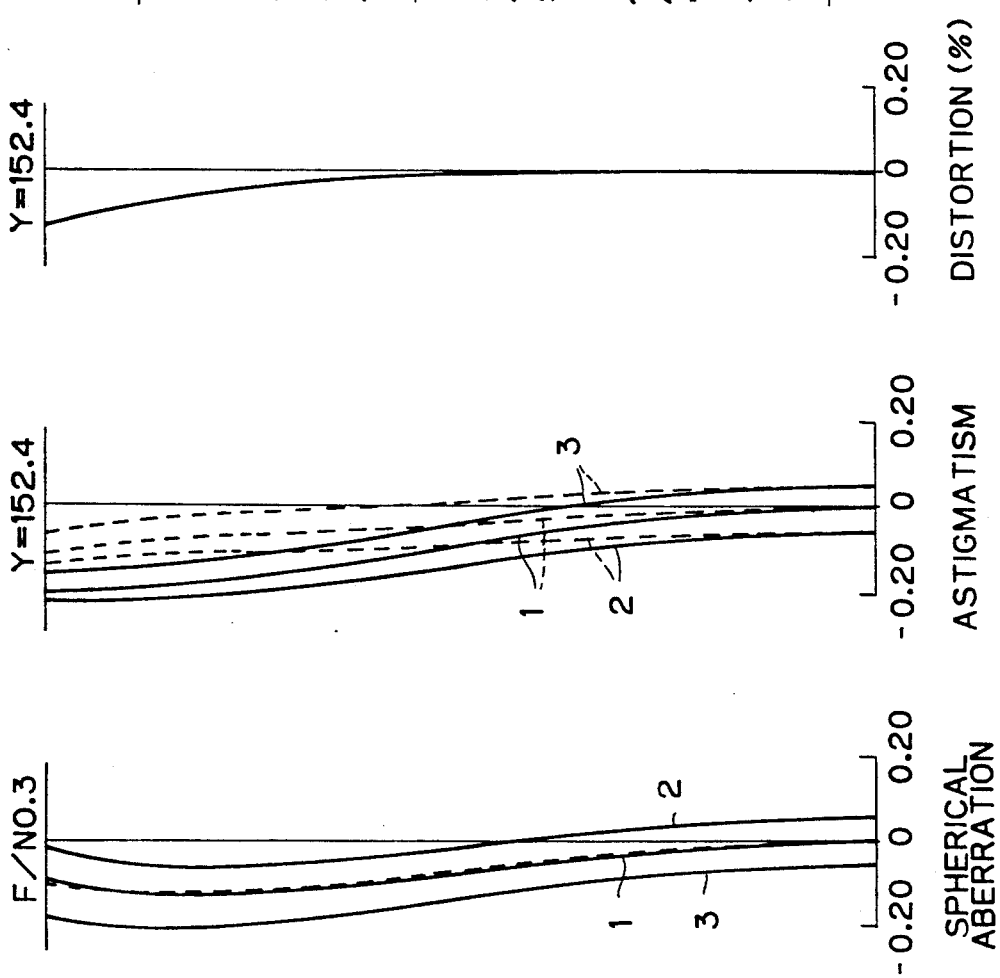

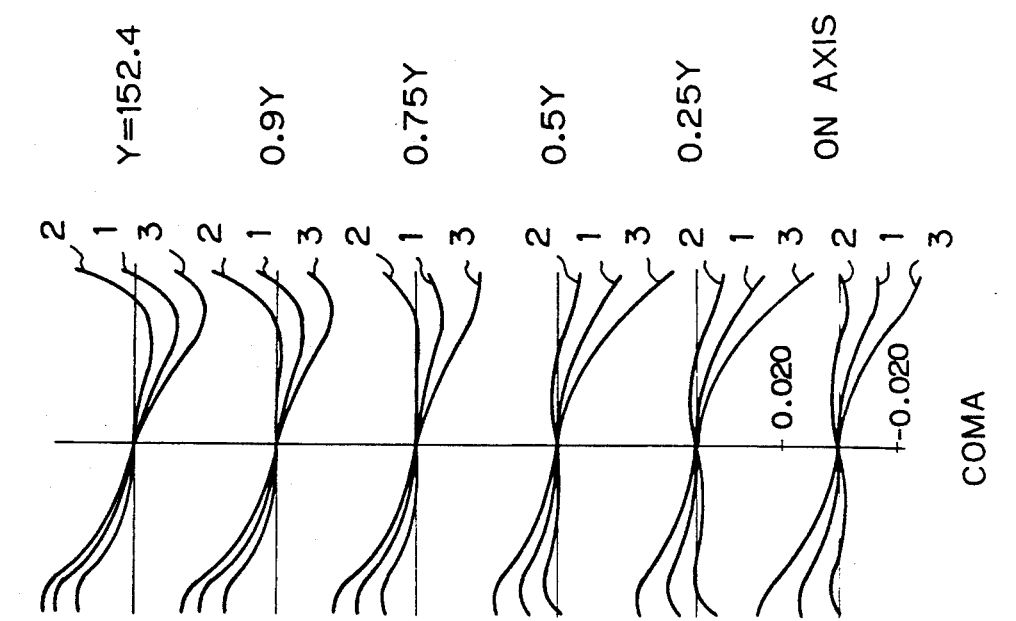
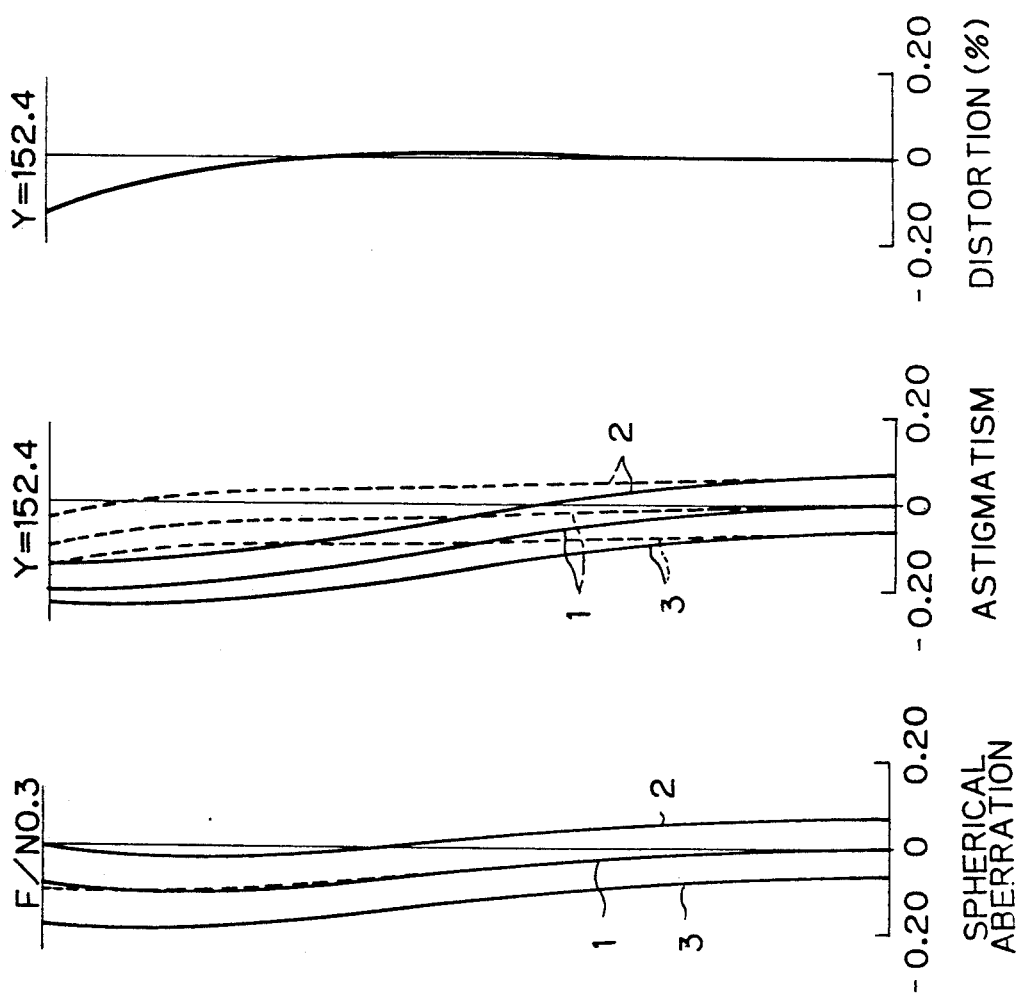

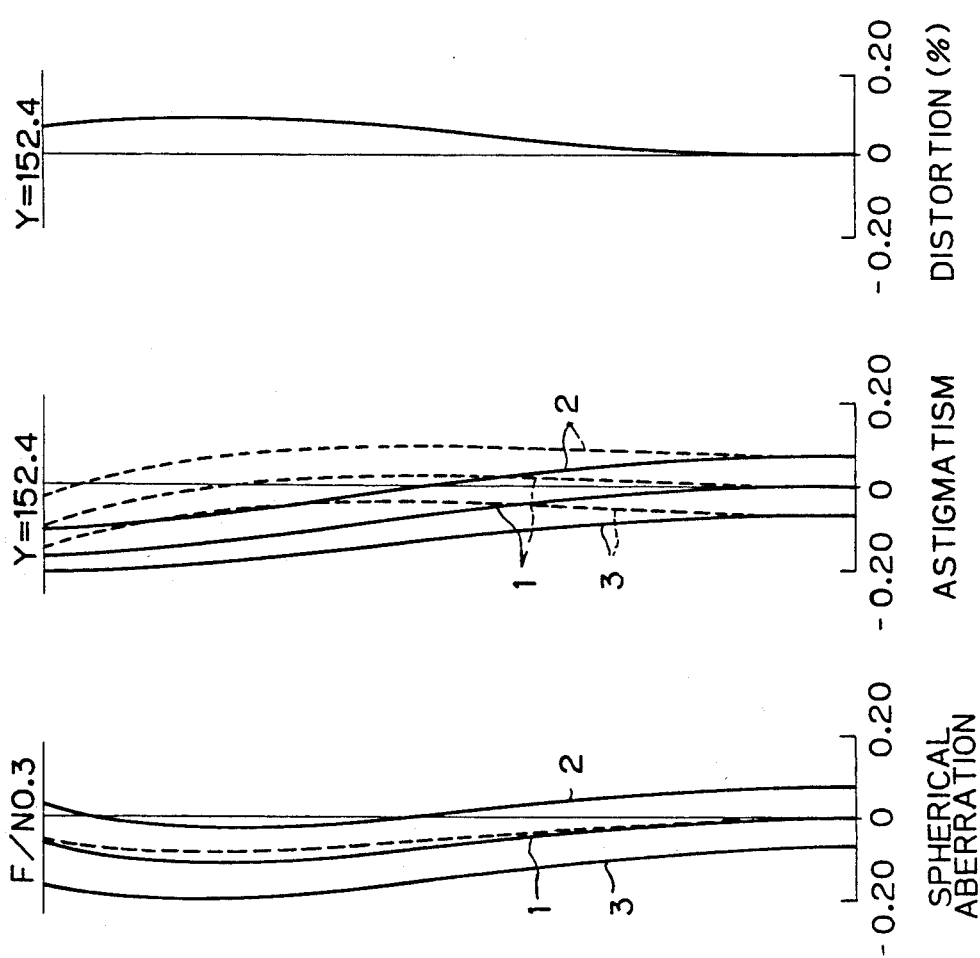

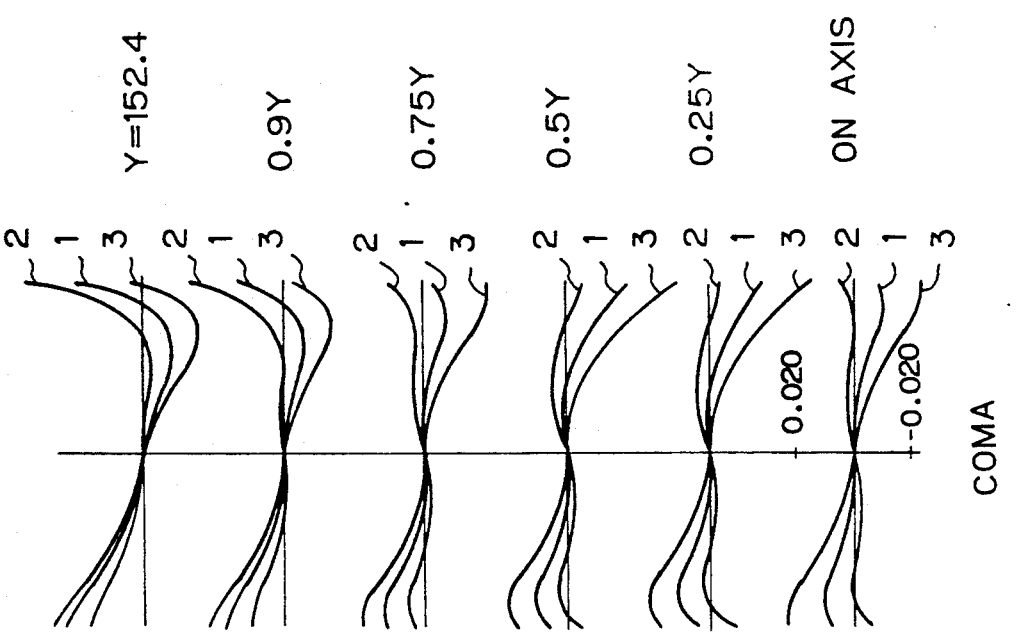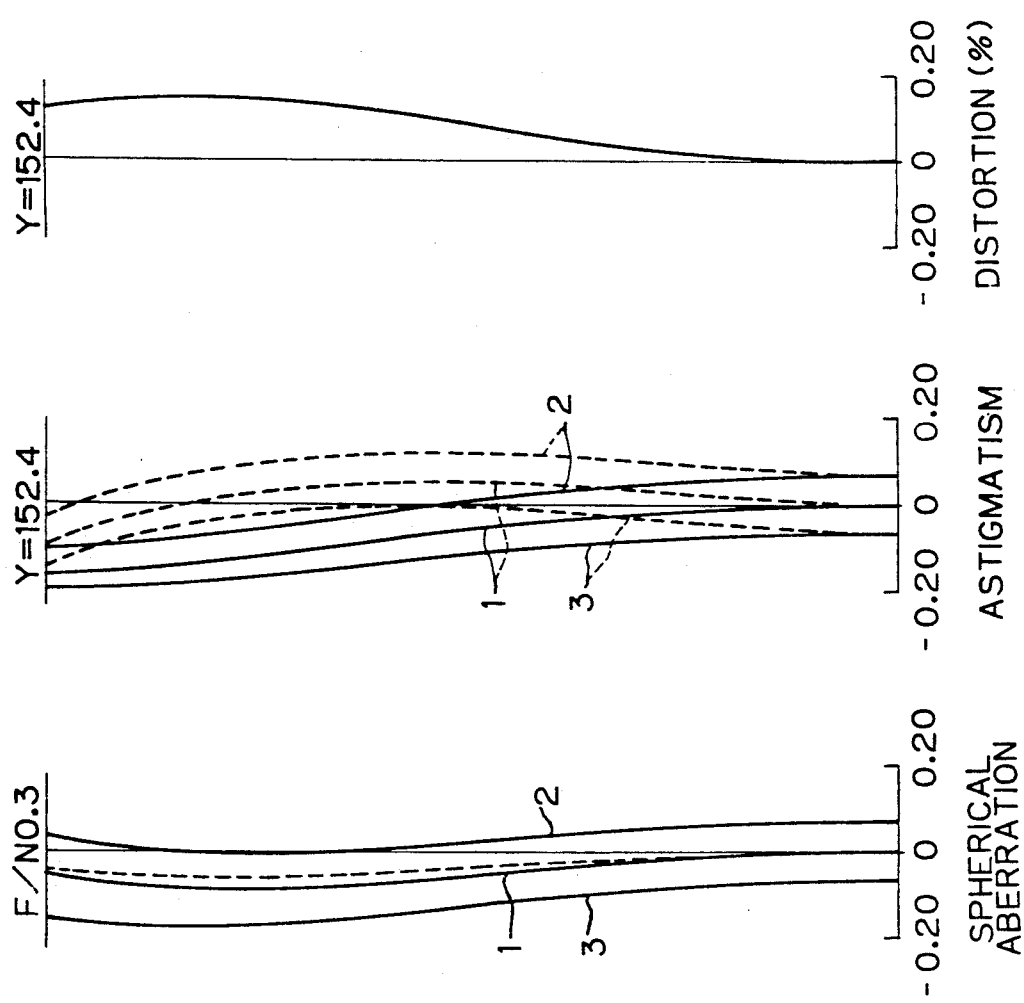

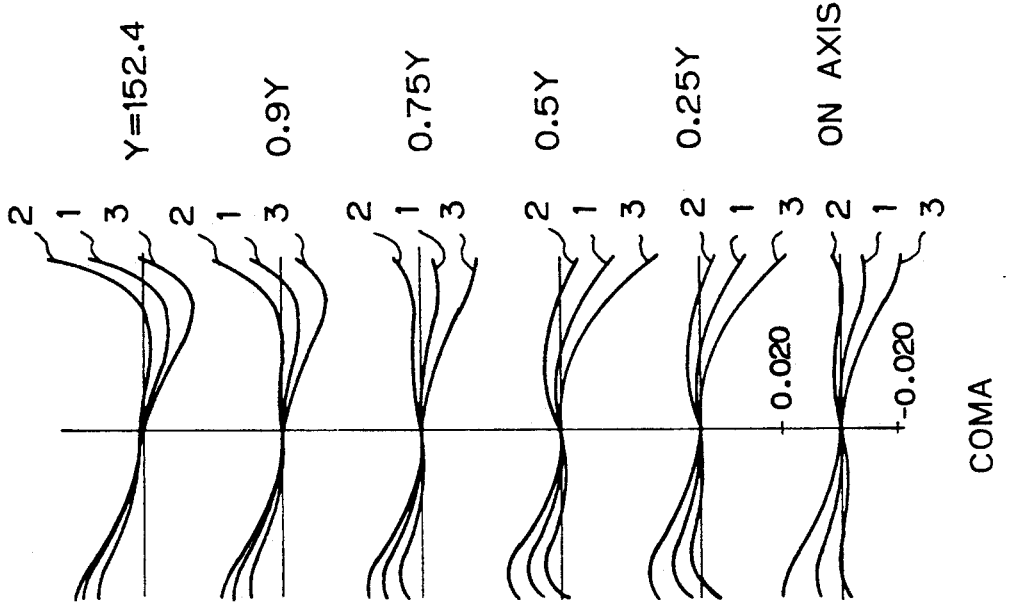
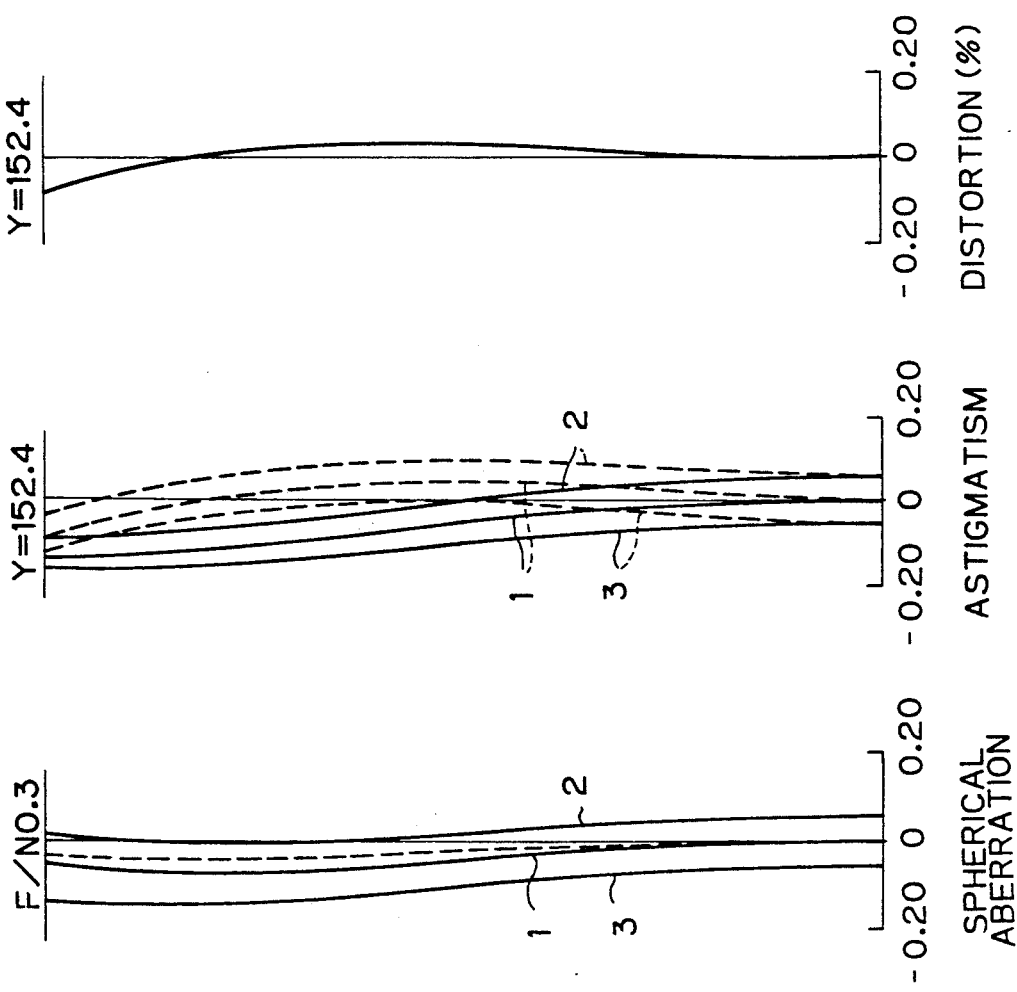

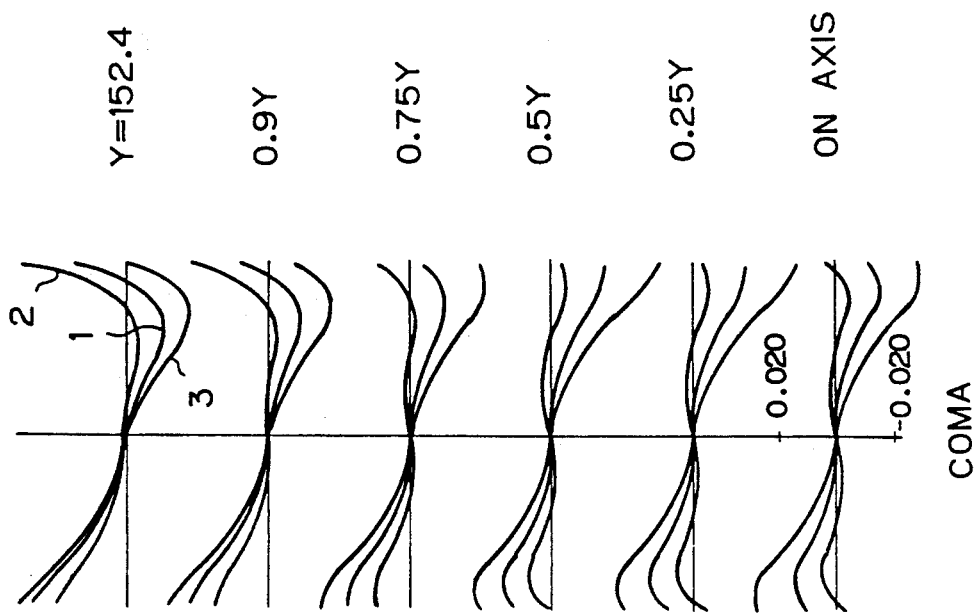
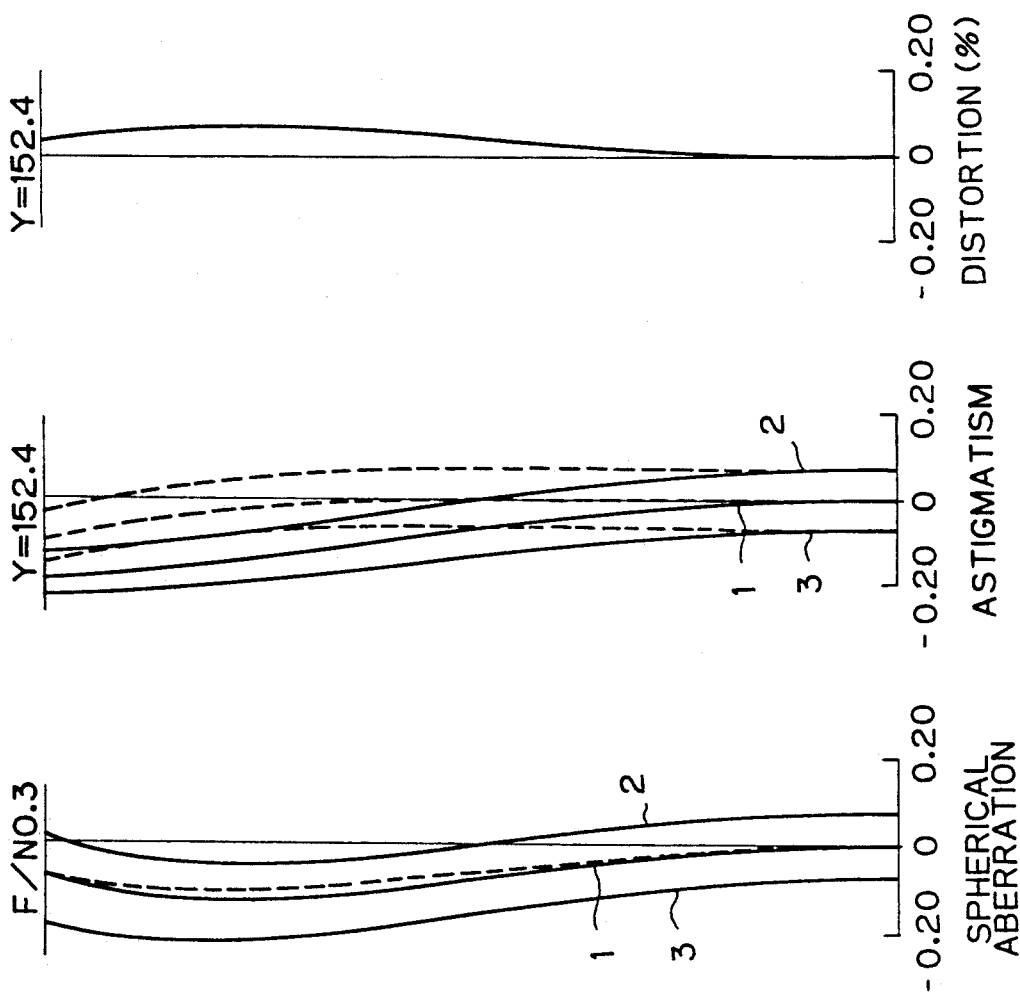

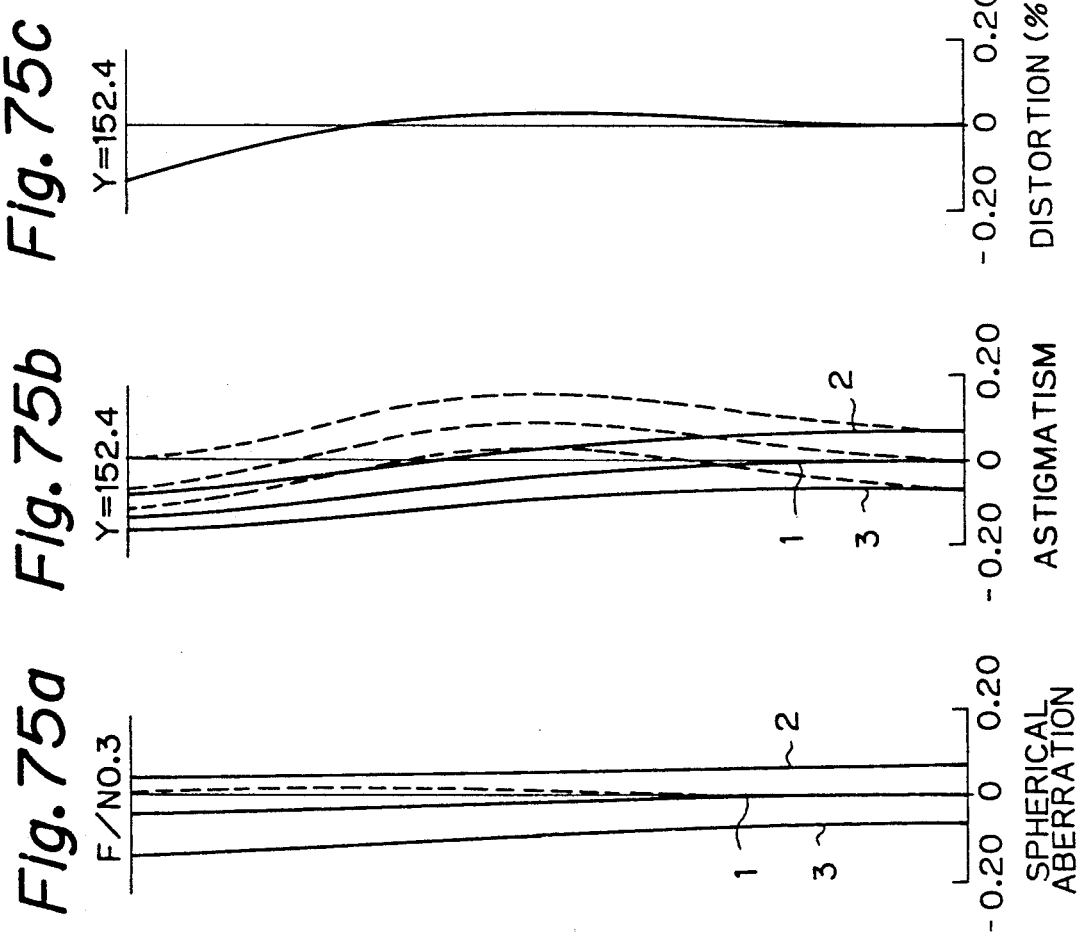

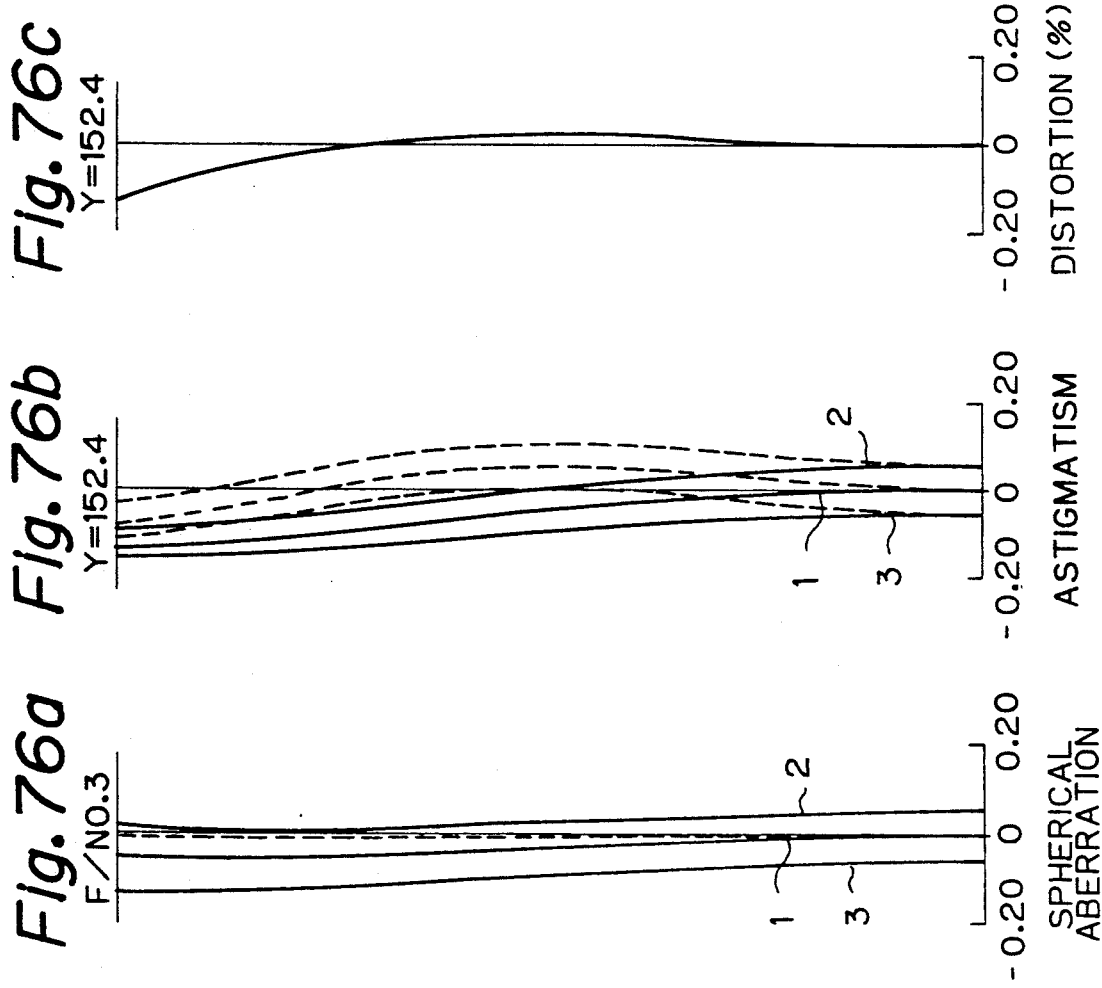

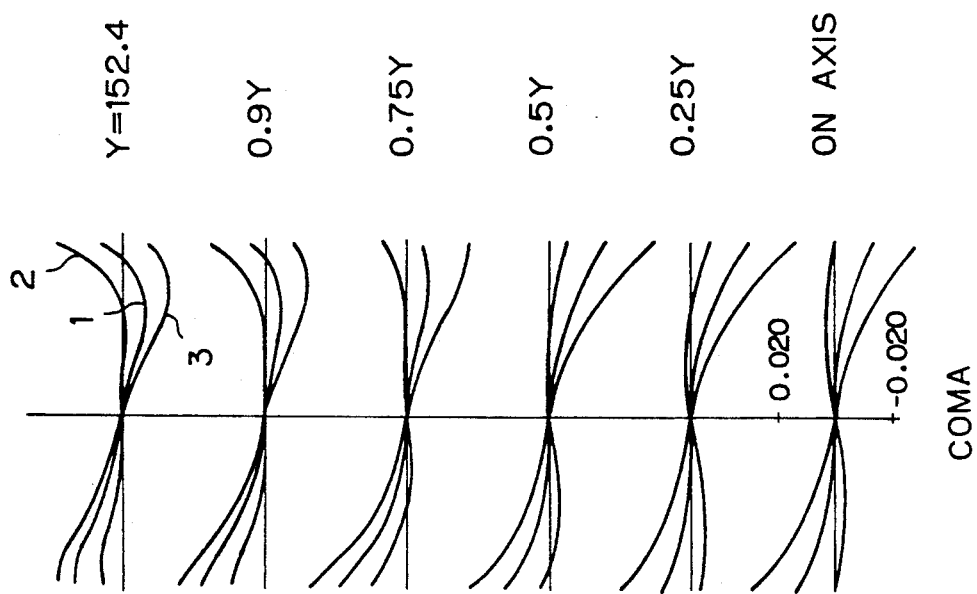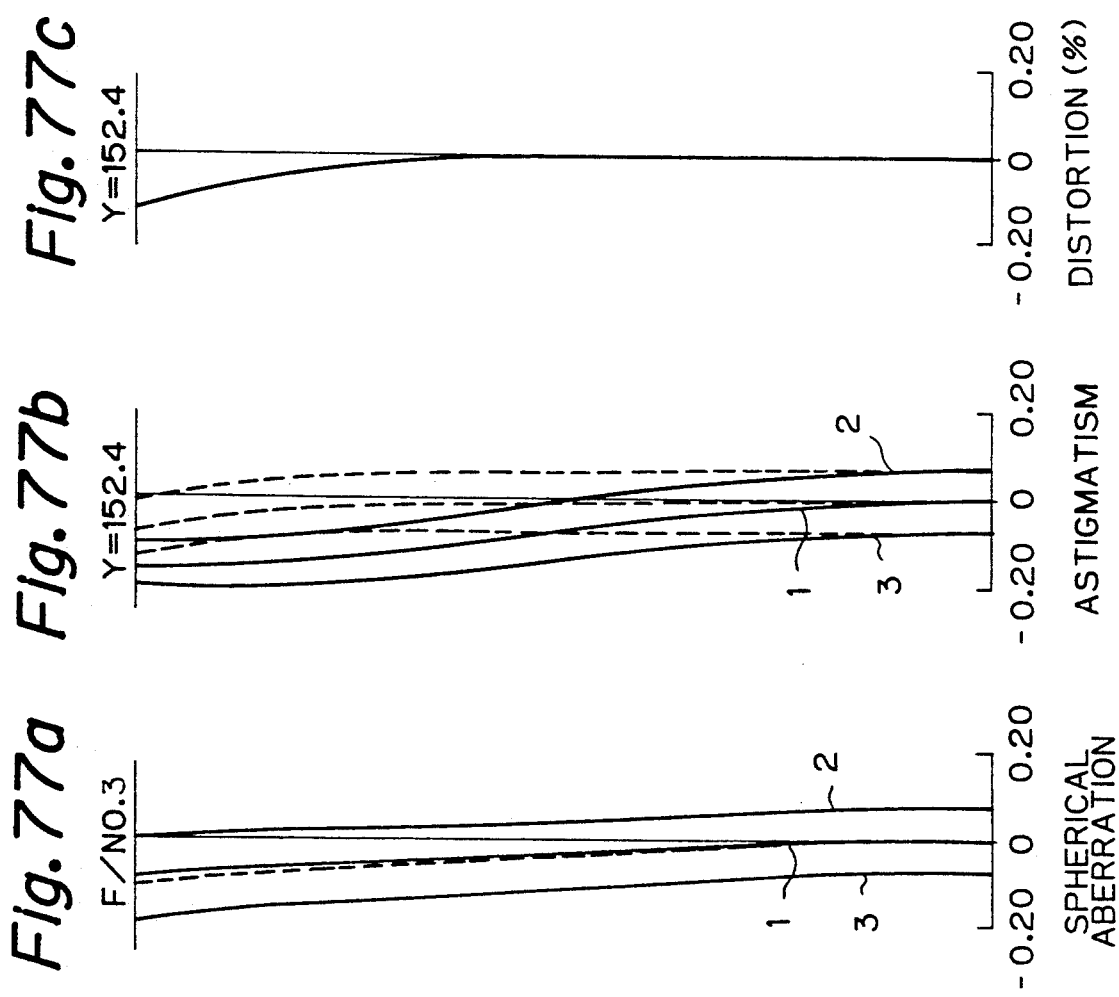

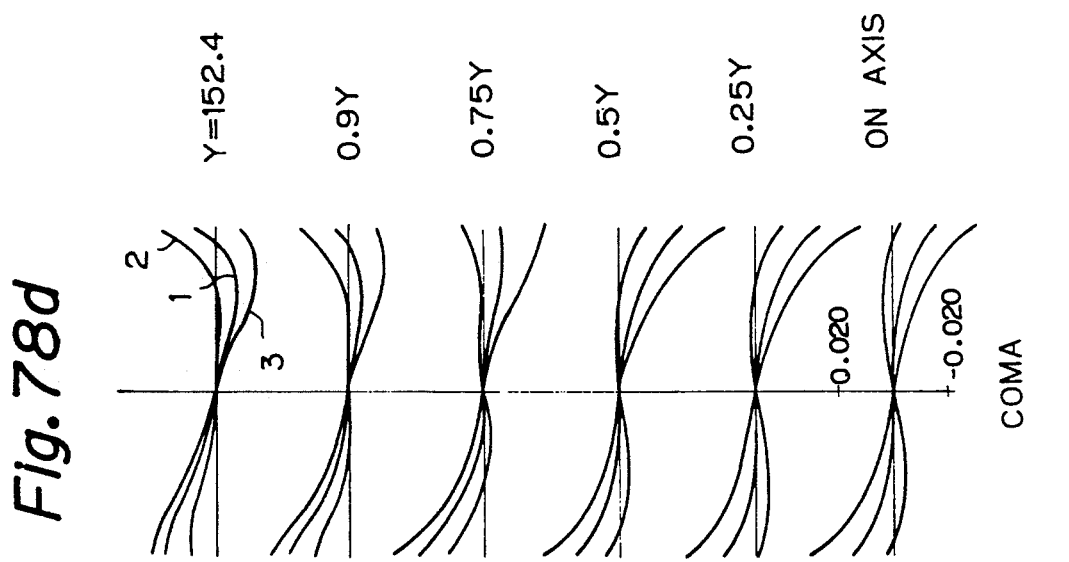
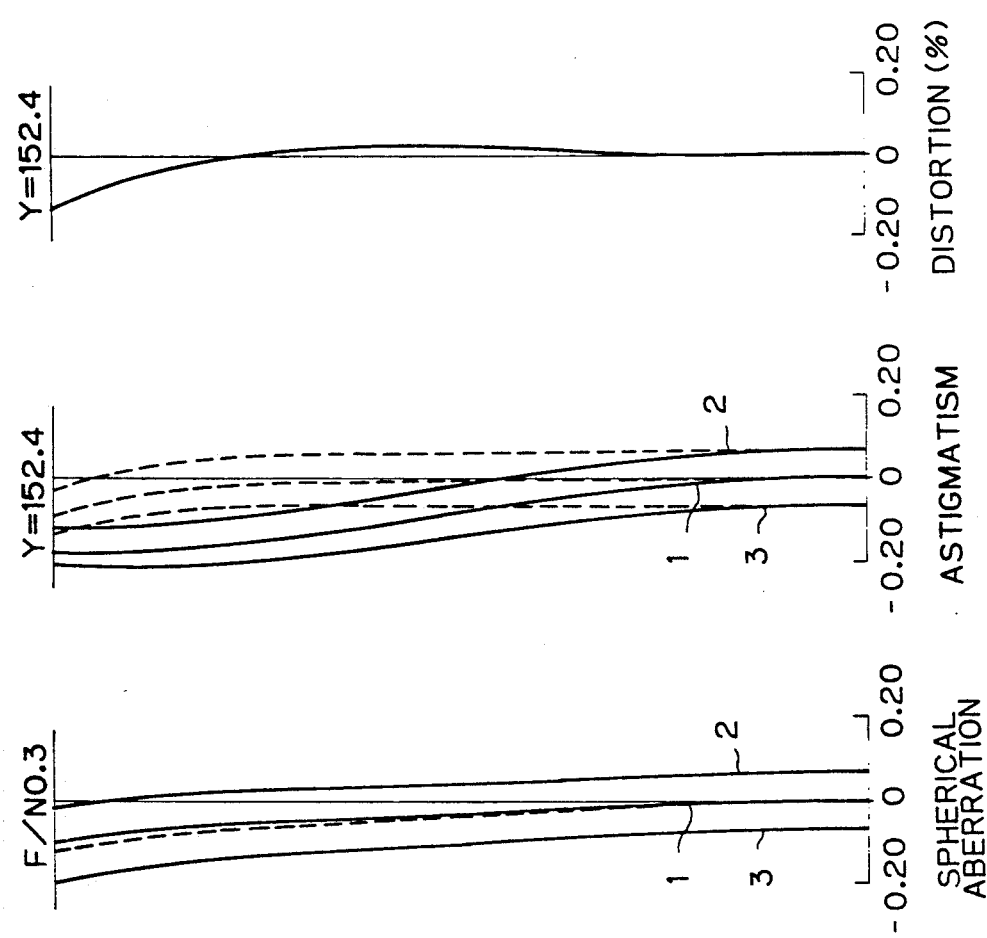

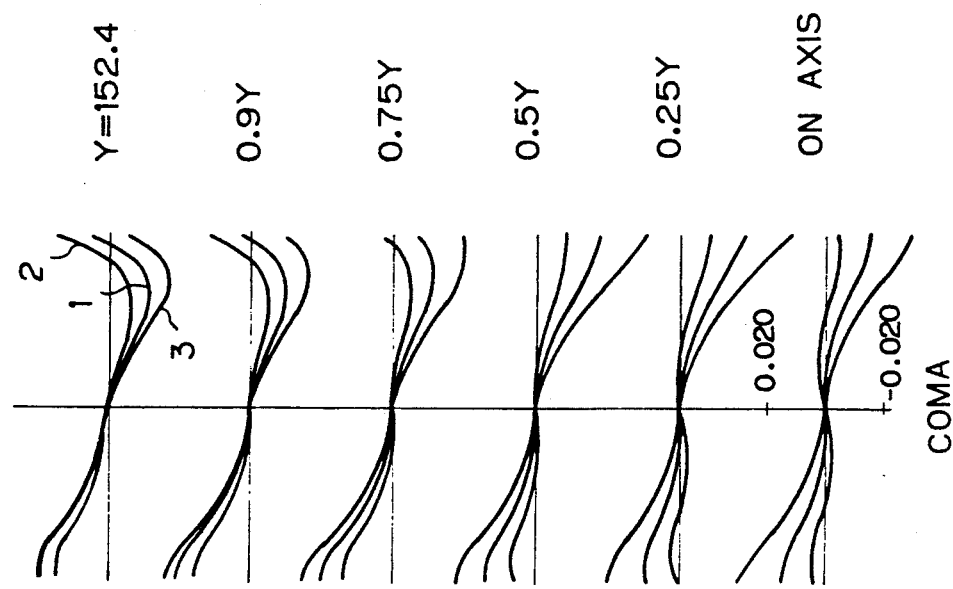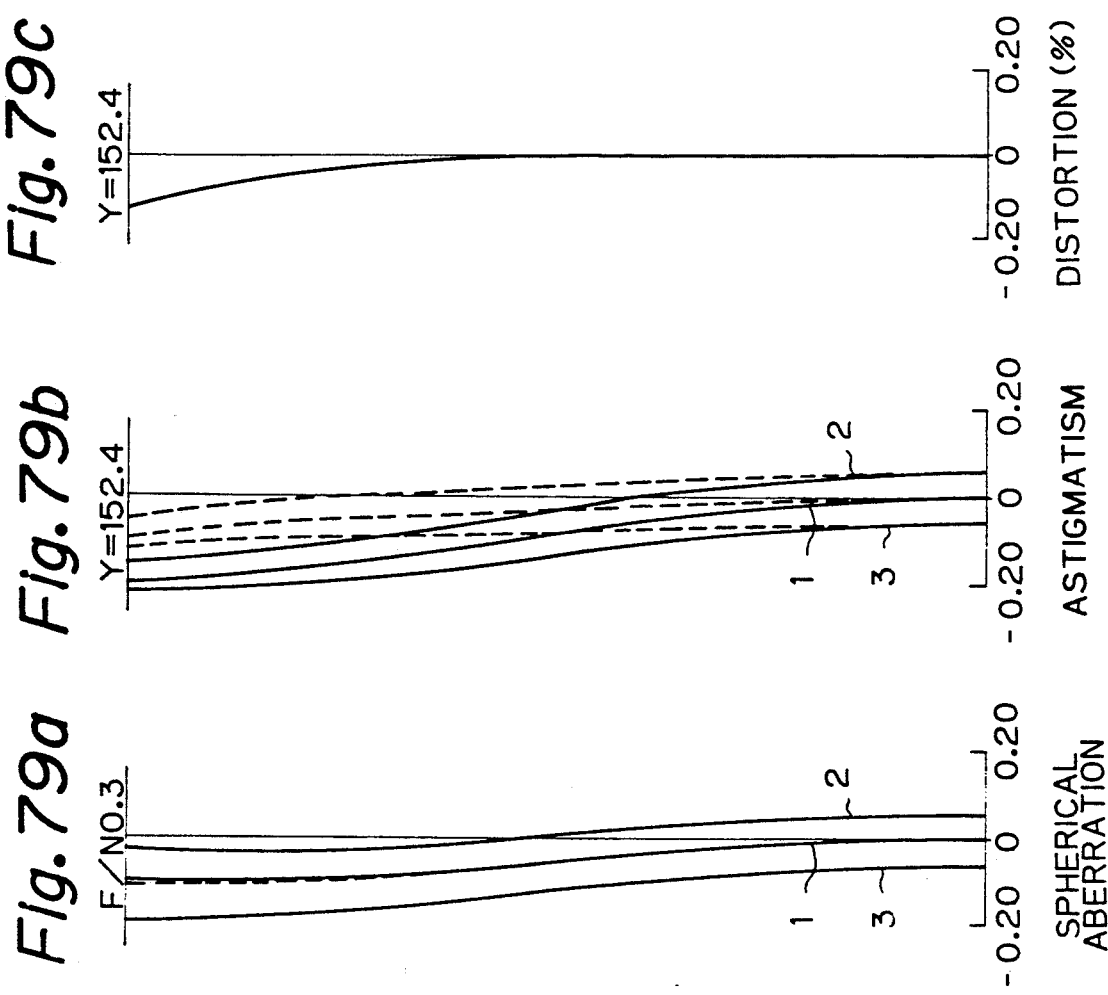

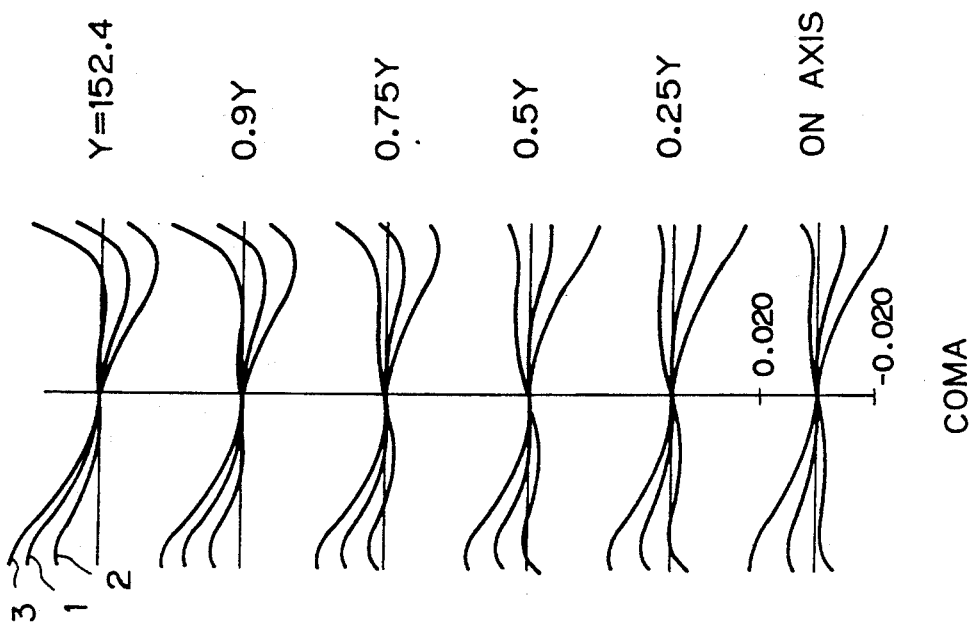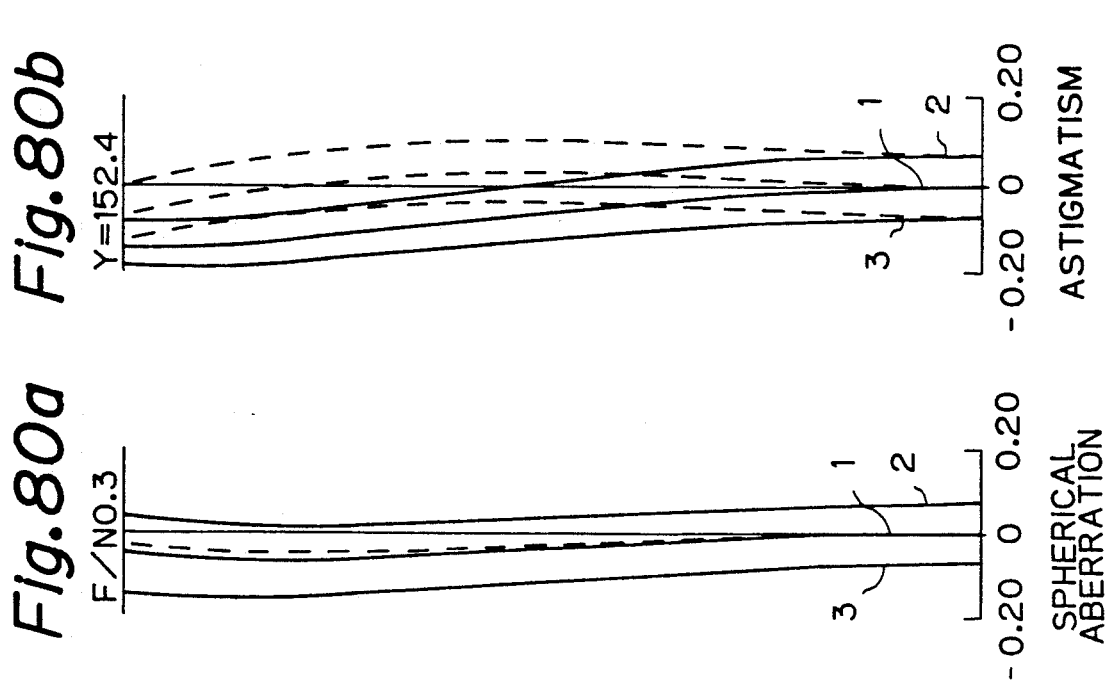

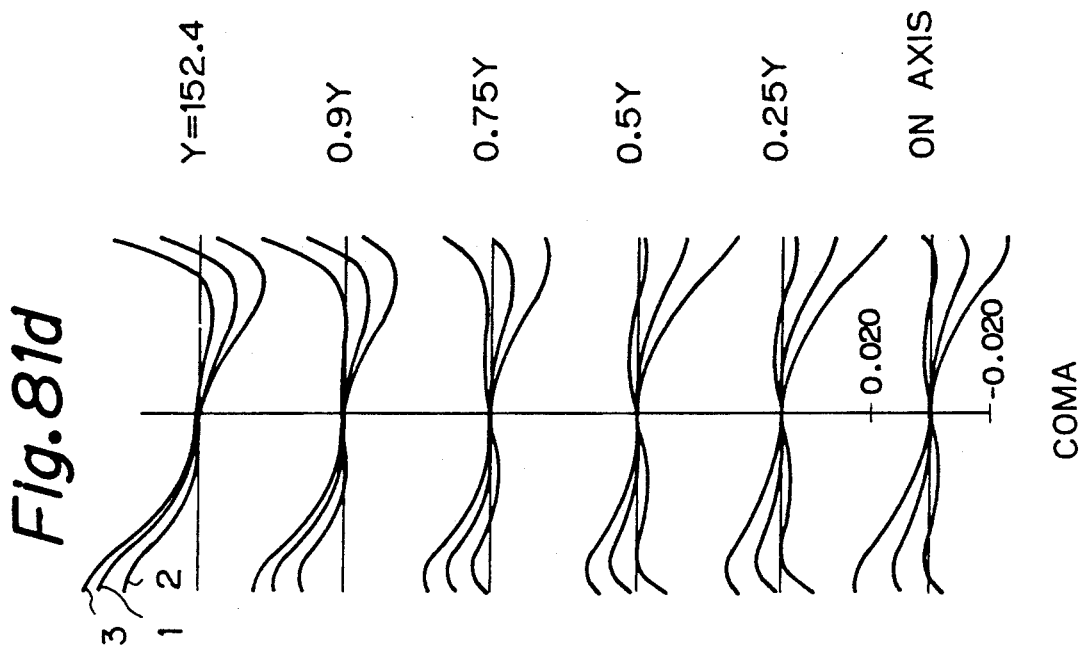
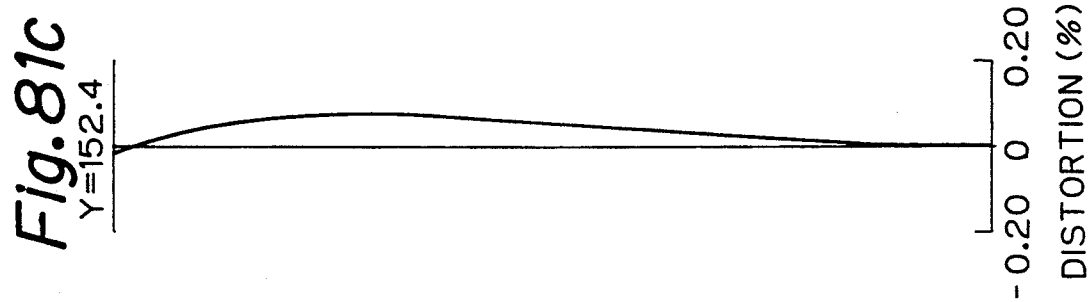
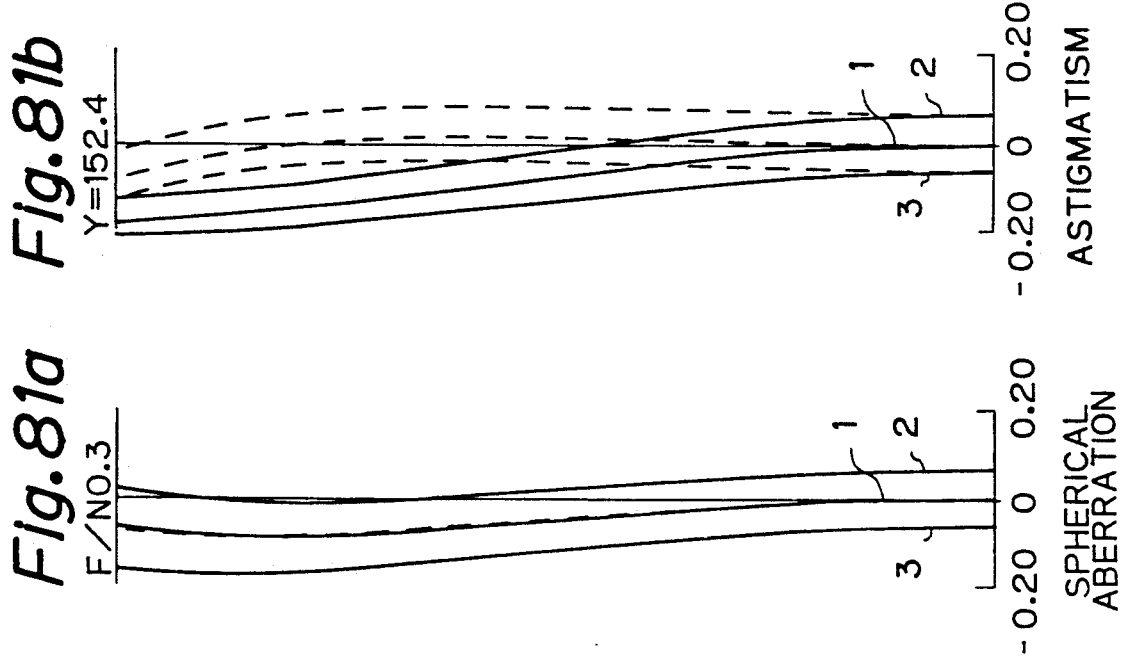

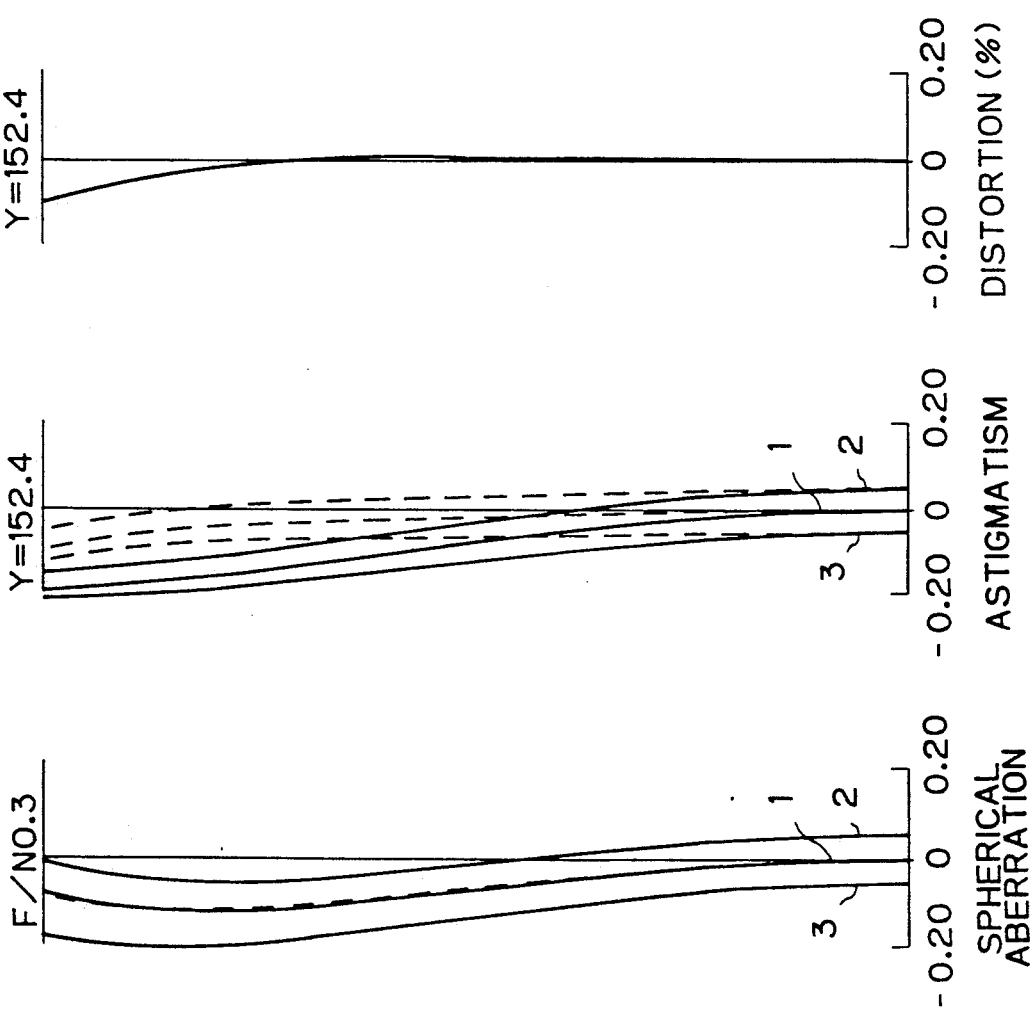

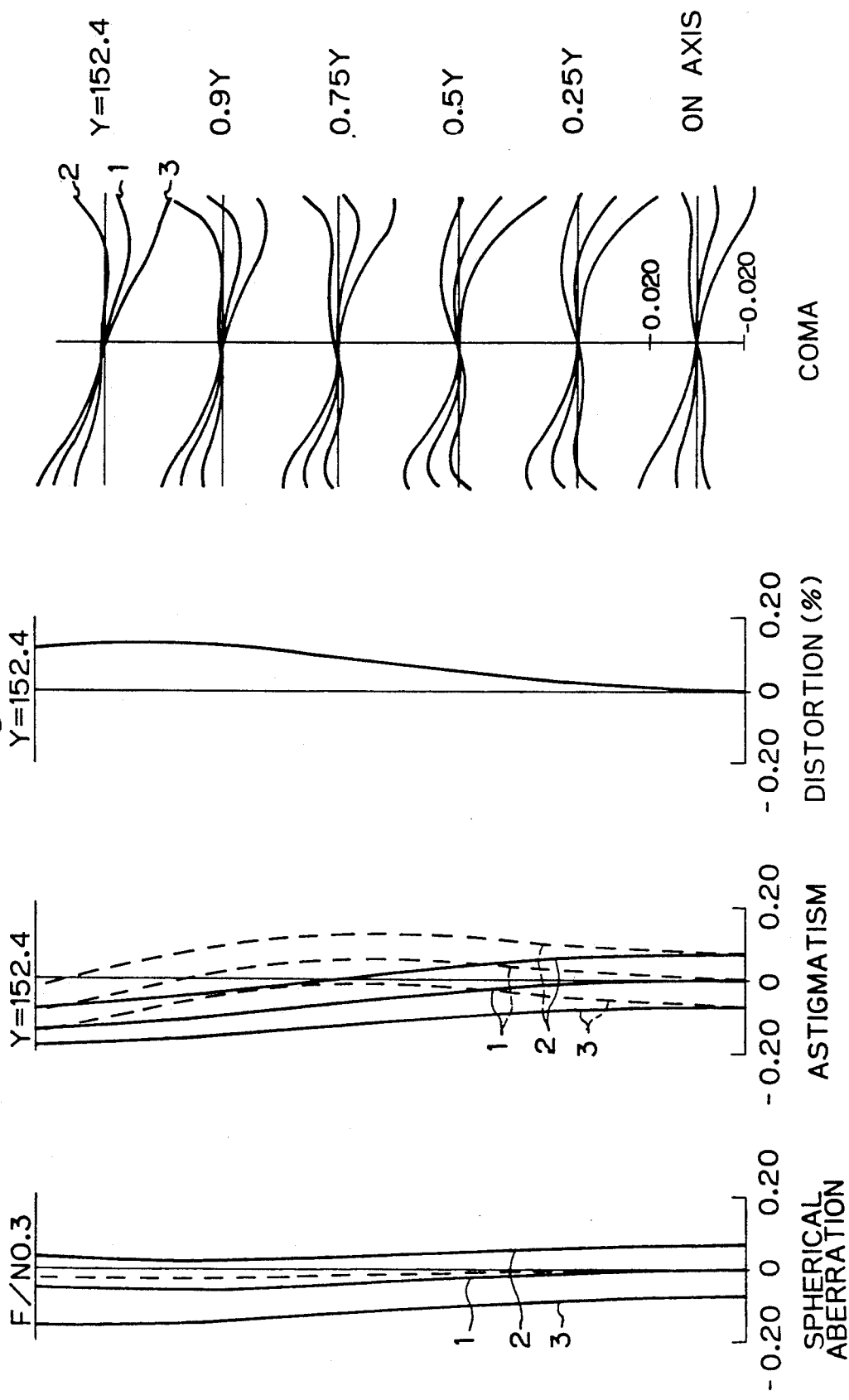

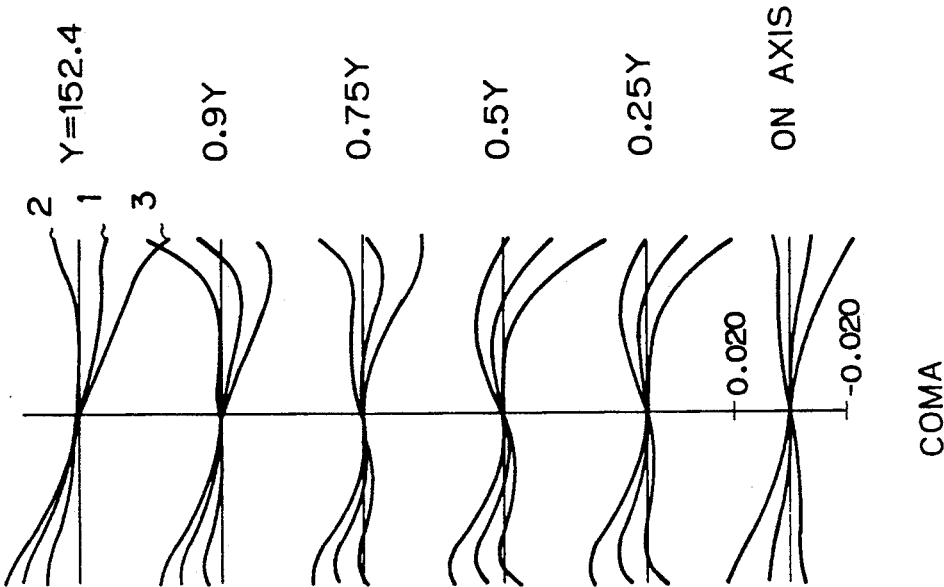
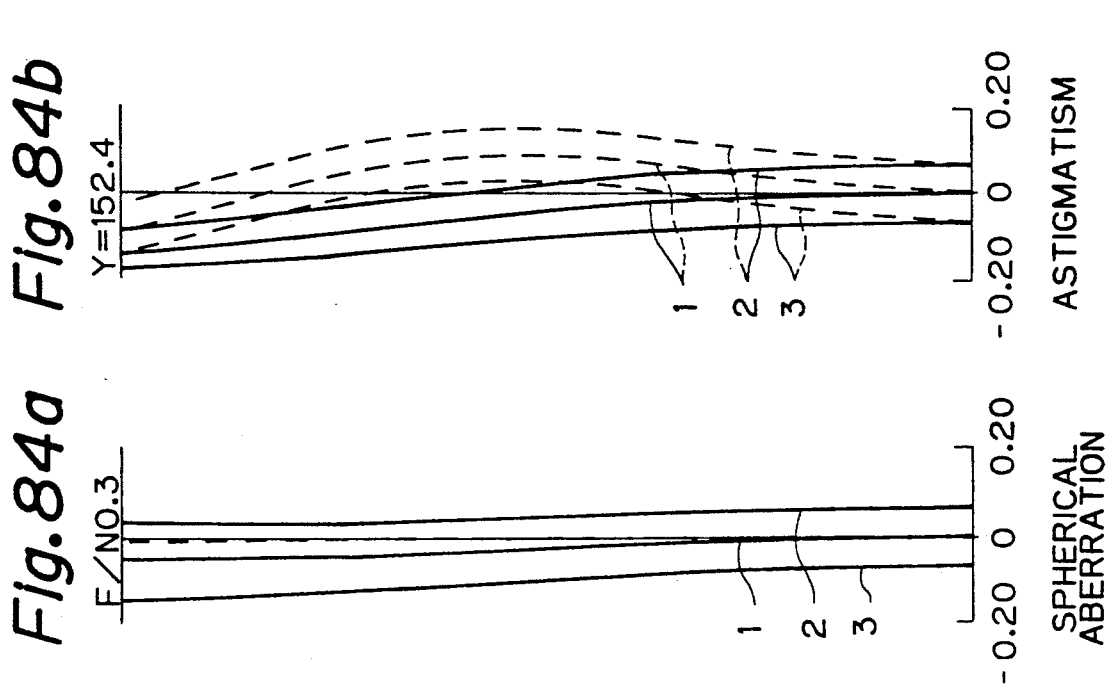

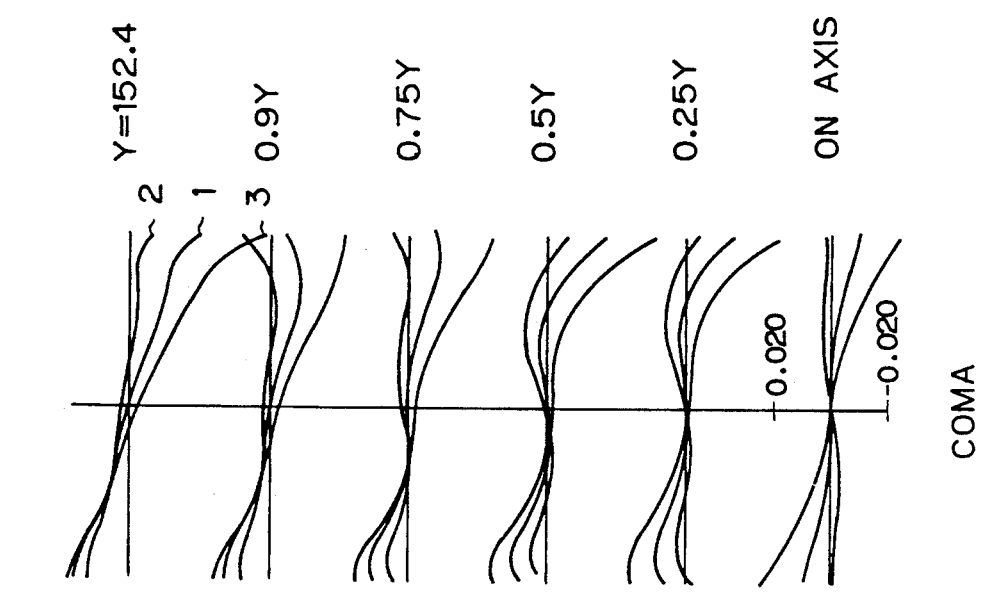
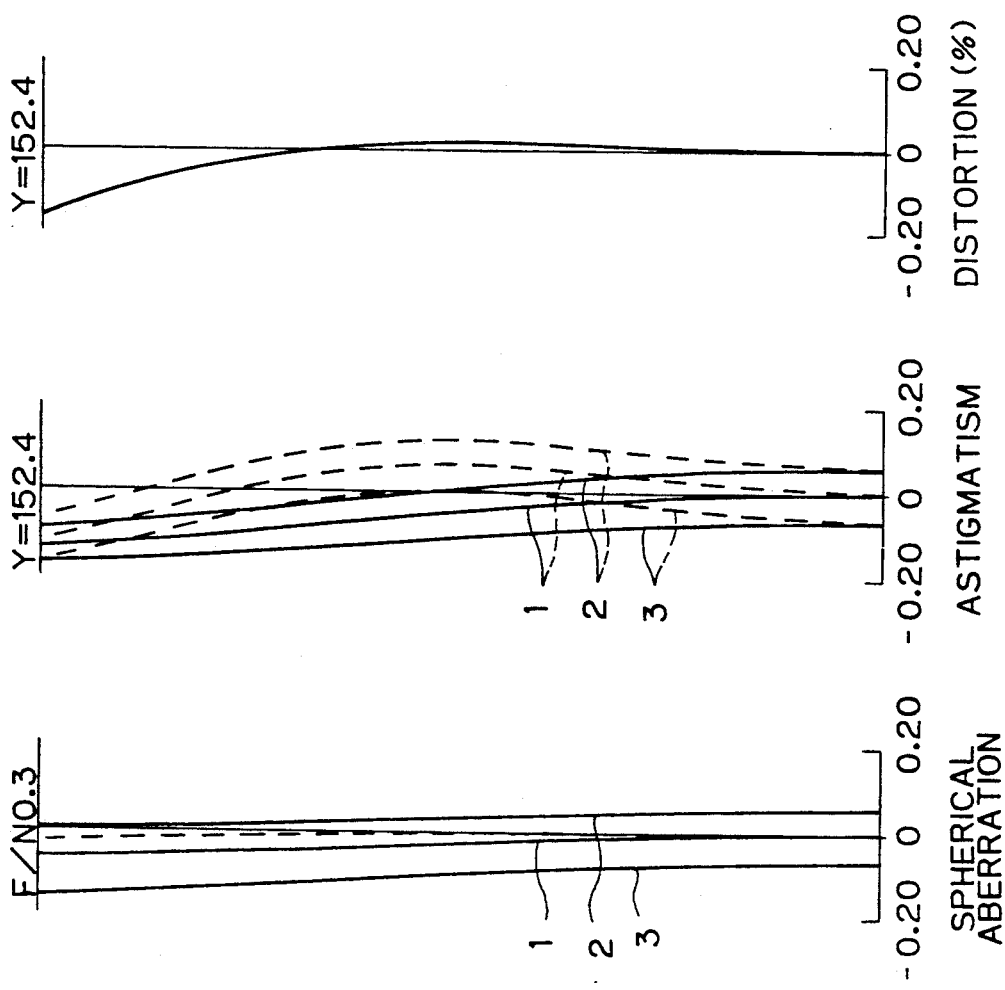

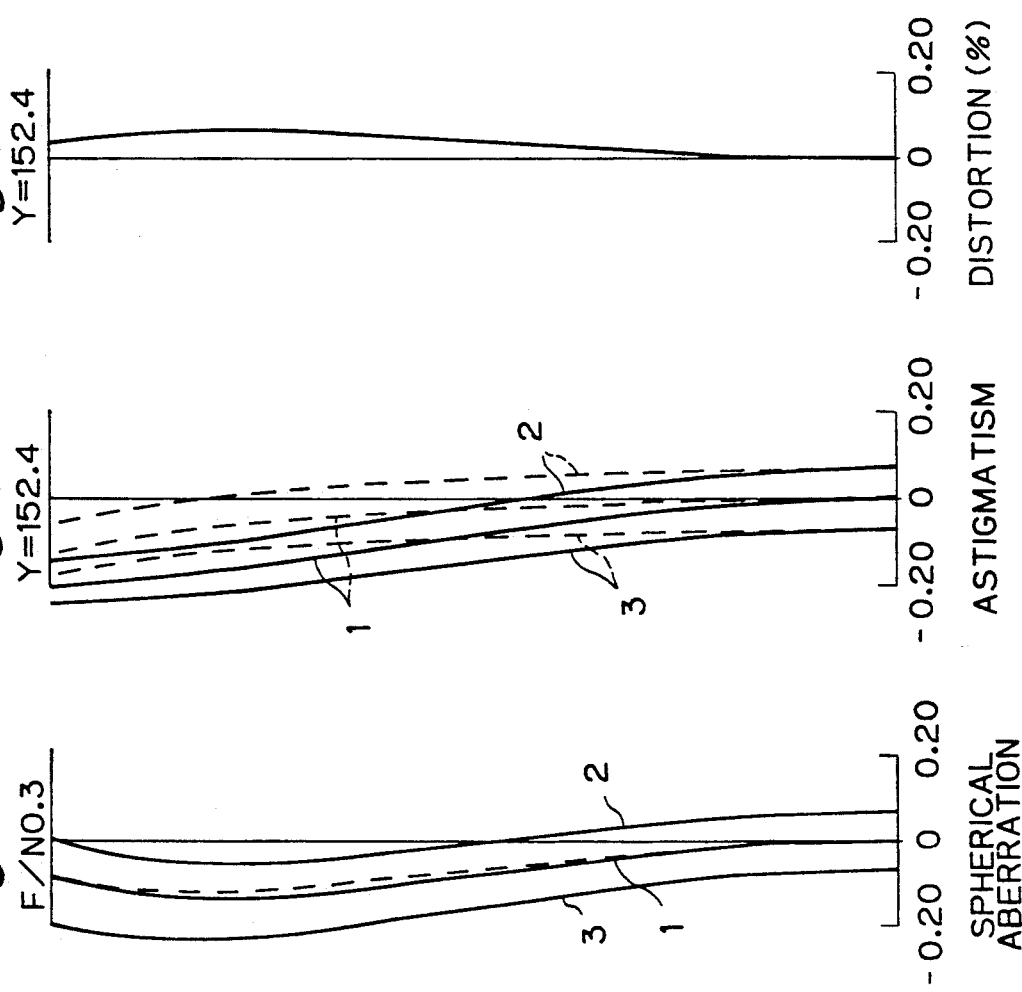

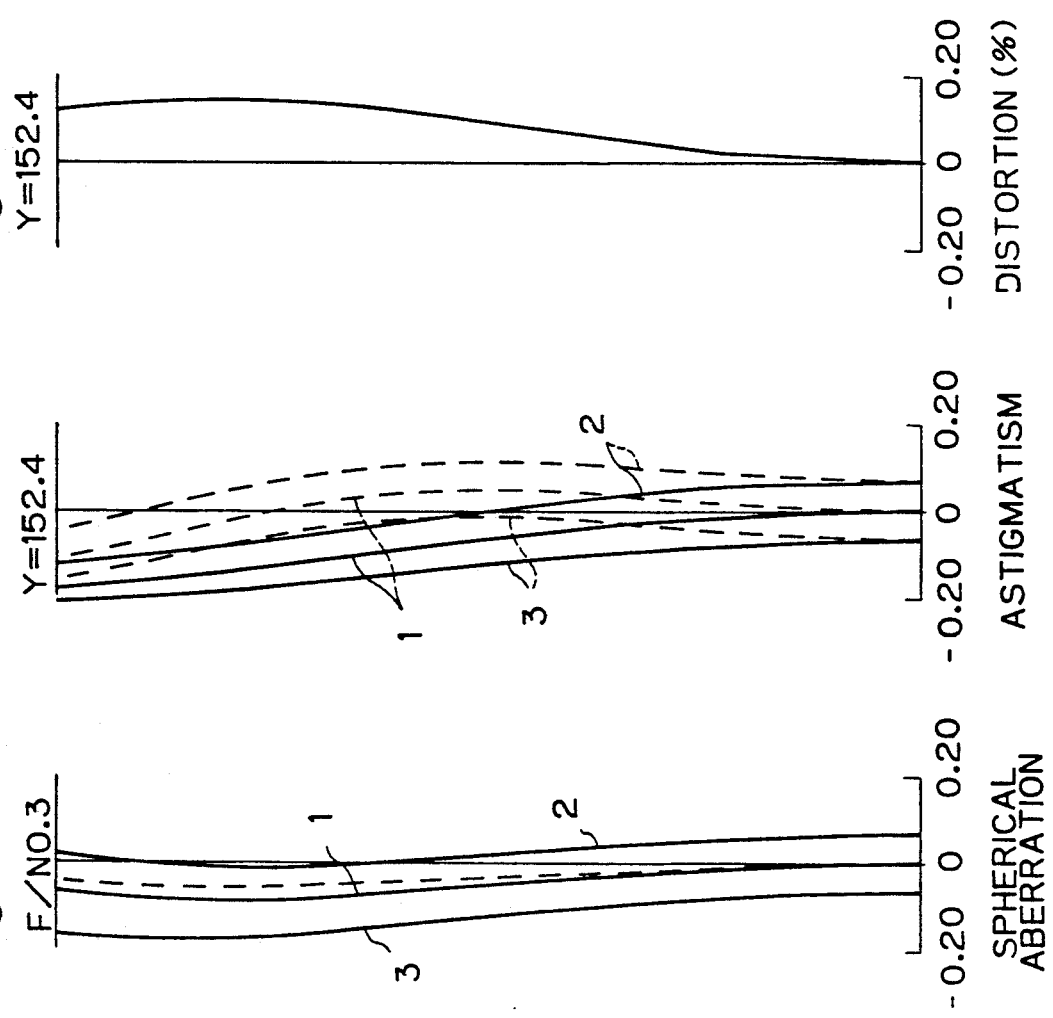

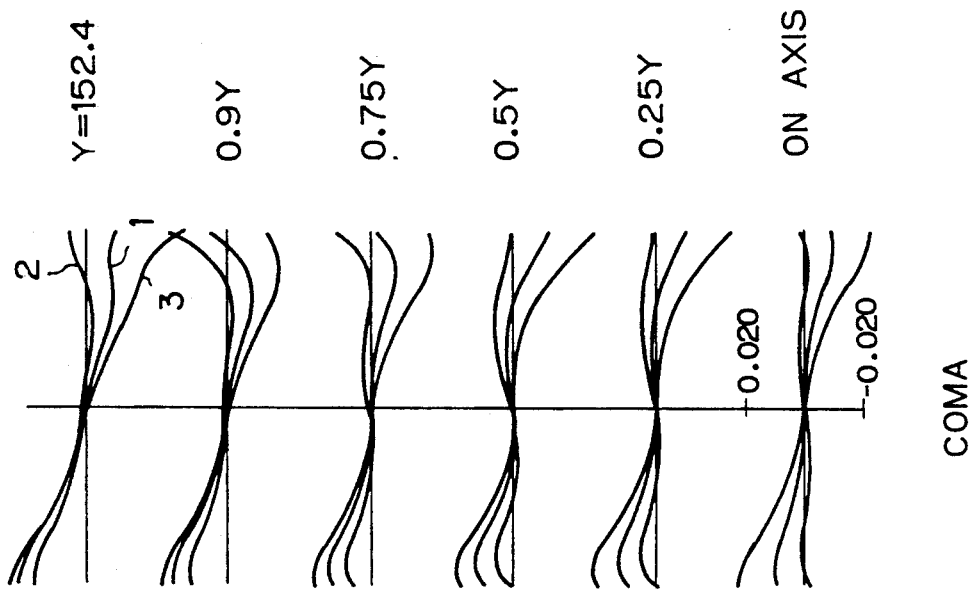
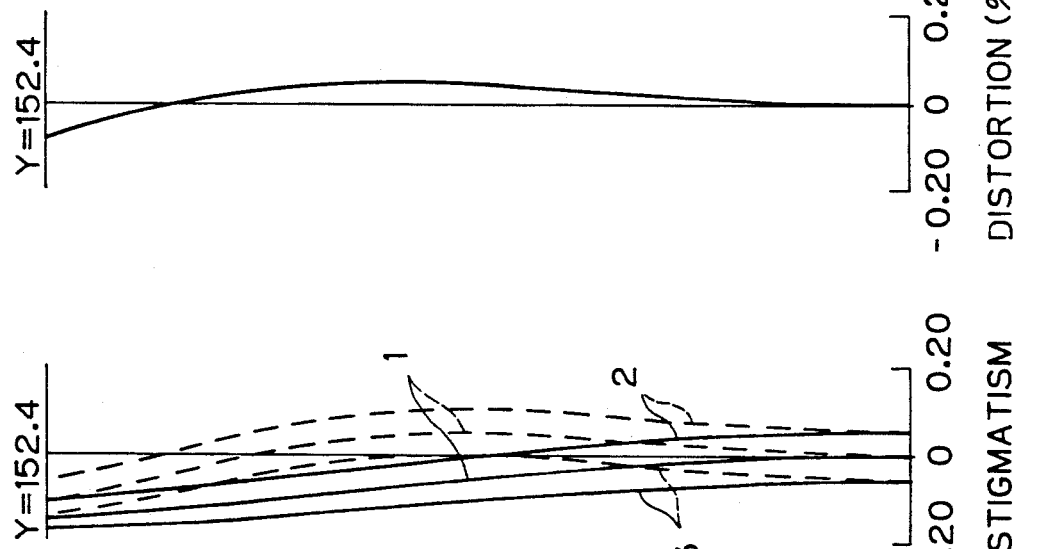
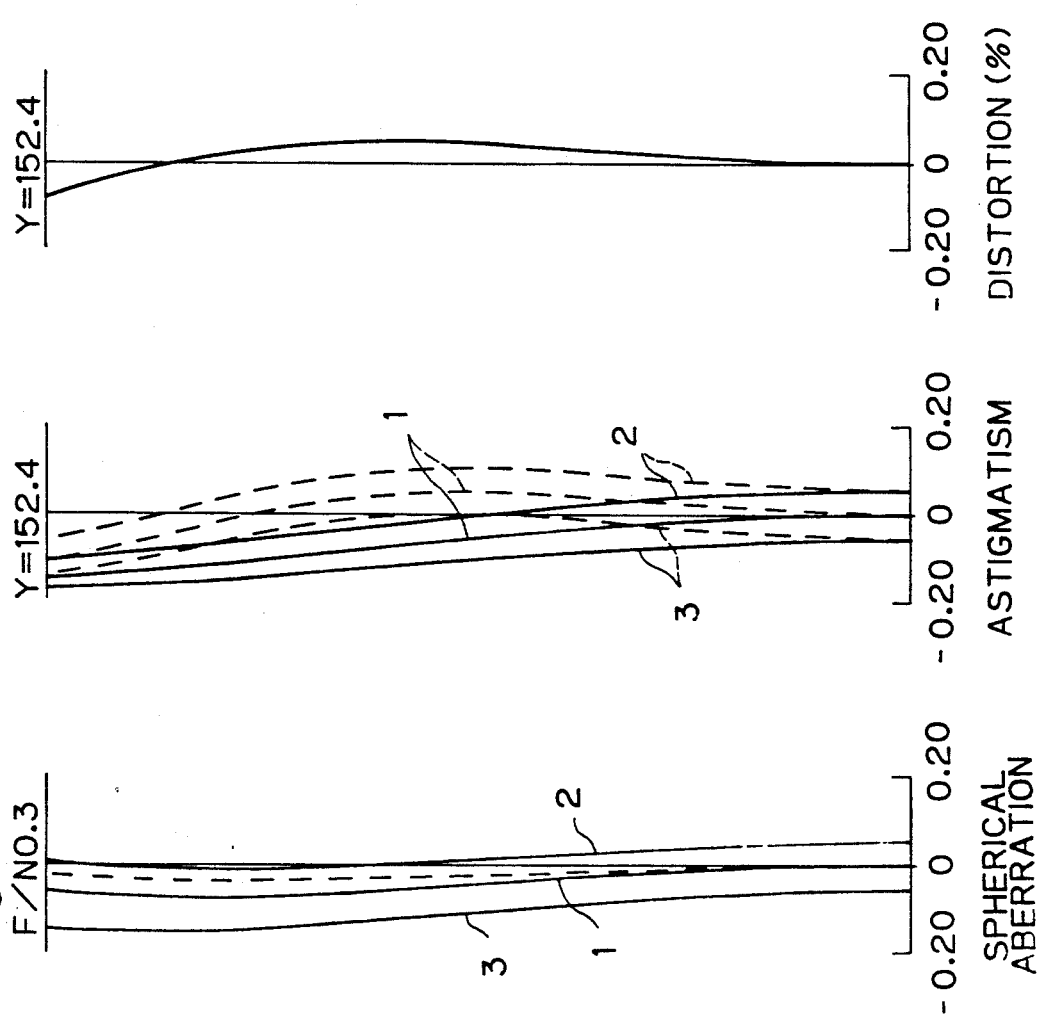

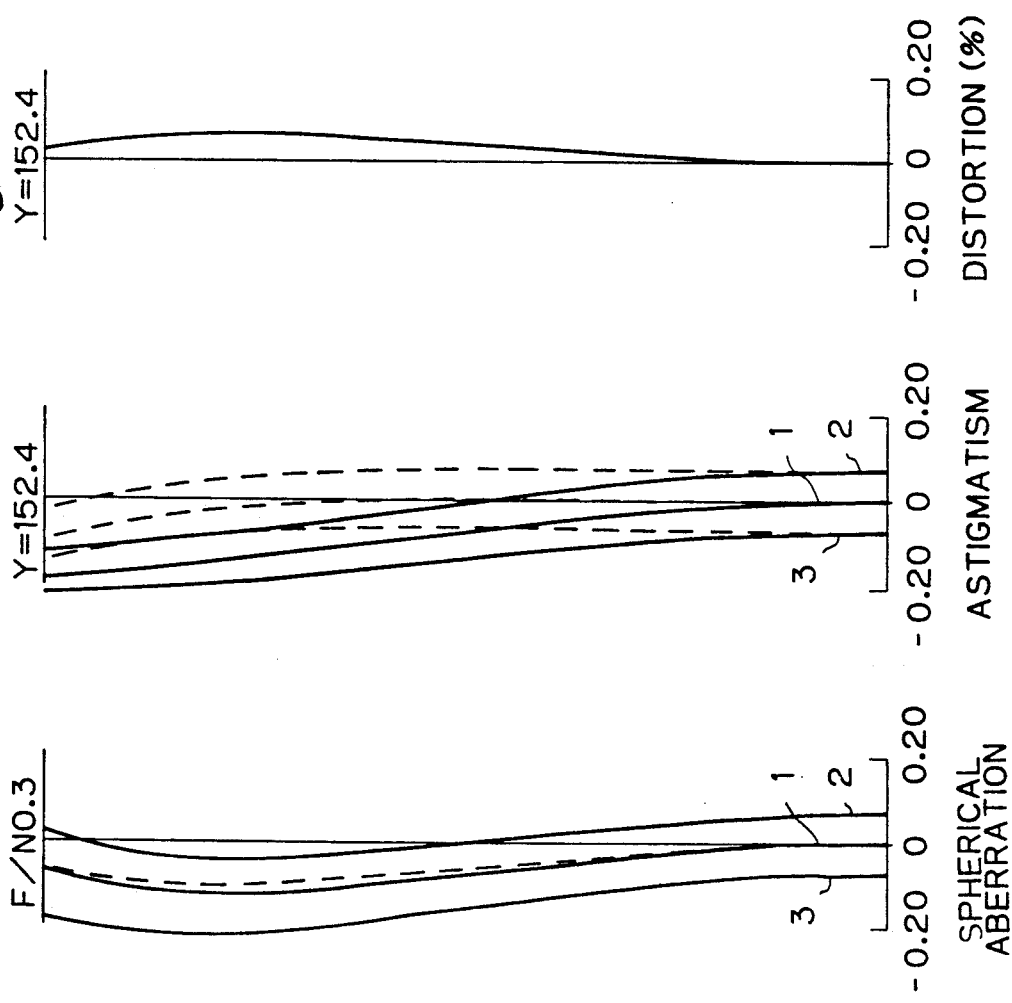

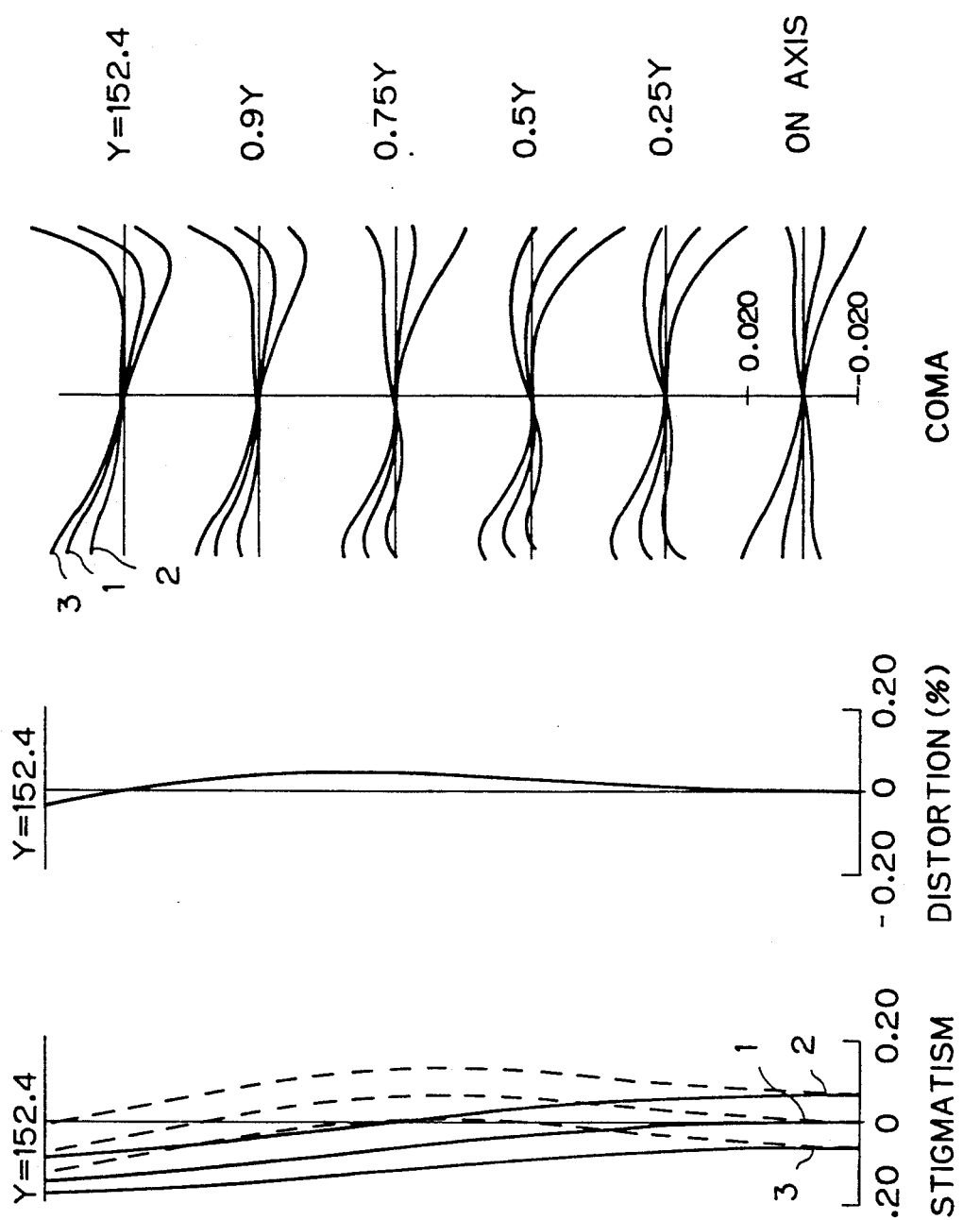

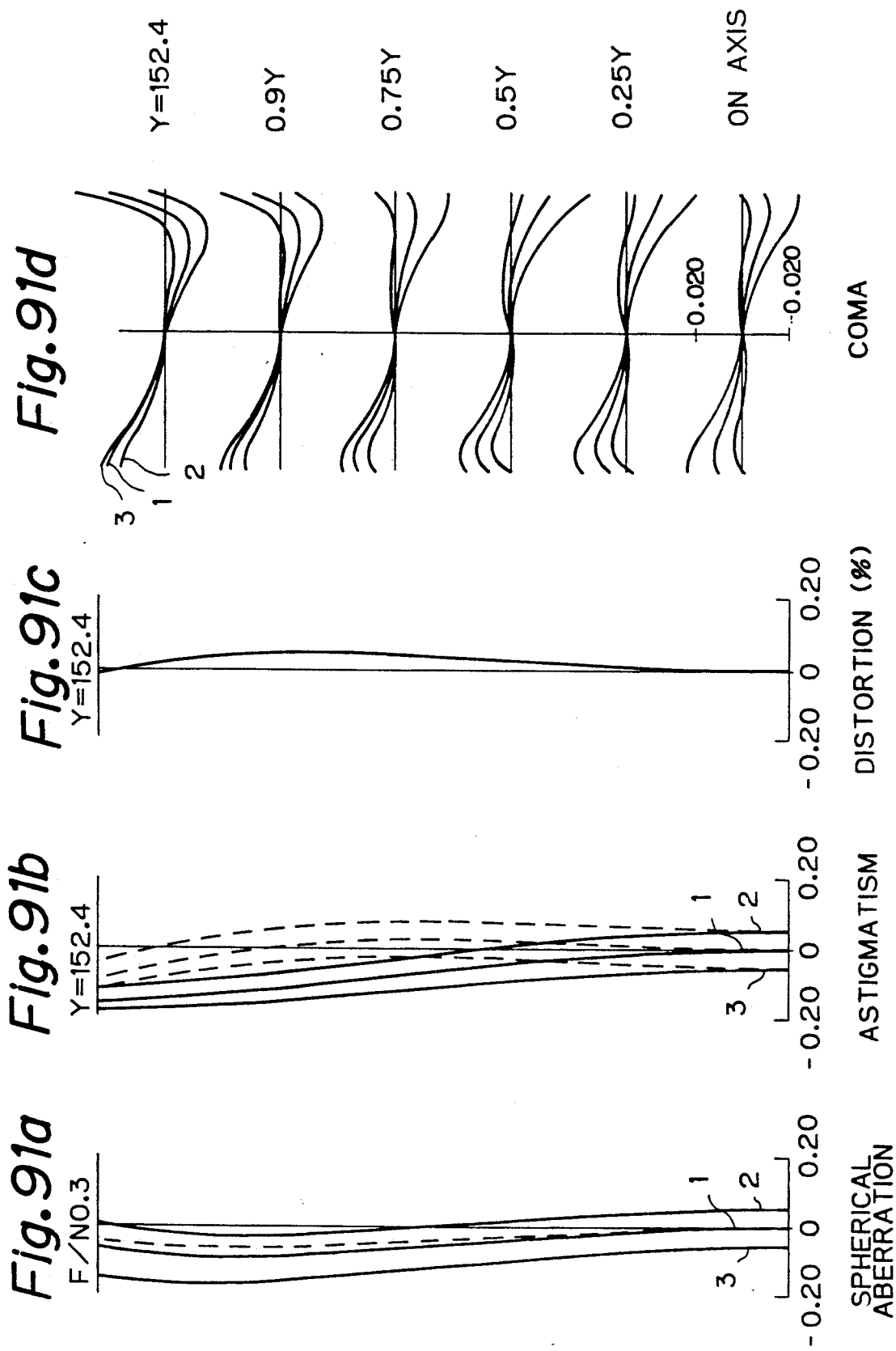

READING LENS FOR SCANNER

This application is a continuation of application Ser. No. 07/574,100, filed Aug. 29, 1990, now abandoned.

BACKGROUND OF THE INVENTION

1. Field of the Invention

The present invention relates to a reading lens for a scanner.

An image reader scans an original and reads an image therefrom by forming a reduced image of the original on a solid-state image pickup device such as CCD (Charge Coupled Device). Such an image reader is used in an image scanner, a facsimile system and a digital copying apparatus, etc.

A reading lens unit for scanner is used in the above mentioned image reader to form a reduced image of the original on the solid-state image pickup device.

2. Description of the Related Art

The reading lens is desirably such that the distance between an object and an image is short and the field angle is wide from the stand point of realizing a small and compact image reader. It is also required that the reading lens aperture be large and the lens be bright so as to heighten the image reading speed. Besides, these days, the pixel size of the solid-state image reader is becoming small, therefore a reading lens of high resolving power is required to makes it possible to heighten the resolution of the image by using the image reader having minute pixels. For example, when a CCD having a pixel size of 7 μm is to be used, the reading lens is required such that the resolution thereof be 71.4 lines/mm on the light receiving surface of the CCD. It is also required that the lens have a high contrast with respect to the above mentioned spatial frequency of the lens (resolution) over the whole area of the light receiving surface of the CCD.

A Topogon lens has a wide field angle and a flat radial image surface.

From the view point of the characteristic of the lens, reading lenses for scanner using the Topogon lens are proposed (for example, Japanese Patent Application Laying Open (KOKAI) Nos. 63-75721 and 64-23215).

On the other hand, however, the Topogon lens is not satisfactory in the aspect of brightness so that it is hard to realize an image scanner of high functional speed. Besides, using the Topogon lens involves a problem that the color quality in the image surface is degraded as the field angle becomes large, which reduces the contrast of the image.

SUMMARY OF THE INVENTION

The present invention was made considering the points mentioned above.

It is therefore an object of the present invention to provide a novel reading lens for scanner which is bright and has a wide field angle and a high resolving power.

The above-mentioned object of the present invention can be achieved by a reading lens for scanner having a reducing magnification and comprising: a first lens disposed on an optical path and composed of a positive lens having a first lens surface on an object side thereof and a second lens surface on an image side thereof; a second lens disposed in contact with the second surface of the first lens on the optical path and composed of a negative lens having the second lens surface on an object side thereof and a third lens surface on an image side thereof; a third lens disposed in the image side of the second lens on the optical path and composed of a meniscus lens having a fourth lens surface on an object side thereof and a fifth lens surface on an image side thereof; a fourth lens disposed in the image side of the third lens on the optical path and composed of a meniscus lens having a sixth lens surface on an object side thereof and a seventh lens surface on an image side thereof; a fifth lens disposed in the image side of the fourth lens on the optical path and composed of a negative lens having an eighth lens surface on an object side thereof; and a sixth lens surface on an image side thereof; and a sixth lens disposed in contact with the ninth lens surface of the fifth lens on the optical path and composed of a positive lens having the ninth lens surface on an object side thereof and a tenth lens surface on an image side thereof, at least one of the ten lens surfaces from the first to tenth lens surfaces being formed as an aspherical surface.

By the above-mentioned construction of the lens assembly, a novel and advantageous reading lens for scanner can be realized.

Advantages of the above mentioned reading lens of the present invention are that the field angle is wide as 20 degrees in the half field angle thereof, that the contrast is fully high even at a high spatial frequency of 71.4 lines/mm and that the lens is bright as F/No=3 so that the vignetting factor of the lens becomes large.

Further objects and advantages of the present invention will be apparent from the following description of the preferred embodiments of the invention as illustrated in the accompanying drawings.

BRIEF DESCRIPTION OF THE DRAWINGS

FIGS. 2a to 91d are graphical views of aberration curve of different embodiments of the present invention, wherein each of FIGS. 2a, 3a, 4a . . . , 91a represents spherical aberration, each of FIGS. 2b, 3b, 4b . . . , 91b represents astigmatism, each of FIGS. 2c, 3c, 4c . . . , 91c represents distortion and each of FIGS. 2d, 3d, 4d . . . , 91d represents coma aberration.

DESCRIPTION OF THE PREFERRED EMBODIMENTS

Figure 1:
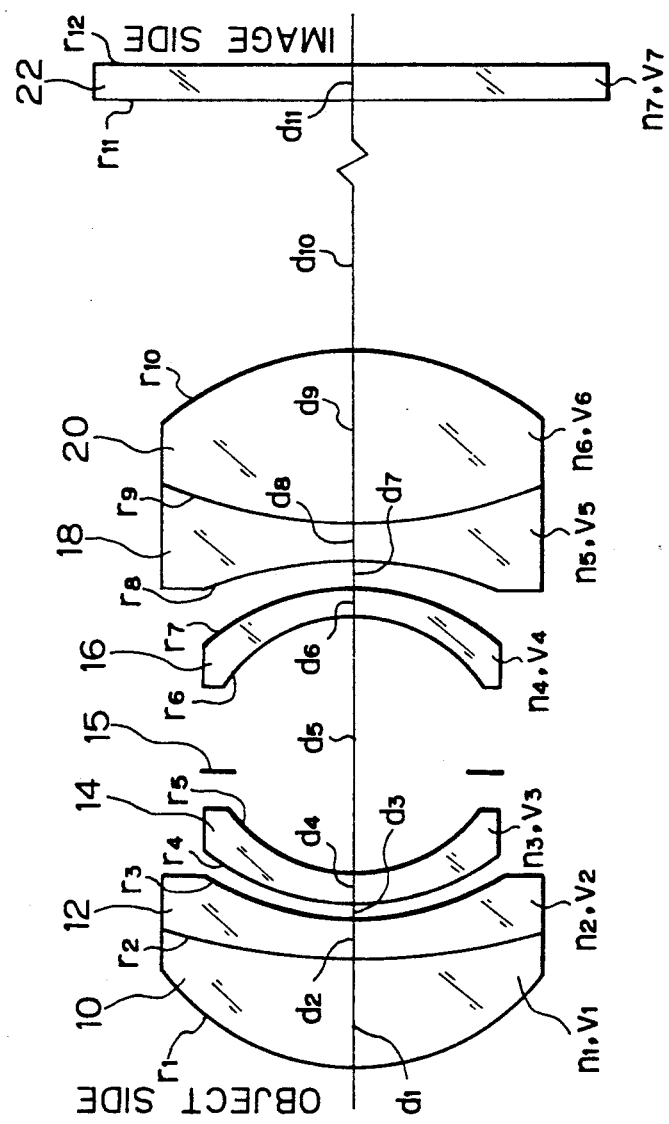
FIG. 1 is a constructional view of a reading lens assembly in accordance with the present invention.

FIG. 1 illustrates an essential structure of an embodiment of the present invention.

The embodiment is constituted from a reading lens for scanner which is used for reading an original in a reduced magnification and comprises five lens elements; i.e., from first to fifth lens elements disposed in order along an optical path from an object side toward an image side. The first and fourth lens elements are composed of two lenses while the other lens elements are composed of a single lens. Therefore, the total lens number is seven. An aperture stop is disposed between the second lens element and the third lens element.

Each example or embodiment, described later, has the same structure as illustrated in FIG. 1.

Referring to FIG. 1, the first lens element comprises a first lens 10 which is composed of a positive lens and a second lens 12 which is composed of a negative lens and bonded to the image side of the first lens 10. The second lens element comprises a third lens 14 which is composed of a meniscus lens having a convex surface in the object side thereof. The third lens element comprises a fourth lens 16 which is composed of a meniscus lens having a convex surface in the image side thereof. The fourth lens element comprises a fifth lens 18 which is composed of a negative lens and a sixth lens 20 which is composed of a positive lens and bonded to the image side of the fifth lens 18. The fifth lens element comprises a seventh lens 22 which is composed of a plane glass plate having parallel side surfaces. The seventh lens 22 actually constitutes and serves as a cover glass disposed in the light receiving side of the image reader.

An aperture stop 15 is disposed between the third lens 14 of the second element and the fourth lens 16 of the third element.

The first lens 10 has a first lens surface of curvature radius ($r_1$) on the object side thereof and a second lens surface of curvature radius ($r_2$) on the image side thereof. The second lens 12 has the common second lens surface of curvature radius ($r_2$) which is the same as that of the first lens 10 on the object side thereof and a third lens surface of curvature radius ($r_3$) on the image side thereof. The third lens 14 has a fourth lens surface of curvature radius ($r_4$) on the object side thereof and a fifth lens surface of curvature radius ($r_5$) on the image side thereof. The fourth lens 16 has a sixth lens surface of curvature radius ($r_6$) on the object side thereof and a seventh lens surface of curvature radius ($r_7$) on the image side thereof. The fifth lens 18 has an eighth lens surface of curvature radius ($r_8$) on the object side thereof and a ninth lens surface of curvature radius ($r_9$) on the image side thereof. The sixth lens 20 has the common ninth lens surface of curvature radius ($r_9$) which is the same as that of the fifth lens 18 on the object side thereof and a tenth lens surface of curvature radius ($r_{10}$) on the image side thereof.

At least one of the ten lens surfaces, that is from the first lens surface ($r_1$) to the tenth lens surface ($r_{10}$) of the first to sixth lenses 10, 12, 14, 16, 18 and 20 is formed as an aspherical surface.

The aspherical surface is represented by a revolutional surface obtained by rotating about an optical axis a curved line represented by the following equation.

$$X = (CH^2/[1+\{1-(1+K)C^2H^2\}^{\frac{1}{2}}]) + A_2H^2 + A_3H^3 + A_4H^4 + \ldots + A_{10}H^{10} +$$

wherein X is the position along the optical axis, H is the height in the direction perpendicular to the optical axis, C is a reciprocal number of the curvature radius on the optical axis and K is a conic constant.

The embodiment of the present invention is a lens which is improved from a Topogon type lens to widen the field angle of the lens. The Topogon lens has an advantageous point that the curvature of the radial image surface is small so that a relatively flat image can be obtained. However, the Topogon lens has a disadvantage that the color vision is impaired according as the field angle is enlarged so that the contrast is reduced.

In accordance with the embodiment of the present invention, the problem of the contrast reduction can be obviated due to the arrangement in which each of the first and fourth lens elements comprises a pair of positive and negative lenses bonded together. By adopting such an arrangement, it becomes possible to avoid degradation of the color vision in the image surface while maintaining the flatness of the radial image surface.

Also, in accordance with the embodiment of the present invention, at least one lens surface is formed as an aspherical surface to realize a lens having a large aperture.

In general, coma flare is increased according as the aperture is enlarged, which results in that the contrast is reduced. In order to minimize the coma flare, it is useful to correct the input or output lens surface which is extremely refractive. However, it is difficult to evenly correct the input or the output lens surface when the surface is spherical so that coma flare can not be avoided.

Therefore, in accordance with the embodiment of the present invention, an aspherical surface is adopted as a means for continuously changing the refractivity of the lens from the optical axis to the periphery of the lens.

Due to the arrangement of the aspherical surface, it becomes possible to minimize the coma flare in the lens having a large aperture.

Embodiments of the reading lens having the above mentioned structure are described hereinafter by numerically specifying the characteristic of the lens.

EMBODIMENT 1

The reading lens in accordance with this embodiment is arranged in such a way that the first lens surface is formed as an aspherical surface wherein the conic constant $K_1$ of the aspherical surface satisfies the following condition.

$$-0.035 < K_1 < 0 \tag{1}$$

In the event in which the first lens surface is aspherical as this embodiment, the aspherical surface which satisfies the condition (1) represents an elliptic surface of revolution which is symmetric with respect to the line of apsides thereof. Also, in this case, the coma flare is minimized when the condition (1) is satisfied.

Three examples (Examples 1 to 3) of this embodiment 1 are represented below in table forms numerically specifying the lens factors.

In each of the examples, the first lens is composed of a positive meniscus lens, the second lens is composed of a negative meniscus lens, the third lens is composed of a negative meniscus lens, the fourth lens is composed of a negative meniscus lens, the fifth lens is composed of a double-concave lens, and the sixth lens is composed of a double-convex lens.

Also, as illustrated in FIG. 1, the curvature radius of the ith lens surface from the object side is represented by $r_i$ (i=1 to 12). Note that with respect to the aspherical surface, the curvature radius represents that of on the optical axis. The distance between the lens surfaces is represented by $d_i$ (i=1 to 11). The refractive index and Abbe's number of the jth lens are represented by $n_j$ and $v_j$ (j=1 to 7), respectively. Also, F represents the focal length of the whole lens assembly system, $F_{NO}$ represents the brightness of the lens, $2\omega$ represents the field angle (degree) and m represents the magnification of the lens.

Also, in tables, the aspherical surface is designated by the mark * and specified by the conic constant and the high order aspherical coefficients $A_4$, $A_6$, $A_8$ and $A_{10}$ in addition to being specified by the curvature radius on the optical axis.

It is to be noted that with regard to the representation of the aspherical coefficient, the letter E followed by a number represents the power number of 10. For example, E-12 represents $10^{-12}$ which is multiplied by the preceding number.

EXAMPLE 1

| F = 43, | $F_{NO}$ = 3.0, | | 2ω = 40, | m = 0.11 | |
|---|---|---|---|---|---|
| i | $r_i$ | $d_i$ | j | $n_j$ | $v_j$ |
| 1* | 18.418 | 6.425 | 1 | 1.72916 | 54.68 |
| 2 | 101.873 | 2.520 | 2 | 1.78472 | 25.71 |
| 3 | 38.149 | 0.100 | | | |
| 4 | 13.415 | 2.794 | 3 | 1.84666 | 23.89 |
| 5 | 9.833 | 10.434 | | | |
| 6 | −8.391 | 2.419 | 4 | 1.74077 | 27.79 |
| 7 | −11.016 | 0.100 | | | |
| 8 | −95.624 | 1.000 | 5 | 1.68893 | 31.08 |
| 9 | 72.151 | 5.526 | 6 | 1.72916 | 54.68 |
| 10 | −20.171 | 27.193 | | | |
| 11 | ∞ | 0.700 | 7 | 1.51633 | 64.15 |
| 12 | ∞ | | | | |

The aspherical surface is applied to the first lens surface.
$K = -0.007909, A_4 = -4.56267E-07, A_6 = 9.40804E-10, A_8 = -7.66816E-13, A_{10} = -6.80560E-14$

EXAMPLE 2

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1* | 19.232 | 1.957 | 1 | 1.81600 | 46.62 |
| 2 | 108.363 | 0.100 | 2 | 1.84666 | 23.89 |
| 3 | 36.718 | 2.042 | | | |
| 4 | 14.167 | 5.388 | 3 | 1.84666 | 23.89 |
| 5 | 10.178 | 10.448 | | | |
| 6 | −8.602 | 7.309 | 4 | 1.84666 | 23.89 |
| 7 | −10.985 | 2.582 | | | |
| 8 | −87.915 | 0.100 | 5 | 1.84666 | 23.89 |
| 9 | 165.458 | 2.389 | 6 | 1.81600 | 46.62 |
| 10 | −20.370 | 27.260 | | | |
| 11 | ∞ | 0.700 | 7 | 1.51633 | 64.15 |
| 12 | ∞ | | | | |

The aspherical surface is applied to the first lens surface.
$K = -0.014618, A_4 = -7.59464E-07, A_6 = 1.11388E-9, A_8 = -4.36340E-12, A_{10} = -5.21945E-14$

EXAMPLE 3

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1* | 19.602 | 6.838 | 1 | 1.81600 | 46.60 |
| 2 | 149.422 | 2.822 | 2 | 1.81988 | 24.63 |
| 3 | 40.988 | 0.100 | | | |
| 4 | 15.747 | 2.773 | 3 | 1.84700 | 23.90 |
| 5 | 10.670 | 10.841 | | | |
| 6 | −8.963 | 2.038 | 4 | 1.84700 | 23.90 |
| 7 | −11.531 | 0.100 | | | |
| 8 | −84.198 | 1.256 | 5 | 1.81871 | 24.66 |
| 9 | 87.957 | 5.062 | 6 | 1.82891 | 43.86 |
| 10 | −20.490 | 26.185 | | | |
| 11 | ∞ | 0.700 | 7 | 1.51633 | 64.15 |
| 12 | ∞ | | | | |

The aspherical surface is applied to the first lens surface.
$K = -0.029407, A_4 = -1.42090E-6, A_6 = 8.66635E-10, A_8 = -1.95884E-11, A_{10} = -1.16864E-14$ FIGS. 2, 3 and 4 represent the aberration curves of the examples 1 to 3, respectively. In the graphs, ①, ② and ③ represent d-line, c-line and F-line, respectively. Also, the dash line of the spherical aberration curve represents the condition of sine. Also, in the astigmatism curve, the solid line represents the radial aberration and the dash line represents the tangential aberration.

The graphs show that the aberrations are fully compensated for.

EMBODIMENT 2

The reading lens in accordance with this embodiment is arranged in such a way that the third lens surface is formed as an aspherical surface wherein the conic constant $K_3$ of the aspherical surface satisfies the following condition.

$$0.097 < K_3 < 1.009 \qquad (2)$$

It is to be noted that the suffix number of the conic constant K represents the order number of the aspherical lens surface from the object side. For example, $K_3$ means the conic constant of the third lens surface which is aspherical.

In the event in which the third lens surface is aspherical as this embodiment, the aspherical surface which satisfies the condition (2) represents an elliptic surface of revolution which is symmetric with respect to the minor axis thereof. Also, in this case, the coma flare is minimized when the condition (2) is satisfied.

Three examples (Examples 4 to 6) of this embodiment 2 are represented below in table forms numerically specifying the lens factors. The structure of the lens is the same as that of the embodiment 1.

EXAMPLE 4

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 19.214 | 7.314 | 1 | 1.81600 | 46.62 |
| 2 | 98.753 | 2.586 | 2 | 1.84666 | 23.89 |
| 3* | 36.199 | 0.278 | | | |
| 4 | 14.491 | 2.409 | 3 | 1.84666 | 23.89 |
| 5 | 10.364 | 10.175 | | | |
| 6 | −8.428 | 1.928 | 4 | 1.84666 | 23.89 |
| 7 | −10.707 | 0.280 | | | |
| 8 | −91.808 | 2.158 | 5 | 1.84666 | 23.89 |
| 9 | 138.815 | 5.495 | 6 | 1.81600 | 46.62 |
| 10 | −20.512 | 28.203 | | | |
| 11 | ∞ | 0.700 | 7 | 1.51633 | 64.15 |
| 12 | ∞ | | | | |

The aspherical surface is applied to the third lens surface.
$K = 0.416103, A_4 = 1.45873E-6, A_6 = -9.31840E-9, A_8 = -5.30585E-11, A_{10} = 9.98433E-13$

EXAMPLE 5

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 18.347 | 6.654 | 1 | 1.72916 | 54.68 |
| 2 | 89.226 | 2.941 | 2 | 1.78472 | 25.71 |
| 3* | 40.127 | 0.100 | | | |
| 4 | 15.059 | 3.002 | 3 | 1.84666 | 23.89 |
| 5 | 10.460 | 9.981 | | | |
| 6 | −8.300 | 2.437 | 4 | 1.74077 | 27.79 |
| 7 | −10.919 | 0.100 | | | |
| 8 | −111.195 | 1.000 | 5 | 1.68893 | 31.08 |
| 9 | 64.854 | 5.657 | 6 | 1.72916 | 54.68 |
| 10 | −20.311 | 27.735 | | | |
| 11 | ∞ | 0.700 | 7 | 1.51633 | 64.15 |
| 12 | ∞ | | | | |

The aspherical surface is applied to the third lens surface.

$K=0.916888, A_4=2.43391E-6, A_6=-1.25226E-8,$
$A_8=-9.68957E-11, A_{10}=1.57001E-12$

EXAMPLE 6

| $F = 43$, | $F_{NO} = 3.0$, | | $2\omega = 40$, | $m = 0.1102$ | |
|---|---|---|---|---|---|
| i | $r_i$ | $d_i$ | j | $n_j$ | $v_j$ |
| 1 | 19.077 | 7.088 | 1 | 1.81600 | 46.60 |
| 2 | 112.670 | 2.211 | 2 | 1.84598 | 23.93 |
| 3* | 34.678 | 0.380 | | | |
| 4 | 13.493 | 2.355 | 3 | 1.84700 | 23.90 |
| 5 | 9.972 | 10.314 | | | |
| 6 | −8.410 | 1.867 | 4 | 1.84700 | 23.90 |
| 7 | −10.646 | 0.427 | | | |
| 8 | −85.423 | 2.148 | 5 | 1.84129 | 24.05 |
| 9 | 135.254 | 5.516 | 6 | 1.81600 | 46.60 |
| 10 | −20.484 | 28.277 | | | |
| 11 | ∞ | 0.700 | 7 | 1.51633 | 64.15 |
| 12 | ∞ | | | | |

The aspherical surface is applied to the third lens surface.
$K=0.098588, A_4=3.65303E-7, A_6=-2.99220E-9,$
$A_8=-2.00759E-11, A_{10}=3.74471E-13$ FIGS. 5, 6 and 7 represent the aberration curves of the examples 4, 5 and 6, respectively, in the same way as the graphs of FIGS. 2 to 4 of the embodiment 1, mentioned before. The graphs show that the aberrations are fully compensated for.

EMBODIMENT 3

The reading lens in accordance with this embodiment is arranged in such a way that the fourth lens surface is formed as an aspherical surface wherein the conic constant $K_4$ of the aspherical surface satisfies the following condition.

$$-0.09 < K_4 < -0.04 \quad (3)$$

In the event in which the fourth lens surface is aspherical as this embodiment, the aspherical surface which satisfies the condition (3) represents an elliptic surface of revolution which is symmetric with respect to the line of apsides thereof. Also, in this case, the coma flare is minimized when the condition (3) is satisfied.

Three examples (Examples 7 to 9) of this embodiment 3 are represented below in table forms numerically specifying the lens factors. The structure of the lens is the same as that of the embodiment 1.

EXAMPLE 7

| $F = 43$, | $F_{NO} = 3.0$, | | $2\omega = 40$, | $m = 0.1102$ | |
|---|---|---|---|---|---|
| i | $r_i$ | $d_i$ | j | $n_j$ | $v_j$ |
| 1 | 19.034 | 7.255 | 1 | 1.81600 | 46.62 |
| 2 | 89.434 | 2.783 | 2 | 1.84666 | 23.89 |
| 3 | 39.449 | 0.100 | | | |
| 4* | 16.709 | 2.643 | 3 | 1.84666 | 23.89 |
| 5 | 10.994 | 10.506 | | | |
| 6 | −8.738 | 2.115 | 4 | 1.84666 | 23.89 |
| 7 | −11.200 | 0.100 | | | |
| 8 | −98.291 | 1.800 | 5 | 1.84666 | 23.89 |
| 9 | 135.829 | 4.923 | 6 | 1.81600 | 46.62 |
| 10 | −20.497 | 27.180 | | | |
| 11 | ∞ | 0.700 | 7 | 1.51633 | 64.15 |
| 12 | ∞ | | | | |

The aspherical surface is applied to the fourth lens surface.
$K=-0.078338, A_4=-5.54583E-6, A_6=-5.49609E-9,$
$A_8=-1.17432E-10, A_{10}=-2.28246E-12$

EXAMPLE 8

| $F = 43$, | $F_{NO} = 3.0$, | | $2\omega = 40$, | $m = 0.1102$ | |
|---|---|---|---|---|---|
| i | $r_i$ | $d_i$ | j | $n_j$ | $v_j$ |
| 1 | 18.326 | 6.377 | 1 | 1.72916 | 54.68 |
| 2 | 96.093 | 2.444 | 2 | 1.78472 | 25.71 |
| 3 | 37.303 | 0.100 | | | |
| 4* | 13.374 | 2.782 | 3 | 1.84666 | 23.89 |
| 5 | 9.833 | 10.434 | | | |
| 6 | −8.412 | 2.428 | 4 | 1.74077 | 27.79 |
| 7 | −11.034 | 0.100 | | | |
| 8 | −95.304 | 1.000 | 5 | 1.68893 | 31.08 |
| 9 | 71.382 | 5.506 | 6 | 1.72916 | 54.68 |
| 10 | −20.206 | 27.235 | | | |
| 11 | ∞ | 0.700 | 7 | 1.51633 | 64.15 |
| 12 | ∞ | | | | |

The aspherical surface is applied to the fourth lens surface.
$K=-0.008160, A_4=-9.62302E-7, A_6=1.20808E-9,$
$A_8=2.17664E-11, A_{10}=-2.24779E-12$

EXAMPLE 9

| $F = 43$, | $F_{NO} = 3.0$, | | $2\omega = 40$, | $m = 0.1102$ | |
|---|---|---|---|---|---|
| i | $r_i$ | $d_i$ | j | $n_j$ | $v_j$ |
| 1 | 19.042 | 7.334 | 1 | 1.81600 | 46.60 |
| 2 | 101.545 | 2.638 | 2 | 1.83162 | 24.30 |
| 3 | 36.814 | 0.100 | | | |
| 4* | 15.460 | 2.447 | 3 | 1.84700 | 23.90 |
| 5 | 10.650 | 10.400 | | | |
| 6 | −8.737 | 1.934 | 4 | 1.84700 | 23.90 |
| 7 | −11.106 | 0.100 | | | |
| 8 | −80.958 | 1.846 | 5 | 1.80851 | 24.96 |
| 9 | 105.101 | 5.167 | 6 | 1.81970 | 45.77 |
| 10 | −20.263 | 27.445 | | | |
| 11 | ∞ | 0.700 | 7 | 1.51633 | 64.15 |
| 12 | ∞ | | | | |

The aspherical surface is applied to the fourth lens surface.
$K=-0.052224, A_4=-4.18164E-6, A_6=-5.83089E-9,$
$A_8=-2.76955E-11, A_{10}=-3.14083E-12$ FIGS. 8, 9 and 10 represent the aberration curves of the examples 7, 8 and 9, respectively, in the same way as the graphs of FIGS. 2 to 4 of the embodiment 1, mentioned before. The graphs show that the aberrations are fully compensated for.

EMBODIMENT 4

The reading lens in accordance with this embodiment is arranged in such a way that the fifth lens-surface is formed as an aspherical surface wherein the conic constant $K_5$ of the aspherical surface satisfies the following condition.

$$0 < K_5 < 0.055 \quad (4)$$

In the event in which the fifth lens-surface is aspherical as this embodiment, the aspherical surface which satisfies the condition (4) represents an elliptic surface of revolution which is symmetric with respect to the minor axis thereof. Also, in this case, the coma flare is minimized when the condition (4) is satisfied.

Three examples (Examples 10 to 12) of this embodiment 4 are represented below in table forms numerically specifying the lens factors. The structure of the lens is the same as that of the embodiment 1.

EXAMPLE 10

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 18.805 | 6.970 | 1 | 1.81600 | 46.62 |
| 2 | 85.247 | 2.565 | 2 | 1.84666 | 23.89 |
| 3 | 38.279 | 0.100 | | | |
| 4 | 17.063 | 2.835 | 3 | 1.84666 | 23.89 |
| 5* | 11.152 | 10.741 | | | |
| 6 | −8.955 | 2.228 | 4 | 1.84666 | 23.89 |
| 7 | −11.528 | 0.100 | | | |
| 8 | −100.168 | 1.502 | 5 | 1.84666 | 23.89 |
| 9 | 133.777 | 4.854 | 6 | 1.81600 | 46.62 |
| 10 | −20.642 | 27.304 | | | |
| 11 | ∞ | 0.700 | 7 | 1.51633 | 64.15 |
| 12 | ∞ | | | | |

The aspherical surface is applied to the fifth lens-surface.
$K = 0.049412, A_4 = 1.00320E\text{-}5, A_6 = 8.40725E\text{-}8,$
$A_8 = 2.49206E\text{-}10, A_{10} = 4.69833E\text{-}11$

EXAMPLE 11

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 18.904 | 7.301 | 1 | 1.81600 | 46.60 |
| 2 | 97.465 | 2.552 | 2 | 1.84144 | 24.04 |
| 3 | 35.495 | 0.100 | | | |
| 4 | 15.116 | 2.448 | 3 | 1.84700 | 23.90 |
| 5* | 10.582 | 10.414 | | | |
| 6 | −8.766 | 1.943 | 4 | 1.84700 | 23.90 |
| 7 | −11.155 | 0.100 | | | |
| 8 | −80.988 | 1.893 | 5 | 1.81170 | 24.87 |
| 9 | 109.602 | 5.227 | 6 | 1.81928 | 45.86 |
| 10 | −20.275 | 27.468 | | | |
| 11 | ∞ | 0.700 | 7 | 1.51633 | 64.15 |
| 12 | ∞ | | | | |

The aspherical surface is applied to the fifth lens-surface.
$K = 0.027910, A_4 = 6.38719E\text{-}6, A_6 = 4.48568E\text{-}8,$
$A_8 = 2.32266E\text{-}10, A_{10} = 3.17292E\text{-}11$

EXAMPLE 12

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 18.285 | 6.367 | 1 | 1.72916 | 54.68 |
| 2 | 94.324 | 2.439 | 2 | 1.78472 | 25.71 |
| 3 | 37.079 | 0.100 | | | |
| 4 | 13.443 | 2.796 | 3 | 1.84666 | 23.89 |
| 5* | 9.869 | 10.412 | | | |
| 6 | −8.438 | 2.439 | 4 | 1.74077 | 27.79 |
| 7 | −11.075 | 0.100 | | | |
| 8 | −95.375 | 1.000 | 5 | 1.68893 | 31.08 |
| 9 | 71.249 | 5.499 | 6 | 1.72916 | 54.68 |
| 10 | −20.202 | 27.396 | | | |
| 11 | ∞ | 0.700 | 7 | 1.51633 | 64.15 |
| 12 | ∞ | | | | |

The aspherical surface is applied to the fifth lens-surface.
$K = 0.007493, A_4 = 2.14616E\text{-}6, A_6 = 4.21923E\text{-}9,$
$A_8 = -5.84199E\text{-}11, A_{10} = 1.85723E\text{-}11$ FIGS. 11, 12 and 13 represent the aberration curves of the examples 10, 11 and 12, respectively, in the same way as the graphs of FIGS. 2 to 4 of the embodiment 1, mentioned before. The graphs show that the aberrations are fully compensated for.

EMBODIMENT 5

The reading lens in accordance with this embodiment is arranged in such a way that the sixth lens-surface is formed as an aspherical surface wherein the conic constant $K_6$ of the aspherical surface satisfies the following condition.

$$0 < K_6 < 0.007 \tag{5}$$

In the event in which the sixth lens-surface is aspherical as this embodiment, the aspherical surface which satisfies the condition (5) represents an elliptic surface of revolution which is symmetric with respect to the minor axis thereof. Also, in this case, the coma flare is minimized when the condition (5) is satisfied.

Three examples (Examples 13 to 15) of this embodiment 5 are represented below in table forms numerically specifying the lens factors. The structure of the lens is the same as that of the embodiment 1.

EXAMPLE 13

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 19.442 | 7.041 | 1 | 1.81600 | 46.62 |
| 2 | 111.988 | 2.304 | 2 | 1.84666 | 23.89 |
| 3 | 36.704 | 0.100 | | | |
| 4 | 13.803 | 2.518 | 3 | 1.84666 | 23.89 |
| 5 | 10.109 | 9.926 | | | |
| 6* | −9.186 | 2.043 | 4 | 1.84666 | 23.89 |
| 7 | −12.019 | 0.135 | | | |
| 8 | −89.219 | 2.401 | 5 | 1.84666 | 23.89 |
| 9 | 193.598 | 5.699 | 6 | 1.81600 | 46.62 |
| 10 | −20.371 | 28.817 | | | |
| 11 | ∞ | 0.700 | 7 | 1.51633 | 64.15 |
| 12 | ∞ | | | | |

The aspherical surface is applied to the sixth lens-surface.
$K = 0.005365, A_4 = -8.23039E\text{-}6, A_6 = 5.91838E\text{-}8,$
$A_8 = -2.25537E\text{-}9, A_{10} = -7.88704E\text{-}12$

EXAMPLE 14

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 18.717 | 6.036 | 1 | 1.72916 | 54.68 |
| 2 | 107.722 | 2.238 | 2 | 1.78472 | 25.71 |
| 3 | 40.569 | 0.100 | | | |
| 4 | 13.711 | 3.005 | 3 | 1.84666 | 23.89 |
| 5 | 9.953 | 9.948 | | | |
| 6* | −9.088 | 2.649 | 4 | 1.74077 | 27.79 |
| 7 | −12.326 | 0.100 | | | |
| 8 | −98.133 | 1.000 | 5 | 1.68893 | 31.08 |
| 9 | 83.669 | 5.447 | 6 | 1.72916 | 54.68 |
| 10 | −20.017 | 28.096 | | | |
| 11 | ∞ | 0.700 | 7 | 1.51633 | 64.15 |
| 12 | ∞ | | | | |

The aspherical surface is applied to the sixth lens-surface.
$K = 0.002518, A_4 = -9.24647E\text{-}6, A_6 = 9.61788E\text{-}8,$
$A_8 = -3.11805E\text{-}9, A_{10} = 5.23537E\text{-}12$

EXAMPLE 15

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 19.324 | 6.929 | 1 | 1.81600 | 46.60 |

-continued

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 2 | 117.736 | 2.121 | 2 | 1.83304 | 24.26 |
| 3 | 35.866 | 0.100 | | | |
| 4 | 13.848 | 2.522 | 3 | 1.84700 | 23.90 |
| 5 | 10.120 | 9.887 | | | |
| 6* | −9.370 | 2.007 | 4 | 1.84700 | 23.90 |
| 7 | −12.324 | 0.151 | | | |
| 8 | −87.574 | 2.362 | 5 | 1.82648 | 24.44 |
| 9 | 128.763 | 5.658 | 6 | 1.82009 | 45.69 |
| 10 | −20.368 | 28.25 | | | |
| 11 | ∞ | 0.700 | 7 | 1.51633 | 64.15 |
| 12 | ∞ | | | | |

The aspherical surface is applied to the sixth lens-surface.
$K = 0.006308, A_4 = -8.29250E-6, A_6 = 4.84237E-8,$
$A_8 = -2.14399E-9, A_{10} = -5.54669E-12$ FIGS. 14, 15 and 16 represent the aberration curves of the examples 13, 14 and 15, respectively, in the same way as the graphs of FIGS. 2 to 4 of the embodiment 1, mentioned before. The graphs show that the aberrations are fully compensated for.

EMBODIMENT 6

The reading lens in accordance with this embodiment is arranged in such a way that the seventh lens-surface is formed as an aspherical surface wherein the conic constant $K_7$ of the aspherical surface satisfies the following condition.

$$-0.014 < K_7 < 0 \quad (6)$$

In the event in which the seventh lens surface is aspherical as this embodiment, the aspherical surface which satisfies the condition (6) represents an elliptic surface of revolution which is symmetric with respect to the line of apsides thereof. Also, in this case, the coma flare is minimized when the condition (6) is satisfied.

Three examples (Examples 16 to 18) of this embodiment 6 are represented below in table forms numerically specifying the lens factors. The structure of the lens is the same as that of the embodiment 1.

EXAMPLE 16

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 19.086 | 7.044 | 1 | 1.81600 | 46.62 |
| 2 | 102.403 | 2.178 | 2 | 1.84666 | 23.89 |
| 3 | 34.772 | 0.271 | | | |
| 4 | 13.393 | 2.354 | 3 | 1.84666 | 23.89 |
| 5 | 9.933 | 10.155 | | | |
| 6 | −8.692 | 1.905 | 4 | 1.84666 | 23.89 |
| 7* | −11.130 | 0.387 | | | |
| 8 | −87.013 | 2.240 | 5 | 1.84666 | 23.89 |
| 9 | 176.125 | 5.605 | 6 | 1.81600 | 46.62 |
| 10 | −20.466 | 27.516 | | | |
| 11 | ∞ | 0.700 | 7 | 1.51633 | 64.15 |
| 12 | ∞ | | | | |

The aspherical surface is applied to the seventh lens-surface.
$K = -0.003628, A_4 = 2.28002E-6, A_6 = -1.43414E-8,$
$A_8 = 8.33006E-11, A_{10} = 2.50481E-12$

EXAMPLE 17

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 18.625 | 5.916 | 1 | 1.72916 | 54.68 |
| 2 | 103.746 | 2.123 | 2 | 1.78472 | 25.71 |
| 3 | 40.025 | 0.100 | | | |
| 4 | 13.794 | 3.055 | 3 | 1.84666 | 23.89 |
| 5 | 10.010 | 10.125 | | | |
| 6 | −9.014 | 2.641 | 4 | 1.74077 | 27.79 |
| 7* | −12.252 | 0.100 | | | |
| 8 | −104.401 | 1.000 | 5 | 1.68893 | 31.08 |
| 9 | 80.976 | 5.460 | 6 | 1.72916 | 54.68 |
| 10 | −20.133 | 28.084 | | | |
| 11 | ∞ | 0.700 | 7 | 1.51633 | 64.15 |
| 12 | ∞ | | | | |

The aspherical surface is applied to the seventh lens-surface.
$K = -0.006228, A_4 = 4.73538E-6, A_6 = -3.69070E-8,$
$A_8 = 6.39680E-10, A_{10} = -5.49358E-13$

EXAMPLE 18

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 19.501 | 6.805 | 1 | 1.81600 | 46.60 |
| 2 | 123.700 | 2.048 | 2 | 1.83165 | 24.30 |
| 3 | 36.527 | 0.100 | | | |
| 4 | 14.036 | 2.647 | 3 | 1.84700 | 23.90 |
| 5 | 10.224 | 9.999 | | | |
| 6 | −9.439 | 2.054 | 4 | 1.84700 | 23.90 |
| 7* | −12.528 | 0.100 | | | |
| 8 | −91.053 | 2.306 | 5 | 1.82348 | 24.53 |
| 9 | 125.946 | 5.603 | 6 | 1.82035 | 45.63 |
| 10 | −20.382 | 28.342 | | | |
| 11 | ∞ | 0.700 | 7 | 1.51633 | 64.15 |
| 12 | ∞ | | | | |

The aspherical surface is applied to the seventh lens-surface.
$K = -0.012493, A_4 = 5.33956E-6, A_6 = -2.71217E-8,$
$A_8 = 7.121090-10, A_{10} = -1.01155E-12$ FIGS. 17, 18 and 19 represent the aberration curves of the examples 16, 17 and 18, respectively, in the same way as the graphs of FIGS. 2 to 4 of the embodiment 1, mentioned before. The graphs show that the aberrations are fully compensated for.

EMBODIMENT 7

The reading lens in accordance with this embodiment is arranged in such a way that the eighth lens-surface is formed as an aspherical surface wherein the conic constant $K_8$ of the aspherical surface satisfies the following condition.

$$0.74 < K_8 < 9.51 \quad (7)$$

In the event in which the eighth lens-surface is aspherical as this embodiment, the aspherical surface which satisfies the condition (7) represents an elliptic surface of revolution which is symmetric with respect to the minor axis thereof. Also, in this case, the coma flare is minimized when the condition (7) is satisfied.

Three examples (Examples 19 to 21) of this embodiment 7 are represented below in table forms numerically specifying the lens factors. The structure of the lens is the same as that of the embodiment 1.

EXAMPLE 19

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 19.324 | 7.069 | 1 | 1.81600 | 46.62 |
| 2 | 106.456 | 2.275 | 2 | 1.84666 | 23.89 |
| 3 | 35.700 | 0.184 | | | |
| 4 | 13.481 | 2.395 | 3 | 1.84666 | 23.89 |
| 5 | 9.956 | 9.985 | | | |
| 6 | −8.840 | 1.967 | 4 | 1.84666 | 23.89 |
| 7 | −11.376 | 0.248 | | | |
| 8* | −92.150 | 2.290 | 5 | 1.84666 | 23.89 |
| 9 | 161.572 | 5.611 | 6 | 1.81600 | 46.62 |
| 10 | −20.690 | 27.925 | | | |
| 11 | ∞ | 0.700 | 7 | 1.51633 | 64.15 |
| 12 | ∞ | | | | |

The aspherical surface is applied to the eighth lens-surface.
$K=3.822906, A_4=-7.93030E-7, A_6=8.99030E-9, A_8=6.74972E-12, A_{10}=-1.56450E-13$

EXAMPLE 20

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 18.725 | 6.172 | 1 | 1.72916 | 54.68 |
| 2 | 102.928 | 2.289 | 2 | 1.78472 | 25.71 |
| 3 | 39.515 | 0.100 | | | |
| 4 | 13.395 | 2.914 | 3 | 1.84666 | 23.89 |
| 5 | 9.794 | 10.101 | | | |
| 6 | −8.902 | 2.589 | 4 | 1.74077 | 27.79 |
| 7 | −12.010 | 0.100 | | | |
| 8* | −103.538 | 1.000 | 5 | 1.68893 | 31.08 |
| 9 | 74.789 | 5.615 | 6 | 1.72916 | 54.68 |
| 10 | −20.043 | 28.155 | | | |
| 11 | ∞ | 0.700 | 7 | 1.51633 | 64.15 |
| 12 | ∞ | | | | |

The aspherical surface is applied to the eighth lens-surface.
$K=9.504827, A_4=-1.54750E-6, A_6=1.06757E-8, A_8=2.93413E-12, A_{10}=-1.43560E-13$

EXAMPLE 21

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 19.076 | 7.018 | 1 | 1.81600 | 46.60 |
| 2 | 112.116 | 2.123 | 2 | 1.84493 | 23.95 |
| 3 | 34.562 | 0.374 | | | |
| 4 | 13.335 | 2.330 | 3 | 1.84700 | 23.90 |
| 5 | 9.908 | 10.172 | | | |
| 6 | −8.527 | 1.869 | 4 | 1.84700 | 23.90 |
| 7 | −10.835 | 0.401 | | | |
| 8* | −86.142 | 2.171 | 5 | 1.84272 | 24.01 |
| 9 | 139.558 | 5.537 | 6 | 1.81635 | 46.52 |
| 10 | −20.545 | 27.719 | | | |
| 11 | ∞ | 0.700 | 7 | 1.51633 | 64.15 |
| 12 | ∞ | | | | |

Figures 21A, 21B, 21C, 21D:
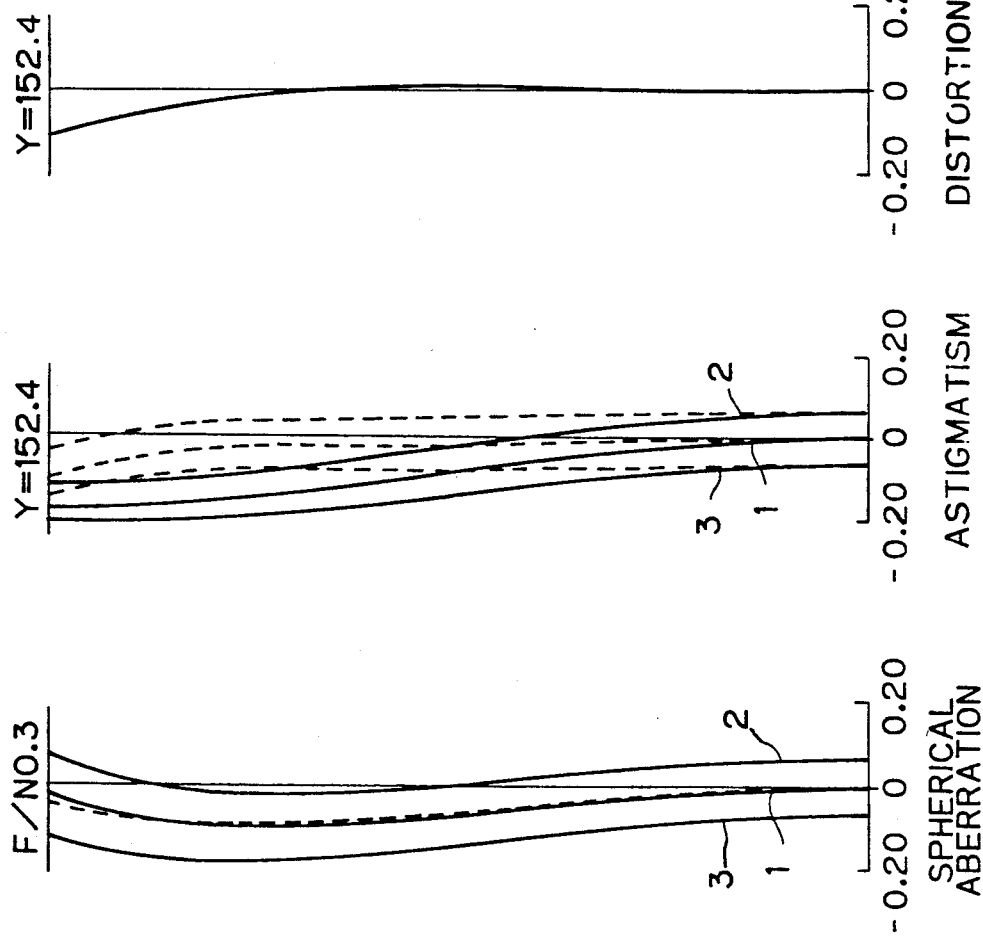

The aspherical surface is applied to the eighth lens-surface.
$K=0.744343, A_4=-1.64000E-7, A_6=2.76977E-9, A_8=8.73591E-12, A_{10}=-5.93840E-14$ FIGS. 20, 21 and 22 represent the aberration curves of the examples 19, 20 and 21, respectively, in the same way as the graphs of FIGS. 2 to 4 of the embodiment 1, mentioned before. The graphs show that the aberrations are fully compensated for.

EMBODIMENT 8

The reading lens in accordance with this embodiment is arranged in such a way that the tenth lens-surface is formed as an aspherical surface wherein the conic constant $K_{10}$ of the aspherical surface satisfies the following condition.

$$-0.06 < K_{10} < 0 \qquad (8)$$

In the event in which the tenth lens-surface is aspherical as this embodiment, the aspherical surface which satisfies the condition (8) represents an elliptic surface of revolution which is symmetric with respect to the line of apsides thereof. Also, in this case, the coma flare is minimized when the condition (8) is satisfied.

Three examples (Examples 22 to 24) of this embodiment 8 are represented below in table forms numerically specifying the lens factors. The structure of the lens is the same as that of the embodiment 1.

EXAMPLE 22

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 20.015 | 6.558 | 1 | 1.81600 | 46.62 |
| 2 | 118.268 | 2.062 | 2 | 1.84666 | 23.89 |
| 3 | 38.829 | 0.100 | | | |
| 4 | 14.366 | 2.903 | 3 | 1.84666 | 23.89 |
| 5 | 10.387 | 10.657 | | | |
| 6 | −9.296 | 2.263 | 4 | 1.84666 | 23.89 |
| 7 | −12.426 | 0.100 | | | |
| 8 | −106.453 | 2.219 | 5 | 1.84666 | 23.89 |
| 9 | 143.133 | 5.333 | 6 | 1.81600 | 46.62 |
| 10* | −20.496 | 28.217 | | | |
| 11 | ∞ | 0.700 | 7 | 1.51633 | 64.15 |
| 12 | ∞ | | | | |

The aspherical surface is applied to the tenth lens-surface.
$K=-0.054674, A_4=2.25866E-6, A_6=-7.91677E-9, A_8=4.66936E-11, A_{10}=-5.16970E-14$

EXAMPLE 23

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 18.647 | 5.904 | 1 | 1.72916 | 54.68 |
| 2 | 100.194 | 2.084 | 2 | 1.78472 | 25.71 |
| 3 | 39.540 | 0.100 | | | |
| 4 | 13.765 | 3.072 | 3 | 1.84666 | 23.89 |
| 5 | 10.002 | 10.445 | | | |
| 6 | −8.865 | 2.617 | 4 | 1.74077 | 27.79 |
| 7 | −12.044 | 0.100 | | | |
| 8 | −110.436 | 1.000 | 5 | 1.68893 | 31.08 |
| 9 | 71.375 | 5.638 | 6 | 1.72916 | 54.68 |
| 10* | −20.108 | 27.998 | | | |
| 11 | ∞ | 0.700 | 7 | 1.51633 | 64.15 |
| 12 | ∞ | | | | |

The aspherical surface is applied to the tenth lens-surface.
$K=-0.039463, A_4=1.67673E-6, A_6=-4.57731E-9, A_8=2.36750E-11, A_{10}=1.49544E-15$

EXAMPLE 24

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 19.060 | 7.009 | 1 | 1.81600 | 46.60 |

-continued

| F = 43, | $F_{NO}$ = 3.0, | | 2ω = 40, | | m = 0.1102 |
|---|---|---|---|---|---|
| i | $r_i$ | $d_i$ | j | $n_j$ | $\nu_j$ |
| 2 | 110.398 | 2.112 | 2 | 1.84457 | 23.96 |
| 3 | 34.483 | 0.327 | | | |
| 4 | 13.416 | 2.341 | 3 | 1.84700 | 23.90 |
| 5 | 9.962 | 10.221 | | | |
| 6 | −8.545 | 1.867 | 4 | 1.84700 | 23.90 |
| 7 | −10.877 | 0.389 | | | |
| 8 | −86.883 | 2.181 | 5 | 1.84263 | 24.01 |
| 9 | 138.520 | 5.543 | 6 | 1.81656 | 46.47 |
| 10* | −20.537 | 27.627 | | | |
| 11 | ∞ | 0.700 | 7 | 1.51633 | 64.15 |
| 12 | ∞ | | | | |

The aspherical surface is applied to the tenth lens-surface.
K= −0.006632, $A_4$=3.45624E-7, $A_6$= −1.54678E-9, $A_8$= −3.86417E-12, $A_{10}$=1.88441E-14

FIGS. 23, 24 and 25 represent the aberration curves of the examples 22, 23 and 24, respectively, in the same way as the graphs of FIGS. 2 to 4 of the embodiment 1, mentioned before. The graphs show that the aberrations are fully compensated for.

EMBODIMENT 9

The reading lens in accordance with this embodiment is arranged in such a way that the first lens-surface and the third lens-surface are formed as an aspherical surface wherein the conic constant $K_1$ and $K_3$ of the aspherical surfaces satisfy the following conditions.

$$-0.03 < K_1 < 0 \quad (9\text{-}1)$$

$$0.09 < K_3 < 0.5 \quad (9\text{-}2)$$

In the event in which the first and the third lens-surfaces are aspherical as this embodiment, the aspherical surface of the first lens-surface which satisfies the condition (9-1) represents an elliptic surface of revolution which is symmetric with respect to the line of apsides thereof and the aspherical surface of the third lens-surface which satisfies the condition (9-2) represents an elliptic surface of revolution which is symmetric with respect to the minor axis thereof. Also, in this case, the coma flare is minimized when the conditions (9-1) and (9-2) are satisfied.

Three examples (Examples 25 to 27) of this embodiment 9 are represented below in table forms numerically specifying the lens factors. The structure of the lens is the same as that of the embodiment 1.

EXAMPLE 25

| F = 43, | $F_{NO}$ = 3.0, | | 2ω = 40, | | m = 0.1102 |
|---|---|---|---|---|---|
| i | $r_i$ | $d_i$ | j | $n_j$ | $\nu_j$ |
| 1* | 19.110 | 7.246 | 1 | 1.81600 | 46.62 |
| 2 | 102.481 | 2.452 | 2 | 1.84666 | 23.89 |
| 3* | 35.710 | 0.282 | | | |
| 4 | 13.941 | 2.343 | 3 | 1.84666 | 23.89 |
| 5 | 10.117 | 10.292 | | | |
| 6 | −8.472 | 1.915 | 4 | 1.84666 | 23.89 |
| 7 | −10.766 | 0.313 | | | |
| 8 | −87.472 | 2.123 | 5 | 1.84666 | 23.89 |
| 9 | 156.214 | 5.485 | 6 | 1.81600 | 46.62 |
| 10 | −20.433 | 27.252 | | | |
| 11 | ∞ | 0.700 | 7 | 1.51633 | 64.15 |
| 12 | ∞ | | | | |

The aspherical surface is applied to the first lens-surface.
K= −0.007750, $A_4$= −4.52796E-07, $A_6$=1.75905E-9, $A_8$= −2.80057E-13, $A_{10}$= −1.04580E-13
The aspherical surface is applied to the third lens-surface.
K=0.097573, $A_4$=3.56217E-07, $A_6$= −1.84123E-9, $A_8$= −3.03233E-11, $A_{10}$= −2.95016E-13

EXAMPLE 26

| F = 43, | $F_{NO}$ = 3.0, | | 2ω = 40, | | m = 0.1102 |
|---|---|---|---|---|---|
| i | $r_i$ | $d_i$ | j | $n_j$ | $\nu_j$ |
| 1 | 18.820 | 6.604 | 1 | 1.72916 | 54.68 |
| 2 | 110.237 | 3.482 | 2 | 1.78472 | 25.71 |
| 3* | 44.391 | 0.100 | | | |
| 4 | 15.208 | 3.102 | 3 | 1.84666 | 23.89 |
| 5 | 10.405 | 9.750 | | | |
| 6 | −8.494 | 2.539 | 4 | 1.74077 | 27.79 |
| 7 | −11.316 | 0.100 | | | |
| 8 | −121.248 | 1.000 | 5 | 1.68893 | 31.08 |
| 9 | 64.404 | 5.547 | 6 | 1.72916 | 54.68 |
| 10 | −20.306 | 26.487 | | | |
| 11 | ∞ | 0.700 | 7 | 1.51633 | 64.15 |
| 12 | ∞ | | | | |

The aspherical surface is applied to the first lens-surface.
K= −0.020553, $A_4$= −1.11466E-06, $A_6$=3.22682E-9, $A_8$= −1.15008E-11, $A_{10}$= −3.70485E-13
The aspherical surface is applied to the third lens-surface.
K=0.452788, $A_4$=1.16338E-06, $A_6$= −1.80592E-8, $A_8$= −2.71303E-10, $A_{10}$=3.66208E-13

EXAMPLE 27

| F = 43, | $F_{NO}$ = 3.0, | | 2ω = 40, | | m = 0.1102 |
|---|---|---|---|---|---|
| i | $r_i$ | $d_i$ | j | $n_j$ | $\nu_j$ |
| 1* | 19.604 | 6.636 | 1 | 1.81600 | 46.62 |
| 2 | 161.304 | 3.373 | 2 | 1.80104 | 25.19 |
| 3* | 42.738 | 0.100 | | | |
| 4 | 16.348 | 2.773 | 3 | 1.84700 | 23.90 |
| 5 | 10.734 | 10.097 | | | |
| 6 | −9.034 | 1.830 | 4 | 1.84700 | 23.90 |
| 7 | −11.535 | 0.100 | | | |
| 8 | −78.344 | 1.929 | 5 | 1.78996 | 25.55 |
| 9 | 78.453 | 5.213 | 6 | 1.82870 | 43.90 |
| 10 | −20.449 | 27.086 | | | |
| 11 | ∞ | 0.700 | 7 | 1.51633 | 64.15 |
| 12 | ∞ | | | | |

The aspherical surface is applied to the first lens-surface.
K= −0.034658, $A_4$= −1.54315E-6, $A_6$=1.62857E-9, $A_8$= −1.51745E-11, $A_{10}$= −2.42377E-13
The aspherical surface is applied to the third lens-surface.
K=0.252311, $A_4$=8.98927E-7, $A_6$= −1.46919E-8, $A_8$= −2.11439E-10, $A_{10}$=1.72957E-13

FIGS. 26, 27 and 28 represent the aberration curves of the examples 25, 26 and 27, respectively, in the same way as the graphs of FIGS. 2 to 4 of the embodiment 1, mentioned before. The graphs show that the aberrations are fully compensated for.

EMBODIMENT 10

The reading lens in accordance with this embodiment is arranged in such a way that the first lens-surface and the fourth lens-surface are formed as an aspherical surface wherein the conic constant $K_1$ and $K_4$ of the aspherical surfaces satisfy the following conditions.

$$-0.02 < K_1 < 0 \tag{10-1}$$

$$-0.04 < K_4 < -0.017 \tag{10-2}$$

In the event in which the first and the fourth lens-surfaces are aspherical as this embodiment, the aspherical surface of the first lens-surface which satisfies the condition (10-1) represents an elliptic surface of revolution which is symmetric with respect to the line of apsides thereof and the aspherical lens surface of the fourth lens-surface which satisfies the condition (10-2) represents an elliptic surface of revolution which is symmetric with respect to the line of apsides thereof. Also, in this case, the coma flare is minimized when the conditions (10-1) and (10-2) are satisfied.

Three examples (Examples 28 to 30) of this embodiment 10 are represented below in table forms numerically specifying the lens factors. The structure of the lens is the same as that of the embodiment 1.

EXAMPLE 28

| F = 43, | $F_{NO}$ = 3.0, | | $2\omega$ = 40, | m = 0.1102 | |
|---|---|---|---|---|---|
| i | $r_i$ | $d_i$ | j | $n_j$ | $\nu_j$ |
| 1* | 19.088 | 7.415 | 1 | 1.81600 | 46.62 |
| 2 | 98.790 | 2.717 | 2 | 1.84666 | 23.89 |
| 3 | 36.594 | 0.224 | | | |
| 4* | 14.544 | 2.322 | 3 | 1.84666 | 23.89 |
| 5 | 10.315 | 10.120 | | | |
| 6 | −8.538 | 1.952 | 4 | 1.84666 | 23.89 |
| 7 | −10.891 | 0.245 | | | |
| 8 | −90.225 | 2.136 | 5 | 1.84666 | 23.89 |
| 9 | 150.464 | 5.473 | 6 | 1.81600 | 46.62 |
| 10 | −20.380 | 27.071 | | | |
| 11 | ∞ | 0.700 | 7 | 1.51633 | 64.15 |
| 12 | ∞ | | | | |

The aspherical surface is applied to the first lens-surface.
$K = -0.008429, A_4 = -5.04034E-7, A_6 = 2.12374E-9,$
$A_8 = -3.78090E-12, A_{10} = -1.19472E-13$ The aspherical surface is applied to the fourth lens-surface.
$K = -0.016752, A_4 = -1.53051E-6, A_6 = -7.31268E-9,$
$A_8 = -3.14188E-12, A_{10} = 6.02591E-12$

EXAMPLE 29

| F = 43, | $F_{NO}$ = 3.0, | | $2\omega$ = 40, | m = 0.1102 | |
|---|---|---|---|---|---|
| i | $r_i$ | $d_i$ | j | $n_j$ | $\nu_j$ |
| 1* | 18.512 | 6.186 | 1 | 1.72916 | 54.68 |
| 2 | 98.470 | 3.453 | 2 | 1.78472 | 25.71 |
| 3 | 47.241 | 0.100 | | | |
| 4* | 16.745 | 3.475 | 3 | 1.84666 | 23.89 |
| 5 | 10.780 | 9.712 | | | |
| 6 | −8.557 | 2.547 | 4 | 1.74077 | 27.79 |
| 7 | −11.392 | 0.100 | | | |
| 8 | −134.203 | 1.000 | 5 | 1.68893 | 31.08 |
| 9 | 63.424 | 5.511 | 6 | 12.72916 | 54.68 |
| 10 | −20.519 | 26.259 | | | |
| 11 | ∞ | 0.700 | 7 | 1.51633 | 64.15 |
| 12 | ∞ | | | | |

The aspherical surface is applied to the first lens-surface.
$K = -0.017628, A_4 = -9.58682E-7, A_6 = 2.15373E-9,$
$A_8 = -2.98307E-11, A_{10} = -2.21943E-13$ The aspherical surface is applied to the fourth lens-surface.
$K = -0.039724, A_4 = -3.22412E-6, A_6 = 7.60970E-9,$
$A_8 = 2.11926E-10, A_{10} = 4.32071E-12$

EXAMPLE 30

| F = 43, | $F_{NO}$ = 3.0, | | $2\omega$ = 40, | m = 0.1102 | |
|---|---|---|---|---|---|
| i | $r_i$ | $d_i$ | j | $n_j$ | $\nu_j$ |
| 1* | 19.211 | 7.359 | 1 | 1.81600 | 46.60 |
| 2 | 122.656 | 2.940 | 2 | 1.81060 | 24.90 |
| 3 | 39.019 | 0.100 | | | |
| 4* | 15.852 | 2.425 | 3 | 1.84700 | 23.90 |
| 5 | 10.687 | 10.073 | | | |
| 6 | −8.813 | 1.890 | 4 | 1.84700 | 23.90 |
| 7 | −11.241 | 0.100 | | | |
| 8 | −80.200 | 1.984 | 5 | 1.80317 | 25.13 |
| 9 | 101.338 | 5.294 | 6 | 1.82129 | 45.43 |
| 10 | −20.222 | 27.289 | | | |
| 11 | ∞ | 0.700 | 7 | 1.51633 | 64.15 |
| 12 | ∞ | | | | |

The aspherical surface is applied to the first lens-surface.
$K = -0.015876, A_4 = -8.60148E-7, A_6 = 2.41887E-9,$
$A_8 = -9.31686E-12, A_{10} = -1.51407E-13$ The aspherical surface is applied to the fourth lens-surface.
$K = -0.034171, A_4 = -2.67962E-6, A_6 = -7.22367E-9,$
$A_8 = -4.12487E-12, A_{10} = 7.25781E-12$ FIGS. 29, 30 and 31 represent the aberration curves of the examples 28, 29 and 30, respectively, in the same way as the graphs of FIGS. 2 to 4 of the embodiment 1, mentioned before. The graphs show that the aberrations are fully compensated for.

EMBODIMENT 11

The reading lens in accordance with this embodiment is arranged in such a way that the first lens-surface and the fifth lens surface are formed as an aspherical surface wherein the conic constant $K_1$ and $K_5$ of the aspherical surfaces satisfy the following conditions.

$$-0.02 < K_1 < 0 \tag{11-1}$$

$$0 < K_5 < 0.025 \tag{11-2}$$

In the event in which the first and the fifth lens-surfaces are aspherical as this embodiment, the aspherical surface of the first lens-surface which satisfies the condition (11-1) represents an elliptic surface of revolution which is symmetric with respect to the line of apsides thereof and the aspherical lens surface of the fifth lens-surface which satisfies the condition (11-2) represents an elliptic surface of revolution which is symmetric with respect to the minor axis thereof. Also, in this case, the coma flare is minimized when the conditions (11-1) and (11-2) are satisfied.

Three examples (Examples 31 to 33) of this embodiment 11 are represented below in table forms numerically specifying the lens factors. The structure of the lens is the same as that of the embodiment 1.

EXAMPLE 31

| F = 43, | $F_{NO}$ = 3.0, | | $2\omega$ = 40, | m = 0.1102 | |
|---|---|---|---|---|---|
| i | $r_i$ | $d_i$ | j | $n_j$ | $\nu_j$ |
| 1* | 19.149 | 7.148 | 1 | 1.81600 | 46.62 |
| 2 | 105.746 | 3.149 | 2 | 1.84666 | 23.89 |

-continued

| F = 43, | $F_{NO}$ = 3.0, | | $2\omega$ = 40, | m = 0.1102 | |
|---|---|---|---|---|---|
| i | $r_i$ | $d_i$ | j | $n_j$ | $\nu_j$ |
| 3 | 41.831 | 0.100 | | | |
| 4 | 16.846 | 2.744 | 3 | 1.84666 | 23.89 |
| 5* | 10.955 | 10.002 | | | |
| 6 | −8.682 | 2.003 | 4 | 1.84666 | 23.89 |
| 7 | −11.142 | 0.100 | | | |
| 8 | −103.393 | 2.329 | 5 | 1.84666 | 23.89 |
| 9 | 133.142 | 5.361 | 6 | 1.81600 | 46.62 |
| 10 | −20.671 | 26.55 | | | |
| 11 | ∞ | 0.700 | 7 | 1.51633 | 64.15 |
| 12 | ∞ | | | | |

The aspherical surface is applied to the first lens-surface.
$K = -0.018862, A_4 = -1.01049E-6, A_6 = 1.91731E-9, A_8 = -2.04957E-11, A_{10} = -8.56358E-14$ The aspherical surface is applied to the fifth lens-surface.
$K = 0.020362, A_4 = 5.06392E-6, A_6 = -3.294908E-8, A_8 = 7.41789E-10, A_{10} = -6.61300E-11$

EXAMPLE 32

| F = 43, | $F_{NO}$ = 3.0, | | $2\omega$ = 40, | m = 0.1102 | |
|---|---|---|---|---|---|
| i | $r_i$ | $d_i$ | j | $n_j$ | $\nu_j$ |
| 1* | 18.404 | 6.418 | 1 | 1.72916 | 54.68 |
| 2 | 97.014 | 2.487 | 2 | 1.78472 | 25.71 |
| 3 | 37.756 | 0.100 | | | |
| 4 | 13.491 | 2.794 | 3 | 1.84666 | 23.89 |
| 5* | 9.893 | 10.256 | | | |
| 6 | −8.383 | 2.421 | 4 | 1.74077 | 27.79 |
| 7 | −11.014 | 0.100 | | | |
| 8 | −95.950 | 1.000 | 5 | 1.68893 | 31.08 |
| 9 | 70.025 | 5.603 | 6 | 1.72916 | 54.68 |
| 10 | −20.192 | 27.369 | | | |
| 11 | ∞ | 0.700 | 7 | 1.51633 | 64.15 |
| 12 | ∞ | | | | |

The aspherical surface is applied to the first lens-surface.
$K = -0.003080, A_4 = -1.88489E-7, A_6 = 32\ 9.68848E-10$
$A_8 = -2.08042E-12, A_{10} = -9.80886E-14$ The aspherical surface is applied to the fifth lens-surface.
$K = 0.003736, A_4 = 1.21199E-6, A_6 = 3.73261E-9, A_8 = -4.52120E-10, A_{10} = -2.89756E-11$

EXAMPLE 33

| F = 43, | $F_{NO}$ = 3.0, | | $2\omega$ = 40, | m = 0.1102 | |
|---|---|---|---|---|---|
| i | $r_i$ | $d_i$ | j | $n_j$ | $\nu_j$ |
| 1* | 19.019 | 7.420 | 1 | 1.81600 | 46.60 |
| 2 | 112.173 | 2.731 | 2 | 1.82588 | 24.46 |
| 3 | 36.474 | 0.105 | | | |
| 4 | 15.106 | 2.358 | 3 | 1.84700 | 23.90 |
| 5* | 10.530 | 10.06 | | | |
| 6 | −8.675 | 1.898 | 4 | 1.84700 | 23.90 |
| 7 | −11.057 | 0.253 | | | |
| 8 | −83.275 | 1.997 | 5 | 1.81583 | 24.75 |
| 9 | 118.260 | 5.356 | 6 | 1.81782 | 46.19 |
| 10 | −20.277 | 27.275 | | | |
| 11 | ∞ | 0.700 | 7 | 1.51633 | 64.15 |
| 12 | ∞ | | | | |

Figures 34A, 34B, 34C, 34D:
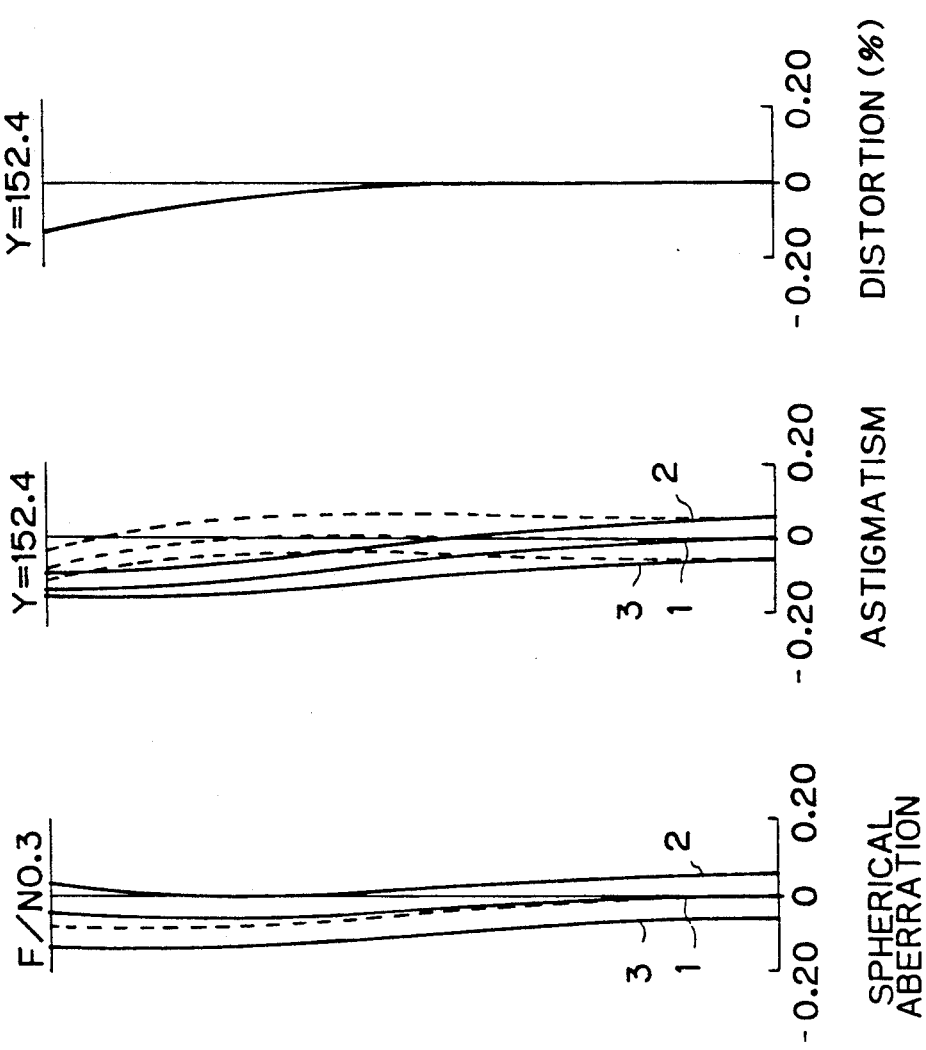
Figure 49A:
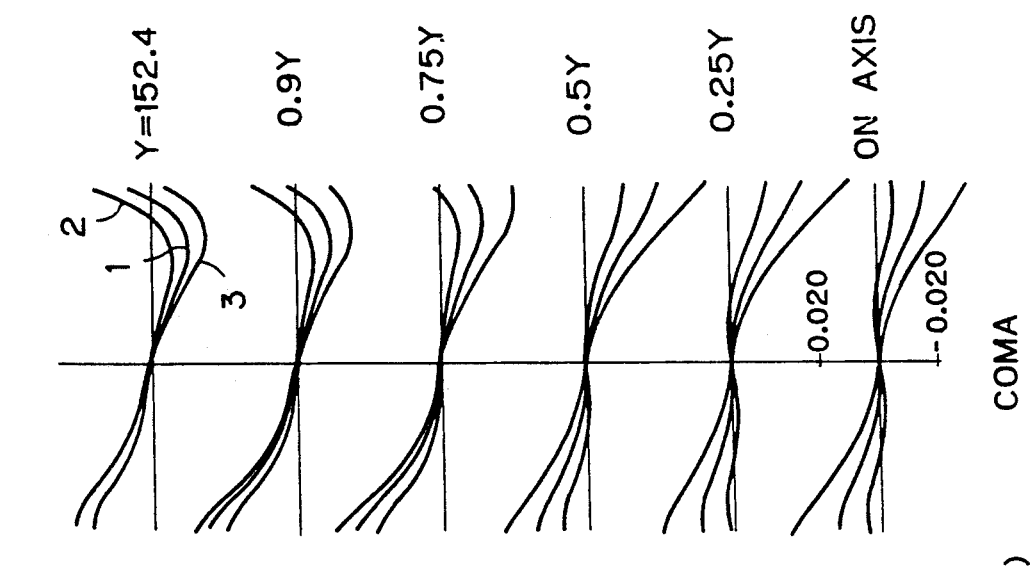
Figure 49B:
Figure 49C:
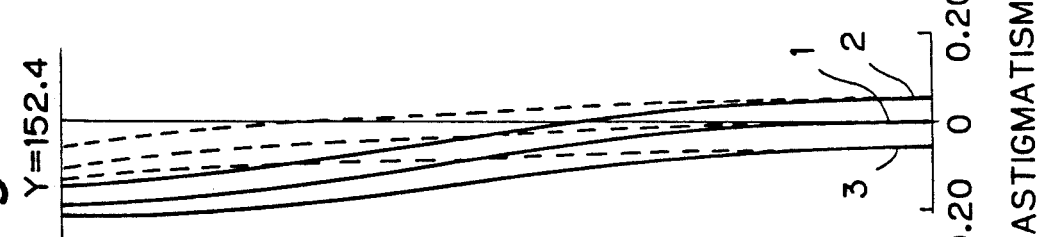
Figure 49D:
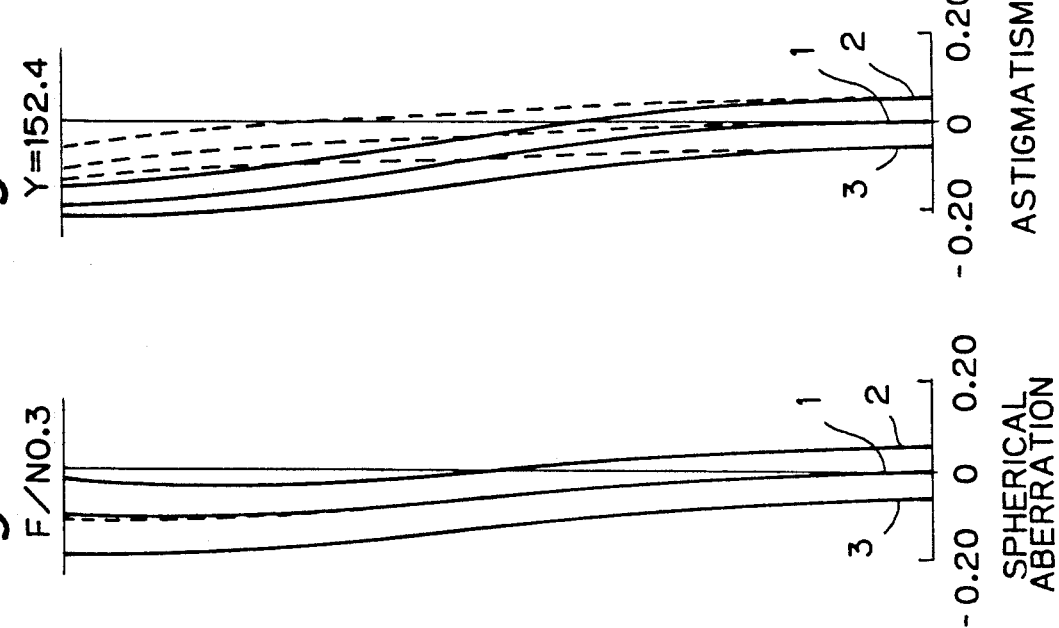

The aspherical surface is applied to the first lens-surface.
$K = -0.010443, A_4 = -5.98715E-7, A_6 = 2.00529E-9, A_8 = -4.13581E-12, A_{10} = -1.12304E-13$ The aspherical surface is applied to the fifth lens-surface.
$K = 0.015159, A_4 = 3.43273E-6, A_6 = 4.78610E-8, A_8 = 3.96971E-10, A_{10} = -5.57490E-11$ FIGS. 32, 33 and 34 represent the aberration curves of the examples 31, 32 and 33, respectively, in the same way as the graphs of FIGS. 2 to 4 of the embodiment 1, mentioned before. The graphs show that the aberrations are fully compensated for.

EMBODIMENT 12

The reading lens in accordance with this embodiment is arranged in such a way that the first lens-surface and the sixth lens-surface are formed as an aspherical surface wherein the conic constant $K_1$ and $K_6$ of the aspherical surfaces satisfy the following conditions.

$$-0.026 < K_1 < 0 \quad (12\text{-}1)$$

$$-0.005 < K_6 < 0.0025 \quad (12\text{-}2)$$

In the event in which the first and the sixth lens-surfaces are spherical as this embodiment, the aspherical surface of the first lens-surface which satisfies the condition (12-1) represents an elliptic surface of revolution which is symmetric with respect to the line of apsides thereof and the aspherical surface of the sixth lens-surface which satisfies the condition (12-2) represents an elliptic surface of revolution which is symmetric with respect to the line of apsides or to the minor axis thereof. Also, in this case, the coma flare is minimized when the conditions (12-1) and (12-2) are satisfied.

Three examples (Examples 34 to 36) of this embodiment 12 are represented below in table forms numerically specifying the lens factors. The structure of the lens is the same as that of the embodiment 1.

EXAMPLE 34

| F = 43, | $F_{NO}$ = 3.0, | | $2\omega$ = 40, | m = 0.1102 | |
|---|---|---|---|---|---|
| i | $r_i$ | $d_i$ | j | $n_j$ | $\nu_j$ |
| 1* | 19.063 | 7.061 | 1 | 1.81600 | 46.62 |
| 2 | 102.103 | 2.196 | 2 | 1.84666 | 23.89 |
| 3 | 34.789 | 0.308 | | | |
| 4 | 13.360 | 2.330 | 3 | 1.84666 | 23.89 |
| 5 | 9.901 | 10.181 | | | |
| 6* | −8.684 | 1.911 | 4 | 1.84666 | 23.89 |
| 7 | −11.103 | 0.386 | | | |
| 8 | −85.916 | 2.237 | 5 | 1.84666 | 23.89 |
| 9 | 174.694 | 5.599 | 6 | 1.81600 | 46.62 |
| 10 | −20.432 | 27.457 | | | |
| 11 | ∞ | 0.700 | 7 | 1.51633 | 64.15 |
| 12 | ∞ | | | | |

The aspherical surface is applied to the first lens-surface.
$K = -0.001960, A_4 = -1.46168E-7, A_6 = 8.63897E-10, A_8 = 1.33465E-12, A_{10} = -2.86779E-14$ The aspherical surface is applied to the sixth lens-surface.
$K = 0.002280, A_4 = -3.26010E-6, A_6 = 2.315580E-8, A_8 = -4.11491E-10, A_{10} = -1.04530E-11$

EXAMPLE 35

| F = 43, | $F_{NO}$ = 3.0, | | $2\omega$ = 40, | m = 0.1102 | |
|---|---|---|---|---|---|
| i | $r_i$ | $d_i$ | j | $n_j$ | $\nu_j$ |
| 1* | 18.215 | 5.500 | 1 | 1.72916 | 54.68 |
| 2 | 107.097 | 2.113 | 2 | 1.78472 | 25.71 |

-continued

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 3 | 42.713 | 0.100 | | | |
| 4 | 14.911 | 3.443 | 3 | 1.84666 | 23.89 |
| 5 | 10.314 | 10.323 | | | |
| 6* | −9.086 | 2.760 | 4 | 1.74077 | 27.79 |
| 7 | −12.365 | 0.100 | | | |
| 8 | −127.467 | 1.000 | 5 | 1.68893 | 31.08 |
| 9 | 73.175 | 5.569 | 6 | 1.72916 | 54.68 |
| 10 | −21.007 | 27.05 | | | |
| 11 | ∞ | 0.700 | 7 | 1.51633 | 64.15 |
| 12 | ∞ | | | | |

The aspherical surface is applied to the first lens-surface.
$K = -0.013965, A_4 = -6.74060E-7, A_6 = 3.29871E-10$
$A_8 = -1.66152E-11, A_{10} = -2.44190E-14$ The aspherical surface is applied to the sixth lens-surface.
$K = -0.004581, A_4 = -1.20696E-5, Ahd\ 6 = 2.31282E-7,$
$A_8 = -6.93064E-9, A_{10} = 2.30984E-11$

EXAMPLE 36

| F = 43, | $F_{NO}$ = 3.0. | | 2ω = 40, | m = 0.1102 | |
|---|---|---|---|---|---|
| i | $r_i$ | $d_i$ | j | $n_j$ | $v_j$ |
| 1* | 19.450 | 6.335 | 1 | 1.81600 | 46.60 |
| 2 | 146.457 | 1.988 | 2 | 1.79202 | 25.48 |
| 3 | 39.169 | 0.100 | | | |
| 4 | 15.318 | 2.870 | 3 | 1.84700 | 23.90 |
| 5 | 10.551 | 10.226 | | | |
| 6* | −10.031 | 2.205 | 4 | 1.84700 | 23.90 |
| 7 | −13.476 | 0.100 | | | |
| 8 | −84.284 | 1.535 | 5 | 1.81654 | 24.72 |
| 9 | 97.325 | 4.938 | 6 | 1.83310 | 43.05 |
| 10 | −20.408 | 28.704 | | | |
| 11 | ∞ | 0.700 | 7 | 1.51633 | 64.15 |
| 12 | ∞ | | | | |

The aspherical surface is applied to the first lens-surface.
$K = -0.023233, A_4 = -9.87032E-7, A_6 = 9.11501E-10,$
$A_8 = -1.25253E-11, A_{10} = -2.63762E-14$ The aspherical surface is applied to the sixth lens-surface.
$K = 0.002083, A_4 = -8.25530E-6, A_6 = 1.02286E-7,$
$A_8 = -3.94557E-9, A_{10} = 2.92095E-11$ FIGS. 35, 36 and 37 represent the aberration curves of the examples 34, 35 and 36, respectively, in the same way as the graphs of FIGS. 2 to 4 of the embodiment 1, mentioned before. The graphs show that the aberrations are fully compensated for.

EMBODIMENT 13

The reading lens in accordance with this embodiment is arranged in such a way that the first lens-surface and the seventh lens-surface are formed as an aspherical surface wherein the conic constant $K_1$ and $K_7$ of the aspherical surfaces satisfy the following conditions.

$$-0.02 < K_1 < 0 \quad (13\text{-}1)$$

$$-0.020 < K_7 < 0.004 \quad (13\text{-}2)$$

In the event in which the first and the seventh lens-surfaces are aspherical as this embodiment, the aspherical surface of the first lens-surface which satisfies the condition (13-1) represents an elliptic surface of revolution which is symmetric with respect to the line of apsides thereof and the aspherical surface of the seventh lens-surface which satisfies the condition (13-2) represents an elliptic surface of revolution which is symmetric with respect to the line of apsides or the minor axis thereof. Also, in this case, the coma flare is minimized when the conditions (13-1) and (13-2) are satisfied.

Three examples (Examples 37 to 39) of this embodiment 13 are represented below in table forms numerically specifying the lens factors. The structure of the lens is the same as that of the embodiment 1.

EXAMPLE 37

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1* | 19.062 | 7.058 | 1 | 1.81600 | 46.62 |
| 2 | 101.762 | 2.194 | 2 | 1.84666 | 23.89 |
| 3 | 34.772 | 0.281 | | | |
| 4 | 13.400 | 2.341 | 3 | 1.84666 | 23.89 |
| 5 | 9.926 | 10.026 | | | |
| 6 | −8.676 | 1.907 | 4 | 1.84666 | 23.89 |
| 7* | −11.101 | 0.374 | | | |
| 8 | −86.769 | 2.236 | 5 | 1.84666 | 23.89 |
| 9 | 174.517 | 5.598 | 6 | 1.81600 | 46.62 |
| 10 | −20.444 | 27.579 | | | |
| 11 | ∞ | 0.700 | 7 | 1.51633 | 64.15 |
| 12 | ∞ | | | | |

The aspherical surface is applied to the first lens-surface.
$K = -0.001976, A_4 = -1.44894E-7, A_6 = 8.37117E-10$
$A_8 = 1.18126E-12, A_{10} = -2.81943E-14$ The aspherical surface is applied to the seventh lens-surface.
$K = 0.003234, A_4 = 1.98394E-6, A_6 = -1.151368E-8, A_8 = 8.59008E-11, A_{10} = 2.19876E-12$

EXAMPLE 38

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1* | 18.218 | 5.551 | 1 | 1.72916 | 54.68 |
| 2 | 105.483 | 2.114 | 2 | 1.78472 | 25.71 |
| 3 | 41.921 | 0.100 | | | |
| 4 | 14.999 | 3.473 | 3 | 1.84666 | 23.89 |
| 5 | 10.421 | 10.507 | | | |
| 6 | −8.881 | 2.699 | 4 | 1.74077 | 27.79 |
| 7* | −12.144 | 0.100 | | | |
| 8 | −124.671 | 1.000 | 5 | 1.68893 | 31.08 |
| 9 | 74.703 | 5.717 | 6 | 1.72916 | 54.68 |
| 10 | −20.577 | 26.947 | | | |
| 11 | ∞ | 0.700 | 7 | 1.51633 | 64.15 |
| 12 | ∞ | | | | |

The aspherical surface is applied to the first lens-surface.
$K = -0.011703, A_4 = -5.76026E-7, A_6 = 4.46521E-10$
$A_8 = -1.91375E-11, A_{10} = -1.23951E-14$ The aspherical surface is applied to the seventh lens-surface.
$K = 0.003228, A_4 = 6.35968E-6, A_6 = -7.04247E-8,$
$A_8 = 1.32165E-9, A_{10} = -1.56414E-12$

EXAMPLE 39

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1* | 19.360 | 5.651 | 1 | 1.81079 | 46.60 |
| 2 | 157.986 | 1.739 | 2 | 1.76552 | 26.10 |
| 3 | 40.478 | 0.100 | | | |
| 4 | 16.379 | 3.293 | 3 | 1.83683 | 23.90 |

-continued

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 5 | 10.905 | 10.733 | | | |
| 6 | −10.208 | 2.352 | 4 | 1.83683 | 23.90 |
| 7* | −14.045 | 0.100 | | | |
| 8 | −89.681 | 1.000 | 5 | 1.80774 | 24.70 |
| 9 | 96.139 | 4.999 | 6 | 1.82891 | 42.76 |
| 10 | −20.317 | 28.779 | | | |
| 11 | ∞ | 0.700 | 7 | 1.51633 | 64.15 |
| 12 | ∞ | | | | |

The aspherical surface is applied to the first lens-surface.
K = −0.029247, $A_4$ = −1.17034E-6, $A_6$ = 2.88618E-10, $A_8$ = −2.06262E-11, $A_{10}$ = 1.43840E-15

The aspherical surface is applied to the seventh lens-surface.
K = −0.015128, $A_4$ = 6.16670E-6, $A_6$ = 5.49297E-8, $A_8$ = 1.30015E-9, $A_{10}$ = −5.67732E-12

FIGS. 38, 39 and 40 represent the aberration curves of the examples 37, 38 and 39, respectively, in the same way as the graphs of FIGS. 2 to 4 of the embodiment 1, mentioned before. The graphs show that the aberrations are fully compensated for.

EMBODIMENT 14

The reading lens in accordance with this embodiment is arranged in such a way that the first lens-surface and the eighth lens-surface are formed as an aspherical surface wherein the conic constant $K_1$ and $K_8$ of the aspherical surfaces satisfy the following conditions.

$$-0.038 < K_1 < 0 \quad (14\text{-}1)$$

$$0.6 < K_8 < 14.6 \quad (14\text{-}2)$$

In the event in which the first and the eighth lens-surfaces are aspherical as this embodiment, the aspherical surface of the first lens-surface which satisfies the condition (14-1) represents an elliptic surface of revolution which is symmetric with respect to the line of apsides thereof and the aspherical surface of the eighth lens-surface which satisfies the condition (14-2) represents an elliptic surface of revolution which is symmetric with respect to the minor axis thereof. Also, in this case, the coma flare is minimized when the conditions (14-1) and (14-2) are satisfied.

Three examples (Examples 40 to 42) of this embodiment 13 are represented below in table forms numerically specifying the lens factors. The structure of the lens is the same as that of the embodiment 1.

EXAMPLE 40

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1* | 19.493 | 6.792 | 1 | 1.81600 | 46.62 |
| 2 | 120.633 | 2.944 | 2 | 1.84666 | 23.89 |
| 3 | 42.972 | 0.100 | | | |
| 4 | 15.067 | 2.831 | 3 | 1.84666 | 23.89 |
| 5 | 10.072 | 10.987 | | | |
| 6 | −9.592 | 2.334 | 4 | 1.84666 | 23.89 |
| 7 | −12.975 | 0.100 | | | |
| 8* | −97.373 | 1.684 | 5 | 1.84666 | 23.89 |
| 9 | 201.454 | 5.128 | 6 | 1.81600 | 46.62 |
| 10 | −19.373 | 26.680 | | | |
| 11 | ∞ | 0.700 | 7 | 1.51633 | 64.15 |
| 12 | ∞ | | | | |

The aspherical surface is applied to the first lens-surface.
K = −0.034325, $A_4$ = −1.66540E-6, $A_6$ = 2.21745E-9, $A_8$ = −2.91556E-11, $A_{10}$ = 6.45751E-15

The aspherical surface is applied to the eighth lens-surface.
K = 13.300293, $A_4$ = −2.68862E-6, $A_6$ = 1.406940E-8, $A_8$ = −9.51671E-11, $A_{10}$ = 3.74453E-13

EXAMPLE 41

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1* | 18.439 | 6.402 | 1 | 1.72916 | 54.68 |
| 2 | 103.290 | 2.610 | 2 | 1.78472 | 25.71 |
| 3 | 40.272 | 0.100 | | | |
| 4 | 13.621 | 2.896 | 3 | 1.84666 | 23.89 |
| 5 | 9.760 | 10.387 | | | |
| 6 | −8.767 | 2.553 | 4 | 1.74077 | 27.79 |
| 7 | −11.830 | 0.100 | | | |
| 8* | −100.602 | 1.000 | 5 | 1.68893 | 31.08 |
| 9 | 77.656 | 5.770 | 6 | 1.72916 | 54.68 |
| 10 | −19.629 | 26.871 | | | |
| 11 | ∞ | 0.700 | 7 | 1.51633 | 64.15 |
| 12 | ∞ | | | | |

The aspherical surface is applied to the first lens-surface.
K = −0.014080, $A_4$ = −8.16146E-7, $A_6$ = 1.78859E-9, $A_8$ = −7.72303E-12, $A_{10}$ = −7.20514E-14

The aspherical surface is applied to the eighth lens-surface.
K = 9.571830, $A_4$ = −1.51704E-6, $A_6$ = 6.18854E-9, $A_8$ = −6.50425E-12, $A_{10}$ = −4.50413E-14

EXAMPLE 42

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1* | 19.072 | 7.038 | 1 | 1.81600 | 46.60 |
| 2 | 113.114 | 2.149 | 2 | 1.84360 | 23.99 |
| 3 | 34.689 | 0.357 | | | |
| 4 | 13.319 | 2.312 | 3 | 1.84700 | 23.90 |
| 5 | 9.882 | 10.209 | | | |
| 6 | −8.578 | 1.877 | 4 | 1.84700 | 23.90 |
| 7 | −10.906 | 0.380 | | | |
| 8* | −85.013 | 2.148 | 5 | 1.84153 | 24.04 |
| 9 | 141.065 | 5.515 | 6 | 1.81673 | 46.43 |
| 10 | −20.498 | 27.567 | | | |
| 11 | ∞ | 0.700 | 7 | 1.51633 | 64.15 |
| 12 | ∞ | | | | |

The aspherical surface is applied to the first lens-surface.
K = −0.002573, $A_4$ = −1.79411E-7, $A_6$ = 9.10678E-10, $A_8$ = 1.87968E-12, $A_{10}$ = −2.99375E-14

The aspherical surface is applied to the eighth lens-surface.
K = 0.715988, $A_4$ = −1.51707E-7, $A_6$ = 2.35780E-9, $A_8$ = 8.16645E-12, $A_{10}$ = −3.74693E-14

FIGS. 41, 42 and 43 represent the aberration curves of the examples 40, 41 and 42, respectively, in the same way as the graphs of FIGS. 2 to 4 of the embodiment 1, mentioned before. The graphs show that the aberrations are fully compensated for.

EMBODIMENT 15

The reading lens in accordance with this embodiment is arranged in such a way that the first lens-surface and the tenth lens-surface are formed as an aspherical surface wherein the conic constant $K_1$ and $K_{10}$ of the aspherical surfaces satisfy the following conditions.

$$-0.04 < K_1 < -0.01 \quad (15\text{-}1)$$

$$-0.1 < K_{10} < -0.03 \quad (15\text{-}2)$$

In the event in which the first and the tenth lens-surfaces are aspherical as this embodiment, the aspherical surface of the first lens-surface which satisfies the condition (15-1) represents an elliptic surface of revolution which is symmetric with respect to the line of apsides thereof and the aspherical surface of the tenth lens-surface which satisfies the condition (15-2) represents an elliptic surface of revolution which is symmetric with respect to the line of apsides thereof. Also, in this case, the coma flare is minimized when the conditions (15-1) and (15-2) are satisfied.

Three examples (Examples 43 to 45) of this embodiment 15 are represented below in table forms numerically specifying the lens factors. The structure of the lens is the same as that of the embodiment 1.

EXAMPLE 43

| F = 43, | $F_{NO}$ = 3.0, | | $2\omega$ = 40, | m = 0.1102 | |
|---|---|---|---|---|---|
| i | $r_i$ | $d_i$ | j | $n_j$ | $v_j$ |
| 1* | 19.763 | 6.029 | 1 | 1.81600 | 46.62 |
| 2 | 119.022 | 2.397 | 2 | 1.84666 | 23.89 |
| 3 | 44.056 | 0.100 | | | |
| 4 | 16.271 | 3.456 | 3 | 1.84666 | 23.89 |
| 5 | 10.708 | 11.906 | | | |
| 6 | −9.425 | 2.537 | 4 | 1.84666 | 23.89 |
| 7 | −12.983 | 0.100 | | | |
| 8 | −122.993 | 1.429 | 5 | 1.84666 | 23.89 |
| 9 | 120.723 | 5.378 | 6 | 1.81600 | 46.62 |
| 10* | −19.791 | 27.960 | | | |
| 11 | ∞ | 0.700 | 7 | 1.51633 | 64.15 |
| 12 | ∞ | | | | |

The aspherical surface is applied to the first lens-surface.
$K = -0.026887, A_4 = -1.31320\text{E-}6, A_6 = 2.08190\text{E-}9$
$A_8 = -2.94016\text{E-}11, A_{10} = 2.19630\text{E-}14$ The aspherical surface is applied to the tenth lens-surface.
$K = -0.075049, A_4 = 3.24280\text{E-}6, A_6 = -9.563330\text{E-}9$,
$A_8 = 1.14013\text{E-}10, A_{10} = -2.10650\text{E-}13$

EXAMPLE 44

| F = 43, | $F_{NO}$ = 3.0, | | $2\omega$ = 40, | m = 0.1102 | |
|---|---|---|---|---|---|
| i | $r_i$ | $d_i$ | j | $n_j$ | $v_j$ |
| 1* | 17.990 | 5.615 | 1 | 1.72916 | 54.68 |
| 2 | 107.615 | 1.000 | 2 | 1.78472 | 25.71 |
| 3 | 46.543 | 0.100 | | | |
| 4 | 16.109 | 4.278 | 3 | 1.8466 | 23.89 |
| 5 | 10.328 | 12.04 | | | |
| 6 | −8.885 | 2.744 | 4 | 1.74077 | 27.79 |
| 7 | −12.654 | 0.100 | | | |
| 8 | −138.272 | 1.000 | 5 | 1.68893 | 31.08 |
| 9 | 70.457 | 6.579 | 6 | 1.72916 | 54.68 |
| 10* | −18.857 | 26.571 | | | |
| 11 | ∞ | 0.700 | 7 | 1.51633 | 64.15 |
| 12 | ∞ | | | | |

The aspherical surface is applied to the first lens-surface.
$K = -0.030353, A_4 = -1.78960\text{E-}6, A_6 = 4.13597\text{E-}9$
$A_8 = -6.21596\text{E-}11, A_{10} = 4.11230\text{E-}14$ The aspherical surface is applied to the tenth lens-surface.
$K = -0.099744, A_4 = 4.90100\text{E-}6, A_6 = -1.17977\text{E-}8$,
$A_8 = 1.59978\text{E-}10, A_{10} = -2.52440\text{E-}13$

EXAMPLE 45

| F = 43, | $F_{NO}$ = 3.0, | | $2\omega$ = 40, | m = 0.1102 | |
|---|---|---|---|---|---|
| i | $r_i$ | $d_i$ | j | $n_j$ | $v_j$ |
| 1* | 19.446 | 6.824 | 1 | 1.81600 | 46.62 |
| 2 | 133.444 | 2.244 | 2 | 1.81597 | 24.74 |
| 3 | 38.06 | 0.100 | | | |
| 4 | 14.797 | 2.691 | 3 | 1.84700 | 23.90 |
| 5 | 10.395 | 10.663 | | | |
| 6 | −9.235 | 2.041 | 4 | 1.84700 | 23.90 |
| 7 | −12.170 | 0.100 | | | |
| 8 | −86.640 | 1.945 | 5 | 1.81639 | 24.73 |
| 9 | 103.205 | 5.181 | 6 | 1.82512 | 44.62 |
| 10* | −20.118 | 28.904 | | | |
| 11 | ∞ | 0.700 | 7 | 1.51633 | 64.15 |
| 12 | ∞ | | | | |

The aspherical surface is applied to the first lens-surface.
$K = -0.018088, A_4 = -8.42250\text{E-}7, A_6 = 1.13202\text{E-}9$,
$A_8 = -9.25894\text{E-}12, A_{10} = -3.46440\text{E-}14$ The aspherical surface is applied to the tenth lens-surface.
$K = -0.034427, A_4 = 1.43120\text{E-}6, A_6 = -4.64287\text{E-}9$,
$A_8 = 3.09905\text{E-}11, A_{10} = -3.58020\text{E-}14$ FIGS. 44, 45 and 46 represent the aberration curves of the examples 43, 44 and 45, respectively, in the same way as the graphs of FIGS. 2 to 4 of the embodiment 1, mentioned before. The graphs show that the aberrations are fully compensated for.

EMBODIMENT 16

The reading lens in accordance with this embodiment is arranged in such a way that the third lens-surface and the fifth lens-surface are formed as an aspherical surface wherein the conic constant $K_3$ and $K_5$ of the aspherical surfaces satisfy the following conditions.

$$0.01 < K_3 < 0.15 \quad (16\text{-}1)$$

$$0.01 < K_5 < 0.06 \quad (16\text{-}2)$$

In the event in which the third and the fifth lens-surfaces are aspherical as this embodiment, the aspherical surface of the third lens-surface which satisfies the condition (16-1) represents an elliptic surface of revolution which is symmetric with respect to the minor axis thereof and the aspherical lens surface of the fifth lens-surface which satisfies the condition (16-2) also represents an elliptic surface of revolution which is symmetric with respect to the minor axis thereof. Also, in this case, the coma flare is minimized when the conditions (16-1) and (16-2) are satisfied.

Three examples (Examples 46 to 48) of this embodiment 16 are represented below in table forms numerically specifying the lens factors. The structure of the lens is the same as that of the embodiment 1.

EXAMPLE 46

| F = 43, | $F_{NO}$ = 3.0, | | $2\omega$ = 40, | m = 0.1102 | |
|---|---|---|---|---|---|
| i | $r_i$ | $d_i$ | j | $n_j$ | $v_j$ |
| 1 | 18.938 | 7.512 | 1 | 1.81600 | 46.62 |
| 2 | 90.981 | 2.975 | 2 | 1.84666 | 23.89 |

-continued

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 3* | 39.535 | 0.100 | | | |
| 4 | 17.819 | 2.734 | 3 | 1.84666 | 23.89 |
| 5* | 11.440 | 9.947 | | | |
| 6 | −8.743 | 2.043 | 4 | 1.84666 | 23.89 |
| 7 | −11.192 | 0.100 | | | |
| 8 | −110.116 | 2.322 | 5 | 1.84666 | 23.89 |
| 9 | 121.095 | 5.382 | 6 | 1.81600 | 46.62 |
| 10 | −20.874 | 26.639 | | | |
| 11 | ∞ | 0.700 | 7 | 1.51633 | 64.15 |
| 12 | ∞ | | | | |

The aspherical surface is applied to the third lens-surface.
$K=0.014692, A_4=5.41435E-8, A_6=1.34380E-9$,
$A_8=2.26825E-10, A_{10}=-5.76743E-13$
The aspherical surface is applied to the fifth lens-surface.
$K=0.054226, A_4=1.13197E-5, A_6=4.32462E-8$,
$A_8=8.48211E-10, A_{10}=-6.32821E-11$

EXAMPLE 47

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 18.221 | 6.722 | 1 | 1.72916 | 54.68 |
| 2 | 81.984 | 3.083 | 2 | 1.78472 | 25.71 |
| 3* | 42.237 | 0.100 | | | |
| 4 | 17.517 | 3.440 | 3 | 1.84666 | 23.89 |
| 5* | 11.326 | 9.638 | | | |
| 6 | −8.455 | 2.519 | 4 | 1.74077 | 27.79 |
| 7 | −11.193 | 0.100 | | | |
| 8 | −132.986 | 1.000 | 5 | 1.68893 | 31.08 |
| 9 | 62.563 | 5.543 | 6 | 1.72916 | 54.68 |
| 10 | −20.507 | 26.473 | | | |
| 11 | ∞ | 0.700 | 7 | 1.51633 | 64.15 |
| 12 | ∞ | | | | |

The aspherical surface is applied to the third lens-surface.
$K=0.144502, A_4=3.62575E-7, A_6=1.50066E-9$,
$A_8=1.99823E-10, A_{10}=-4.09608E-13$
The aspherical surface is applied to the fifth lens-surface.
$K=0.048302, A_4=1.05777E-5, A_6=3.15461E-8$,
$A_8=1.12625E-10, A_{10}=-8.09483E-11$

EXAMPLE 48

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 19.079 | 7.275 | 1 | 1.81600 | 46.62 |
| 2 | 112.387 | 2.474 | 2 | 1.83356 | 24.25 |
| 3* | 35.756 | 0.426 | | | |
| 4 | 14.850 | 2.413 | 3 | 1.84700 | 23.90 |
| 5* | 10.566 | 10.013 | | | |
| 6 | −8.570 | 1.901 | 4 | 1.84700 | 23.90 |
| 7 | −10.905 | 0.398 | | | |
| 8 | −88.369 | 2.127 | 5 | 1.82319 | 24.53 |
| 9 | 111.874 | 5.451 | 6 | 1.81802 | 46.14 |
| 10 | −20.584 | 27.205 | | | |
| 11 | ∞ | 0.700 | 7 | 1.51633 | 64.15 |
| 12 | ∞ | | | | |

The aspherical surface is applied to the third lens-surface.
$K=0.046746, A_4=1.51931E-7, A_6=1.68787E-9$,
$A_8=6.75386E-11, A_{10}=3.78550E-13$
The aspherical surface is applied to the fifth lens-surface.
$K=0.015008, A_4=3.96724E-6, A_6=2.94250E-8$,
$A_8=-3.50047E-10, A_{10}=-5.23492E-11$ FIGS. 47, 48 and 49 represent the aberration curves of the examples 46, 47 and 48, respectively, in the same way as the graphs of FIGS. 2 to 4 of the embodiment 1, mentioned before. The graphs show that the aberrations are fully compensated for.

EMBODIMENT 17

The reading lens in accordance with this embodiment is arranged in such a way that the third lens-surface and the fourth lens-surface are formed as an aspherical surface wherein the conic constant $K_3$ and $K_4$ of the aspherical surfaces satisfy the following conditions.

$$0.04 < K_3 < 0.45 \quad (17\text{-}1)$$

$$-0.07 < K_4 < -0.005 \quad (17\text{-}2)$$

In the event in which the third and the fourth lens-surfaces are aspherical as this embodiment, the aspherical surface of the third lens surface which satisfies the condition (17-1) represents an elliptic surface of revolution which is symmetric with respect to the minor axis thereof and the aspherical lens surface of the fourth-lens surface which satisfies the condition (17-2) represents an elliptic surface of revolution which is symmetric with respect to the line of apsides thereof. Also, in this case, the coma flare is minimized when the conditions (17-1) and (17-2) are satisfied.

Three examples (Examples 49 to 51) of this embodiment 17 are represented below in table forms numerically specifying the lens factors. The structure of the lens is the same as that of the embodiment 1.

EXAMPLE 49

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 19.182 | 7.526 | 1 | 1.81600 | 46.62 |
| 2 | 97.062 | 2.986 | 2 | 1.84666 | 23.89 |
| 3* | 39.594 | 0.100 | | | |
| 4* | 16.478 | 2.569 | 3 | 1.84666 | 23.89 |
| 5 | 10.971 | 10.126 | | | |
| 6 | −8.805 | 2.099 | 4 | 1.84666 | 23.89 |
| 7 | −11.302 | 0.100 | | | |
| 8 | −109.810 | 2.171 | 5 | 1.84666 | 23.89 |
| 9 | 121.500 | 5.292 | 6 | 1.81600 | 46.62 |
| 10 | −20.939 | 26.704 | | | |
| 11 | ∞ | 0.700 | 7 | 1.51633 | 64.15 |
| 12 | ∞ | | | | |

The aspherical surface is applied to the third lens-surface.
$K=0.141786, A_4=4.22518E-7, A_6=5.67333E-9$,
$A_8=1.93463E-10, A_{10}=-1.88519E-13$
The aspherical surface is applied to the fourth lens-surface.
$K=0.065006, A_4=-4.96803E-6, A_6=9.95590E-9$,
$A_8=1.20542E-11, A_{10}=5.65280E-12$

EXAMPLE 50

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 18.447 | 6.706 | 1 | 1.72916 | 54.68 |
| 2 | 88.776 | 3.119 | 2 | 1.78472 | 25.71 |

-continued

| F = 43, | $F_{NO}$ = 3.0, | | $2\omega$ = 40, | | m = 0.1102 |
|---|---|---|---|---|---|
| i | $r_i$ | $d_i$ | j | $n_j$ | $v_j$ |
| 3* | 44.440 | 0.100 | | | |
| 4* | 16.766 | 3.346 | 3 | 1.84666 | 23.89 |
| 5 | 10.932 | 9.754 | | | |
| 6 | −8.587 | 2.570 | 4 | 1.74077 | 27.79 |
| 7 | −11.378 | 0.100 | | | |
| 8 | −139.506 | 1.000 | 5 | 1.68893 | 31.08 |
| 9 | 61.711 | 5.498 | 6 | 1.72916 | 54.68 |
| 10 | −20.729 | 26.349 | | | |
| 11 | ∞ | 0.700 | 7 | 1.51633 | 64.15 |
| 12 | ∞ | | | | |

The aspherical surface is applied to the third lens-surface.
K=0.429091, $A_4$=9.59661E-7, $A_6$=1.46103E-8, $A_8$=2.54603E-10, $A_{10}$=−7.61938E-13

The aspherical surface is applied to the fourth lens-surface.
K=−0.052498, $A_4$=−4.48434E-6, $A_6$=2.47330E-8, $A_8$=1.81893E-10, $A_{10}$=5.49511E-12

EXAMPLE 51

| F = 43, | $F_{NO}$ = 3.0, | | $2\omega$ = 40, | | m = 0.1102 |
|---|---|---|---|---|---|
| i | $r_i$ | $d_i$ | j | $n_j$ | $v_j$ |
| 1 | 19.063 | 7.098 | 1 | 1.81600 | 46.60 |
| 2 | 115.497 | 2.223 | 2 | 1.84316 | 24.00 |
| 3* | 34.754 | 0.475 | | | |
| 4* | 13.579 | 2.336 | 3 | 1.84700 | 23.90 |
| 5 | 10.023 | 10.311 | | | |
| 6 | −8.488 | 1.878 | 4 | 1.83824 | 24.13 |
| 7 | −10.765 | 0.438 | | | |
| 8 | −86.003 | 2.182 | 5 | 1.84068 | 24.06 |
| 9 | 131.107 | 5.532 | 6 | 1.81690 | 46.39 |
| 10 | −20.536 | 27.045 | | | |
| 11 | ∞ | 0.700 | 7 | 1.51633 | 64.15 |
| 12 | ∞ | | | | |

The aspherical surface is applied to the third lens-surface.
K=0.041769, $A_4$=1.43347E-7, $A_6$=1.00566E-9, $A_8$=2.56045E-11, $A_{10}$=3.04923E-13

The aspherical surface is applied to the fourth lens-surface.
K=−0.005284, $A_4$=−7.20731E-7, $A_6$=3.30973E-9, $A_8$=1.14995E-10, $A_{10}$=2.56502E-12

FIGS. 50, 51 and 52 represent the aberration curves of the examples 49, 50 and 51, respectively, in the same way as the graphs of FIGS. 2 to 4 of the embodiment 1, mentioned before. The graphs show that the aberrations are fully compensated for.

EMBODIMENT 18

The reading lens in accordance with this embodiment is arranged in such a way that the third lens-surface and the tenth lens-surface are formed as an aspherical surface wherein the conic constant $K_3$ and $K_{10}$ of the aspherical surfaces satisfy the following conditions.

$$0.06 < K_3 < 1.3 \quad (18\text{-}1)$$

$$-0.065 < K_{10} < -0.008 \quad (18\text{-}2)$$

In the event in which the third and the tenth lens surfaces are aspherical as this embodiment, the aspherical surface of the third lens-surface which satisfies the condition (18-1) represents an elliptic surface of revolution which is symmetric with respect to the minor axis thereof or a hyperboloidal surface and the aspherical lens surface of the tenth lens surface which satisfies the condition (18-2) represents an elliptic surface of revolution which is symmetric with respect to the line of apsides or to the minor axis thereof. Also, in this case, the coma flare is minimized when the conditions (18-1) and (18-2) are satisfied.

Three examples (Examples 52 to 54) of this embodiment 18 are represented below in table forms numerically specifying the lens factors. The structure of the lens is the same as that of the embodiment 1.

EXAMPLE 52

| F = 43, | $F_{NO}$ = 3.0, | | $2\omega$ = 40, | | m = 0.1102 |
|---|---|---|---|---|---|
| i | $r_i$ | $d_i$ | j | $n_j$ | $v_j$ |
| 1 | 19.620 | 7.059 | 1 | 1.81600 | 46.62 |
| 2 | 108.907 | 2.632 | 2 | 1.84666 | 23.89 |
| 3* | 40.802 | 0.100 | | | |
| 4 | 16.176 | 2.899 | 3 | 1.84666 | 23.89 |
| 5 | 10.994 | 10.402 | | | |
| 6 | −9.265 | 2.360 | 4 | 1.84666 | 23.89 |
| 7 | −12.442 | 0.100 | | | |
| 8 | −141.098 | 2.410 | 5 | 1.84666 | 23.89 |
| 9 | 108.753 | 5.388 | 6 | 1.81600 | 46.62 |
| 10* | −21.031 | 27.023 | | | |
| 11 | ∞ | 0.700 | 7 | 1.51633 | 64.15 |
| 12 | ∞ | | | | |

The aspherical surface is applied to the third lens-surface.
K=0.760176, $A_4$=2.28114E-6, $A_6$=−1.11753E-8, $A_8$=−3.87600E-11, $A_{10}$=7.21837E-13

The aspherical surface is applied to the tenth lens-surface.
K=−0.050494, $A_4$=2.15463E-6, $A_6$=−6.94992E-9, $A_8$=4.70402E-11, $A_{10}$=−7.40005E-14

EXAMPLE 53

| F = 43, | $F_{NO}$ = 3.0, | | $2\omega$ = 40, | | m = 0.1102 |
|---|---|---|---|---|---|
| i | $r_i$ | $d_i$ | j | $n_j$ | $v_j$ |
| 1 | 18.501 | 6.268 | 1 | 1.72916 | 54.68 |
| 2 | 99.258 | 2.740 | 2 | 1.78472 | 25.71 |
| 3* | 44.620 | 0.100 | | | |
| 4 | 16.216 | 3.533 | 3 | 1.84666 | 23.89 |
| 5 | 10.832 | 10.317 | | | |
| 6 | −8.941 | 2.890 | 4 | 1.74077 | 27.79 |
| 7 | −12.478 | 0.100 | | | |
| 8 | −196.753 | 1.000 | 5 | 1.68893 | 31.08 |
| 9 | 57.919 | 6.122 | 6 | 1.72916 | 54.68 |
| 10* | −20.707 | 25.967 | | | |
| 11 | ∞ | 0.700 | 7 | 1.51633 | 64.15 |
| 12 | ∞ | | | | |

The aspherical surface is applied to the third lens-surface.
K=1.210521, $A_4$=2.86512E-6, $A_6$=−1.04323E-8, $A_8$=−4.92375E-11, $A_{10}$=7.13514E-13

The aspherical surface is applied to the tenth lens-surface.
K=−0.059681, $A_4$=2.63116E-6, $A_6$=−6.99761E-9, $A_8$=6.26243E-11, $A_{10}$=−9.35823E-14

EXAMPLE 54

| F = 43, | $F_{NO}$ = 3.0, | | $2\omega$ = 40, | | m = 0.1102 |
|---|---|---|---|---|---|
| i | $r_i$ | $d_i$ | j | $n_j$ | $v_j$ |
| 1 | 19.082 | 7.041 | 1 | 1.81600 | 46.60 |
| 2 | 114.666 | 2.157 | 2 | 1.84312 | 24.00 |
| 3* | 34.722 | 0.396 | | | |

-continued

| F = 43, | $F_{NO}$ = 3.0, | 2ω = 40, | | m = 0.1102 | |
|---|---|---|---|---|---|
| i | $r_i$ | $d_i$ | j | $n_j$ | $v_j$ |
| 4 | 13.444 | 2.326 | 3 | 1.84700 | 23.90 |
| 5 | 9.973 | 10.264 | | | |
| 6 | −8.678 | 1.883 | 4 | 1.84433 | 23.97 |
| 7 | −11.083 | 0.387 | | | |
| 8 | −87.129 | 2.206 | 5 | 1.83899 | 24.11 |
| 9 | 131.837 | 5.550 | 6 | 1.81808 | 46.13 |
| 10* | −20.550 | 27.341 | | | |
| 11 | ∞ | 0.700 | 7 | 1.51633 | 64.15 |
| 12 | ∞ | | | | |

Figures 54A, 54B, 54C, 54D:
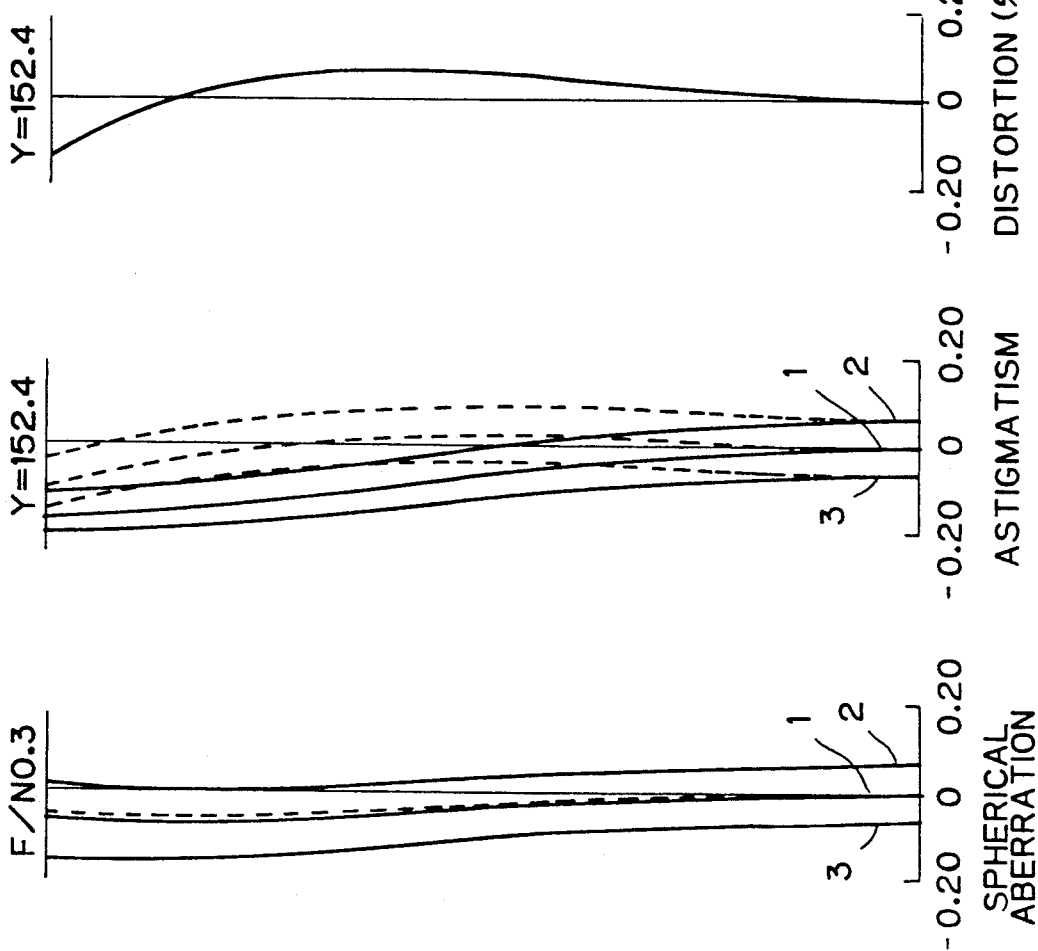

The aspherical surface is applied to the third lens-surface.
$K = 0.063843, A_4 = 2.43121E-7, A_6 = -2.31338E-9, A_8 = -1.33121E-11, A_{10} = 2.43194E-13$ The aspherical surface is applied to the tenth lens-surface.
$K = -0.008317, A_4 = 3.77233E-7, A_6 = -9.46070E-10, A_8 = -2.05265E-12, A_{10} = -3.37376E-16$ FIGS. 53, 54 and 55 represent the aberration curves of the examples 52, 53 and 54, respectively, in the same way as the graphs of FIGS. 2 to 4 of the embodiment 1, mentioned before. The graphs show that the aberrations are fully compensated for.

EMBODIMENT 19

The reading lens in accordance with this embodiment is arranged in such a way that the fourth lens-surface and the sixth-lens surface are formed as an aspherical surface wherein the conic constant $K_4$ and $K_6$ of the aspherical surfaces satisfy the following conditions.

$$-0.07 < K_4 < -0.005 \quad (19-1)$$

$$-0.08 < K_6 < -0.008 \quad (19-2)$$

In the event in which the fourth and the sixth lens surfaces are aspherical as this embodiment, the aspherical surface of the fourth-lens surface which satisfies the condition (19-1) represents an elliptic surface of revolution which is symmetric with respect to the line of apsides thereof and the aspherical lens surface of the sixth lens-surface which satisfies the condition (19-2) also represents an elliptic surface of revolution which is symmetric with respect to the line of apsides thereof. Also, in this case, the coma flare is minimized when the conditions (19-1) and (19-2) are satisfied.

Three examples (Examples 55 to 57) of this embodiment 19 are represented below in table forms numerically specifying the lens factors. The structure of the lens is the same as that of the embodiment 1.

EXAMPLE 55

| F = 43, | $F_{NO}$ = 3.0, | 2ω = 40, | | m = 0.1102 | |
|---|---|---|---|---|---|
| i | $r_i$ | $d_i$ | j | $n_j$ | $v_j$ |
| 1 | 19.189 | 7.127 | 1 | 1.81600 | 46.62 |
| 2 | 107.801 | 2.314 | 2 | 1.84666 | 23.89 |
| 3 | 35.850 | 0.241 | | | |
| 4* | 13.549 | 2.336 | 3 | 1.84666 | 23.89 |
| 5 | 9.982 | 10.076 | | | |
| 6* | −9.059 | 1.987 | 4 | 1.84666 | 23.89 |
| 7 | −11.704 | 0.303 | | | |
| 8 | −85.839 | 2.264 | 5 | 1.84666 | 23.89 |
| 9 | 199.991 | 5.600 | 6 | 1.81600 | 46.62 |
| 10 | −20.392 | 27.402 | | | |
| 11 | ∞ | 0.700 | 7 | 1.51633 | 64.15 |
| 12 | ∞ | | | | |

The aspherical surface is applied to the fourth lens-surface.
$K = -0.006985, A_4 = -8.70244E-7, A_6 = 6.70807E-9, A_8 = 8.14270E-11, A_{10} = -2.27282E-12$ The aspherical surface is applied to the sixth lens-surface.
$K = 0.003408, A_4 = -5.39522E-6, A_6 = 1.33757E-8, A_8 = -7.73716E-10, A_{10} = -7.68430E-12$

EXAMPLE 56

| F = 43, | $F_{NO}$ = 3.0, | 2ω = 40, | | m = 0.1102 | |
|---|---|---|---|---|---|
| i | $r_i$ | $d_i$ | j | $n_j$ | $v_j$ |
| 1 | 18.502 | 5.596 | 1 | 1.72916 | 54.68 |
| 2 | 110.031 | 1.996 | 2 | 1.78472 | 25.71 |
| 3 | 44.010 | 0.100 | | | |
| 4* | 14.516 | 3.330 | 3 | 1.84666 | 23.89 |
| 5 | 10.120 | 9.890 | | | |
| 6* | −9.913 | 3.028 | 4 | 1.74077 | 27.79 |
| 7 | −13.696 | 0.100 | | | |
| 8 | −133.748 | 1.000 | 5 | 1.68893 | 31.08 |
| 9 | 77.290 | 5.283 | 6 | 1.72916 | 54.68 |
| 10 | −21.353 | 27.806 | | | |
| 11 | ∞ | 0.700 | 7 | 1.51633 | 64.15 |
| 12 | ∞ | | | | |

The aspherical surface is applied to the fourth lens-surface.
$K = -0.016907, A_4 = -1.58692E-6, A_6 = -9.84751E-9, A_8 = 2.59646E-10, A_{10} = -3.43233E-12$ The aspherical surface is applied to the sixth lens-surface.
$K = -0.006914, A_4 = -1.08449E-5, A_6 = 1.26257E-7, A_8 = -4.61022E-9, A_{10} = 4.68973E-11$

EXAMPLE 57

| F = 43, | $F_{NO}$ = 3.0, | 2ω = 40, | | m = 0.1102 | |
|---|---|---|---|---|---|
| i | $r_i$ | $d_i$ | j | $n_j$ | $v_j$ |
| 1 | 19.476 | 6.657 | 1 | 1.81600 | 46.60 |
| 2 | 136.781 | 1.981 | 2 | 1.79302 | 25.45 |
| 3 | 39.624 | 0.100 | | | |
| 4* | 15.943 | 2.876 | 3 | 1.84700 | 23.90 |
| 5 | 10.819 | 9.753 | | | |
| 6* | −10.645 | 2.292 | 4 | 1.84700 | 23.90 |
| 7 | −14.515 | 0.100 | | | |
| 8 | −86.300 | 1.526 | 5 | 1.79578 | 25.36 |
| 9 | 85.752 | 4.882 | 6 | 1.83500 | 42.70 |
| 10 | −20.658 | 28.786 | | | |
| 11 | ∞ | 0.700 | 7 | 1.51633 | 64.15 |
| 12 | ∞ | | | | |

The aspherical surface is applied to the fourth lens-surface.
$K = -0.045443, A_4 = -3.56915E-6, A_6 = -1.26981E-8, A_8 1.63937E-10, A_{10} = -3.04759E-12$ The aspherical surface is applied to the sixth lens-surface.
$K = 0.002306, A_4 = -8.61933E-6, A_6 = 5.71006E-8, A_8 = -2.89816E-9, A_{10} = 3.14123E-11$ FIGS. 56, 57 and 58 represent the aberration curves of the examples 55, 56 and 57, respectively, in the same way as the graphs of FIGS. 2 to 4 of the embodiment 1, mentioned before. The graphs show that the aberrations are fully compensated for.

EMBODIMENT 20

The reading lens in accordance with this embodiment is arranged in such a way that the fourth lens-surface and the seventh lens-surface are formed as an aspherical surface wherein the conic constant $K_4$ and $K_7$ of the aspherical surfaces satisfy the following conditions.

$$-0.06 < K_4 < -0.015 \tag{20-1}$$

$$-0.013 < K_7 < 0 \tag{20-2}$$

In the event in which the fourth and the seventh lens-surfaces are aspherical as this embodiment, the aspherical surface of the fourth lens-surface which satisfies the condition (20-1) represents an elliptic surface of revolution which is symmetric with respect to the line of apsides thereof and the aspherical surface of the seventh lens-surface which satisfies the condition (20-2) represents an elliptic surface of revolution which is symmetric with respect to the line of apsides thereof or to the minor axis thereof. Also, in this case, the coma flare is minimized when the conditions (20-1) and (20-2) are satisfied.

Three examples (Examples 58 to 60) of this embodiment 20 are represented below in table forms numerically specifying the lens factors. The structure of the lens is the same as that of the embodiment 1.

EXAMPLE 58

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 19.642 | 6.636 | 1 | 1.81600 | 46.62 |
| 2 | 113.553 | 2.288 | 2 | 1.84666 | 23.89 |
| 3 | 41.837 | 0.100 | | | |
| 4* | 16.243 | 3.050 | 3 | 1.84666 | 23.89 |
| 5 | 11.011 | 10.368 | | | |
| 6 | −9.843 | 2.580 | 4 | 1.84666 | 23.89 |
| 7* | −13.354 | 0.100 | | | |
| 8 | −116.491 | 1.691 | 5 | 1.84666 | 23.89 |
| 9 | 158.692 | 4.770 | 6 | 1.81600 | 46.62 |
| 10 | −20.934 | 27.787 | | | |
| 11 | ∞ | 0.700 | 7 | 1.51633 | 64.15 |
| 12 | ∞ | | | | |

The aspherical surface is applied to the fourth lens-surface.
K = −0.036686, $A_4$ = −2.88158E-6, $A_6$ = −8.07566E-9, $A_8$ = 3.97835E-11, $A_{10}$ = −1.95659E-12

The aspherical surface is applied to the seventh lens-surface.
K = −0.004991, $A_4$ = 5.49047E-6, $A_6$ = −4.71493E-8, $A_8$ = 1.01960E-9, $A_{10}$ = −3.91207E-12

EXAMPLE 59

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 18.178 | 4.803 | 1 | 1.72916 | 54.68 |
| 2 | 109.538 | 1.272 | 2 | 1.78472 | 25.71 |
| 3 | 45.590 | 0.100 | | | |
| 4* | 15.334 | 3.850 | 3 | 1.84666 | 23.89 |
| 5 | 10.363 | 10.239 | | | |
| 6 | −10.178 | 3.186 | 4 | 1.74077 | 27.79 |
| 7* | −14.274 | 0.100 | | | |
| 8 | −176.476 | 1.000 | 5 | 1.68893 | 31.08 |
| 9 | 77.144 | 5.171 | 6 | 1.72916 | 54.68 |
| 10 | −22.216 | 27.846 | | | |
| 11 | ∞ | 0.700 | 7 | 1.51633 | 64.15 |
| 12 | ∞ | | | | |

The aspherical surface is applied to the fourth lens-surface.
K = −0.016945, $A_4$ = −1.39906E-6, $A_6$ = −1.87671E-8, $A_8$ = 2.77907E-10, $A_{10}$ = −2.70287E-12

The aspherical surface is applied to the seventh lens surface.
K = 0.000458, $A_4$ = 6.70937E-6, $A_6$ = −7.10084E-8, $A_8$ = 1.23191E-9, $A_{10}$ = −6.02898E-12

EXAMPLE 60

| F = 43, | $F_{NO}$ = 3.0, | | 2ω = 40, | m = 0.1102 | |
|---|---|---|---|---|---|
| i | $r_i$ | $d_i$ | j | $n_j$ | $v_j$ |
| 1 | 19.403 | 6.300 | 1 | 1.81600 | 46.60 |
| 2 | 138.210 | 1.728 | 2 | 1.77622 | 26.02 |
| 3 | 40.787 | 0.100 | | | |
| 4* | 17.105 | 3.184 | 3 | 1.84700 | 23.90 |
| 5 | 11.224 | 10.084 | | | |
| 6 | −10.624 | 2.411 | 4 | 1.84700 | 23.90 |
| 7* | −14.625 | 0.100 | | | |
| 8 | −91.884 | 1.034 | 5 | 1.79461 | 25.40 |
| 9 | 82.505 | 4.936 | 6 | 1.83500 | 42.70 |
| 10 | −20.791 | 28.871 | | | |
| 11 | ∞ | 0.700 | 7 | 1.51633 | 64.15 |
| 12 | ∞ | | | | |

The aspherical surface is applied to the fourth lens-surface.
K = −0.055108, $A_4$ = −3.86205E-6, $A_6$ = −1.64787E-8, $A_8$ = 1.32954E-10, $A_{10}$ = −2.29872E-12

The aspherical surface is applied to the seventh lens-surface.
K = −0.012391, $A_4$ = 5.70612E-6, $A_6$ = −4.10811E-8, $A_8$ = 9.18516E-10, $A_{10}$ = −4.99304E-12

FIGS. 59, 60 and 61 represent the aberration curves of the examples 58, 59 and 60, respectively, in the same way as the graphs of FIGS. 2 to 4 of the embodiment 1, mentioned before. The graphs show that the aberrations are fully compensated for.

EMBODIMENT 21

The reading lens in accordance with this embodiment is arranged in such a way that the fourth lens-surface and the eighth lens-surface are formed as an aspherical surface wherein the conic constant $K_4$ and $K_8$ of the aspherical surfaces satisfy the following conditions.

$$-0.07 < K_4 < -0.015 \tag{21-1}$$

$$3 < K_8 < 14 \tag{21-2}$$

In the event in which the fourth and the eighth lens-surfaces are aspherical as this embodiment, the aspherical surface of the fourth lens-surface which satisfies the condition (21-1) represents an elliptic surface of revolution which is symmetric with respect to the line of apsides thereof and the aspherical surface of the eighth lens-surface which satisfies the condition (21-2) represents an elliptic surface of revolution which is symmetric with respect to the minor axis thereof. Also, in this case, the coma flare is minimized when the conditions (21-1) and (21-2) are satisfied.

Three examples (Examples 61 to 63) of this embodiment 21 are represented below in table forms numerically specifying the lens factors. The structure of the lens is the same as that of the embodiment 1.

EXAMPLE 61

| F = 43, | $F_{NO}$ = 3.0, | 2ω = 40, | m = 0.1102 | | |
|---|---|---|---|---|---|
| i | $r_i$ | $d_i$ | j | $n_j$ | $\nu_j$ |
| 1 | 19.207 | 7.200 | 1 | 1.81600 | 46.62 |
| 2 | 105.166 | 2.423 | 2 | 1.84666 | 23.89 |
| 3 | 36.428 | 0.248 | | | |
| 4* | 13.868 | 2.341 | 3 | 1.84666 | 23.89 |
| 5 | 10.076 | 10.121 | | | |
| 6 | −9.021 | 2.028 | 4 | 1.84666 | 23.89 |
| 7 | −11.658 | 0.146 | | | |
| 8* | −90.122 | 2.227 | 5 | 1.84666 | 23.89 |
| 9 | 178.173 | 5.532 | 6 | 1.81600 | 46.62 |
| 10 | −20.484 | 27.390 | | | |
| 11 | ∞ | 0.700 | 7 | 1.51633 | 64.15 |
| 12 | ∞ | | | | |

The aspherical surface is applied to the fourth lens-surface.
K = −0.017135, $A_4$ = −1.85147E-6, $A_6$ = 3.56325E-9, $A_8$ = 7.12655E-11, $A_{10}$ = −3.22025E-12

The aspherical surface is applied to the eighth lens-surface.
K = 3.481316, $A_4$ = −7.35258E-7, $A_6$ = 5.12661E-9, $A_8$ = 8.60239E-12, $A_{10}$ = 7.77872E-15

EXAMPLE 62

| F = 43, | $F_{NO}$ = 3.0, | 2ω = 40, | m = 0.1102 | | |
|---|---|---|---|---|---|
| i | $r_i$ | $d_i$ | j | $n_j$ | $\nu_j$ |
| 1 | 18.433 | 6.416 | 1 | 1.72916 | 54.68 |
| 2 | 98.943 | 2.611 | 2 | 1.78472 | 25.71 |
| 3 | 40.864 | 0.100 | | | |
| 4* | 14.143 | 3.002 | 3 | 1.84666 | 23.89 |
| 5 | 9.993 | 10.218 | | | |
| 6 | −9.139 | 2.732 | 4 | 1.74077 | 27.79 |
| 7 | −12.450 | 0.100 | | | |
| 8* | −118.620 | 1.000 | 5 | 1.68893 | 31.08 |
| 9 | 73.106 | 5.720 | 6 | 1.72916 | 54.68 |
| 10 | −20.181 | 26.800 | | | |
| 11 | ∞ | 0.700 | 7 | 1.51633 | 64.15 |
| 12 | ∞ | | | | |

The aspherical surface is applied to the fourth lens-surface.
K = −0.025593, $A_4$ = −2.57314E-6, $A_6$ = −3.09492E-9, $A_8$ = 7.36530E-11, $A_{10}$ = −3.83370E-12

The aspherical surface is applied to the eighth lens-surface.
K = 13.663905, $A_4$ = −1.96136E-6, $A_6$ = 8.14017E-9, $A_8$ = −3.98388E-12, $A_{10}$ = −1.90745E-14

EXAMPLE 63

| F = 43, | $F_{NO}$ = 3.0, | 2ω = 40, | m = 0.1102 | | |
|---|---|---|---|---|---|
| i | $r_i$ | $d_i$ | j | $n_j$ | $\nu_j$ |
| 1 | 19.303 | 7.106 | 1 | 1.81600 | 46.60 |
| 2 | 122.733 | 2.392 | 2 | 1.80299 | 25.13 |
| 3 | 39.214 | 0.100 | | | |
| 4* | 16.083 | 2.735 | 3 | 1.84700 | 23.90 |
| 5 | 10.777 | 10.107 | | | |
| 6 | −9.982 | 2.133 | 4 | 1.84700 | 23.90 |
| 7 | −13.304 | 0.100 | | | |
| 8* | −87.603 | 1.724 | 5 | 1.78277 | 25.79 |
| 9 | 78.887 | 5.146 | 6 | 1.82981 | 43.68 |
| 10 | −20.508 | 27.747 | | | |
| 11 | ∞ | 0.700 | 7 | 1.51633 | 64.15 |
| 12 | ∞ | | | | |

The aspherical surface is applied to the fourth lens-surface.
K = −0.063935, $A_4$ = −4.80398E-6, $A_6$ = −1.37707E-8, $A_8$ = 8.14848E-11, $A_{10}$ = −3.20387E-12

The aspherical surface is applied to the eighth lens-surface.
K = 8.485037, $A_4$ = −1.88648E-6, $A_6$ = 1.41590E-8, $A_8$ = −2.54793E-11, $A_{10}$ = 6.45001E-14

FIGS. 62, 63 and 64 represent the aberration curves of the examples 61, 62 and 63, respectively, in the same way as the graphs of FIGS. 2 to 4 of the embodiment 1, mentioned before. The graphs show that the aberrations are fully compensated for.

EMBODIMENT 22

The reading lens in accordance with this embodiment is arranged in such a way that the third lens-surface and the seventh lens-surface are formed as an aspherical surface wherein the conic constant $K_3$ and $K_7$ of the aspherical surfaces satisfy the following conditions.

$$0.03 < K_3 < 1.6 \tag{22-1}$$

$$-0.02 < K_7 < 0.01 \tag{22-2}$$

In the event in which the third and the seventh lens-surfaces are aspherical as this embodiment, the aspherical surface of the third lens-surface which satisfies the condition (22-1) represents an elliptic surface of revolution which is symmetric with respect to the minor axis thereof and the aspherical lens surface of the seventh lens-surface which satisfies the condition (22-2) represents an elliptic surface of revolution which is symmetric with respect to the line of apsides thereof or to the minor axis thereof. Also, in this case, the coma flare is minimized when the conditions (22-1) and (22-2) are satisfied.

Three examples (Examples 64 to 66) of this embodiment 22 are represented below in table forms numerically specifying the lens factors. The structure of the lens is the same as that of the embodiment 1.

EXAMPLE 64

| F = 43, | $F_{NO}$ = 3.0, | 2ω = 40, | m = 0.1102 | | |
|---|---|---|---|---|---|
| i | $r_i$ | $d_i$ | j | $n_j$ | $\nu_j$ |
| 1 | 19.100 | 7.078 | 1 | 1.81600 | 46.62 |
| 2 | 106.567 | 2.221 | 2 | 1.84666 | 23.89 |
| 3* | 34.975 | 0.391 | | | |
| 4 | 13.420 | 2.333 | 3 | 1.84666 | 23.89 |
| 5 | 9.961 | 10.250 | | | |
| 6 | −8.701 | 1.913 | 4 | 1.84666 | 23.89 |
| 7* | −11.126 | 0.415 | | | |
| 8 | −86.690 | 2.268 | 5 | 1.84666 | 23.89 |
| 9 | 175.664 | 5.620 | 6 | 1.81600 | 46.62 |
| 10 | −20.471 | 27.099 | | | |
| 11 | ∞ | 0.700 | 7 | 1.51633 | 64.15 |
| 12 | ∞ | | | | |

The aspherical surface is applied to the third lens-surface.
K = 0.049941, $A_4$ = 1.90123E-7, $A_6$ = −1.80318E-9, $A_8$ = −8.85395E-12, $A_{10}$ = 2.18204E-13

The aspherical surface is applied to the seventh lens-surface.
$K=-0.003627, A_4=2.08008E-6, A_6=-7.45899E-9,$
$A_8=9.03218E-11, A_{10}=2.23502E-12$

EXAMPLE 65

| | $F = 43,$ | $F_{NO} = 3.0,$ | $2\omega = 40,$ | $m = 0.1102$ | |
|---|---|---|---|---|---|
| i | $r_i$ | $d_i$ | j | $n_j$ | $v_j$ |
| 1 | 18.076 | 5.777 | 1 | 1.72916 | 54.68 |
| 2 | 96.989 | 2.467 | 2 | 1.78472 | 25.71 |
| 3* | 46.063 | 0.100 | | | |
| 4 | 17.021 | 3.738 | 3 | 1.84666 | 23.89 |
| 5 | 11.080 | 10.051 | | | |
| 6 | −9.214 | 3.024 | 4 | 1.74077 | 27.79 |
| 7* | −12.870 | 0.100 | | | |
| 8 | −224.899 | 1.000 | 5 | 1.68893 | 31.08 |
| 9 | 62.509 | 5.798 | 6 | 1.72916 | 54.68 |
| 10 | −21.775 | 26.028 | | | |
| 11 | ∞ | 0.700 | 7 | 1.51633 | 64.15 |
| 12 | ∞ | | | | |

The aspherical surface is applied to the third lens-surface.
$K=1.441772, A_4=3.21264E-6, A_6=-1.00346E-8,$
$A_8=-5.65401E-11, A_{10}=6.80639E-13$ The aspherical surface is applied to the seventh lens-surface.
$K=0.001046, A_4=7.54201E-6, A_6=-7.76313E-8,$
$A_8=1.44243E-9, A_{10}=-3.16283E-12$

EXAMPLE 66

| | $F = 43,$ | $F_{NO} = 3.0,$ | $2\omega = 40,$ | $m = 0.1102$ | |
|---|---|---|---|---|---|
| i | $r_i$ | $d_i$ | j | $n_j$ | $v_j$ |
| 1 | 19.472 | 6.917 | 1 | 1.81600 | 46.60 |
| 2 | 138.738 | 2.257 | 2 | 1.80306 | 25.13 |
| 3* | 38.432 | 0.100 | | | |
| 4 | 15.562 | 2.784 | 3 | 1.84700 | 23.90 |
| 5 | 10.784 | 9.827 | | | |
| 6 | −9.904 | 2.149 | 4 | 1.84700 | 23.99 |
| 7* | −13.391 | 0.100 | | | |
| 8 | −99.262 | 2.177 | 5 | 1.80758 | 24.99 |
| 9 | 90.038 | 5.414 | 6 | 1.82866 | 43.91 |
| 10 | −20.730 | 27.950 | | | |
| 11 | ∞ | 0.700 | 7 | 1.51633 | 64.15 |
| 12 | ∞ | | | | |

The aspherical surface is applied to the third lens-surface.
$K=0.640355, A_4=2.04058E-6, A_6=-1.10226E-8,$
$A_8=-9.86561E-11, A_{10}=1.31621E-12$ The aspherical surface is applied to the seventh lens-surface.
$K=-0.014549, A_4=5.67421E-6, A_6=-2.14190E-8,$
$A_8=7.41180E-10, A_{10}=-2.73448E-12$ FIGS. 65, 66 and 67 represent the aberration curves of the examples 64, 65 and 66, respectively, in the same way as the graphs of FIGS. 2 to 4 of the embodiment 1, mentioned before. The graphs show that the aberrations are fully compensated for.

EMBODIMENT 23

The reading lens in accordance with this embodiment is arranged in such a way that the third lens-surface and the eighth lens-surface are formed as an aspherical surface wherein the conic constant $K_3$ and $K_8$ of the aspherical surfaces satisfy the following conditions.

$$0.14 < K_3 < 0.65 \quad (23\text{-}1)$$

$$2.1 < K_8 < 9.8 \quad (23\text{-}2)$$

In the event in which the third and the eighth lens-surfaces are aspherical as this embodiment, the aspherical surface of the third lens-surface which satisfies the condition (23-1) represents an elliptic surface of revolution which is symmetric with respect to the minor axis thereof and the aspherical lens surface of the eighth lens-surface which satisfies the condition (23-2) also represents an elliptic surface of revolution which is symmetric with respect to the minor axis thereof. Also, in this case, the coma flare is minimized when the conditions (23-1) and (23-2) are satisfied.

Three examples (Examples 67 to 69) of this embodiment 23 are represented below in table forms numerically specifying the lens factors. The structure of the lens is the same as that of the embodiment 1.

EXAMPLE 67

| | $F = 43,$ | $F_{NO} = 3.0,$ | $2\omega = 40,$ | $m = 0.1102$ | |
|---|---|---|---|---|---|
| i | $r_i$ | $d_i$ | j | $n_j$ | $v_j$ |
| 1 | 19.272 | 7.169 | 1 | 1.81600 | 46.62 |
| 2 | 106.754 | 2.389 | 2 | 1.84666 | 23.89 |
| 3* | 36.422 | 0.302 | | | |
| 4 | 13.763 | 2.346 | 3 | 1.84666 | 23.89 |
| 5 | 10.051 | 10.028 | | | |
| 6 | −8.947 | 2.006 | 4 | 1.84666 | 23.89 |
| 7 | −11.554 | 0.223 | | | |
| 8* | −92.732 | 2.287 | 5 | 1.84666 | 23.89 |
| 9 | 165.714 | 5.590 | 6 | 1.81600 | 46.62 |
| 10 | −20.605 | 28.572 | | | |
| 11 | ∞ | 0.700 | 7 | 1.51633 | 64.15 |
| 12 | ∞ | | | | |

The aspherical surface is applied to the third lens-surface.
$K=0.244687, A_4=8.58630E-7, A_6=-6.74626E-9,$
$A_8=-4.41147E-11, A_{10}=7.18050E-13$ The aspherical surface is applied to the eighth lens-surface.
$K=3.636485, A_4=-7.47760E-7, A_6=5.39439E-9,$
$A_8=7.69728E-12, A_{10}=1.17800E-14$

EXAMPLE 68

| | $F = 43,$ | $F_{NO} = 3.0,$ | $2\omega = 40,$ | $m = 0.1102$ | |
|---|---|---|---|---|---|
| i | $r_i$ | $d_i$ | j | $n_j$ | $v_j$ |
| 1 | 19.150 | 7.072 | 1 | 1.81600 | 46.60 |
| 2 | 115.568 | 2.212 | 2 | 1.84001 | 24.08 |
| 3* | 35.289 | 0.364 | | | |
| 4 | 13.519 | 2.319 | 3 | 1.84700 | 23.90 |
| 5 | 9.961 | 10.091 | | | |
| 6 | −8.904 | 1.920 | 4 | 1.84700 | 23.90 |
| 7 | −11.439 | 0.324 | | | |
| 8* | −87.428 | 2.198 | 5 | 1.83128 | 24.31 |
| 9 | 123.148 | 5.524 | 6 | 1.81963 | 45.79 |
| 10 | −20.584 | 28.715 | | | |
| 11 | ∞ | 0.700 | 7 | 1.51633 | 64.15 |
| 12 | ∞ | | | | |

The aspherical surface is applied to the third lens-surface.
$K=0.148534, A_4=5.44880E-7, A_6=-4.46336E-9,$
$A_8=-3.08116E-11, A_{10}=4.69510E-13$ The aspherical surface is applied to the eighth lens-surface.
$K=2.192532, A_4=-4.61660E-7, A_6=3.37438E-9,$
$A_8=1.00874E-11, A_{10}=2.93553E-14$

EXAMPLE 69

| i | $r_i$ | $d_i$ | j | $n_j$ | $\nu_j$ |
|---|---|---|---|---|---|
| | F = 43, | $F_{NO}$ = 3.0, | $2\omega$ = 40, | m = 0.1102 | |
| 1 | 18.552 | 2.661 | 1 | 1.72916 | 54.68 |
| 2 | 97.280 | 0.100 | 2 | 1.78472 | 25.71 |
| 3* | 40.372 | 1.000 | | | |
| 4 | 14.149 | 5.667 | 3 | 1.84666 | 23.89 |
| 5 | 10.096 | 10.033 | | | |
| 6 | −8.902 | 6.508 | 4 | 1.74077 | 27.79 |
| 7 | −12.030 | 2.718 | | | |
| 8* | −120.239 | 0.100 | 5 | 1.68893 | 31.08 |
| 9 | 68.426 | 2.905 | 6 | 1.72916 | 54.68 |
| 10 | −20.378 | 28.265 | | | |
| 11 | ∞ | 0.700 | 7 | 1.51633 | 64.15 |
| 12 | ∞ | | | | |

The aspherical surface is applied to the third lens-surface.
$K=0.606360, A_4=1.56700E-6, A_6=-8.87205E-9,$
$A_8=-7.15108E-11, A_{10}=1.03180E-12$ The aspherical surface is applied to the eighth lens-surface.
$K=9.710604, A_4=-1.33760E-6, A_6=6.51084E-9,$
$A_8=-5.34907E-12, A_{10}=1.91580E-14$ FIGS. 68, 69 and 70 represent the aberration curves of the examples 49, 50 and 51, respectively, in the same way as the graphs of FIGS. 2 to 4 of the embodiment 1, mentioned before. The graphs show that the aberrations are fully compensated for.

EMBODIMENT 24

The reading lens in accordance with this embodiment is arranged in such a way that the sixth lens-surface and the seventh lens-surface are formed as an aspherical surface wherein the conic constant $K_6$ and $K_7$ of the aspherical surfaces satisfy the following conditions.

$$0.0 < K_6 < 0.004 \quad (24\text{-}1)$$

$$-0.008 < K_7 < -0.003 \quad (24\text{-}2)$$

In the event in which the sixth and the seventh lens-surfaces are aspherical as this embodiment, the aspherical surface of the sixth lens-surface which satisfies the condition (24-1) represents an elliptic surface of revolution which is symmetric with respect to the minor axis thereof and the aspherical lens surface of the seventh lens-surface which satisfies the condition (24-2) represents an elliptic surface of revolution which is symmetric with respect to the line of apsides thereof. Also, in this case, the coma flare is minimized when the conditions (24-1) and (24-2) are satisfied.

Three examples (Examples 70 to 72) of this embodiment 24 are represented below in table forms numerically specifying the lens factors. The structure of the lens is the same as that of the embodiment 1.

EXAMPLE 70

| i | $r_i$ | $d_i$ | j | $n_j$ | $\nu_j$ |
|---|---|---|---|---|---|
| | F = 43, | $F_{NO}$ = 3.0, | $2\omega$ = 40, | m = 0.1102 | |
| 1 | 19.164 | 7.074 | 1 | 1.81600 | 46.62 |
| 2 | 109.122 | 2.229 | 2 | 1.84666 | 23.89 |
| 3 | 35.275 | 0.270 | | | |
| 4 | 13.354 | 2.356 | 3 | 1.84666 | 23.89 |
| 5 | 9.923 | 10.179 | | | |
| 6* | −8.958 | 1.950 | 4 | 1.84666 | 23.89 |
| 7* | −11.563 | 0.406 | | | |

-continued

| i | $r_i$ | $d_i$ | j | $n_j$ | $\nu_j$ |
|---|---|---|---|---|---|
| | F = 43, | $F_{NO}$ = 3.0, | $2\omega$ = 40, | m = 0.1102 | |
| 8 | −86.486 | 2.308 | 5 | 1.84666 | 23.89 |
| 9 | 195.539 | 5.657 | 6 | 1.81600 | 46.62 |
| 10 | −20.386 | 28.381 | | | |
| 11 | ∞ | 0.700 | 7 | 1.51633 | 64.15 |
| 12 | ∞ | | | | |

The aspherical surface is applied to the sixth lens-surface.
$K=0.001431, A_4=-3.64280E-6, A_6=1.28349E-8,$
$A_8=-4.91953E-10, A_{10}=2.13780E-12$ The aspherical surface is applied to the seventh lens-surface.
$K=-0.003178, A_4=1.79000E-6, A_6=-9.66198E-9,$
$A_8=1.98000E-10, A_{10}=2.95790E-12$

EXAMPLE 71

| i | $r_i$ | $d_i$ | j | $n_j$ | $\nu_j$ |
|---|---|---|---|---|---|
| | F = 43, | $F_{NO}$ = 3.0, | $2\omega$ = 40, | m = 0.1102 | |
| 1 | 18.873 | 6.167 | 1 | 1.72916 | 54.68 |
| 2 | 116.599 | 2.319 | 2 | 1.78472 | 25.71 |
| 3 | 40.833 | 0.100 | | | |
| 4 | 13.298 | 2.918 | 3 | 1.84666 | 23.89 |
| 5 | 9.763 | 10.192 | | | |
| 6* | −9.403 | 2.768 | 4 | 1.74077 | 27.79 |
| 7* | −12.964 | 0.100 | | | |
| 8 | −99.699 | 1.000 | 5 | 1.68893 | 31.08 |
| 9 | 86.995 | 5.581 | 6 | 1.72916 | 54.68 |
| 10 | −19.782 | 28.853 | | | |
| 11 | ∞ | 0.700 | 7 | 1.51633 | 64.15 |
| 12 | ∞ | | | | |

The aspherical surface is applied to the sixth lens-surface.
$K=0.000370, A_4=-8.37370E-6, A_6=1.36348E-8,$
$A_8=-1.38903E-9, A_{10}=5.63380E-11$ The aspherical surface is applied to the seventh lens-surface.
$K=-0.003190, A_4=2.20100E-6, A_6=-1.86949E-8,$
$A_8=5.73854E-10, A_{10}=4.04140E-12$

EXAMPLE 72

| i | $r_i$ | $d_i$ | j | $n_j$ | $\nu_j$ |
|---|---|---|---|---|---|
| | F = 43, | $F_{NO}$ = 3.0, | $2\omega$ = 40, | m = 0.1102 | |
| 1 | 19.670 | 6.848 | 1 | 1.81600 | 46.60 |
| 2 | 138.378 | 2.054 | 2 | 1.83195 | 24.29 |
| 3 | 37.237 | 0.100 | | | |
| 4 | 13.726 | 2.643 | 3 | 1.84700 | 23.90 |
| 5 | 10.061 | 10.093 | | | |
| 6* | −10.030 | 2.183 | 4 | 1.84700 | 23.90 |
| 7* | −13.597 | 0.100 | | | |
| 8 | −92.487 | 2.408 | 5 | 1.81605 | 24.74 |
| 9 | 118.396 | 5.680 | 6 | 1.82240 | 45.19 |
| 10 | −20.381 | 29.167 | | | |
| 11 | ∞ | 0.700 | 7 | 1.51633 | 64.15 |
| 12 | ∞ | | | | |

The aspherical surface is applied to the sixth lens-surface.
$K=0.002945, A_4=-7.96870E-6, A_6=1.93752E-8,$
$A_8=-1.81827E-9, A_{10}=5.09500E-11$ The aspherical surface is applied to the seventh lens-surface.
$K=-0.007394, A_4=3.02040E-6, A_6=-1.87387E-8,$
$A_8=7.64002E-10, A_{10}=2.86630E-12$ FIGS. 71, 72 and 73 represent the aberration curves of the examples 70, 71 and 72, respectively, in the same way as the graphs of FIGS. 2 to 4 of the embodiment 1, mentioned before. The graphs show that the aberrations are fully compensated for.

EMBODIMENT 25

The reading lens in accordance with this embodiment is arranged in such a way that the seventh lens-surface and the tenth lens-surface are formed as an aspherical surface wherein the conic constant $K_7$ and $K_{10}$ of the aspherical surfaces satisfy the following conditions.

$$-0.065 < K_7 < 0.0 \tag{25-1}$$

$$-0.0085 < K_{10} < 0.0045 \tag{25-2}$$

In the event in which the seventh and the tenth lens-surfaces are aspherical as this embodiment, the aspherical surface of the seventh lens-surface which satisfies the condition (25-1) represents an elliptic surface of revolution which is symmetric with respect to the line of apsides thereof and the aspherical lens surface of the tenth lens-surface which satisfies the condition (25-2) represents an elliptic surface of revolution which is symmetric with respect to the line of apsides thereof or to the minor axis thereof. Also, in this case, the coma flare is minimized when the conditions (25-1) and (25-2) are satisfied.

Three examples (Examples 73 to 75) of this embodiment 25 are represented below in table forms numerically specifying the lens factors. The structure of the lens is the same as that of the embodiment 1.

EXAMPLE 73

| F = 43, | $F_{NO}$ = 3.0, | 2ω = 40, | m = 0.1102 | | |
|---|---|---|---|---|---|
| i | $r_i$ | $d_i$ | j | $n_j$ | $v_j$ |
| 1 | 19.124 | 7.056 | 1 | 1.81600 | 46.62 |
| 2 | 109.004 | 2.189 | 2 | 1.84666 | 23.89 |
| 3 | 34.942 | 0.365 | | | |
| 4 | 13.210 | 2.334 | 3 | 1.84666 | 23.89 |
| 5 | 9.850 | 10.278 | | | |
| 6 | −8.787 | 1.918 | 4 | 1.84666 | 23.89 |
| 7* | −11.275 | 0.448 | | | |
| 8 | −86.248 | 2.295 | 5 | 1.84666 | 23.89 |
| 9 | 182.973 | 5.649 | 6 | 1.81600 | 46.62 |
| 10* | −20.402 | 27.099 | | | |
| 11 | ∞ | 0.700 | 7 | 1.51633 | 64.15 |
| 12 | ∞ | | | | |

The aspherical surface is applied to the seventh lens-surface.
K = −0.003578, $A_4$ = 2.24682E-6, $A_6$ = −3.61065E-9, $A_8$ = 8.83588E-11, $A_{10}$ = 4.11251E-13
The aspherical surface is applied to the tenth lens-surface.
K = −0.004164, $A_4$ = 1.63465E-7, $A_6$ = −3.85131E-10, $A_8$ = 4.62027E-12, $A_{10}$ = 1.98425E-14

EXAMPLE 74

| F = 43, | $F_{NO}$ = 3.0, | 2ω = 40, | m = 0.1102 | | |
|---|---|---|---|---|---|
| i | $r_i$ | $d_i$ | j | $n_j$ | $v_j$ |
| 1 | 19.151 | 5.762 | 1 | 1.72916 | 54.68 |
| 2 | 119.161 | 1.763 | 2 | 1.78472 | 25.71 |
| 3 | 44.562 | 0.100 | | | |
| 4 | 13.176 | 3.196 | 3 | 1.84666 | 23.89 |
| 5 | 9.449 | 10.489 | | | |
| 6 | −10.848 | 3.561 | 4 | 1.74077 | 27.79 |
| 7* | −16.559 | 0.100 | | | |
| 8 | −146.457 | 1.000 | 5 | 1.68893 | 31.08 |
| 9 | 81.221 | 5.971 | 6 | 1.72916 | 54.68 |
| 10* | −19.532 | 28.367 | | | |
| 11 | ∞ | 0.700 | 7 | 1.51633 | 64.15 |
| 12 | ∞ | | | | |

The aspherical surface is applied to the seventh lens-surface.
K = −0.058301, $A_4$ = 1.29324E-5, $A_6$ = −4.07523E-8, $A_8$ = 6.08806E-10, $A_{10}$ = 7.34871E-12
The aspherical surface is applied to the tenth lens-surface.
K = 0.003711, $A_4$ = −3.45880E-7, $A_6$ = −1.72019E-9, $A_8$ = 1.20527E-10, $A_{10}$ = 1.02839E-13

EXAMPLE 75

| F = 43, | $F_{NO}$ = 3.0, | 2ω = 40, | m = 0.1102 | | |
|---|---|---|---|---|---|
| i | $r_i$ | $d_i$ | j | $n_j$ | $v_j$ |
| 1 | 20.066 | 6.798 | 1 | 1.81600 | 46.60 |
| 2 | 143.122 | 1.952 | 2 | 1.83028 | 24.34 |
| 3 | 38.755 | 0.100 | | | |
| 4 | 13.442 | 2.694 | 3 | 1.84700 | 23.90 |
| 5 | 9.829 | 10.377 | | | |
| 6 | −10.769 | 2.450 | 4 | 1.84700 | 23.90 |
| 7* | −15.223 | 0.100 | | | |
| 8 | −99.397 | 2.477 | 5 | 1.78691 | 25.65 |
| 9 | 102.561 | 5.712 | 6 | 1.81977 | 45.75 |
| 10* | −20.143 | 28.410 | | | |
| 11 | ∞ | 0.700 | 7 | 1.51633 | 64.15 |
| 12 | ∞ | | | | |

The aspherical surface is applied to the seventh lens-surface.
K = −0.037968, $A_4$ = 9.25355E-6, $A_6$ = −1.74783E-8, $A_8$ = 6.62639E-10, $A_{10}$ = −8.97527E-12
The aspherical surface is applied to the tenth lens-surface.
K = −0.007783, $A_4$ = 4.07081E-7, $A_6$ = −3.64396E-9, $A_8$ = 6.16320E-11, $A_{10}$ = 1.17530E-13

FIGS. 74, 75 and 76 represent the aberration curves of the examples 73, 74 and 75, respectively, in the same way as the graphs of FIGS. 2 to 4 of the embodiment 1, mentioned before. The graphs show that the aberrations are fully compensated for.

EMBODIMENT 26

The reading lens in accordance with this embodiment is arranged in such a way that the fourth lens-surface and the fifth lens-surface are formed as an aspherical surface wherein the conic constant $K_4$ and $K_5$ of the aspherical surfaces satisfy the following conditions.

$$-0.05 < K_4 < 0.0 \tag{26-1}$$

$$0.0 < K_5 < 0.03 \tag{26-2}$$

In the event in which the fourth and the fifth lens-surfaces are aspherical as this embodiment, the aspherical surface of the fourth lens-surface which satisfies the condition (26-1) represents an elliptic surface of revolution which is symmetric with respect to the line of apsides thereof and the aspherical surface of the fifth lens-surface which satisfies the condition (26-2) represents an elliptic surface of revolution which is symmetric with respect to the minor axis thereof. Also, in this case, the coma flare is minimized when the conditions (26-1) and (26-2) are satisfied.

Three examples (Examples 76 to 78) of this embodiment 20 are represented below in table forms numerically specifying the lens factors. The structure of the lens is the same as that of the embodiment 1.

EXAMPLE 76

| F = 43, $F_{NO}$ = 3.0, 2ω = 40, m = 0.1102 | | | | | |
|---|---|---|---|---|---|
| i | $r_i$ | $d_i$ | j | $n_j$ | $v_j$ |
| 1 | 19.046 | 7.551 | 1 | 1.81600 | 46.62 |
| 2 | 93.121 | 2.979 | 2 | 1.84666 | 23.89 |
| 3 | 39.678 | 0.166 | | | |
| 4* | 17.394 | 2.626 | 3 | 1.84666 | 23.89 |
| 5* | 11.326 | 9.936 | | | |
| 6 | −8.628 | 2.021 | 4 | 1.84666 | 23.89 |
| 7 | −11.045 | 0.100 | | | |
| 8 | −106.856 | 2.264 | 5 | 1.84666 | 23.89 |
| 9 | 124.633 | 5.395 | 6 | 1.81600 | 46.62 |
| 10 | −20.757 | 26.667 | | | |
| 11 | ∞ | 0.700 | 7 | 1.51633 | 64.15 |
| 12 | ∞ | | | | |

The aspherical surface is applied to the fourth lens-surface.
K = −0.041853, $A_4$ = −2.67591E-6, $A_6$ = 6.54582E-9, $A_8$ = −4.53012E-10, $A_{10}$ = −7.96081E-12

The aspherical surface is applied to the fifth lens-surface.
K = 0.025492, $A_4$ = 5.60604E-6, $A_6$ = 5.41652E-8, $A_8$ = −2.96158E-11, $A_{10}$ = −1.32509E-10

EXAMPLE 77

| F = 43, $F_{NO}$ = 3.0, 2ω = 40, m = 0.1102 | | | | | |
|---|---|---|---|---|---|
| i | $r_i$ | $d_i$ | j | $n_j$ | $v_j$ |
| 1 | 18.248 | 6.745 | 1 | 1.72916 | 54.68 |
| 2 | 82.092 | 3.043 | 2 | 1.78472 | 25.71 |
| 3 | 42.144 | 0.100 | | | |
| 4* | 17.038 | 3.297 | 3 | 1.84666 | 23.89 |
| 5* | 11.170 | 9.722 | | | |
| 6 | −8.401 | 2.499 | 4 | 1.74077 | 27.79 |
| 7 | −11.109 | 0.100 | | | |
| 8 | −127.247 | 1.000 | 5 | 1.68893 | 31.08 |
| 9 | 63.803 | 5.476 | 6 | 1.72916 | 54.68 |
| 10 | −20.455 | 26.539 | | | |
| 11 | ∞ | 0.700 | 7 | 1.51633 | 64.15 |
| 12 | ∞ | | | | |

The aspherical surface is applied to the fourth lens-surface.
K = −0.034230, $A_4$ = −2.34438E-6, $A_6$ = 2.61863E-9, $A_8$ = −3.38785E-10, $A_{10}$ = −8.02220E-12

The aspherical surface is applied to the fifth lens-surface.
K = 0.023637, $A_4$ = 5.64922E-6, $A_6$ = 5.91132E-8, $A_8$ = −8.64913E-10, $A_{10}$ = −1.64031E-10

EXAMPLE 78

| F = 43, $F_{NO}$ = 3.0, 2ω = 40, m = 0.1102 | | | | | |
|---|---|---|---|---|---|
| i | $r_i$ | $d_i$ | j | $n_j$ | $v_j$ |
| 1 | 19.073 | 7.226 | 1 | 1.81600 | 46.60 |
| 2 | 112.217 | 2.406 | 2 | 1.83485 | 24.21 |
| 3 | 35.559 | 0.402 | | | |
| 4* | 14.608 | 2.398 | 3 | 1.84700 | 23.90 |
| 5* | 10.473 | 10.205 | | | |
| 6 | −8.552 | 1.902 | 4 | 1.84700 | 23.90 |
| 7 | −10.868 | 0.338 | | | |
| 8 | −87.390 | 2.107 | 5 | 1.82891 | 24.38 |
| 9 | 115.106 | 5.435 | 6 | 1.81847 | 46.04 |
| 10 | −20.569 | 27.100 | | | |
| 11 | ∞ | 0.700 | 7 | 1.51633 | 64.15 |
| 12 | ∞ | | | | |

The aspherical surface is applied to the fourth lens-surface.
K = −0.010867, $A_4$ = −9.32056E-7, $A_6$ = −1.57828E-9, $A_8$ = −2.40019E-10, $A_{10}$ = −7.85481E-12

The aspherical surface is applied to the fifth lens-surface.
K = 0.008758, $A_4$ = 2.70342E-6, $A_6$ = 8.33841E-9, $A_8$ = −1.18136E-9, $A_{10}$ = −6.47271E-11

FIGS. 77, 78 and 79 represent the aberration curves of the examples 76, 77 and 78, respectively, in the same way as the graphs of FIGS. 2 to 4 of the embodiment 1, mentioned before. The graphs show that the aberrations are fully compensated for.

EMBODIMENT 27

The reading lens in accordance with this embodiment is arranged in such a way that the fifth lens-surface and the tenth lens-surface are formed as an aspherical surface wherein the conic constant $K_5$ and $K_{10}$ of the aspherical surfaces satisfy the following conditions.

$$0.0 < K_5 < 0.0234 \tag{27-1}$$

$$-0.0577 < K_{10} < 0.0 \tag{27-2}$$

In the event in which the fifth and the tenth lens-surfaces are aspherical as this embodiment, the aspherical surface of the fifth lens-surface which satisfies the condition (27-1) represents an elliptic surface of revolution which is symmetric with respect to the minor axis thereof and the aspherical surface of the tenth lens-surface which satisfies the condition (21-2) represents an elliptic surface of revolution which is symmetric with respect to the line of apsides thereof. Also, in this case, the coma flare is minimized when the conditions (27-1) and (27-2) are satisfied.

Three examples (Examples 79 to 81) of this embodiment 27 are represented below in table forms numerically specifying the lens factors. The structure of the lens is the same as that of the embodiment 1.

EXAMPLE 79

| F = 43, $F_{NO}$ = 3.0, 2ω = 40, m = 0.1102 | | | | | |
|---|---|---|---|---|---|
| i | $r_i$ | $d_i$ | j | $n_j$ | $v_j$ |
| 1 | 19.956 | 6.368 | 1 | 1.81600 | 46.62 |
| 2 | 114.185 | 2.016 | 2 | 1.84666 | 23.89 |
| 3 | 41.764 | 0.100 | | | |
| 4 | 16.202 | 3.304 | 3 | 1.84666 | 23.89 |
| 5* | 11.050 | 10.827 | | | |
| 6 | −9.962 | 2.724 | 4 | 1.84666 | 23.89 |
| 7 | −13.600 | 0.100 | | | |
| 8 | −136.593 | 1.586 | 5 | 1.84666 | 23.89 |
| 9 | 118.474 | 4.798 | 6 | 1.81600 | 46.62 |
| 10* | −21.270 | 28.037 | | | |
| 11 | ∞ | 0.700 | 7 | 1.51633 | 64.15 |
| 12 | ∞ | | | | |

The aspherical surface is applied to the fifth lens-surface.

$K=0.021229, A_4=4.42128E-6, A_6=5.25264E-8$,
$A_8=-1.11641E-9, A_{10}=3.29450E-11$

The aspherical surface is applied to the tenth lens-surface.

$K=-0.052434, A_4=2.26624E-6, A_6=-9.42767E-9$,
$A_8=6.61839E-11, A_{10}=-1.47251E-13$

EXAMPLE 80

| | F = 43, | $F_{NO}$ = 3.0, | 2ω = 40, | m = 0.1102 | |
|---|---|---|---|---|---|
| i | $r_i$ | $d_i$ | j | $n_j$ | $v_j$ |
| 1 | 18.776 | 5.920 | 1 | 1.72916 | 54.68 |
| 2 | 105.635 | 2.206 | 2 | 1.78472 | 25.71 |
| 3 | 41.421 | 0.100 | | | |
| 4 | 14.265 | 3.171 | 3 | 1.84666 | 23.89 |
| 5* | 10.219 | 10.222 | | | |
| 6 | −9.228 | 2.788 | 4 | 1.74077 | 27.79 |
| 7 | −12.643 | 0.100 | | | |
| 8 | −128.400 | 1.000 | 5 | 1.68893 | 31.08 |
| 9 | 69.461 | 5.488 | 6 | 1.72916 | 54.68 |
| 10* | −20.696 | 27.811 | | | |
| 11 | ∞ | 0.700 | 7 | 1.51633 | 64.15 |
| 12 | ∞ | | | | |

The aspherical surface is applied to the fifth lens-surface.

$K=0.007367, A_4=2.10350E-6, A_6=6.70922E-9$,
$A_8=-1.73856E-9, A_{10}=3.48093E-11$

The aspherical surface is applied to the tenth lens-surface.

$K=-0.037805, A_4=1.64953E-6, A_6=-4.20483E-9$,
$A_8=2.42853E-11, A_{10}=-6.97238E-14$

EXAMPLE 81

| | F = 43, | $F_{NO}$ = 3.0, | 2ω = 40, | m = 0.1102 | |
|---|---|---|---|---|---|
| i | $r_i$ | $d_i$ | j | $n_j$ | $v_j$ |
| 1 | 19.094 | 7.030 | 1 | 1.81600 | 46.60 |
| 2 | 112.988 | 2.143 | 2 | 1.84383 | 23.98 |
| 3 | 34.773 | 0.365 | | | |
| 4 | 13.451 | 2.327 | 3 | 1.84700 | 23.90 |
| 5* | 9.970 | 10.171 | | | |
| 6 | −8.765 | 1.887 | 4 | 1.83693 | 24.16 |
| 7 | −11.218 | 0.381 | | | |
| 8 | −86.648 | 2.185 | 5 | 1.83795 | 24.13 |
| 9 | 132.868 | 5.528 | 6 | 1.81834 | 46.07 |
| 10* | −20.548 | 27.535 | | | |
| 11 | ∞ | 0.700 | 7 | 1.51633 | 64.15 |
| 12 | ∞ | | | | |

The aspherical surface is applied to the fifth lens-surface.

$K=0.003293, A_4=1.16906E-6, A_6=-1.54676E-8$,
$A_8=-4.61742E-10, A_{10}=7.43398E-12$

The aspherical surface is applied to the tenth lens-surface.

$K=-0.007910, A_4=3.68268E-7, A_6=-9.54707E-10$,
$A_8=-2.60274E-12, A_{10}=-9.36492E-15$

FIGS. 80, 81 and 82 represent the aberration curves of the examples 79, 80 and 81, respectively, in the same way as the graphs of FIGS. 2 to 4 of the embodiment 1, mentioned before. The graphs show that the aberrations are fully compensated for.

EMBODIMENT 28

The reading lens in accordance with this embodiment is arranged in such a way that the seventh lens-surface and the eighth lens-surface are formed as an aspherical surface wherein the conic constant $K_7$ and $K_8$ of the aspherical surfaces satisfy the following conditions.

$$-0.04 < K_7 < -0.01 \quad (28\text{-}1)$$

$$3.0 < K_8 < 12.0 \quad (28\text{-}2)$$

In the event in which the seventh and the eighth lens-surfaces are aspherical as this embodiment, the aspherical surface of the seventh lens-surface which satisfies the condition (28-1) represents an elliptic surface of revolution which is symmetric with respect to the line of apsides thereof and the aspherical surface of the eighth lens-surface which satisfies the condition (28-2) represents an elliptic surface of revolution which is symmetric with respect to the minor axis thereof. Also, in this case, the coma flare is minimized when the conditions (28-1) and (28-2) are satisfied.

Three examples (Examples 82 to 84) of this embodiment 28 are represented below in table forms numerically specifying the lens factors. The structure of the lens is the same as that of the embodiment 1.

EXAMPLE 82

| | F = 43, | $F_{NO}$ = 3.0, | 2ω = 40, | m = 0.1102 | |
|---|---|---|---|---|---|
| i | $r_i$ | $d_i$ | j | $n_j$ | $v_j$ |
| 1 | 19.721 | 7.033 | 1 | 1.81600 | 46.62 |
| 2 | 123.644 | 2.248 | 2 | 1.84666 | 23.89 |
| 3 | 37.921 | 0.100 | | | |
| 4 | 13.270 | 2.528 | 3 | 1.84666 | 23.89 |
| 5 | 9.777 | 10.140 | | | |
| 6 | −9.972 | 2.277 | 4 | 1.84666 | 23.89 |
| 7* | −13.597 | 0.163 | | | |
| 8* | −99.449 | 2.432 | 5 | 1.84666 | 23.89 |
| 9 | 212.254 | 5.753 | 6 | 1.81600 | 46.62 |
| 10 | −20.142 | 28.832 | | | |
| 11 | ∞ | 0.700 | 7 | 1.51633 | 64.15 |
| 12 | ∞ | | | | |

The aspherical surface is applied to the seventh lens-surface.

$K=-0.016895, A_4=7.22440E-6, A_6=-4.25001E-8$,
$A_8=1.83357E-10, A_{10}=-9.10720E-13$

The aspherical surface is applied to the eighth lens-surface.

$K=3.453284, A_4=-6.16150E-7, A_6=-1.02581E-8$,
$A_8=-9.20626E-11, A_{10}=8.49010E-13$

EXAMPLE 83

| | F = 43, | $F_{NO}$ = 3.0, | 2ω = 40, | m = 0.1102 | |
|---|---|---|---|---|---|
| i | $r_i$ | $d_i$ | j | $n_j$ | $v_j$ |
| 1 | 19.151 | 5.999 | 1 | 1.72916 | 54.68 |
| 2 | 122.201 | 2.059 | 2 | 1.78472 | 25.71 |
| 3 | 43.545 | 0.100 | | | |
| 4 | 13.125 | 3.038 | 3 | 1.84666 | 23.89 |
| 5 | 9.516 | 10.276 | | | |
| 6 | −10.185 | 3.109 | 4 | 1.74077 | 27.79 |
| 7* | −14.788 | 0.100 | | | |
| 8* | −117.284 | 1.000 | 5 | 1.68893 | 31.08 |
| 9 | 90.416 | 5.773 | 6 | 1.72916 | 54.68 |
| 10 | −19.473 | 29.285 | | | |
| 11 | ∞ | 0.700 | 7 | 1.51633 | 64.15 |
| 12 | ∞ | | | | |

The aspherical surface is applied to the seventh lens-surface.

$K=-0.019076, A_4=8.00200E-6, A_6=-6.17111E-8$,
$A_8=9.31325E-11, A_{10}=-1.38310E-12$

The aspherical surface is applied to the eighth lens-surface.

$K=11.504993, A_4=-1.50660E-6, A_6=-1.66300E-8,$
$A_8=-1.15246E-10, A_{10}=9.63470E-13$

EXAMPLE 84

| | F = 43, | $F_{NO}$ = 3.0, | 2ω = 40, | m = 0.1102 | |
|---|---|---|---|---|---|
| i | $r_i$ | $d_i$ | j | $n_j$ | $v_j$ |
| 1 | 20.154 | 6.809 | 1 | 1.81600 | 46.60 |
| 2 | 142.983 | 1.986 | 2 | 1.83321 | 24.26 |
| 3 | 38.918 | 0.100 | | | |
| 4 | 13.585 | 2.715 | 3 | 1.84700 | 23.90 |
| 5 | 9.929 | 10.269 | | | |
| 6 | −10.626 | 2.446 | 4 | 1.84700 | 23.90 |
| 7* | −14.966 | 0.100 | | | |
| 8* | −100.480 | 2.242 | 5 | 1.79016 | 25.54 |
| 9 | 118.795 | 5.573 | 6 | 1.81963 | 45.79 |
| 10 | −20.103 | 29.564 | | | |
| 11 | ∞ | 0.700 | 7 | 1.51633 | 64.15 |
| 12 | ∞ | | | | |

The aspherical surface is applied to the seventh lens-surface.
$K=-0.030037, A_4=8.62790E-6, A_6=-4.95073E-8,$
$A_8=2.57278E-10, A_{10}=-2.26130E-12$ The aspherical surface is applied to the eighth lens-surface.
$K=4.422731, A_4=-7.67970E-7, A_6=-1.47281E-8, A_8=-1.34642E-10, A_{10}=1.05020E-12$ FIGS. 83, 84 and 85 represent the aberration curves of the examples 82, 83 and 84, respectively, in the same way as the graphs of FIGS. 2 to 4 of the embodiment 1, mentioned before. The graphs show that the aberrations are fully compensated for.

EMBODIMENT 29

The reading lens in accordance with this embodiment is arranged in such a way that the eighth lens-surface and the tenth lens-surface are formed as an aspherical surface wherein the conic constant $K_8$ and $K_{10}$ of the aspherical surfaces satisfy the following conditions.

$$0.9 < K_8 < 20.0 \quad (29\text{-}1)$$

$$-0.04 < K_{10} < 0.0 \quad (29\text{-}2)$$

In the event in which the eighth and the tenth lens-surfaces are aspherical as this embodiment, the aspherical surface of the eighth lens-surface which satisfies the condition (29-1) represents an elliptic surface of revolution which is symmetric with respect to the minor axis thereof and the aspherical surface of the tenth lens-surface which satisfies the condition (29-2) represents an elliptic surface of revolution which is symmetric with respect to the line of apsides thereof. Also, in this case, the coma flare is minimized when the conditions (29-1) and (29-2) are satisfied.

Three examples (Examples 85 to 87) of this embodiment 29 are represented below in table forms numerically specifying the lens factors. The structure of the lens is the same as that of the embodiment 1.

EXAMPLE 85

| | F = 43, | $F_{NO}$ = 3.0, | 2ω = 40, | m = 0.1102 | |
|---|---|---|---|---|---|
| i | $r_i$ | $d_i$ | j | $n_j$ | $v_j$ |
| 1 | 19.177 | 7.050 | 1 | 1.81600 | 46.62 |
| 2 | 109.628 | 2.194 | 2 | 1.84666 | 23.89 |
| 3 | 35.145 | 0.329 | | | |
| 4 | 13.236 | 2.337 | 3 | 1.84666 | 23.89 |
| 5 | 9.863 | 10.272 | | | |
| 6 | −8.791 | 1.923 | 4 | 1.84666 | 23.89 |
| 7 | −11.287 | 0.386 | | | |
| 8* | −87.953 | 2.284 | 5 | 1.84666 | 23.89 |
| 9 | 178.235 | 5.628 | 6 | 1.81600 | 46.62 |
| 10* | −20.483 | 27.223 | | | |
| 11 | ∞ | 0.700 | 7 | 1.51633 | 64.15 |
| 12 | ∞ | | | | |

The aspherical surface is applied to the eighth lens-surface.
$K=1.699649, A_4=-3.52644E-7, A_6=5.95386E-10$
$A_8=-1.52788E-12, A_{10}=1.05899E-13$ The aspherical surface is applied to the tenth lens-surface.
$K=-0.010017, A_4=4.96471E-7, A_6=-1.89235E-9,$
$A_8=-2.34710E-12, A_{10}=3.64297E-14$

EXAMPLE 86

| | F = 43, | $F_{NO}$ = 3.0, | 2ω = 40, | m = 0.1102 | |
|---|---|---|---|---|---|
| i | $r_i$ | $d_i$ | j | $n_j$ | $v_j$ |
| 1 | 19.108 | 5.946 | 1 | 1.72916 | 54.68 |
| 2 | 122.696 | 2.043 | 2 | 1.78472 | 25.71 |
| 3 | 42.758 | 0.100 | | | |
| 4 | 13.441 | 3.115 | 3 | 1.84666 | 23.89 |
| 5 | 9.744 | 10.408 | | | |
| 6 | −9.642 | 2.858 | 4 | 1.74077 | 27.79 |
| 7 | −13.545 | 0.100 | | | |
| 8* | −115.595 | 1.000 | 5 | 1.68893 | 31.08 |
| 9 | 82.515 | 5.692 | 6 | 1.72916 | 54.68 |
| 10* | −19.815 | 27.971 | | | |
| 11 | ∞ | 0.700 | 7 | 1.51633 | 64.15 |
| 12 | ∞ | | | | |

The aspherical surface is applied to the eighth lens-surface.
$K=18.302181, A_4=-2.64416E-6, A_6=5.47168E-9,$
$A_8=1.23761E-11, A_{10}=5.67434E-13$ The aspherical surface is applied to the tenth lens-surface.
$K=-0.023854, A_4=1.74573E-6, A_6=-1.37818E-8,$
$A_8=1.01485E-11, A_{10}=4.24066E-13$

EXAMPLE 87

| | F = 43, | $F_{NO}$ = 3.0, | 2ω = 40, | m = 0.1102 | |
|---|---|---|---|---|---|
| i | $r_i$ | $d_i$ | j | $n_j$ | $v_j$ |
| 1 | 20.180 | 6.765 | 1 | 1.81600 | 46.60 |
| 2 | 133.962 | 1.892 | 2 | 1.83899 | 24.11 |
| 3 | 38.742 | 0.100 | | | |
| 4 | 13.778 | 2.746 | 3 | 1.84700 | 23.90 |
| 5 | 10.067 | 10.419 | | | |
| 6 | −10.154 | 2.209 | 4 | 1.84700 | 23.90 |
| 7 | −13.859 | 0.100 | | | |
| 8* | −93.882 | 2.191 | 5 | 1.78937 | 25.57 |
| 9 | 95.067 | 5.388 | 6 | 1.82274 | 45.19 |
| 10* | −20.316 | 28.699 | | | |
| 11 | ∞ | 0.700 | 7 | 1.51633 | 64.15 |
| 12 | ∞ | | | | |

The aspherical surface is applied to the eighth lens-surface.
$K=10.542519, A_4=-2.08168E-6, A_6=5.05388E-9,$
$A_8=6.92412E-12, A_{10}=8.64832E-13$ The aspherical surface is applied to the tenth lens-surface.

$K=-0.033960, A_4=1.98952E-6, A_6=-1.33608E-8,$
$A_8=8.78627E-12, A_{10}=4.08485E-13$

FIGS. 86, 87, and 88 represent the aberration curves of the examples 85, 86 and 87, respectively, in the same way as the graphs of FIGS. 2 to 4 of the embodiment 1, mentioned before. The graphs show that the aberrations are fully compensated for.

EMBODIMENT 30

The reading lens in accordance with this embodiment is arranged in such a way that the sixth lens-surface and the tenth lens-surface are formed as an aspherical surface wherein the conic constant $K_6$ and $K_{10}$ of the aspherical surfaces satisfy the following conditions.

$$0.0 < K_6 < 0.0255 \tag{30-1}$$

$$-0.0086 < K_{10} < 0.0014 \tag{30-2}$$

In the event in which the sixth and the tenth lens-surfaces are aspherical as this embodiment, the aspherical surface of the sixth lens-surface which satisfies the condition (30-1) represents an elliptic surface of revolution which is symmetric with respect to the minor axis thereof and the aspherical surface of the tenth lens-surface which satisfies the condition (30-2) represents an elliptic surface of revolution which is symmetric with respect to the line of apsides thereof or the minor axis thereof. Also, in this case, the coma flare is minimized when the conditions (30-1) and (30-2) are satisfied.

Three examples (Examples 88 to 90) of this embodiment 30 are represented below in table forms numerically specifying the lens factors. The structure of the lens is the same as that of the embodiment 1.

EXAMPLE 88

| F = 43, | $F_{NO}$ = 3.0, | 2ω = 40, | m = 0.1102 | | |
|---|---|---|---|---|---|
| i | $r_i$ | $d_i$ | j | $n_j$ | $v_j$ |
| 1 | 19.109 | 7.054 | 1 | 1.81600 | 46.62 |
| 2 | 108.746 | 2.183 | 2 | 1.84666 | 23.89 |
| 3 | 34.857 | 0.401 | | | |
| 4 | 13.185 | 2.324 | 3 | 1.84666 | 23.89 |
| 5 | 9.837 | 10.277 | | | |
| 6* | −8.757 | 1.915 | 4 | 1.84666 | 23.89 |
| 7 | −11.211 | 0.462 | | | |
| 8 | −85.264 | 2.289 | 5 | 1.84666 | 23.89 |
| 9 | 180.635 | 5.645 | 6 | 1.81600 | 46.62 |
| 10* | −20.398 | 27.076 | | | |
| 11 | ∞ | 0.700 | 7 | 1.51633 | 64.15 |
| 12 | ∞ | | | | |

The aspherical surface is applied to the sixth lens-surface.
$K=0.002157, A_4=-3.48432E-6, A_6=1.83188E-9,$
$A_8=-3.67833E-10, A_{10}=-4.08177E-12$ The aspherical surface is applied to the tenth lens-surface.
$K=-0.004193, A_4=1.74326E-7, A_6=-4.90269E-10$
$A_8=3.14068E-12, A_{10}=2.19955E-14$

EXAMPLE 89

| F = 43, | $F_{NO}$ = 3.0, | 2ω = 40, | m = 0.1102 | | |
|---|---|---|---|---|---|
| i | $r_i$ | $d_i$ | j | $n_j$ | $v_j$ |
| 1 | 19.064 | 5.988 | 1 | 1.72916 | 54.68 |
| 2 | 117.160 | 2.101 | 2 | 1.78472 | 25.71 |
| 3 | 43.094 | 0.100 | | | |
| 4 | 13.184 | 3.094 | 3 | 1.84666 | 23.89 |
| 5 | 9.515 | 10.304 | | | |
| 6* | −10.558 | 3.314 | 4 | 1.74077 | 27.79 |
| 7 | −15.515 | 0.100 | | | |
| 8 | −104.164 | 1.000 | 5 | 1.68893 | 31.08 |
| 9 | 86.842 | 5.998 | 6 | 1.72916 | 54.68 |
| 10* | −19.111 | 28.037 | | | |
| 11 | ∞ | 0.700 | 7 | 1.51633 | 64.15 |
| 12 | ∞ | | | | |

The aspherical surface is applied to the sixth lens-surface.
$K=0.023181, A_4=-2.26235E-5, A_6=1.21559E-8,$
$A_8=-4.49105E-9, A_{10}=5.09494E-11$ The aspherical surface is applied to the tenth lens-surface.
$K=0.001269, A_4=8.51319E-9, A_6=-3.04630E-9,$
$A_8=8.54878E-11, A_{10}=1.48194E-14$

EXAMPLE 90

| F = 43, | $F_{NO}$ = 3.0, | 2ω = 40, | m = 0.1102 | | |
|---|---|---|---|---|---|
| i | $r_i$ | $d_i$ | j | $n_j$ | $v_j$ |
| 1 | 19.344 | 7.026 | 1 | 1.81600 | 46.60 |
| 2 | 125.931 | 2.175 | 2 | 1.83789 | 24.13 |
| 3 | 36.003 | 0.100 | | | |
| 4 | 13.278 | 2.442 | 3 | 1.84700 | 23.90 |
| 5 | 9.806 | 10.121 | | | |
| 6* | −9.753 | 2.055 | 4 | 1.84700 | 23.90 |
| 7 | −12.973 | 0.329 | | | |
| 8 | −86.779 | 2.449 | 5 | 1.81669 | 24.72 |
| 9 | 123.550 | 5.732 | 6 | 1.82082 | 45.53 |
| 10* | −20.250 | 27.653 | | | |
| 11 | ∞ | 0.700 | 7 | 1.51633 | 64.15 |
| 12 | ∞ | | | | |

The aspherical surface is applied to the sixth lens-surface.
$K=0.007559, A_4=-9.41485E-6, A_6=-1.34254E-8,$
$A_8=-1.63958E-9, A_{10}=1.76908E-11$ The aspherical surface is applied to the tenth lens-surface.
$K=-0.007788, A_4=3.42452E-7, A_6=-1.45934E-9,$
$A_8=2.07325E-11, A_{10}=4.28030E-14$ FIGS. 89, 90 and 91 represent the aberration curves of the examples 88, 89 and 90, respectively, in the same way as the graphs of FIGS. 2 to 4 of the embodiment 1, mentioned before. The graphs show that the aberrations are fully compensated for.

Many widely different embodiments of the present invention may be constructed without departing from the spirit and scope of the present invention. It should be understood that the present invention is not limited to the specific embodiments described in the specification, except as defined in the appended claims.

What is claimed is:

1. A reading lens for a scanner to read an original in a reduced magnification, said lens comprising:

a first lens disposed on an optical axis and composed of a positive lens having a first lens-surface on an object side thereof and a second lens-surface on an image side thereof;

a second lens disposed on said optical axis in contact with said second lens-surface of said first lens and composed of a negative lens having said second lens-surface in common with said first lens on an object side thereof and a third lens-surface on an image side thereof;

a third lens disposed on said optical axis in an image side of said second lens and composed of a meniscus lens having a fourth lens-surface on an object side thereof and a fifth lens-surface on an image side thereof;

a fourth lens disposed on said optical axis in an image side of said third lens and composed of a meniscus lens having a sixth lens-surface on an object side thereof and a seventh lens-surface on an image side thereof;

a fifth lens disposed on said optical axis in an image side of said fourth lens and composed of a negative lens having an eighth lens-surface on an object side thereof and a ninth lens-surface on an image side thereof; and a sixth lens disposed on said optical axis in contact with said ninth lens-surface of said fifth lens and composed of a positive lens having said ninth lens-surface in common with said fifth lens on an object side thereof and a tenth lens-surface on an image side thereof, said first lens-surface being an aspherical surface which has a conic constant $K_1$ satisfying a condition of $$-0.035 < K_1 < 0.$$

2. A reading lens for a scanner according to claim 1, wherein said reading lens further comprises an aperture stop disposed between said third lens and said fourth lens on said optical axis and a seventh lens disposed on said optical axis in an image side of said sixth lens and composed of a plane glass plate having parallel side surfaces.

3. A reading lens for a scanner to read an original in a reduced magnification, said lens comprising:

a first lens disposed on an optical axis and composed of a positive lens having a first lens-surface on an object side thereof and a second lens-surface on an image side thereof;

a second lens disposed on said optical axis in contact with said second lens-surface of said first lens and composed of a negative lens having said second lens-surface in common with said first lens on an object side thereof and a third lens-surface on an image side thereof;

a third lens disposed on said optical axis in an image side of said second lens and composed of a meniscus lens having a fourth lens-surface on an object side thereof and a fifth lens-surface on an image side thereof;

a fourth lens disposed on said optical axis in an image side of said third lens and composed of a meniscus lens having a sixth lens-surface on an object side thereof and a seventh lens-surface on an image side thereof;

a fifth lens disposed on said optical axis in an image side of said fourth lens and composed of a negative lens having an eighth lens-surface on an object side thereof and a ninth lens-surface on an image side thereof; and a sixth lens disposed on said optical axis in contact with said ninth lens-surface of said fifth lens and composed of a positive lens having said ninth lens-surface in common with said fifth lens on an object side thereof and a tenth lens-surface on an image side thereof, said third lens-surface being an aspherical surface which has a conic constant $K_3$ satisfying a condition of $$0.097 < K_3 < 1.009.$$

4. A reading lens for a scanner to read an original in a reduced magnification, said lens comprising:

a first lens disposed on an optical axis and composed of a positive lens having a first lens-surface on an object side thereof and a second lens-surface on an image side thereof;

a second lens disposed on said optical axis in contact with said second lens-surface of said first lens and composed of a negative lens having said second lens-surface in common with said first lens on an object side thereof and a third lens-surface on an image side thereof;

a third lens disposed on said optical axis in an image side of said second lens and composed of a meniscus lens having a fourth lens-surface on an object side thereof and a fifth lens-surface on an image side thereof;

a fourth lens disposed on said optical axis in an image side of said third lens and composed of a meniscus lens having a sixth lens-surface on an object side thereof and a seventh lens-surface on an image side thereof;

a fifth lens disposed on said optical axis in an image side of said fourth lens and composed of a negative lens having an eighth lens-surface on an object side thereof and a ninth lens-surface on an image side thereof; and a sixth lens disposed on said optical axis in contact with said ninth lens-surface of said fifth lens and composed of a positive lens having said ninth lens-surface in common with said fifth lens on an object side thereof and a tenth lens-surface on an image side thereof, said fourth lens-surface being an aspherical surface which has a conic constant $K_4$ satisfying a condition of $$-0.09 < K_4 < -0.04.$$

5. A reading lens for a scanner to read an original in a reduced magnification, said lens comprising:

a first lens disposed on an optical axis and composed of a positive lens having a first lens-surface on an object side thereof and a second lens-surface on an image side thereof;

a second lens disposed on said optical axis in contact with said second lens-surface of said first lens and composed of a negative lens having said second lens-surface in common with said first lens on an object side thereof and a third lens-surface on an image side thereof;

a third lens disposed on said optical axis in an image side of said second lens and composed of a meniscus lens having a fourth lens-surface on an object side thereof and a fifth lens-surface on an image side thereof;

a fourth lens disposed on said optical axis in an image side of said third lens and composed of a meniscus lens having a sixth lens-surface on an object side thereof and a seventh lens-surface on an image side thereof;

a fifth lens disposed on said optical axis in an image side of said fourth lens and composed of a negative lens having an eighth lens-surface on an object side thereof and a ninth lens-surface on an image side thereof; and a sixth lens disposed on said optical axis in contact with said ninth lens-surface of said fifth lens and composed of a positive lens having said ninth lens-surface in common with said fifth lens on an object side thereof and a tenth lens-surface on an image side thereof, said fifth lens-surface being an aspherical surface which has a conic constant $K_5$ satisfying a condition of $0 < K_5 < 0.055.$ 6. A reading lens for a scanner to read an original in a reduced magnification, said lens comprising:

a first lens disposed on an optical axis and composed of a positive lens having a first lens-surface on an object side thereof and a second lens-surface on an image side thereof;

a second lens disposed on said optical axis in contact with said second lens-surface of said first lens and composed of a negative lens having said second lens-surface in common with said first lens on an object side thereof and a third lens-surface on an image side thereof;

a third lens disposed on said optical axis in an image side of said second lens and composed of a meniscus lens having a fourth lens-surface on an object side thereof and a fifth lens-surface on an image side thereof;

a fourth lens disposed on said optical axis in an image side of said third lens and composed of a meniscus lens having a sixth lens-surface on an object side thereof and a seventh lens-surface on an image side thereof;

a fifth lens disposed on said optical axis in an image side of said fourth lens and composed of a negative lens having an eighth lens-surface on an object side thereof and a ninth lens-surface on an image side thereof; and a sixth lens disposed on said optical axis in contact with said ninth lens-surface of said fifth lens and composed of a positive lens having said ninth lens-surface in common with said fifth lens on an object side thereof and a tenth lens-surface on an image side thereof, said sixth lens-surface being an aspherical surface which has a conic constant $K_6$ satisfying a condition of $0 < K_6 < 0.007.$ 7. A reading lens for a scanner to read an original in a reduced magnification, said lens comprising:

a first lens disposed on an optical axis and composed of a positive lens having a first lens-surface on an object side thereof and a second lens-surface on an image side thereof;

a second lens disposed on said optical axis in contact with said second lens-surface of said first lens and composed of a negative lens having said second lens-surface in common with said first lens on an object side thereof and a third lens-surface on an image side thereof;

a third lens disposed on said optical axis in an image side of said second lens and composed of a meniscus lens having a fourth lens-surface on an object side thereof and a fifth lens-surface on an image side thereof;

a fourth lens disposed on said optical axis in an image side of said third lens and composed of a meniscus lens having a sixth lens-surface on an object side thereof and a seventh lens-surface on an image side thereof;

a fifth lens disposed on said optical axis in an image side of said fourth lens and composed of a negative lens having an eighth lens-surface on an object side thereof and a ninth lens-surface on an image side thereof; and a sixth lens disposed on said optical axis in contact with said ninth lens-surface of said fifth lens and composed of a positive lens having said ninth lens-surface in common with said fifth lens on an object side thereof and a tenth lens-surface on an image side thereof, said seventh lens-surface being an aspherical surface which has a conic constant $K_7$ satisfying a condition of $-0.014 < K_7 < 0.$ 8. A reading lens for a scanner to read an original in a reduced magnification, said lens comprising:

a first lens disposed on an optical axis and composed of a positive lens having a first lens-surface on an object side thereof and a second lens-surface on an image side thereof;

a second lens disposed on said optical axis in contact with said second lens-surface of said first lens and composed of a negative lens having said second lens-surface in common with said first lens on an object side thereof and a third lens-surface on an image side thereof;

a third lens disposed on said optical axis in an image side of said second lens and composed of a meniscus lens having a fourth lens-surface on an object side thereof and a fifth lens-surface on an image side thereof;

a fourth lens disposed on said optical axis in an image side of said third lens and composed of a meniscus lens having a sixth lens-surface on an object side thereof and a seventh lens-surface on an image side thereof;

a fifth lens disposed on said optical axis in an image side of said fourth lens and composed of a negative lens having an eighth lens-surface on an object side thereof and a ninth lens-surface on an image side thereof; and a sixth lens disposed on said optical axis in contact with said ninth lens-surface of said fifth lens and composed of a positive lens having said ninth lens-surface in common with said fifth lens on an object side thereof and a tenth lens-surface on an image side thereof, said eighth lens-surface being an aspherical surface which has a conic constant $K_8$ satisfying a condition of $0.74 < K_8 < 9.51.$ 9. A reading lens for a scanner to read an original in a reduced magnification, said lens comprising:

a first lens disposed on an optical axis and composed of a positive lens having a first lens-surface on an object side thereof and a second lens-surface on an image side thereof;

a second lens disposed on said optical axis in contact with said second lens-surface of said first lens and composed of a negative lens having said second lens-surface in common with said first lens on an object side thereof and a third lens-surface on an image side thereof;

a third lens disposed on said optical axis in an image side of said second lens and composed of a meniscus lens having a fourth lens-surface on an object side thereof and a fifth lens-surface on an image side thereof;

a fourth lens disposed on said optical axis in an image side of said third lens and composed of a meniscus lens having a sixth lens-surface on an object side thereof and a seventh lens-surface on an image side thereof;

a fifth lens disposed on said optical axis in an image side of said fourth lens and composed of a negative lens having an eighth lens-surface on an object side thereof and a ninth lens-surface on an image side thereof; and a sixth lens disposed on said optical axis in contact with said ninth lens-surface of said fifth lens and composed of a positive lens having said ninth lens-surface in common with said fifth lens on an object side thereof and a tenth lens-surface on an image side thereof, said tenth lens-surface being an aspherical surface which has a conic constant $K_{10}$ satisfying a condition of $-0.06 < K_{10} < 0.$

* * * * *